United States Patent [19]

Giras et al.

[11] 4,308,463

[45] Dec. 29, 1981

[54] SYSTEM AND METHOD FOR OPERATING INDUSTRIAL GAS TURBINE APPARATUS AND GAS TURBINE ELECTRIC POWER PLANTS PREFERABLY WITH A DIGITAL COMPUTER CONTROL SYSTEM

[75] Inventors: Theodore C. Giras; John F. Reuther, both of Pittsburgh, Pa.

[73] Assignee: Westinghouse Electric Corp., Pittsburgh, Pa.

[21] Appl. No.: 319,114

[22] Filed: Dec. 29, 1972

Related U.S. Application Data

[63] Continuation of Ser. No. 82,470, Oct. 20, 1970.

[51] Int. Cl.³ ............................................. G05B 15/02
[52] U.S. Cl. ...................................... 290/1; 364/118; 364/494; 364/495
[58] Field of Search ..................... 60/39.28; 290/4, 40, 290/2, 40.2

[56] References Cited

U.S. PATENT DOCUMENTS

| | | | |
|---|---|---|---|
| 3,012,401 | 12/1961 | Harner | 60/39.28 |
| 3,021,891 | 2/1962 | Kitchen et al. | 60/39.28 |
| 3,110,817 | 11/1963 | Frederick | 290/40 |
| 3,122,678 | 2/1964 | Marlot | 290/40 X |
| 3,128,603 | 4/1964 | Haigh | 60/39.28 |
| 3,151,450 | 10/1964 | Blackaby | 60/39.28 |
| 3,168,810 | 2/1965 | Gatzemeyer | 60/39.28 |
| 3,199,293 | 8/1965 | Starkey | 60/39.28 |
| 3,228,408 | 1/1966 | Young | 60/39.28 |
| 3,325,650 | 6/1967 | Barnes | 290/40 |
| 3,340,883 | 9/1967 | Peternel | 290/40 |
| 3,469,395 | 6/1969 | Spitsberger | 60/39.28 |
| 3,482,396 | 12/1969 | Nelson et al. | 60/39.28 |
| 3,520,133 | 7/1970 | Cost et al. | 60/39.14 |
| 3,539,785 | 11/1970 | Baker | 235/121.21 |
| 3,552,872 | 1/1971 | Giras et al. | 290/40 |
| 3,601,588 | 8/1971 | Bristol | 364/116 |
| 3,606,754 | 9/1971 | White | 60/39.28 |
| 3,772,882 | 11/1973 | Warne | 60/39.28 |

Primary Examiner—J. D. Miller
Assistant Examiner—John W. Redman
Attorney, Agent, or Firm—E. F. Possessky

[57] ABSTRACT

A gas turbine power plant is provided with an industrial gas turbine which drives a rotating brushless exciter generator coupled to a power system through a breaker. One or more of the turbine-generator plants are operated by a hybrid digital computer control system during sequenced startup, synchronizing, load, and shutdown operations. The program system for the computer and external analog circuitry operate in a multiple gas turbine control loop arrangement. Logic macro instructions are employed in programming the computer for logic operations of the control system.

92 Claims, 80 Drawing Figures

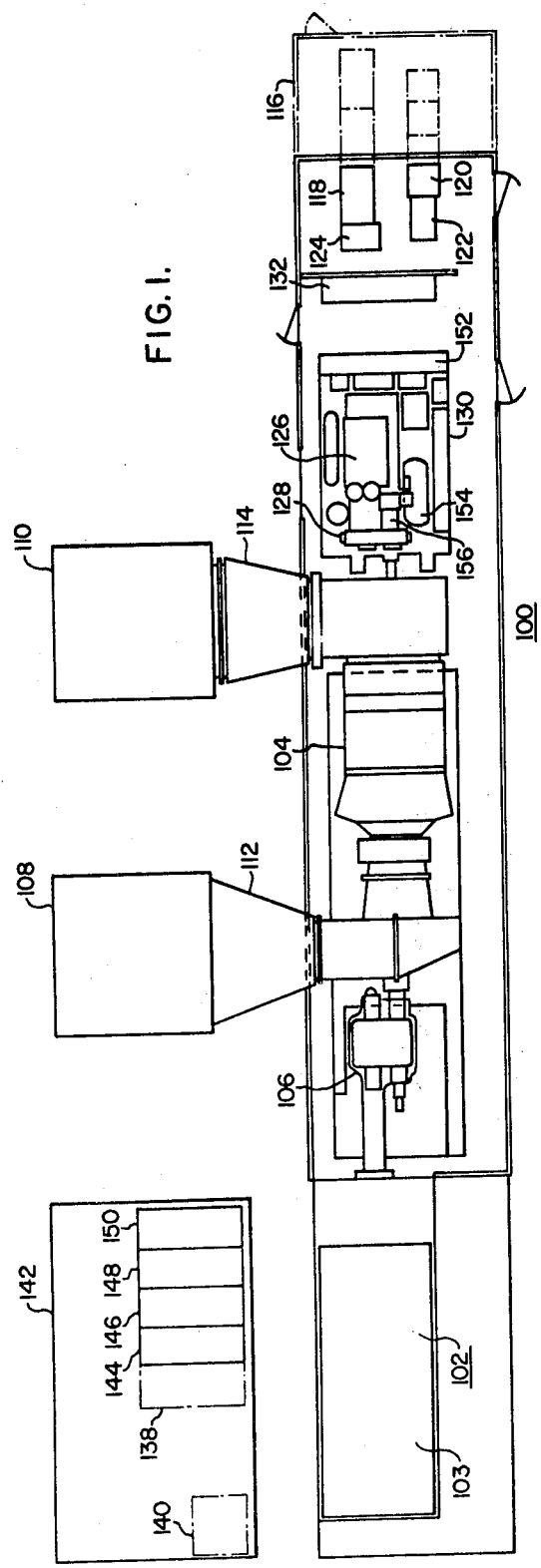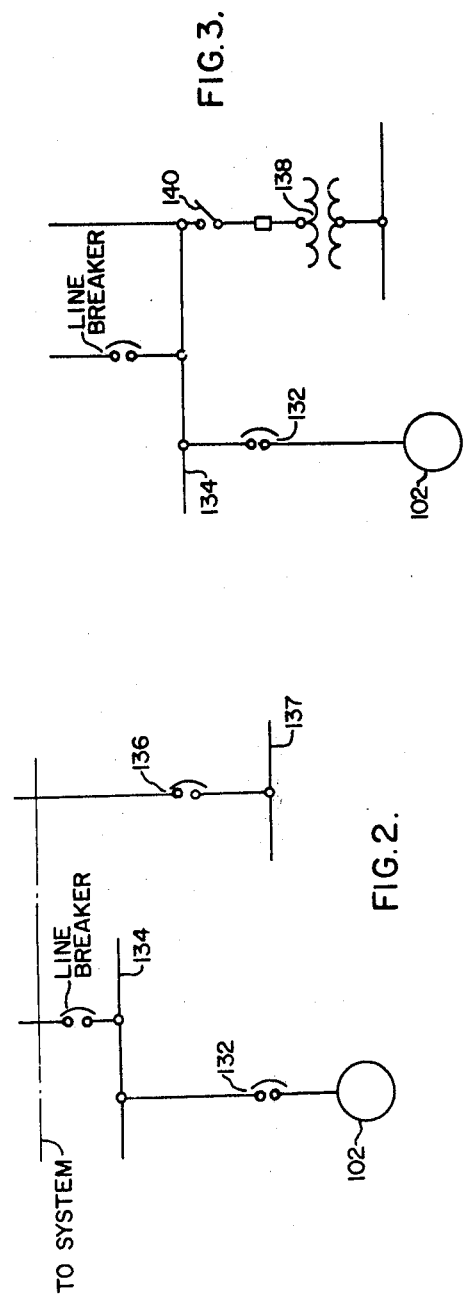

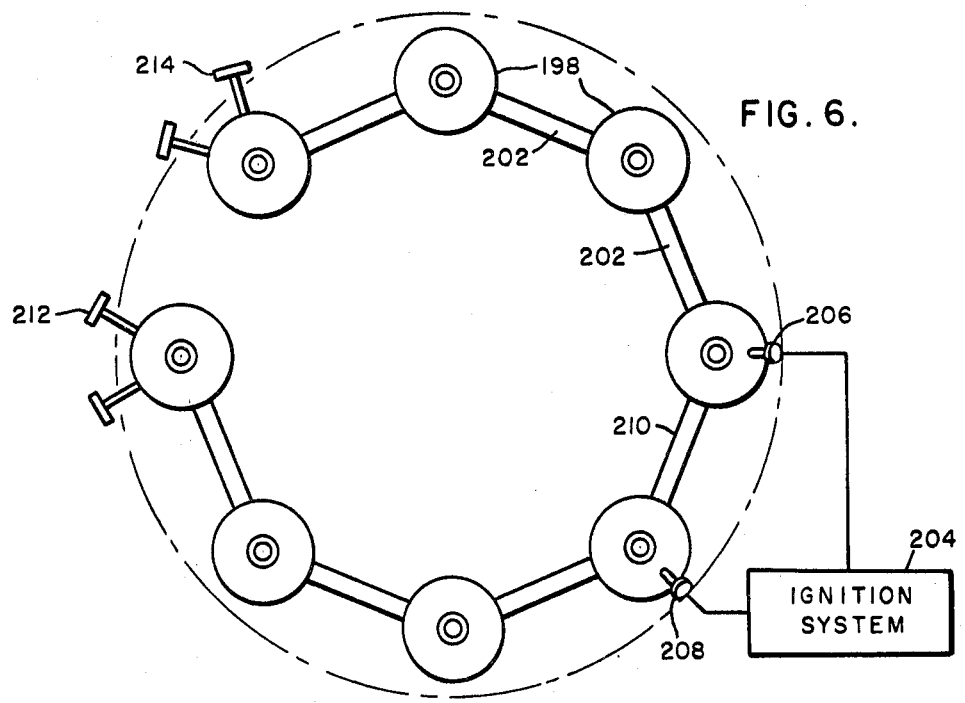
FIG. 6.
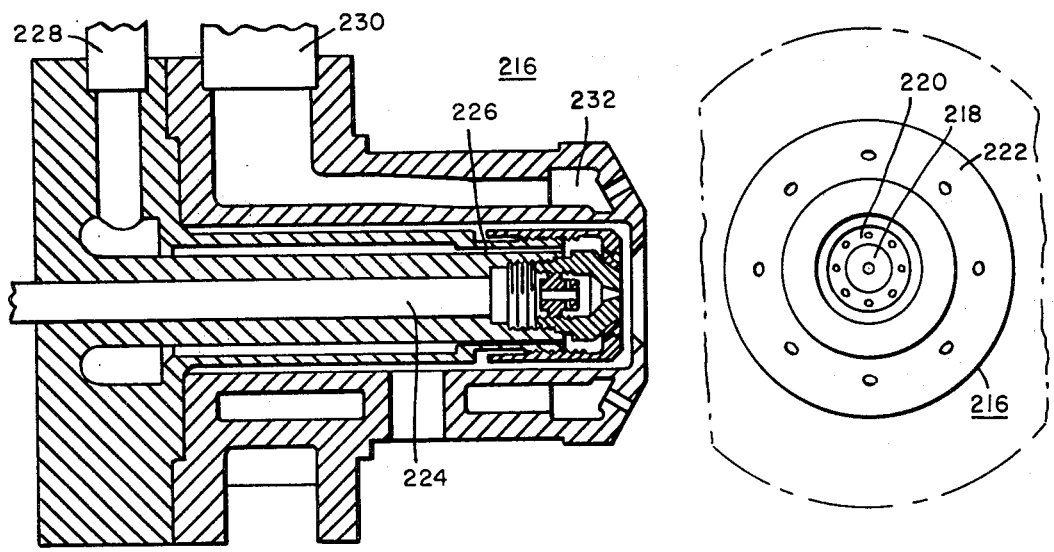
FIG. 8.
FIG. 7.

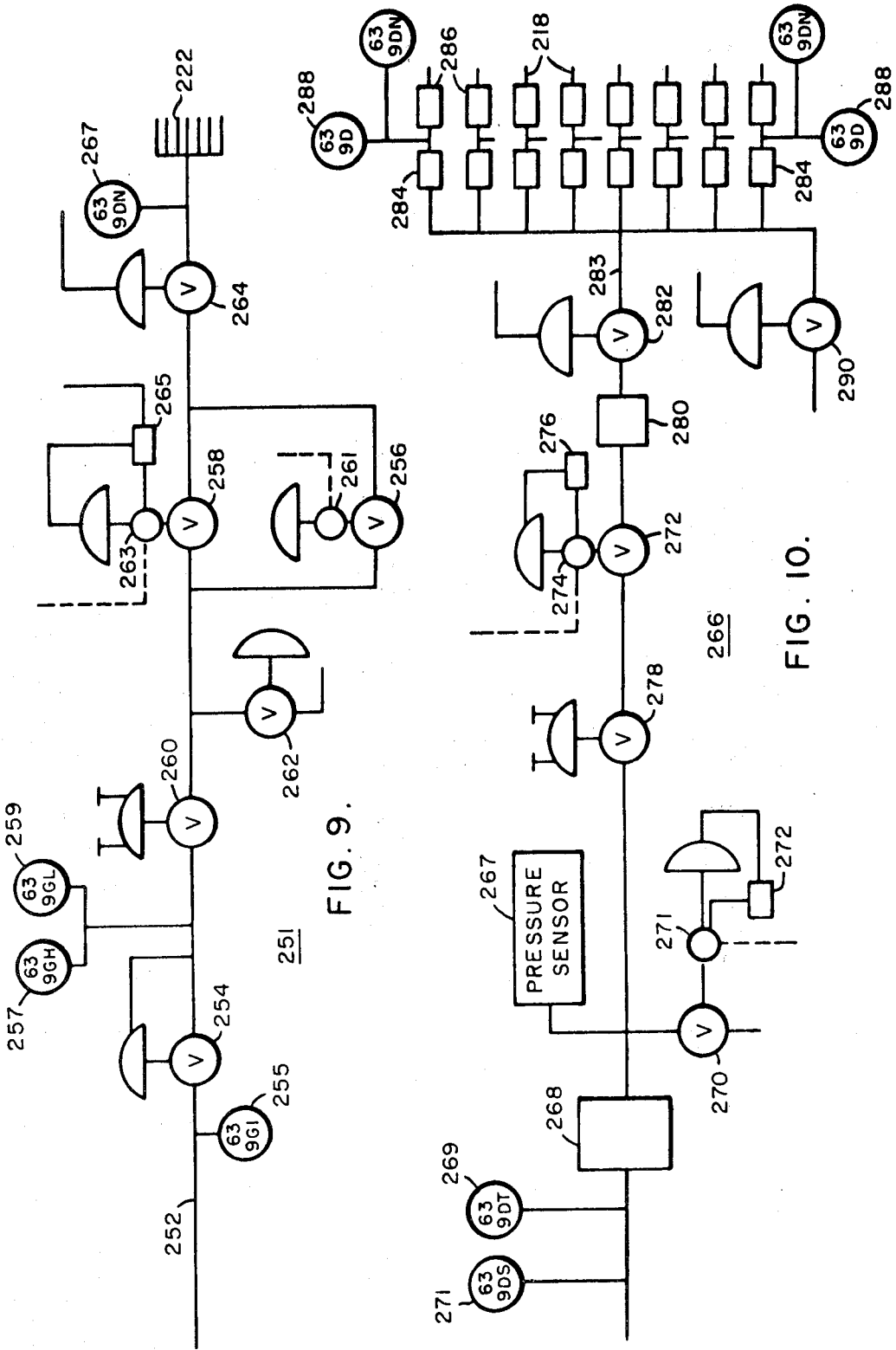

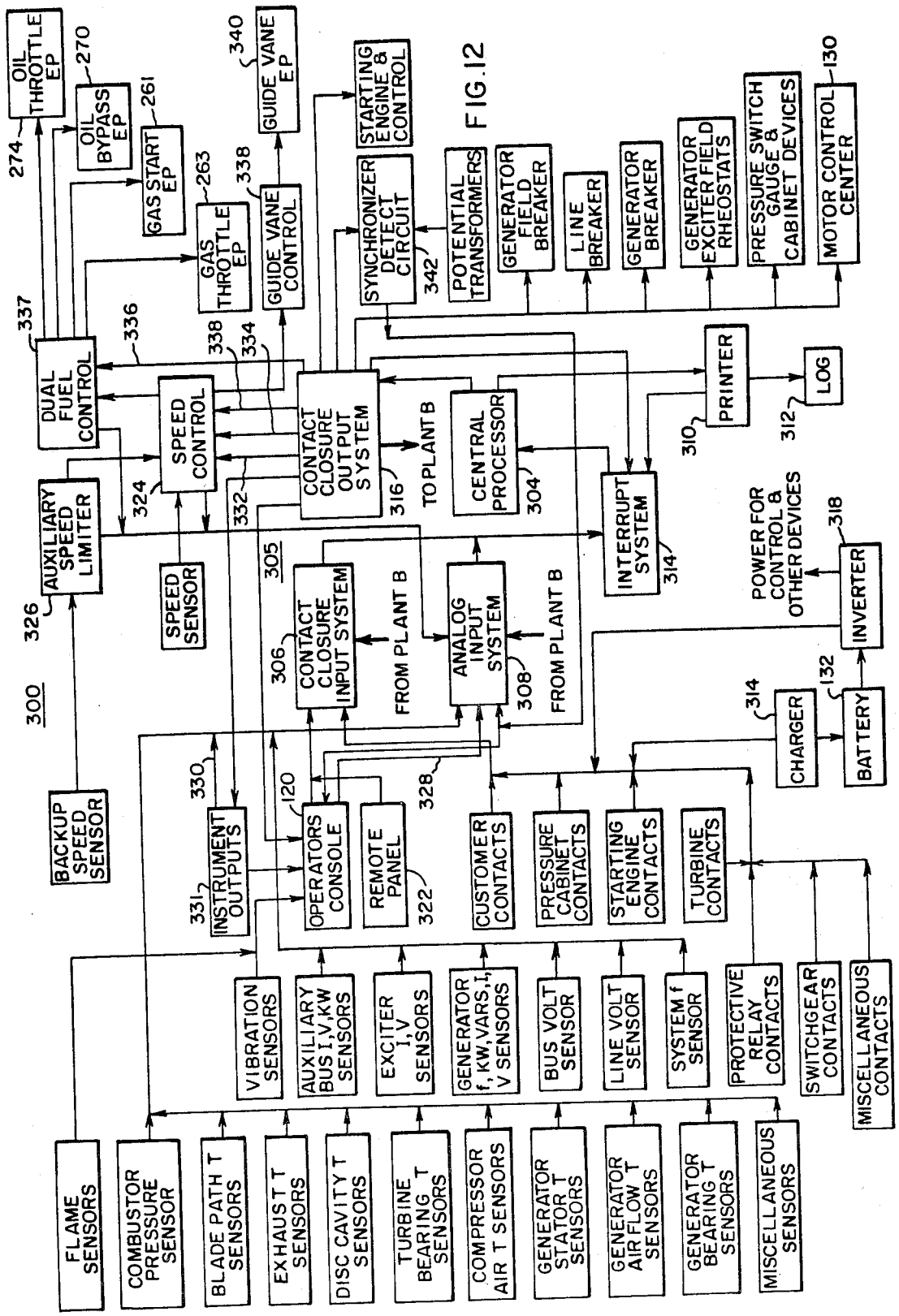

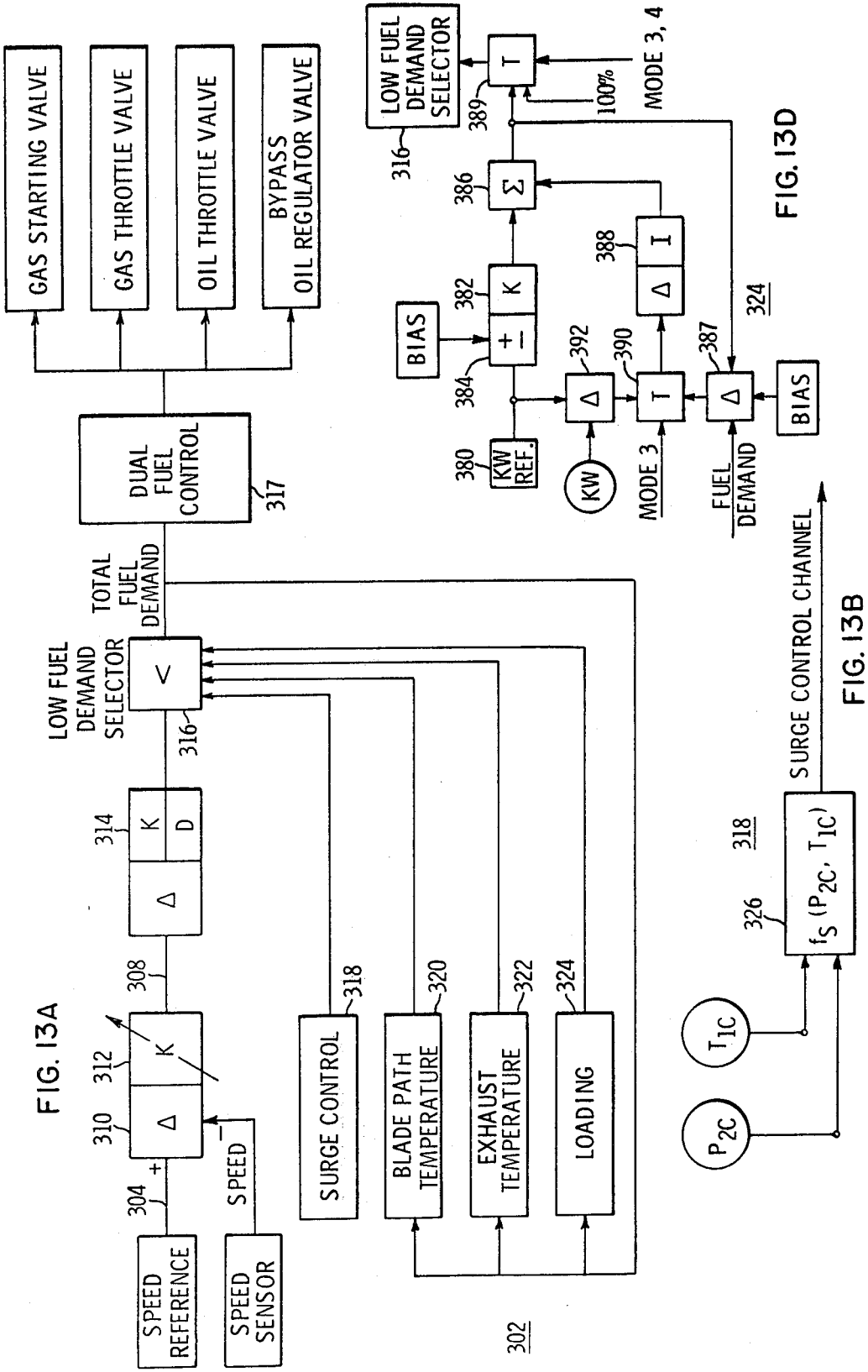

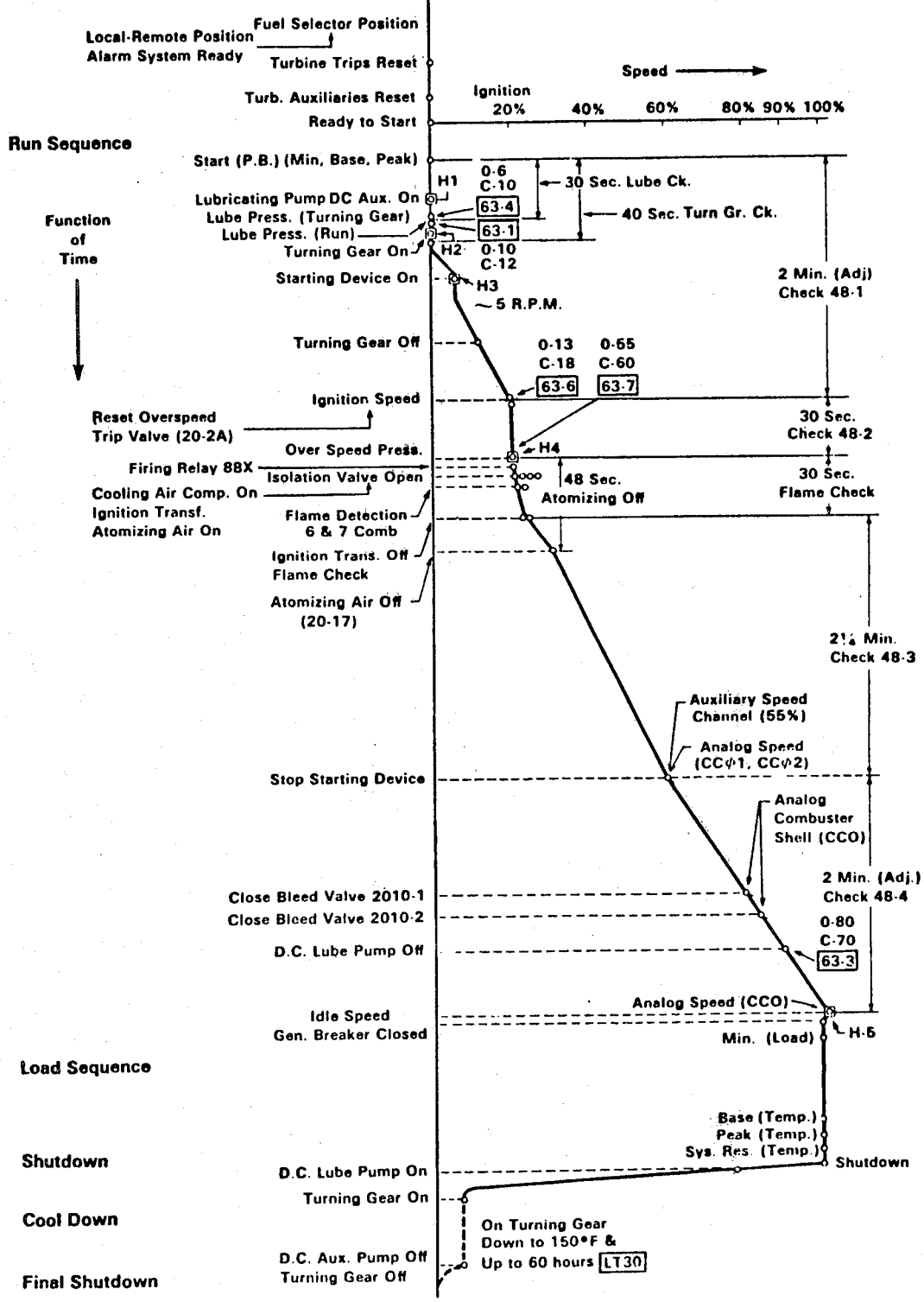

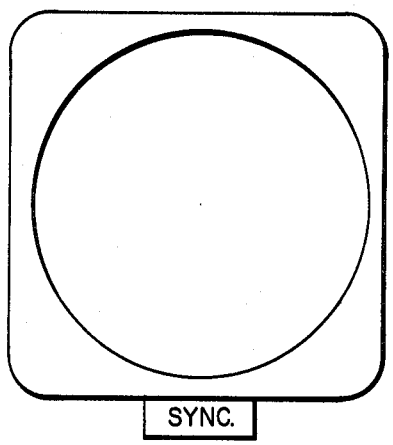
120
SYNC.
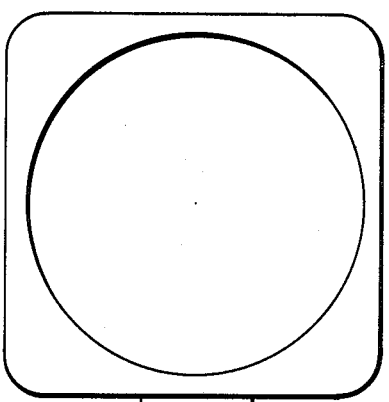
SPEED
| 35 | 36 | 37 | 38 |
|---|---|---|---|
| AUTO SYNC. | MANUEL SYNC. | SYNC. LIGHT | SYNC. LIGHT |
FIG.24B
| 17 | | 51 |
|---|---|---|
| SELECT INDIC. | 534 | SELECT DEV. |
| HOLD | | GO |
| 22 | | 56 |
| 31 | 32 | 33 | 34 | 61 | 62 | 63 | 64 |
|---|---|---|---|---|---|---|---|
| START DEVICE ON | O.S. TRIP VALVE | O.S. TRIP PRESS | IGNITION ON | FUEL ON | FLAME COMB. 6 | FLAME COMB. 7 | START DEV. OFF |

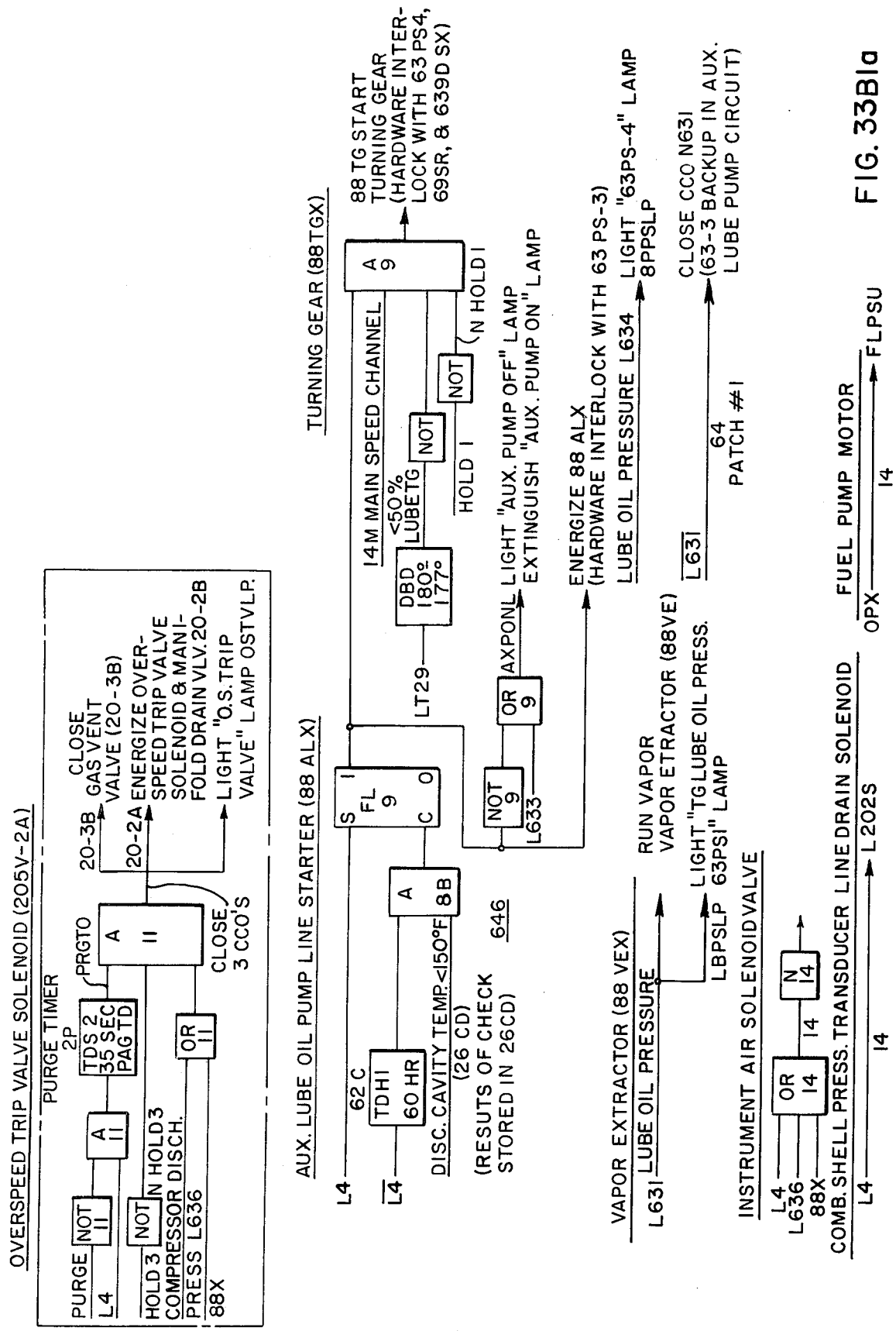
FIG. 33B1a

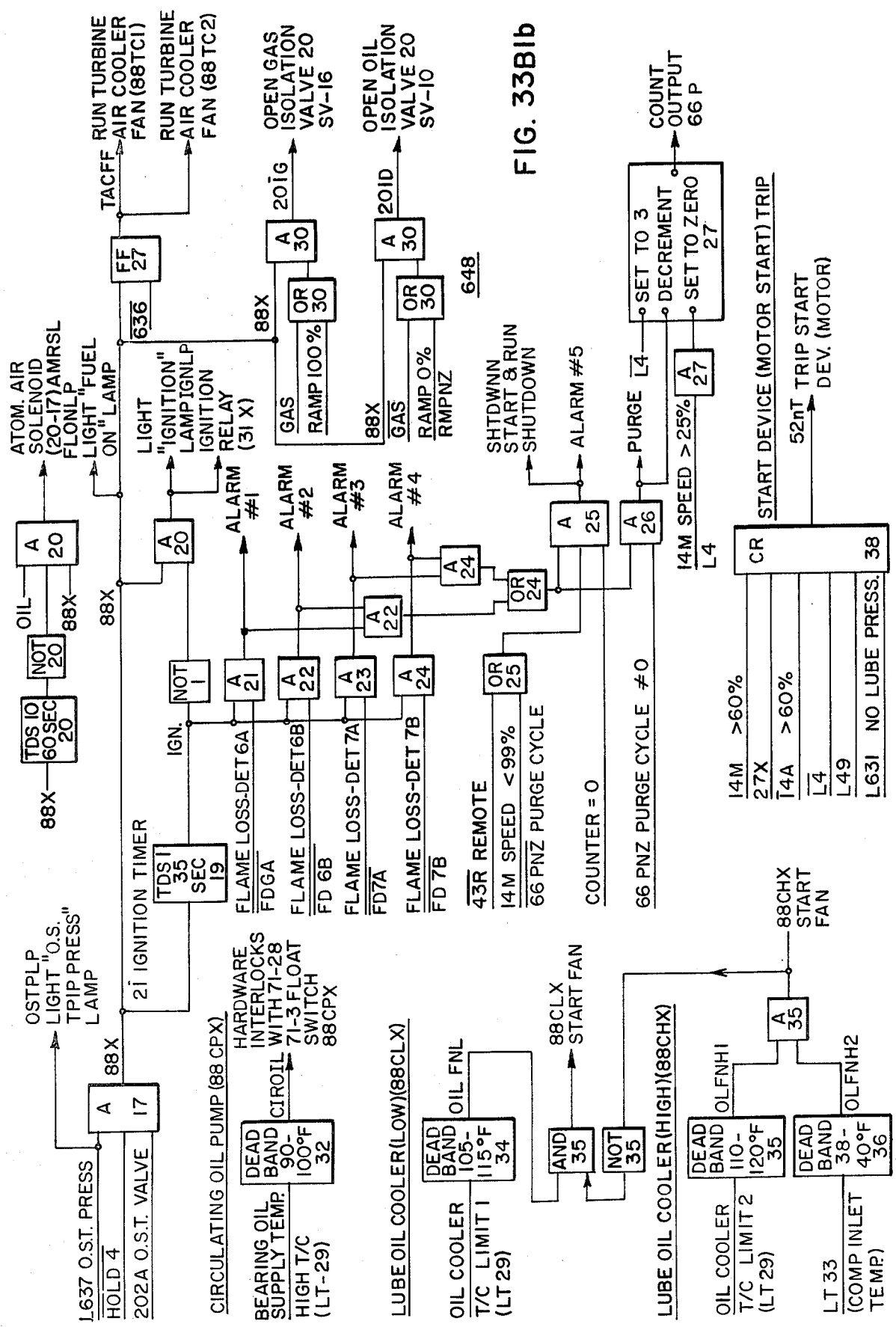
FIG. 33B1b

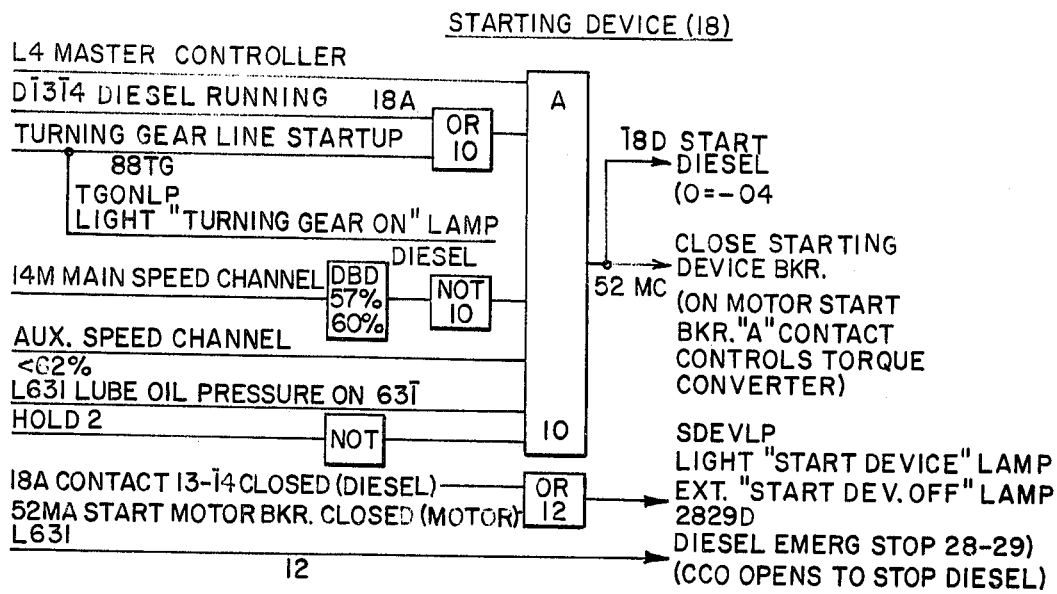
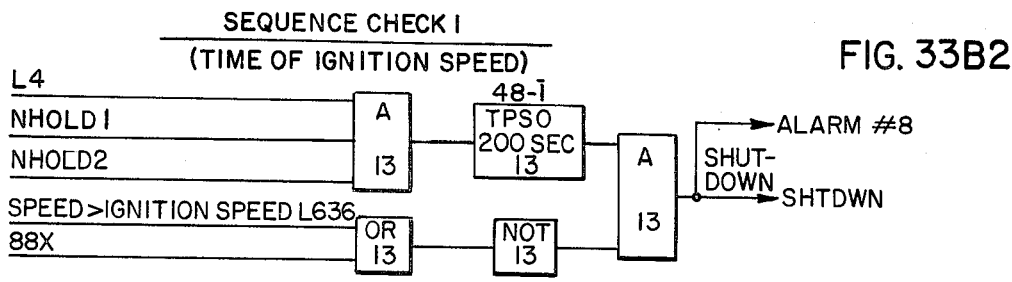
FIG. 33B2
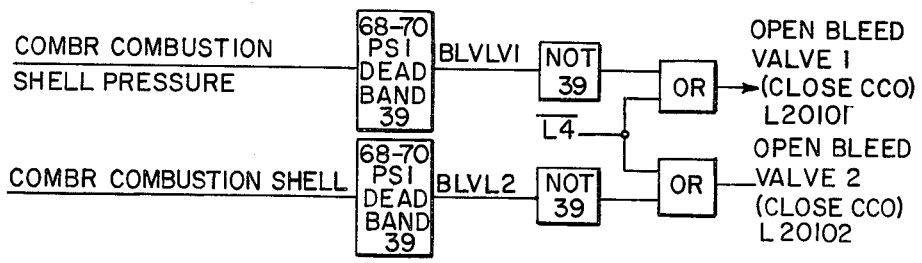
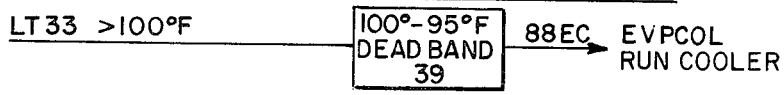
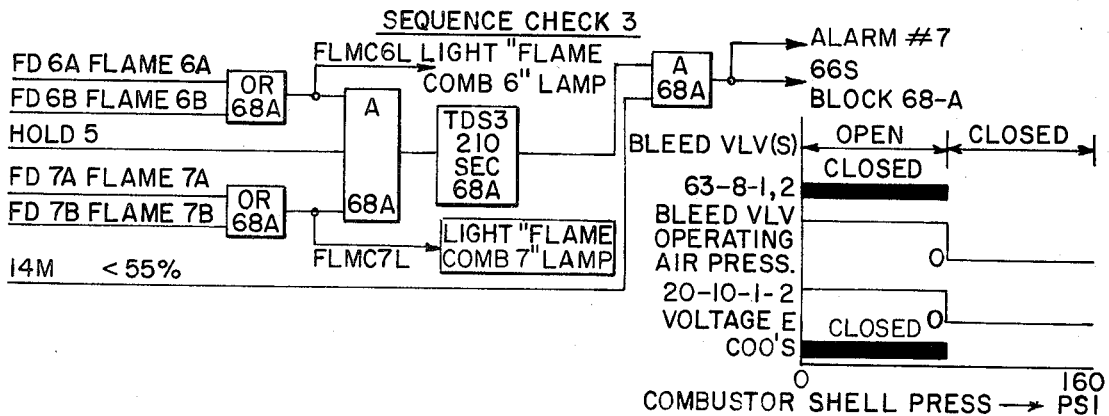

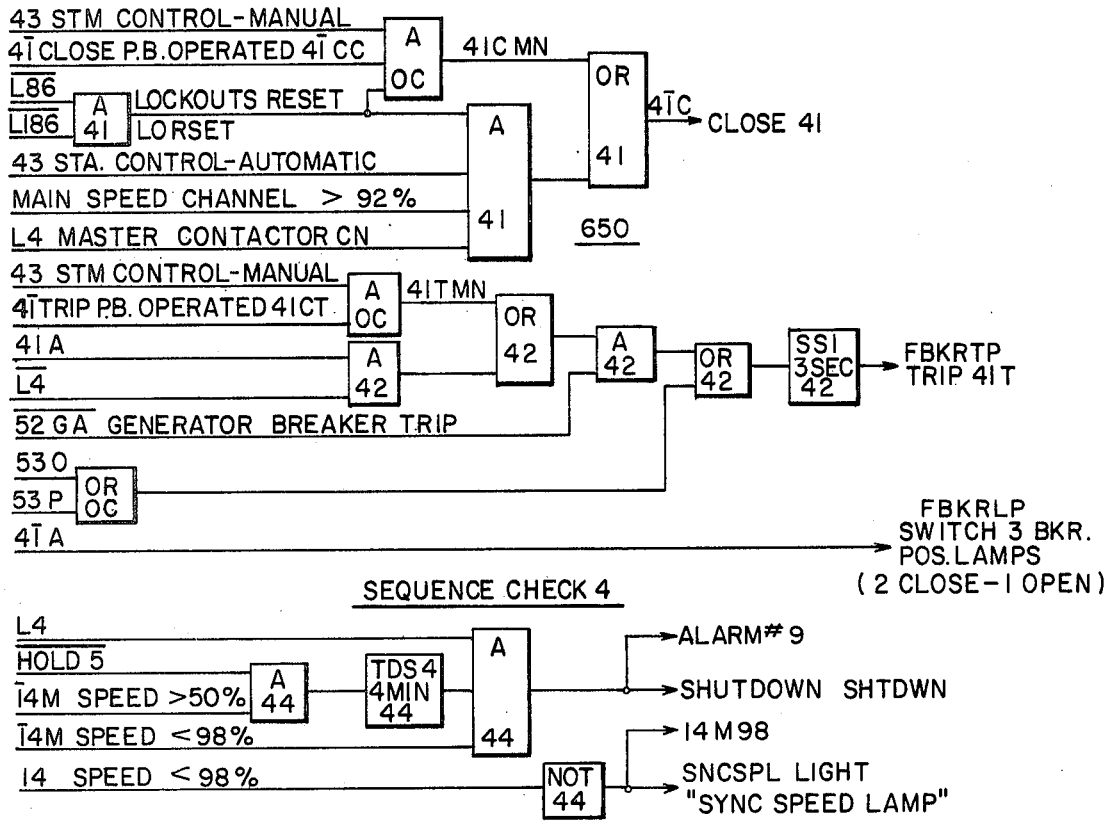
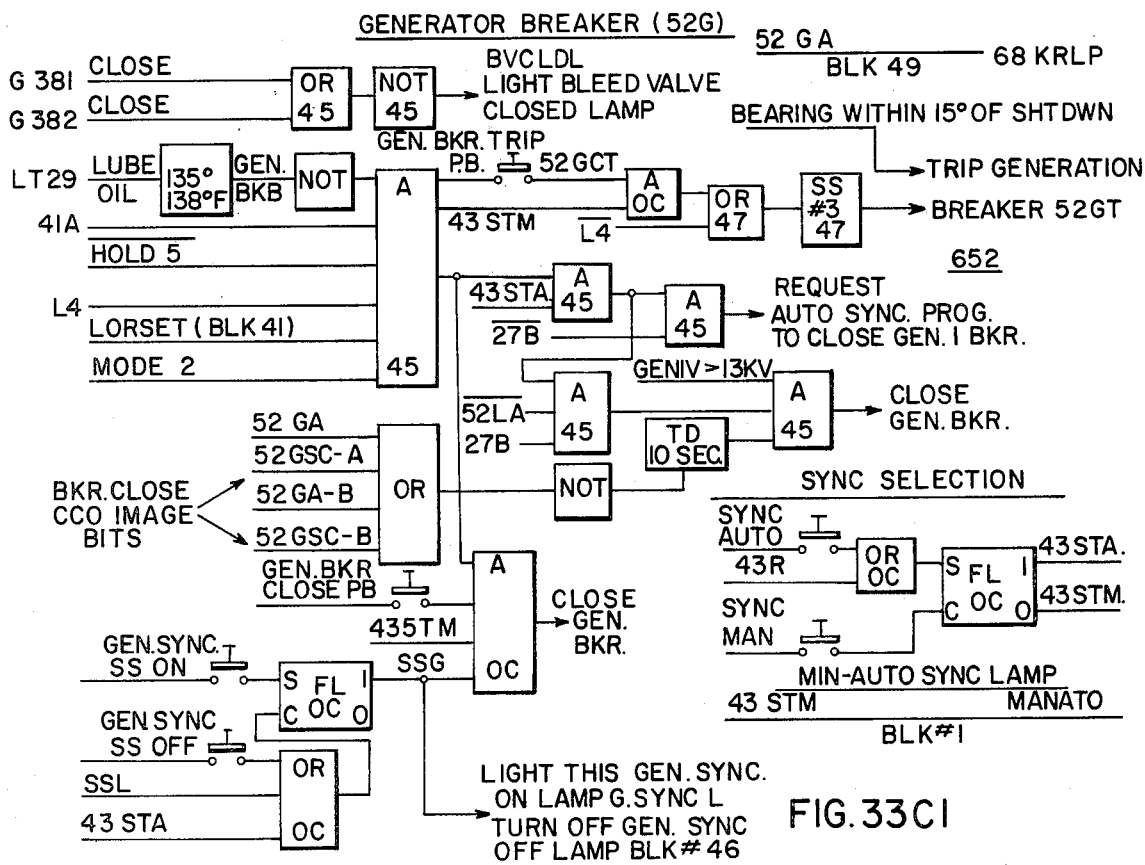
FIG. 33C1

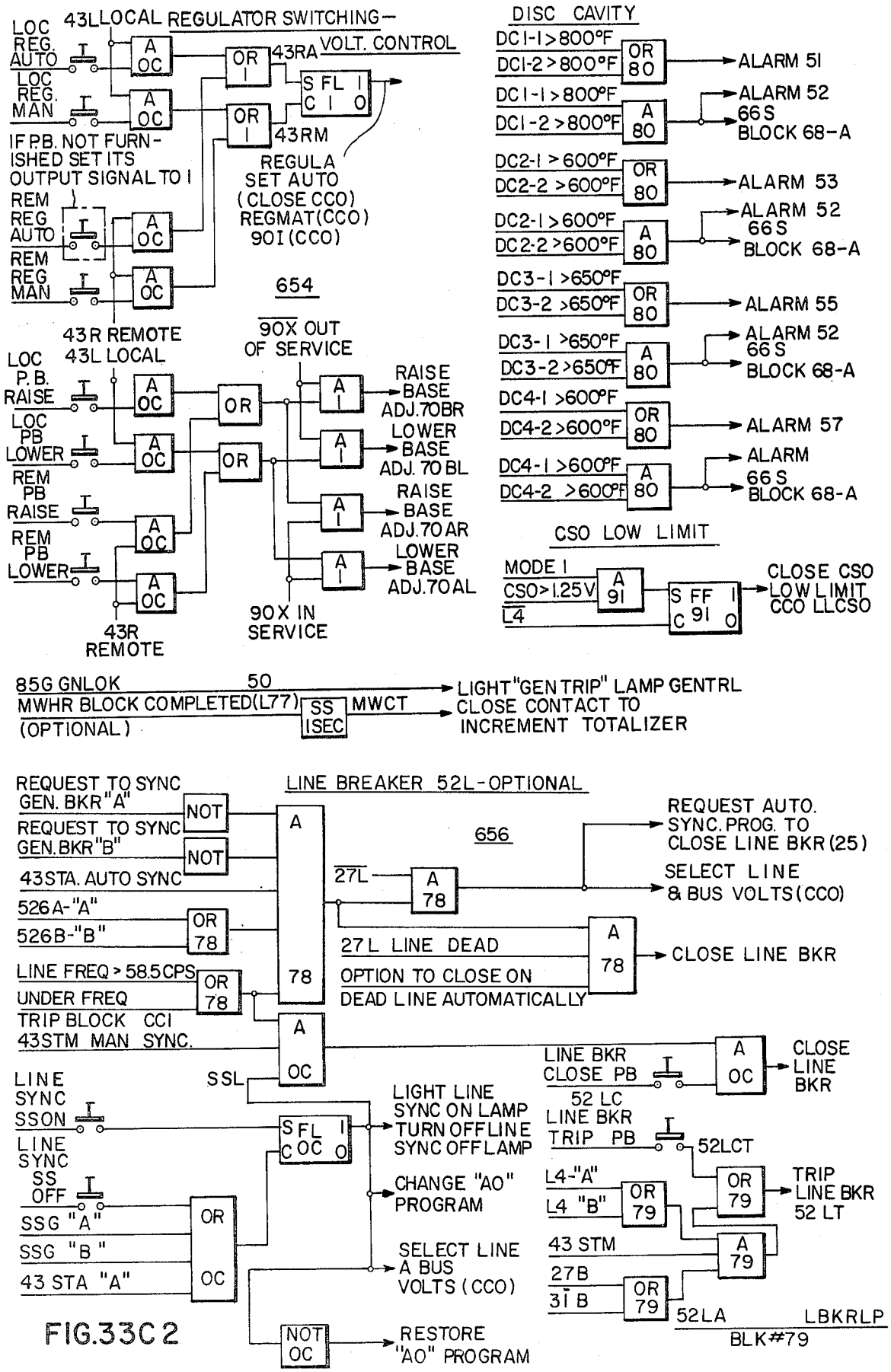
FIG.33C2

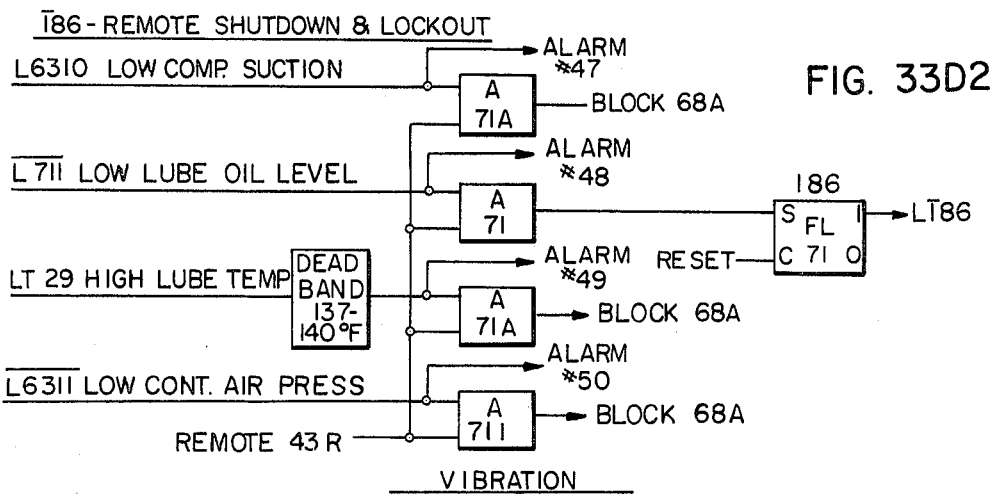
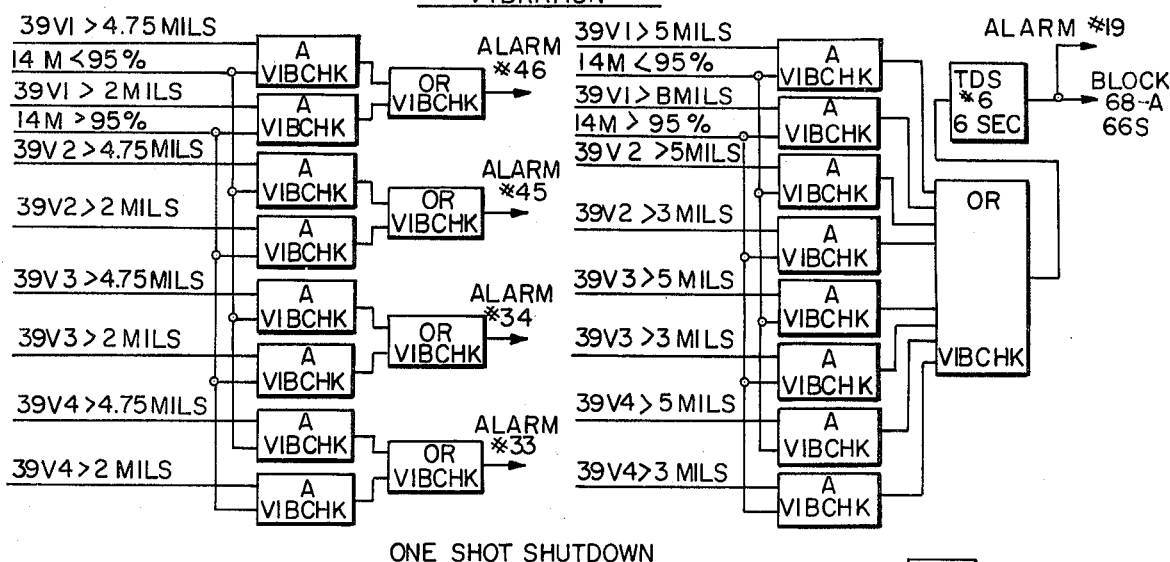
FIG. 33D2

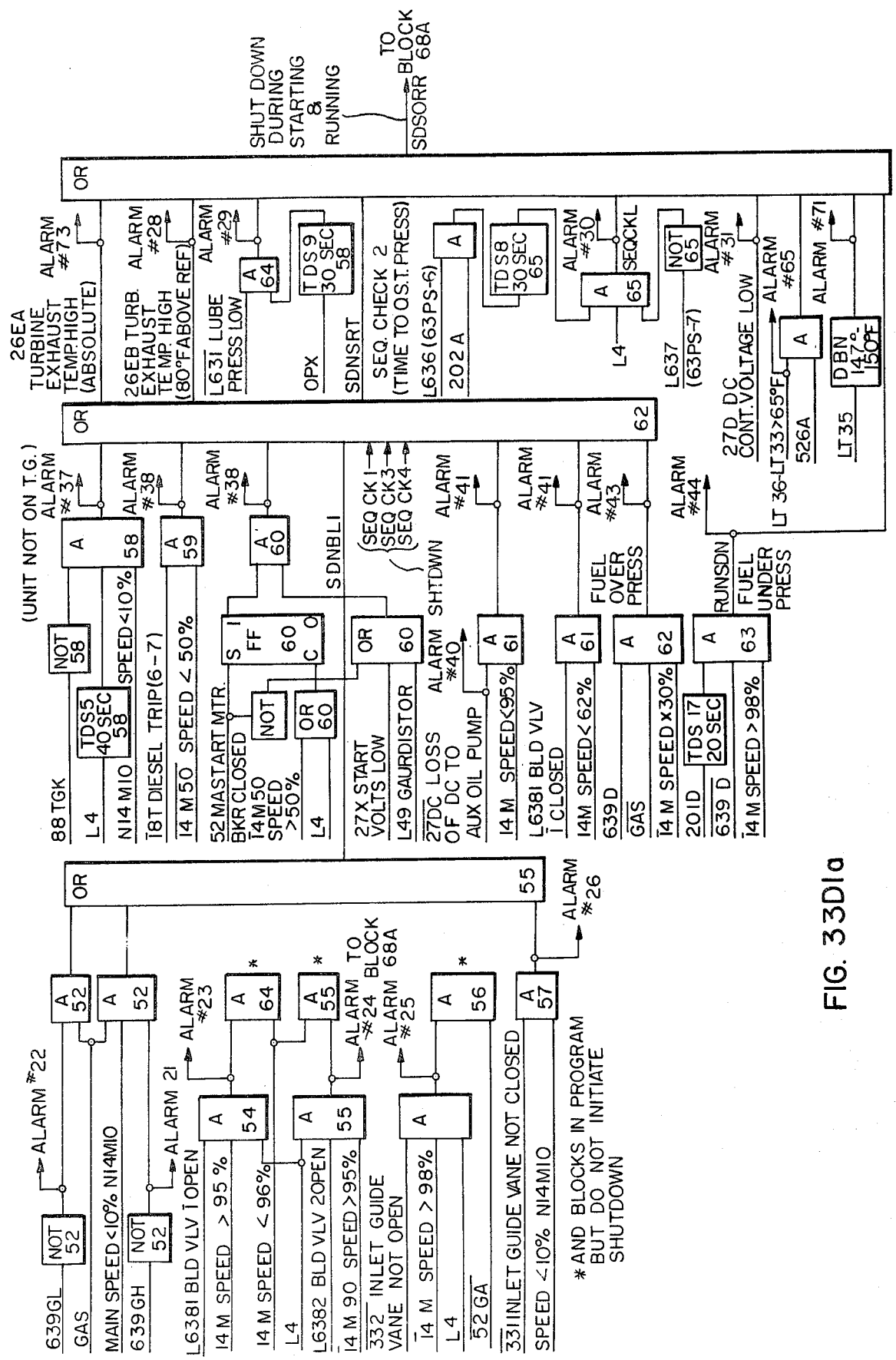
FIG. 33D1a

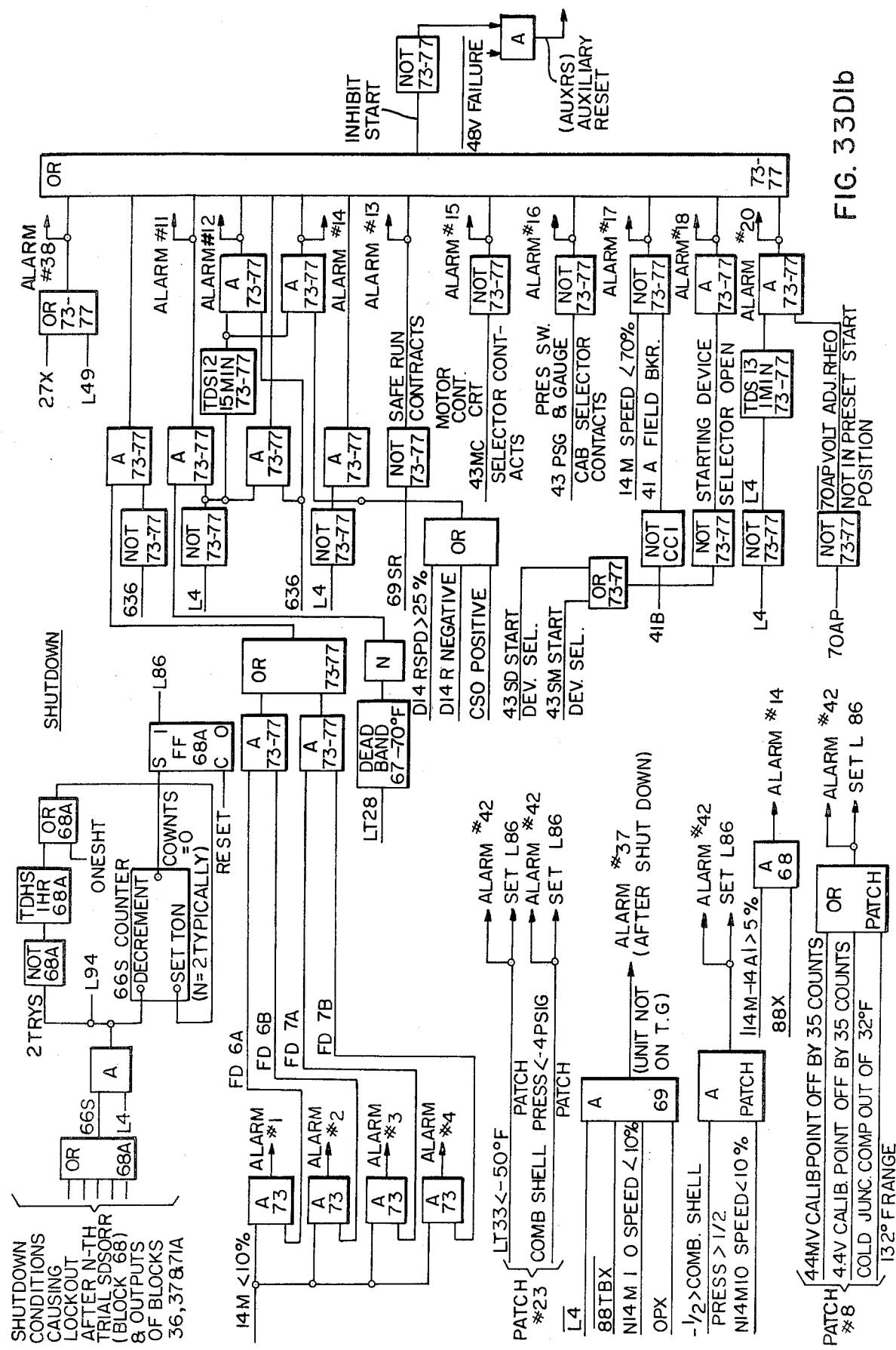
FIG. 33D1b

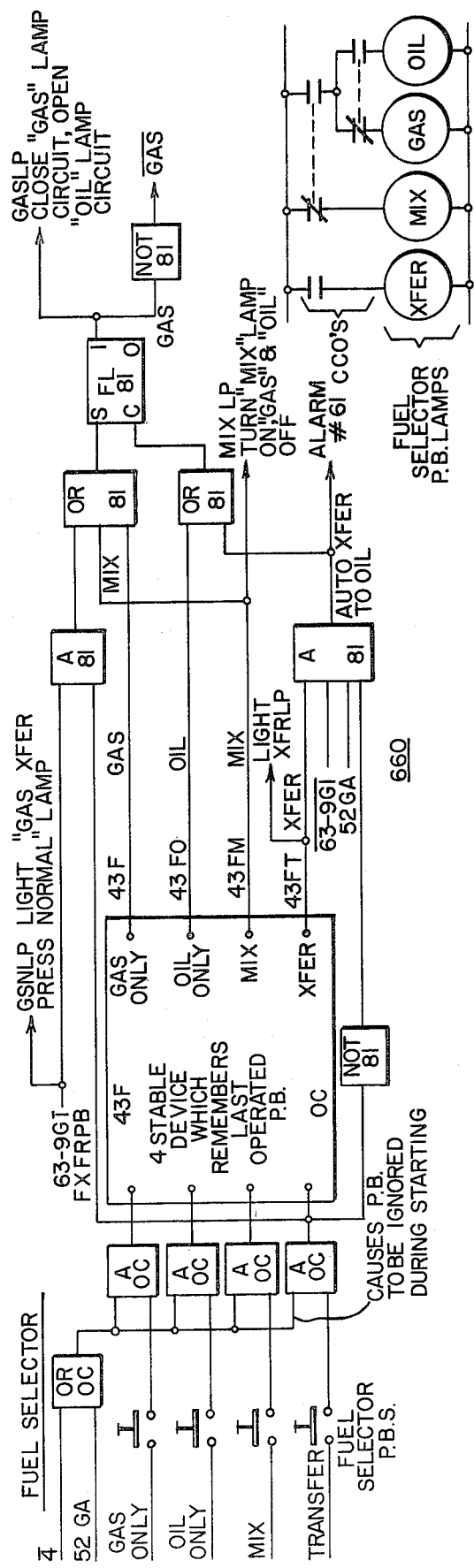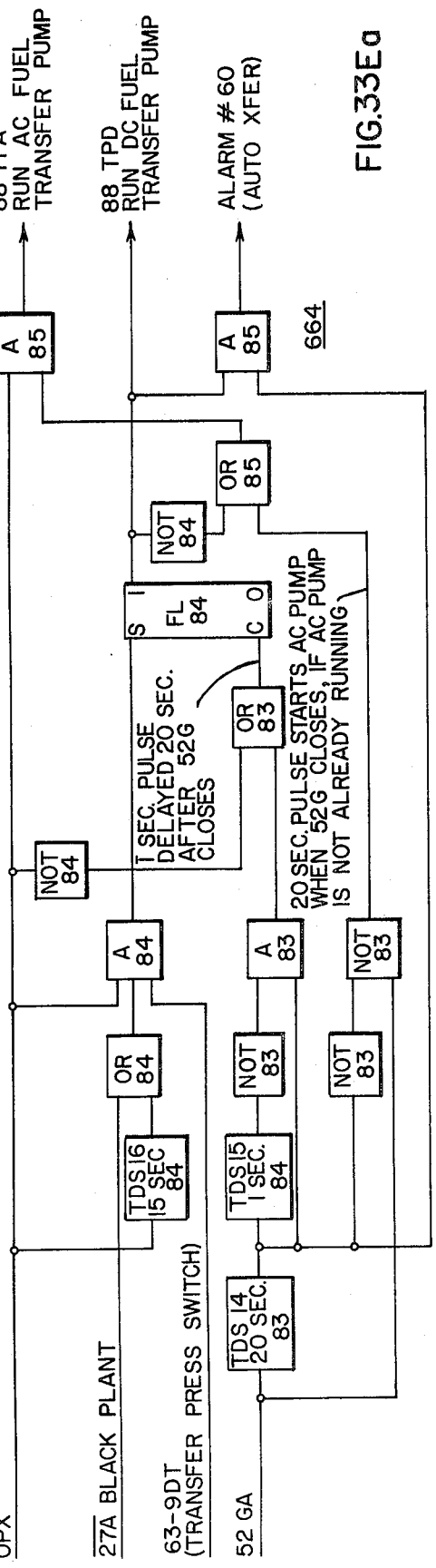
FIG.33Ea

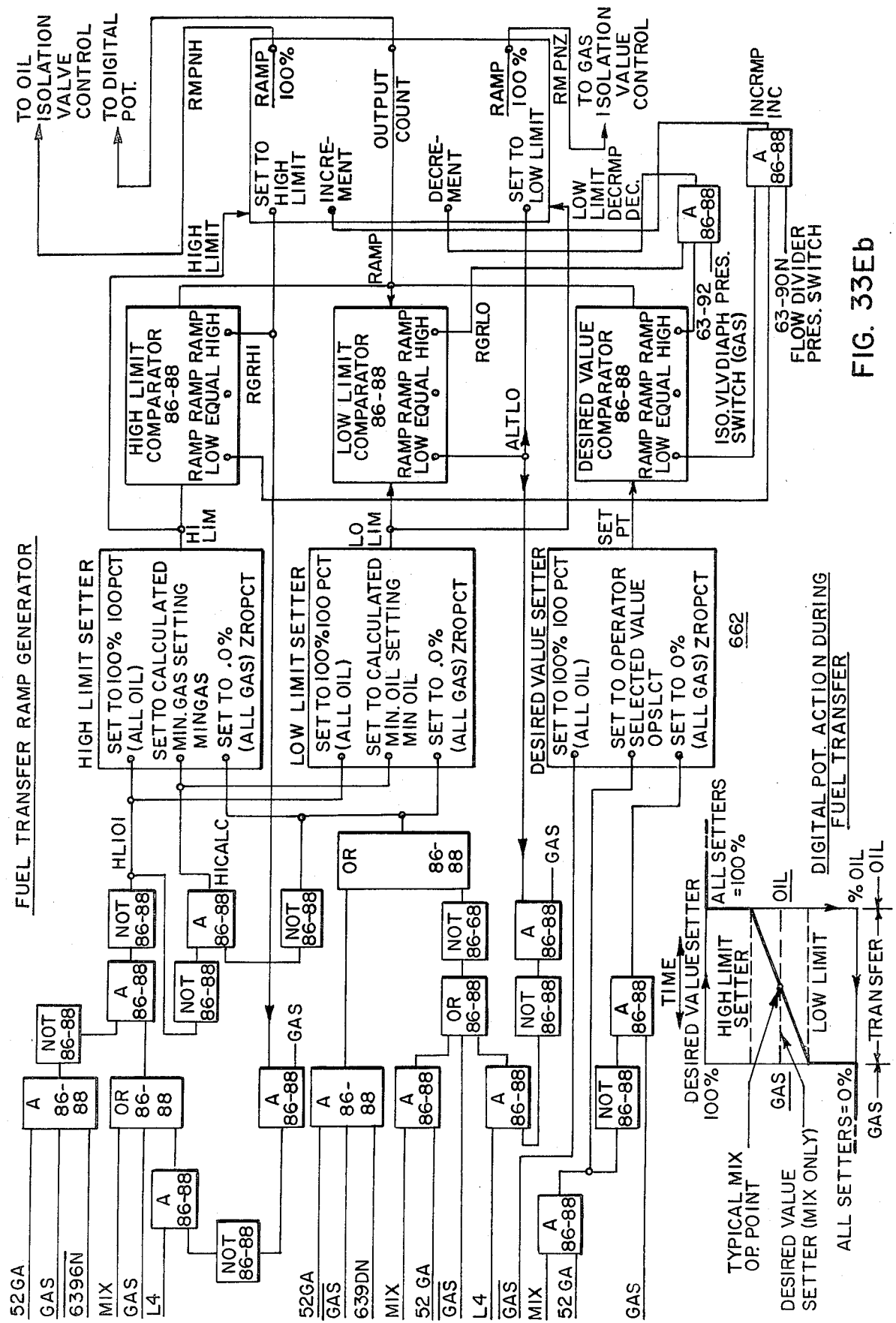

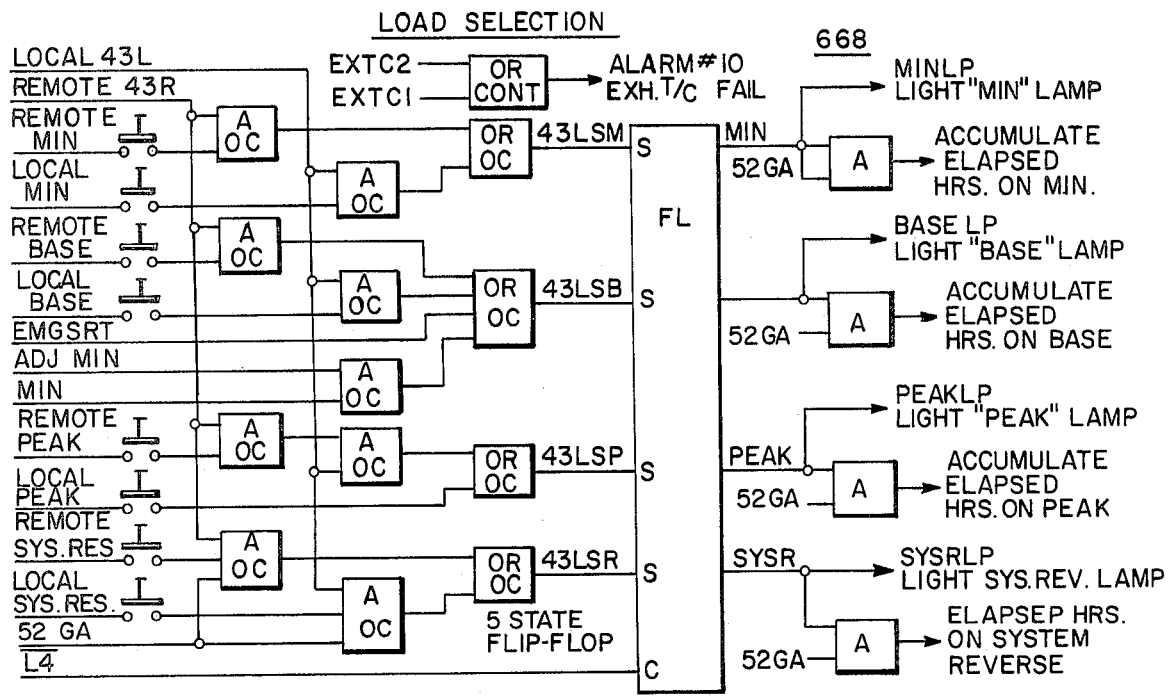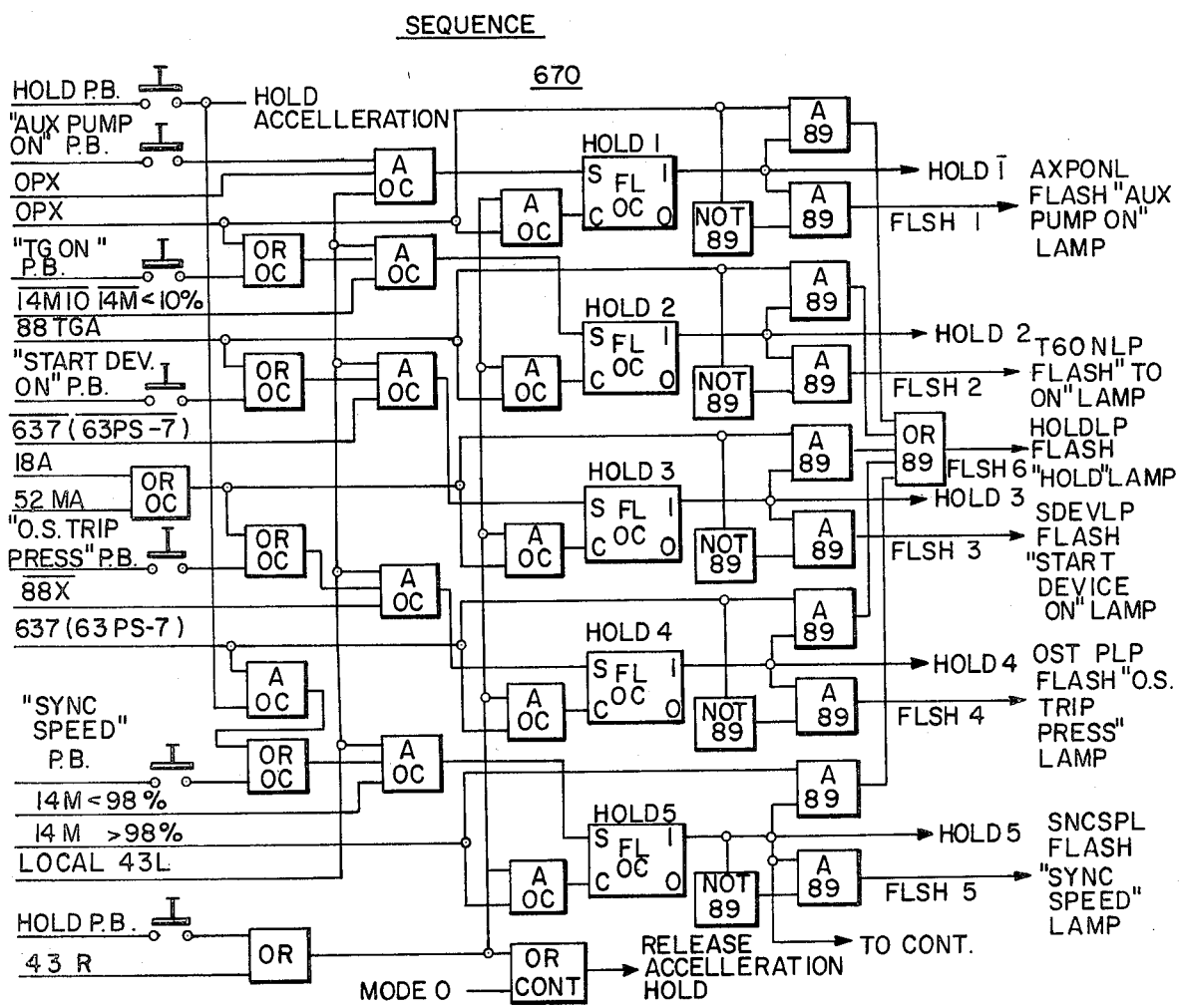
FIG.33Fb

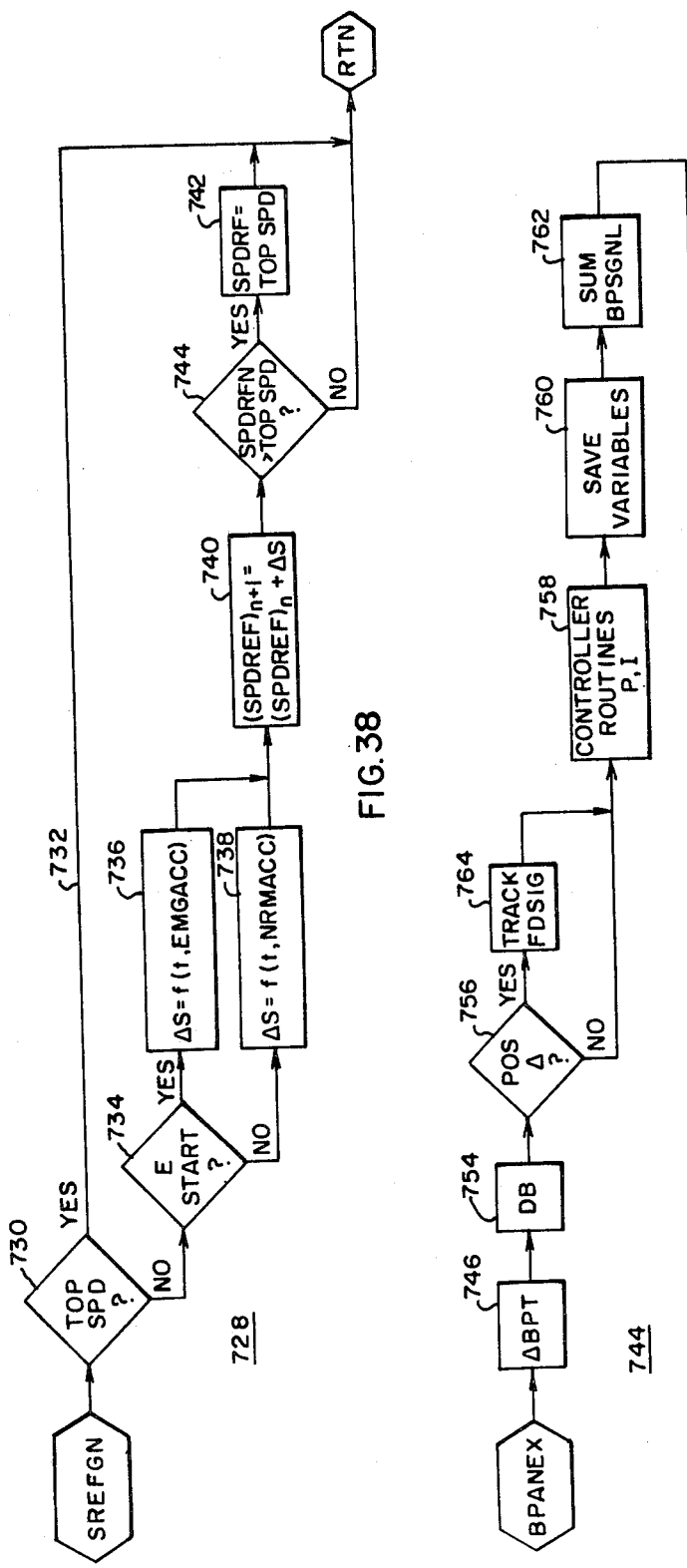
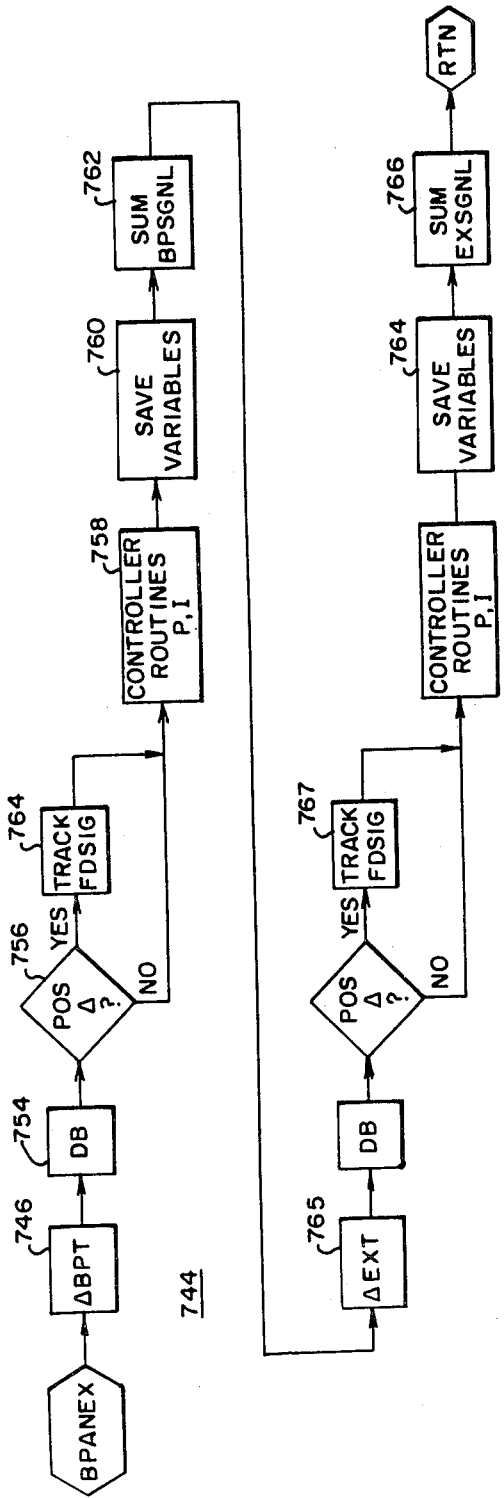
FIG. 38
FIG. 39

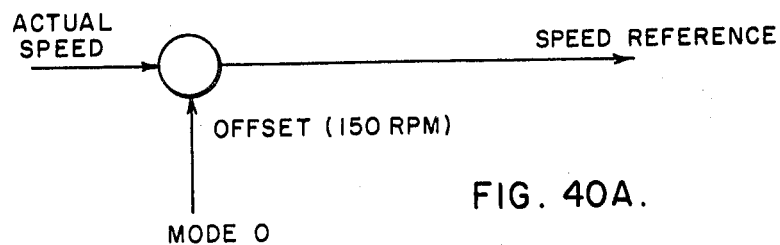
FIG. 40A.
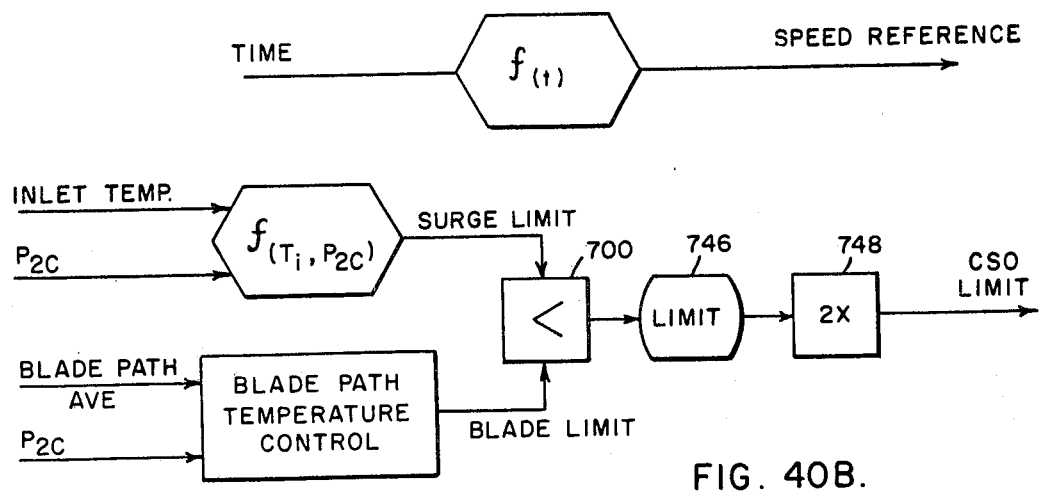
FIG. 40B.
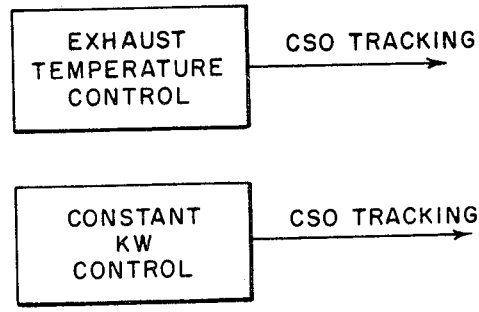
MODE 1

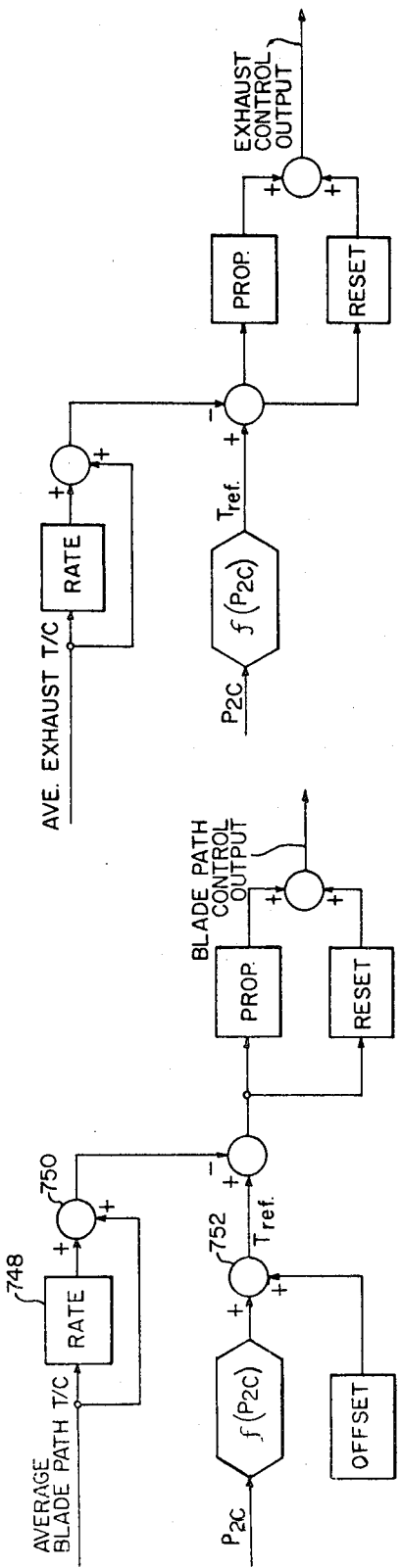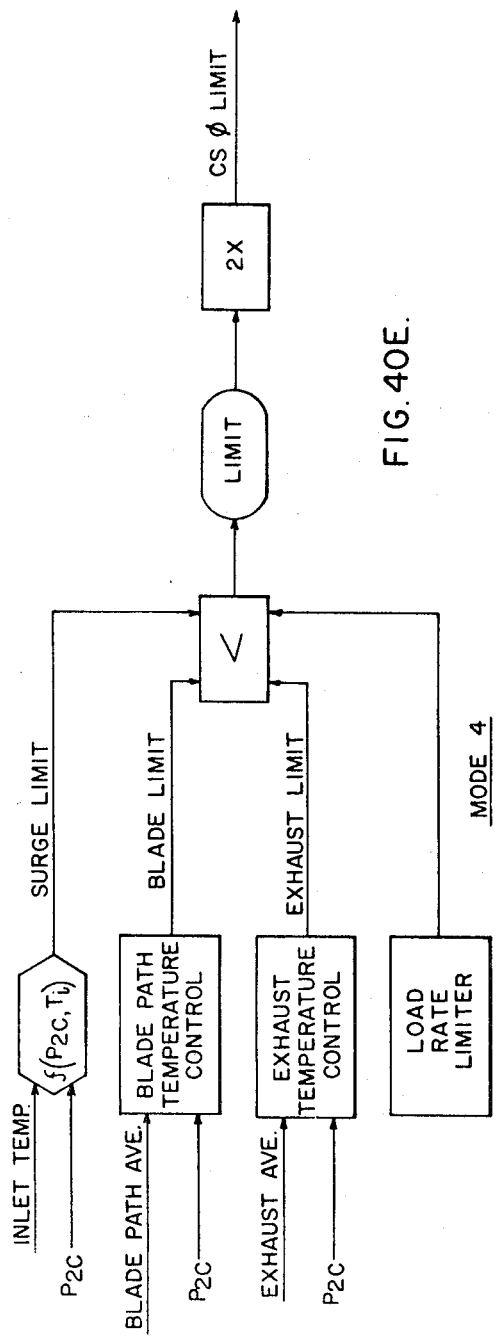
FIG. 41B.
FIG. 41A.
FIG. 40E.

SYSTEM AND METHOD FOR OPERATING INDUSTRIAL GAS TURBINE APPARATUS AND GAS TURBINE ELECTRIC POWER PLANTS PREFERABLY WITH A DIGITAL COMPUTER CONTROL SYSTEM

This is a continuation, of application Ser. No. 82,470 filed Oct. 20, 1970.

CROSS-REFERENCE TO RELATED APPLICATIONS

Reference is made to a deposited microfiche appendix forming a part hereof and having therein 17 microfiche with 1070 frames including title frames.

Ser. No. 82,469 filed on Oct. 20, 1970 by R. Kiscaden and R. Yannone, entitled improved system and method for accelerating and sequencing industrial gas turbine apparatus and gas turbine electric power plants preferably with a digital computer control system, and assigned to the present assignee.

Ser. No. 82,467 filed on Oct. 20, 1970 by J. Rankin and T. Reed, entitled improved control computer programming method and improved system and method for operating industrial gas turbine apparatus, and etc., and assigned to the present assignee.

U.S. Pat. No. 3,919,623 filed by J. Reuther on Dec. 6, 1971, entitled Fuel Transfer Control, and assigned to the present assignee.

Ser. No. 99,491 filed on Dec. 18, 1970 by J. Ruether, entitled Automatic Synchronizing, and assigned to the present assignee.

U.S. Pat. No. 4,031,407 filed on Dec. 18, 1970 by T. Reed, entitled Automatic Synchronizing, and assigned to the present assignee.

BACKGROUND OF THE INVENTION

The present invention relates to gas or combustion turbine apparatus, gas turbine electric power plants and control systems and operating methods therefor.

Industrial gas turbines may have varied cycle, structural and aerodynamic designs for a wide variety of uses. For example, gas turbines may employ the simple, regenerative, steam injection or combined cycle in driving an electric generator to produce electric power. Further, in these varied uses the gas turbine may have one or more shafts and many other rotor, casing, support, and combustion system structural features which can vary relatively widely among differently designed units. They may be aviation jet engines adapted for industrial service as described for example in an ASME paper entitled "The Pratt and Whitney Aircraft Jet Powered 121MW Electrical Peaking Unit" presented at the New York Meeting in November-December 1964.

Other gas turbine uses include drive applications for pipeline or process industry compressors and surface transportation units. An additional application of gas turbines is that which involves recovery of turbine exhaust heat energy in other apparatus such as electric power or industrial boilers or other heat transfer apparatus. More generally, the gas turbine air flow path may form a part of an overall process system in which the gas turbine is used as an energy source in the flow path.

Gas turbine electric power plants are usable in base load, mid-range load and peak load power system applications. Combined cycle plants are normally usable for the base or mid-range applications while the power plant which employs a gas turbine only as a generator drive typically is highly useful for peak load generation because of its relatively low investment cost. Although the heat rate for gas turbines is relatively high in relation to steam turbines, the investment savings for peak load application typically offsets the higher fuel cost factor. Another economic advantage for gas turbines is that power generation capacity can be added in relatively small blocks such as 25MW or 50MW as needed for expected system growth thereby avoiding excessive capital expenditure and excessive system reserve requirements. Further background on peaking generation can be obtained in articles such as "Peaking Generation" a Special Report of Electric Light and Power dated November 1966.

Startup availability and low forced outage rates are particularly important for peak load power plant applications of gas turbines. Thus, reliable gas turbine startup and standby operations are particularly important for power system security and reliability.

In the operation of gas turbine apparatus and electric power plants, various kinds of controls have been employed. Relay-pneumatic type systems form a large part of the prior art. More recently, electronic controls of the analog type have been employed as perhaps represented by U.S. Pat. No. 3,520,133 entitled Gas Turbine Control System and issued on July 14, 1970 to A. Loft or by the control referred to in an article entitled Speedtronic Control, Protection and Sequential System and designated as GER-2461 in the General Electric Gas Turbine Reference Library. A wide variety of controls have been employed for aviation jet engines including electronic and computer controls as described for example in a March 1968 ASME Paper presented by J. E. Bayati and R. M. Frazzini and entitled "Digatec (Digital Gas Turbine Engine Control)", an April 1967 paper in the Journal of the Royal Aeronautical Society authored by E. S. Eccles and entitled "The Use of a Digital Computer for On-Line Control of a Jet Engine", or a July 1965 paper entitled "The Electronic Control of Gas Turbine Engines" by A. Sadler, S. Tweedy and P. J. Colburn in the July 1965 Journal of the Royal Aeronautical Society. However, the operational and control environment for jet engine operation differs considerably from that for industrial gas turbines. In referencing prior art publications or patents as background herein, no representation is made that the cited subject matter is the best prior art.

Generally, the operation of industrial gas turbine apparatus and gas turbine power plants have been limited in flexibility, response speed, accuracy and reliability. Further limits have been in the depth of operational control and in the efficiency or economy with which single or multiple units are placed under operational control and management. Limits have existed on the economics of industrial gas turbine application and in particular on how close industrial gas turbines can operate to the turbine design units over various speed and/or load ranges.

In gas turbine power plants, operational shortcomings have existed with respect to plant availability and load control operations. Turbine surge limit control operations have been limited particularly during startup. Temperature limit control has been less protective and less responsive than otherwise desirable.

Generally, overall control loop arrangements and control system embodiments of such arrangements for industrial gas turbines have been less effective in operations control and systems protection than is desirable.

Performance shortcomings have also persisted in the interfacing of control loop arrangements with sequencing controls.

With respect to industrial gas turbine startup, turbine operating life has been unnecessarily limited by conventional startup schemes. Sequencing systems have typically interacted with startup controls less effectively than desirable from the standpoint of turbine and power plant availability. More generally, sequencing systems have provided for systematic and protective advance of the industrial gas turbine operations through startup, run and shutdown but in doing so have been less efficient and effective from a protection and performance standpoint than is desirable.

Restrictions have been placed on operations and apparatus management particularly in gas turbine power plants in the areas of maintenance and plant information acquisition. Further management limits have existed with respect to plant interfacing with other power system points, operator panel functionality, and the ability to determine plant operations through control system calibration and parameter changes.

SUMMARY OF THE INVENTION

One or more industrial gas turbines or gas turbine-generator power plants are operated by a control system which preferably employs a programmed digitral computer in a hybrid control system arrangement. The control system operates in a gas turbine control loop arrangement preferably to control fuel flow and thereby provide load and loading rate control over the turbine and generator or other unit and further provide speed, surge and temperature limit control with nonlinear control loop characterization. In power plant applications, the preferred computer provides generator control actions and it interfaces with the operator preferably through a central operator's panel to provide extended power plant management and operational benefits.

BRIEF DESCRIPTION OF THE DRAWINGS

FIG. 1 shows a top plan view of a gas turbine power plant arranged to operate in accordance with the principles of the invention;

FIGS. 2 and 3 show respective electrical systems usable in the operation of the gas turbine power plant of FIG. 1;

FIGS. 6-8 show a fuel nozzle and parts thereof employed in the gas turbine of FIG. 5;

FIGS. 9 and 10 respectively show schematic diagrams of gas and liquid fuel supply systems employed with the gas turbine of FIG. 5;

FIG. 12 shows a block diagram of a digital computer control system employed to operate the gas turbine power plant of FIG. 1;

FIGS. 13A-D show various schematic diagrams of control loops which may be employed in operating the computer control system of FIG. 12 and the power plant of FIG. 1;

FIG. 18 shows a sequence chart for startup and shutdown operations of the gas turbine power plant;

FIGS. 24A, 24B, 24C and 25 respectfully respectively show front plan views of a local operator's panel and a remote operator's panel employed in the control system;

FIG. 38 shows a more detailed flowchart for a speed reference generation function included in the program of FIG. 37;

FIG. 39 shows a more detailed flowchart for a gas turbine blade path and exhaust temperature limit function employed in the program of FIG. 37;

FIGS. 40A-E show respective control configurations of software elements associated respectively with Mode 0 through Mode 4 operations;

FIGS. 41A-B respectively show software control configurations for the blade path temperature and exhaust temperature limit functions;

DESCRIPTION OF THE PREFERRED EMBODIMENT

A. POWER PLANT

1. General Structure

Figure 4:
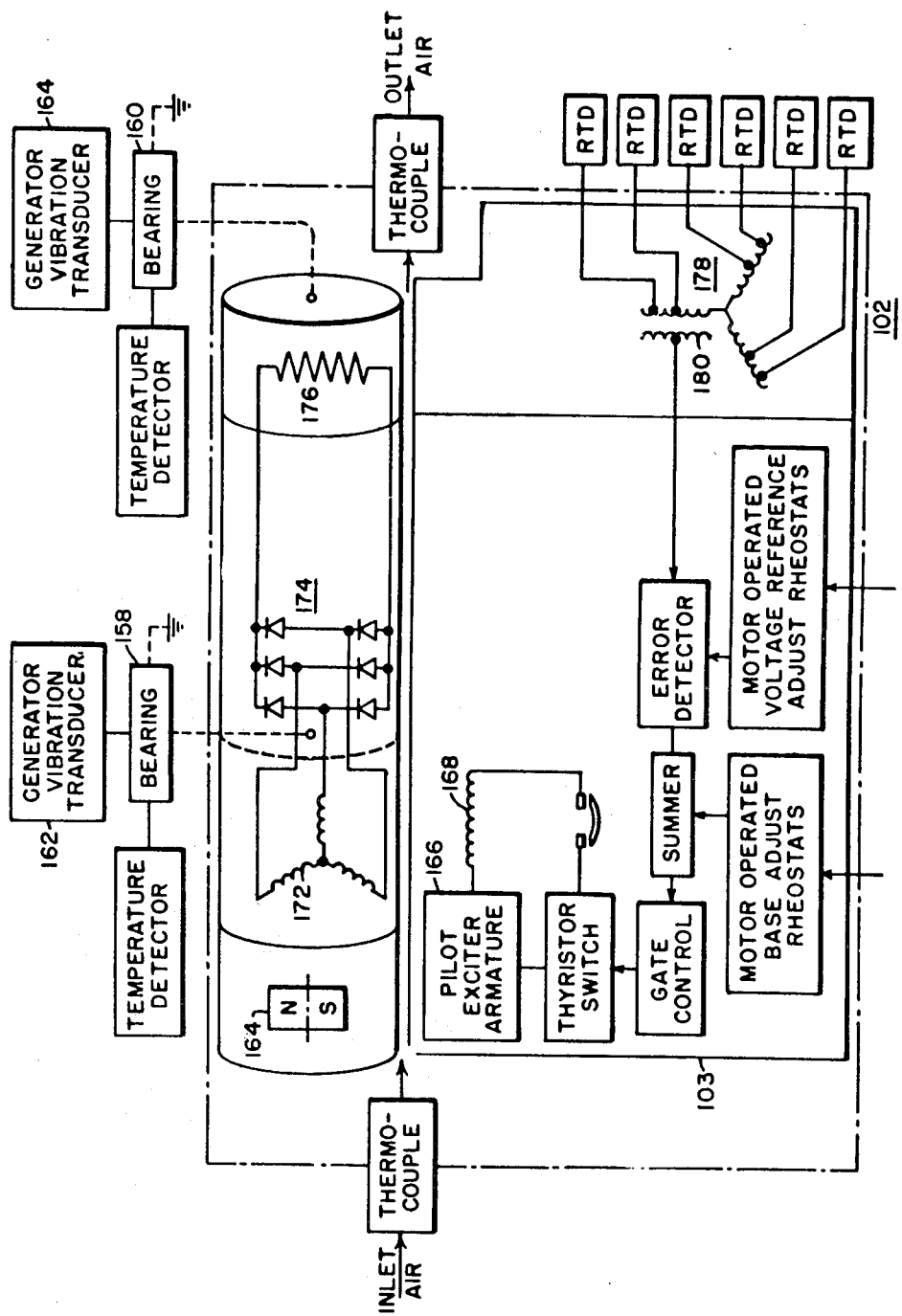
FIG. 4 shows a schematic view of a rotating rectifier exciter and a generator employed in the gas turbine power plant of FIG. 1.

More particularly, there is shown in FIG. 1 a gas turbine electric power plant 100 which includes an AC generator 102 driven by a combustion or gas turbine 104 through a reduction gear unit 106. In this application of the invention, the gas turbine 104 is the W-251G simple cycle type manufactured by Westinghouse Electric Corporation. In other power plant generator applications, other industrial drive applications, and combined steam and gas cycle applications of various aspects of the invention, industrial gas turbines having larger or smaller power ratings, different cycle designs, different number of shafts or otherwise different from the W-251G can be employed.

Generally, the electric power plant 100 is designed to provide an economical solution to many types of power generation problems such as base or intermediate system low use factor. Thus, to meet power generator peaking requirements a single plant 100 or multiple plant units 100 can be purchased simultaneously or over a period of time to meet system power generation needs at relatively reduced investment cost. Another typical use of the plant 100 is where continuous power generation is desired and the exhaust heat from the gas turbine 104 is used for a particular purpose such as for feedwater heating, boilers, or economizers.

In addition to the advantage of relatively low investment cost, the plant 100 can be located relatively close to load centers as indicated by system requirements without need for a cooling water supply thereby advantageously producing a savings in transmission facilities. Further, the plant 100 can be unattended and automatically operated from a remote location.

Community acceptance of the plant 100 is enhanced by the use of inlet and exhaust silencers 108 and 110 which are coupled respectively to the inlet and exhaust ductworks 112 and 114. Fast startup and low standby costs are additional operating advantages characteristic to the plant 100. Among additional advantages, the major components of the plant 100 can be separately shipped to the plant site and site assembly can be completed with relatively simple connections since most plant piping, wiring and testing can be done at the factory.

The plant 100 is provided with an enclosure (not shown) in the form of a rigid frame-type sectional steel building. It comprises rigid structural steel frames covered by sectional type panels on the roof and the walls. The roof and wall construction is designed for minimum heat loss and minimum noise penetration while enabling complete disassembly when required.

The foundation for the plant 100 is approximately 106 feet long if a control station is provided for a single plant unit. The foundation length is increased to approximately 115 feet as indicated by the reference character 116 if space is provided for a master control station when up to three optional additional plant units are selected.

Digital computer and other control system circuitry in a cabinet 118 provides for operation of the power plant 100 when a single plant unit is selected by the user. An operator's panel 120 is associated with the control cabinet 118. In addition, an automatic send/receive printer 122 and a protective relay panel 124 for sensing abnormal electric power system conditions are associated with the control cabinet 118. The numbers of basic, master and slave units 118 through 124 required in the present application of the invention for up to four plants like the plant 100 are indicated by the following table:

| | CONTROL ROOM OPTIONS | | | | |
|---|---|---|---|---|---|
| Control Room | Slave Units | Quantities Per Unit | | | |
| For | Served | 124 | 118 | 122 | 120 |
| Basic Station One Unit | 0 | 1 | 1 | 1 | 1 |
| Master For Two Unit Station | 1 | 1 | 2 | 1 | 2 |
| Master For Three Unit Station | 2 | 1 | 2 | 1 | 3 |
| Master For Four Unit Station | 3 | 1 | 3 | 1 | 4 |
| Slave Unit | 0 | 1 | 0 | 0 | 0 |

Startup or cranking power for the plant 100 is provided by a starting engine 126 such as a diesel engine, a 600 HP diesel in the present case, or an electric induction motor unit. The starting engine 126 is mounted on an auxiliary bedplate and coupled to the drive shaft of the gas turbine 104 through a starting gear unit 128. A DC motor 154 operates through a turning gear 156 which is also coupled to the gas turbine shaft through the starting gear 128 to drive the gas turbine at turning gear speed for at least the first sixty hours of nonoperating periods, or longer if turbine disc cavity temperature is excessive, in order to avoid thermally induced shaft bowing.

A motor control center 130 is also mounted on the auxiliary bedplate and it includes motor starters and other devices to provide for operating the various auxiliary equipment items associated with the plant 100. Motor control center 130 breakers are front mounted and the breakers and motor starters are cable connected to a 480 volt power supply. Various signals from sensor or contact elements associated with the motor control center 130 and with other devices mounted on the auxiliary bedplate are transmitted for use in the control system as considered more fully in connection with FIG. 12.

A plant battery 132 is disposed adjacent to one end of the auxiliary bedplate or skid. A battery charger (FIG. 12) is also included and it is preconnected to the motor control center 130 through a breaker. The battery for example can be a heavy duty control battery of the type EHGS-17 EXIDE rated at 125 volts, 60 cells. In this case, the battery is capable of supplying adequate power for emergency lighting, auxiliary motor loads, and DC computer and other control power for one hour following shutdown of the plant 100 due to a loss of AC power.

More generally, the electrical power system for the plant 100 is designed to enable the plant 100 to operate without connection to the power system, or to operate by accepting auxiliary power and other connections from the power system. However, one boundary condition is that the plant 100 must have auxiliary power once it reaches synchronous speed for power generation. Thus, although the plant 100 can be started by use of the battery 132 and without auxiliary power, the requirement for auxiliary power at synchronous speed must be met. If desired, electrical systems of basic design different from that of the described system can be employed to provide auxiliary power for the plant 100.

One electrical system for the plant 100 is shown generally in FIG. 2. Once the plant 100 is in operation, the generator 102 transmits power to the power system through a generator breaker 132 and a 13.8 KV bus 134 to a main transformer 135 and a line breaker 137 to the power system. Auxiliary power for the plant 100 is obtained from the system through an auxiliary breaker 136 and an auxiliary power 480 volt bus 137. The generator breaker 132 serves as a synchronizing and protective disconnect device for the plant 100.

If a suitable 480 volt source is not available in the power system, an auxiliary power transformer 138 can be provided in another general system as shown in FIG. 3. A disconnect switch 140 is connected between the transformer 138 and the station 13.8 KV bus 134.

If a firm reliable source of auxiliary power cannot be provided from the system, the arrangement as shown in FIG. 3 can provide for black plant startup operation. With this arrangement, the gas turbine 104 may be started at any time, since the auxiliaries may be supplied from the generator 102 or from the system, whichever is energized. For a black start (with a dead system), the gas turbine 104 may be started at any time for availability as a spinning standby source even though the external system is not ready to accept power from the generator 102. Further, the plant 100 can be separated from a system that is in trouble without shutting the gas turbine 104 down. The breaker nearest the load would be tripped to drop the load and let the generator 102 continue to run and supply its own auxiliaries.

An additional advantage of the scheme shown in FIG. 3 is the protection provided if the connection to the system is vulnerable to a permanent fault between the gas turbine power plant 100 and the next breaker in the system. The line breaker 137 would be the clearing breaker in case of such a fault and the auxiliary system would remain energized from the generator 102 which would allow an orderly shutdown of the gas turbine 104 or continued operation as standby.

The arrangement of FIG. 3 is used if the gas turbine 104 is programmed to start in the event of system low voltage or decaying frequency. Automatic startup brings the turbine 104 up to speed, closes the generator breaker 132 and supplies power to the auxiliary load. The turbine-generator unit would then be running and would be immediately available when desired. The arrangement of FIG. 3 is also used if the turbine 104 is running and the system under-frequency or under-voltage signal is used to separate the gas turbine 104 from the system.

A switchgear pad 142 is included in the plant 100 for 15 KV switchgear including the generator breaker as indicated by the reference characters 144, 146 and 148. The auxiliary power transformer 138 and the disconnect switch 140 are also disposed on the switchgear pad 142 if they are selected for use by the user. Excitation switchgear 150 associated with the generator excitation system is also included on the switchgear pad 142. The control system also accepts signals from certain sensor or contact elements associated with various switchgear pad devices.

A pressure switch and gauge cabinet 152 is also included on the auxiliary skid. The cabinet 152 contains the pressure switches, gauges, regulators and other miscellaneous elements needed for gas turbine operation.

A turbine high pressure cooling system includes a radiator air-to-air cooler designed for ambients up to 100° F. with the use of a pair of dual speed fans. The radiator is associated with the necessary interconnecting piping to obtain high pressure compressor outlet air and to transmit the cooled pressurized air the the turbine parts.

A radiation-type air-to-oil cooler is employed for lubrication oil cooling. It is designed for ambients from 0° to 105° F. and it also employs a dual speed fan. Generally, a shaft driven main lubricating oil pump supplies lubricating oil when the plant 100 is running. A DC motor driven auxiliary lubricating oil pump supplies sufficient oil for starting and stopping. To safeguard against loss of lubricating oil, the starting equipment is interlocked so that the plant 100 cannot be started under power without lubricating oil pressure. Further, during run operations the auxiliary lubricating oil pump starts automatically if the lubricating oil pressure becomes dangerously low. The auxiliary pump then serves to bring the gas turbine-generator unit to a standstill in the event the main lubricating oil pump has had a failure. The following list includes the main auxiliaries employed or optionally employed in the plant 100:

|  | Rating, HP | |
| --- | --- | --- |
| A-C Drives 440 Volt, 3 Phase, 60 Cycle | Fuel Oil | Gas |
| (1) Lube oil cooler fan (2 speed) | 25 | 25 |
| (2) Instrument air compressor | 1.5 | 1.5 |
| (3) Turbine enclosure exhaust fan | 2-2 | 2-2 |
| (4) Turbine cooling air heat exchanger fan (2 speed) | 2-5 | 2-5 |
| (5) Lube oil circulating pump | 20 | 20 |
| (6) Evaporative cooler (optional) | 10 | 10 |
| (7) Vapor extractor for lube | ½ | ½ |
| Oil Fuel System, A-C Motors | | |
| (1) Fuel oil (storage tank to unit) | | |

| A-C Drives | Rating, HP | |
|---|---|---|
| 440 Volt, 3 Phase, 60 Cycle | Fuel Oil | Gas |
| (1) transfer pump (optional) | 5 | — |
| (2) Atomizing air compressor | 5 | |
| (3) Fuel oil (storage tank to unit) transfer pump (optional) | | |
| D-C Drives - 125 Volts | | |
| (1) Auxiliary lube oil pump | 10 | 10 |
| (2) Turning gear | 5 | 5 |
| (3) Fuel oil (storage tank to unit) transfer pump (optional) | 5 | — |
| (4) Static inverter | 3 KVA | |
| Heaters - 440 Volt, 3 Phase, 60 Cycle | | |
| (1) Generator and Exciter space heaters | 9 KW | |
| (2) Building unit heaters (normal minimum ambient) | 10 KW | |
| (3) Lube oil heater | 18 KW | |
| (4) Diesel starter jacket water heater | 2½ KW | |
| Controls - 125 Volt D-C | 1 KW | |

The switchgear 144, 146 and 148 and the auxiliary protection and control elements include, or optionally include, the following:

(1) 15 KV HVMC Switchgear
  (a) 15 KV Switchgear with the following equipment:
     Generator breaker type 150DHP500, 2000A. Non-segregated phase bus, generator to switchgear.
     Auxiliary unit for PRX regulator.
     3—2000/5 CT's for generator differential protection.
     3—2000/5 CT's for relaying or metering.
     3—Type SV lightning arresters.
     3—Type FP capacitors.
     2—14400/120 V PT's for metering, relaying and synchronizing (generator).
     2—14400/120 V PT's for synchronizing (line side).
     2—14400/120 V PT's for voltage regulator.
     Provisions for outgoing conduit for cable to system.
     2—1500 MCM per phase (out top or bottom).
  (b) Optional 15 KV switchgear items.
     750 2000A type DHP ACB for generator breaker (in place of 150DHP500).
     1—2000/5 CT for regulator compensation.
     Type DFS fused switch for auxiliary power transformer supply.
     Provisions for connecting to system (in place of 1-a, Item 12).
        Bus duct out top.
        Roof bushings out top.
     Type 150 DHP 500 line side breaker.
     Type 150 DHP 750 line side breaker.
     Bus ground fault relay system.
     Tropicalization treatment.

(2) Generator Protection
  (a) The basic generator protection equipment includes the following items:
     SA-1 generator differential.
     COQ negative sequence.
     CW reverse power.
     2-WL lockout relay.
     COV voltage controlled overcurrent.
     CV-8 generator ground relay.
  (b) Optional Protection Items
     CFVB voltage balance relay.
     Unit differential relay.
     HU
     HU-1
     WL lockout for use with 3-b, Item 2.
     Neutral grounding reactor.
        10 second rating
        1 minute rating
     CO-8 neutral ground (for use with grounding reactor)
     2 Additional COV voltage controlled relays.
     CV-7 over-under voltage relay (generator).
     CV-7 over-under voltage relay (system).
     KF underfrequency relay (generator).
     KF underfrequency relay (system).

(3) Auxiliary System
  (a) Motor control center with provisions for accepting auxiliary power at 480 V-60 Hertz from plant source or customer source. The 125 V D-C is supplied from the plant battery. The motor control center is complete with the following:
     Incoming main breaker A-C.
     Individual fused control circuits.
     Common control power transformer.
     Type II-C wiring.
     A-C starters for the following functions:
        Air cooler fan high.
        Air cooler fan low.
        Lube oil cooler fan two speed.
        Lube oil heater.
        Diesel jacket heater.
        Generator space heater.
        Lube oil circulating pump.
        Control air compressor.
        Building heaters (2).
        Vent fans (2).
        Inlet heater.
        Vapor extractor.
     Battery charger breaker.
     Distribution panelboard A-C 120/240 V.
     Incoming breaker D-C.
     D-C starters for the following functions:
        Lube oil pump.
        Turning gear.
        Fuel transfer pump.
     Distribution panelboard D-C 125 V.
  (b) Motor control center options Starters for the following:
     Evaporative cooler pump.
     Fuel oil transfer pump.
     Atomizing air compressor.
     Spare
     Main transformer auxiliary feeder breaker. Yard lighting feeder breaker.
  (c) Miscellaneous auxiliary options Auxiliary transformer 13.8 KV/480-2777 V, to be supplied from HVMC fused switch option, with the following ratings:
     150 KVA
     225 KVA
     500 KVA
     750 KVA
     PT's for 480 volt bus metering (WHM and volts).
     CT's for 480 volt bus metering (WHM and amps).
        LVME switchgear for auto-transfer from system to station 480 volt power.

2. Generator and Exciter

The generator 102 and its brushless exciter 103 are schematically illustrated in greater detail in FIG. 4. The rotating elements of the generator 102 and the exciter 103 are supported by a pair of bearings 158 and 160. Conventional generator vibration transducers 162 and 164 are coupled to the bearings 158 and 160 for the purpose of generating input data for the plant control system. Structurally, the generator 102 and the exciter 103 are air cooled and located within an enclosure with suitable ventilation and heating to provide for proper equipment protection. Filtered outside air is drawn through the enclosure by shaft mounted axial flow blowers to cool the equipment. Generator space heaters are sized correctly for the installation environment to prevent condensation during shutdown. A grounding distribution transformer with secondary resistors (not indicated) is provided to ground the generator neutral.

Resistance temperature detectors (six in this case) are embedded in the stator winding and thermocouples are installed to measure the air inlet and discharge temperatures and the bearing oil drain temperatures as indicated in FIG. 4. Signals from all of the temperature sensors and the vibration transducers 162 and 164 are transmitted to the control system. Thermocouples (not indicated in FIGS. 1 or 4) associated with the reduction gear 106 similarly generate bearing temperature signals which are transmitted to the control system.

In operation of the exciter 103, a permanent magnet field member 164 is rotated to induce voltage in a pilot exciter armature 166 which is coupled to a stationary AC exciter field 168 through a voltage regulator 170. Voltage is thereby induced in an AC exciter armature 172 formed on the exciter rotating element and it is applied across diodes mounted with fuses on a diode wheel 174 to energize a rotating field element 176 of the generator 102. Generator voltage is induced in a stationary armature winding 178 which supplies current to the power system through a generator breaker when the plant 100 is synchronized and on the line. A transformer 180 supplies a feedback signal for the regulator 170 to control the excitation level of the exciter field 168.

Generally, the rotating rectifier exciter 103 operates without the use of brushes, slip rings, and external connections to the generator field. Brush wear, carbon dust, brush maintenance requirements and brush replacement are thereby eliminated.

All power required to excite the generator field 176 is delivered from the exciter-generator shaft. The only external electrical connection is between the stationary exciter field 168 and the excitation switchgear 150 (FIG. 1).

All of the exciter parts are supported by the main generator 102. In particular, the rotating parts of the exciter 103 are overhung from the main generator shaft to eliminate the need for exciter bearings and to smooth the operation. The generator rotor can be installed and withdrawn without requiring removal of the exciter rotor from the generator shaft.

The brushless excitation system regulator 170 responds to average three phase voltage with frequency insensitivity in determining the excitation level of the brushless exciter field 168. If the regulator 170 is disconnected, a motor operated base adjust rheostat 171 is set by a computer output signal. The rheostat output is applied through a summing circuit 173 to a thyristor gate control 175. If the regulator 170 is functioning, the base adjust rheostat is left in a preset base excitation position, and a motor operated voltage reference adjust rheostat 177 is computer adjusted to provide fine generator voltage control.

An error detector 179 applies an error output to the summing circuit 173 as a function of the difference between the computer output reference and the generator voltage feedback signal. The summing circuit 173 adds the error signal and the base rheostat signal in generating the output which is coupled to the gate control 175. In the error detector 179, the reference voltage is held substantially constant by the use of a temperature compensated Zener diode. In the gate control 175, solid state thyristor firing circuitry is employed to produce a gating pulse variable from 0° to 180° with respect to the voltage supply to thyristors or silicon controlled rectifiers 185.

The silicon controlled rectifiers 185 are connected in an inverter bridge configuration which provides both positive and negative voltage for forcing the exciter field. However, the exciter field current cannot reverse. Accordingly, the regulator 170 controls the excitation level in the exciter field 168 and in turn the generator voltage by controlling the cycle angle at which the silicon controlled rectifiers 185 are made conductive in each cycle as level of the output from the gate control 175.

3. Gas Turbine a. Compressor

Figure 5:
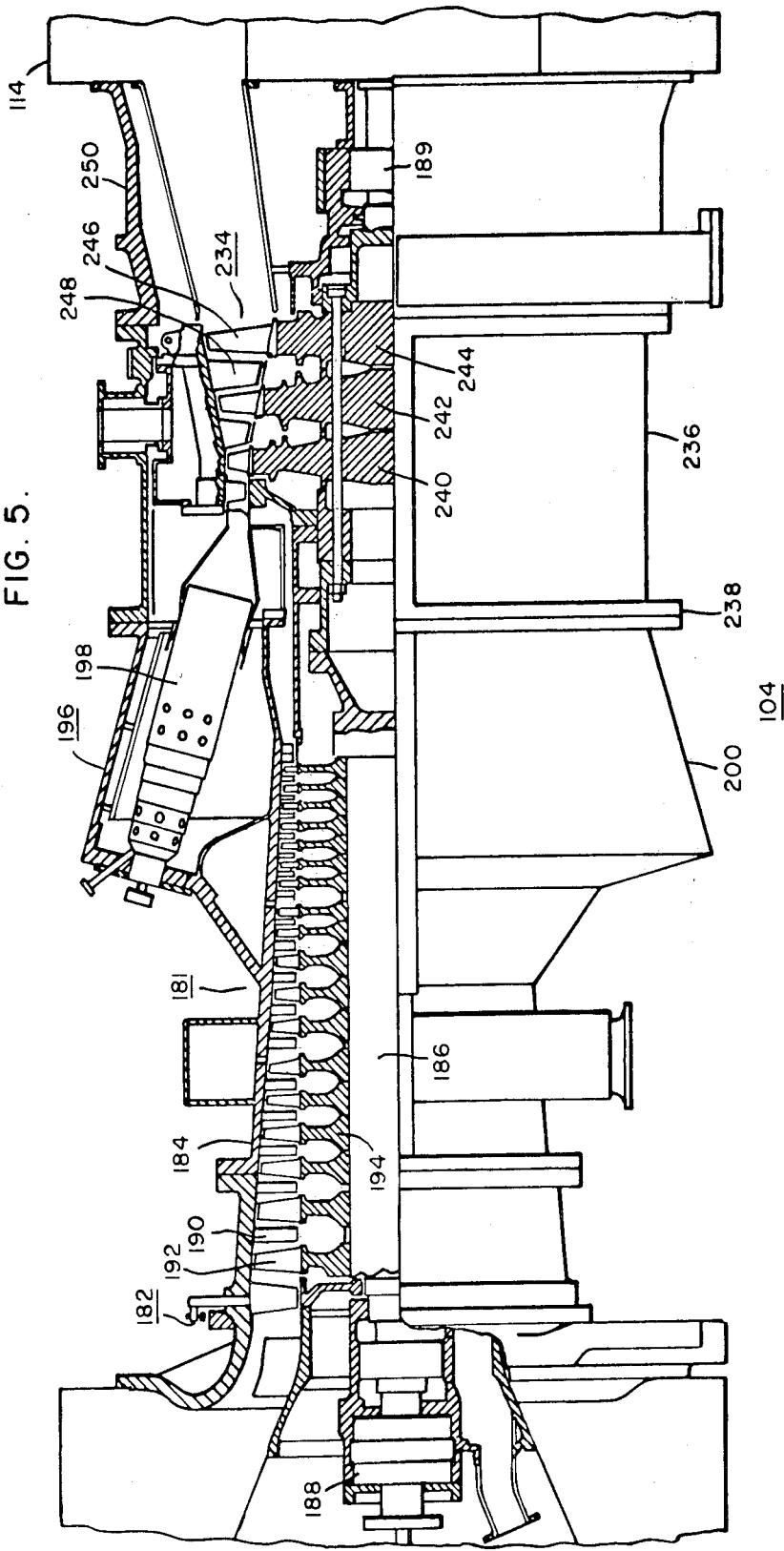
FIG. 5 shows a front elevational view of an industrial gas turbine employed in the power plant to drive the generator and it is shown with some portions thereof broken away.

The gas turbine 104 in this case is the single shaft simple cycle type having a standard ambient pressure ratio of 9.0 to 1 and a rated speed of 4894 rpm and it is illustrated in greater detail in FIG. 5. Filtered inlet air enters a multistage axial flow compressor 181 through a flanged inlet manifold 183 from the inlet ductwork 112. An inlet guide vane assembly 182 includes vanes supported across the compressor inlet to provide for surge prevention particularly during startup. The angle at which all of the guide vanes are disposed in relation to the gas stream is uniform and controlled by a pneumatically operated positioning ring coupled to the vanes in the inlet guide vane assembly 182.

The compressor 181 is provided with a casing 184 which is split into base and cover parts along a horizontal plane. The turbine casing structure including the compressor casing 184 provides support for a turbine rotating element including a compressor rotor 186 through bearings 188 and 189. Vibration transducers (FIG. 12) similar to those described in connection with FIG. 4 are provided for the gas turbine bearings 188 and 189.

The compressor casing 184 also supports stationary blades 190 in successive stationary blade rows along the air flow path. Further, the casing 184 operates as a pressure vessel to contain the air flow as it undergoes compression. Bleed flow is obtained under valve control from intermediate compressor stages to prevent surge during startup.

The compressor inlet air flows annularly through a total of eighteen stages in the compressor 181. Blade 192 mounted on the rotor 186 by means of wheels 194 are appropriately designed from an aerodynamic and structural standpoint for the intended service. A suitable material such as 12% chrome steel is employed for the rotor blades 192. Both the compressor inlet and outlet air temperatures are measured by suitably supported thermocouples (FIG. 12).

b. Combustion System

Pressurized compressor outlet air is directed into a combustion system 196 comprising a total of eight combustor baskets 198 conically mounted within a section 200 of the casing 184 about the longitudinal axis of the gas turbine 104. Combustor shell pressure is detected by a suitable sensor (FIG. 12) coupled to the compressor-combustor flow paths located in the pressure switch and gauge cabinet 152.

As schematically illustrated in FIG. 6, the combustor baskets 198 are cross-connected by cross-flame tubes 202 for ignition purposes. A computer sequenced ignition system 204 includes igniters 206 and 208 associated with respective groups of four combustor baskets 198. In each basket group, the combustor baskets 198 are series cross-connected and the two groups are cross-connected at one end only as indicated by the reference character 210.

Generally, the ignition system 204 includes an ignition transformer and wiring to respective spark plugs which form a part of the igniters 206 and 208. The spark plugs are mounted on retractable pistons within the igniters 206 and 208 so that the plugs can be withdrawn from the combustion zone after ignition has been executed.

A pair of ultraviolet flame detectors 212 are associated with each of the end combustor baskets in the respective basket groups in order to verify ignition and continued presence of combustion in the eight combustor baskets 198. Redundancy in flame sensing capability is especially desirable because of the hot flame detector environment.

The flame detectors 212 can for example be Edison flame detectors Model 424-10433. Generally, the Edison flame detector responds to ultraviolet radiation at wavelengths within the range of 1900–2900 Angstroms which are produced in varying amounts by ordinary combustor flames but not in significant amounts by other elements of the combustor basket environment. Detector pulses are generated, integrated and amplified to operate a flame relay when a flame is present. Ultraviolet radiation produces gap voltage breakdown which causes a pulse train. The flame monitor adds time delay before operating a flame relay if the pulse train exceeds the time delay.

In FIG. 7, there is shown a front plan view of a dual fuel nozzle mounted at the compressor end of each combustor basket 198. An oil nozzle 218 is located at the center of the dual nozzle 216 and an atomizing air nozzle 220 is located circumferentially about the oil nozzle 218. An outer gas nozzle 222 is disposed about the atomizing air nozzle 220 to complete the assembly of the fuel nozzle 216.

As indicated in the broken away side view of FIG. 8, fuel oil or other liquid fuel enters the oil nozzle 218 through a pipe 224 while atomizing air for the fuel oil enters a manifolded pipe arrangement 226 through entry pipe 228 for flow through the atomizing air nozzle 220. Gaseous fuel is emitted through the nozzle 222 after flow through entry pipe 230 and a manifolded pipe arrangement 232.

c. Fuel

Generally, either liquid or gaseous or both liquid and gaseous fuel flow can be used in the turbine combustion process. Various gaseous fuels can be burned including gases ranging from blast furnace gas having low BTU content to gases with high BTU content such as natural gas, butane or propane. However, gas with a heat content greater than 500 BTU per scf (LHV) should be burned with the standard combustion system equipment while lower BTU value gases should be used with special techniques in the fuel handling system and the combustion system.

To prevent condensable liquids in the fuel gas from reaching the nozzles 216, suitable traps and heaters can be employed in the fuel supply line. The maximum value of dust content is set at 0.01 grains per standard cubic foot to prevent excess deposit and erosion. Further corrosion is minimized by limiting the fuel gas sulphur content in the form of $H_2S$ to a value no greater than 5% (mole percent).

With respect to liquid fuels, the fuel viscosity must be less than 100 SSU at the nozzle to assure proper atomization. Most distillates meet this requirement. However, most crude oils and residual fuels will require additive treatment to meet chemical specifications even if the viscosity specification is met. To prevent excess blade deposition, liquid fuel ash content is limited to maximum values of corrosive constituents including vanadium, sodium, calcium and sulphur.

A portion of the compressor outlet air flow combines with the fuel in each combustor basket 198 to produce combustion after ignition and the balance of the compressor outlet air flow combines with the combustion products for flow through the combustor baskets 198 into a multistage reaction type turbine 234 (FIG. 5). The combustor casing section 200 is coupled to a turbine casing 236 through a vertical casing joint 238. No high pressure air or oil seal is required between the compressor 181 and the turbine 234.

d. Turbine Element

The turbine 234 is provided with three reaction stages through which the multiple stream combustion system outlet gas flow is directed in an annular flow pattern to transform the kinetic energy of the heated, pressurized gas turbine rotation, i.e. to drive the compressor 181 and the generator 102. The turbine rotor is formed by a stub shaft 240 and three disc blade assemblies 240, 242 and 244 mounted on the stub shaft by through bolts. Thermocouples (FIG. 12) are supported within the disc cavities to provide cavity temperature signals for the control system.

High temperature alloy rotor blades 246 are mounted on the discs in forming the disc assemblies 240, 242 and 244. Individual blade roots are cooled by air extracted from the outlet of the compressor 181 and passed through a coolant system in the manner previously indicated. The blade roots thus serve as a heat sink for the rotating blades 246. Cooling air also flows over each of the turbine discs to provide a relatively constant low metal temperature over the unit operating load range.

The two support bearings 188 and 189 for the turbine rotating structure are journal bearings of the split-shell babbitt lined type. The bearing housings are external to the casing structure to provide for convenient accessibility through the inlet and exhaust ends of the structure. The overall turbine support structure provides for free expansion and contraction without disturbance to shaft alignment.

In addition to acting as a pressure containment vessel for the turbine 234, the turbine casing 236 supports stationary blades 248 which form three stationary blade rows interspersed with the rotor blade rows. Gas flow is discharged from the turbine 234 substantially at atmospheric pressure through a flanged exhaust manifold 250 to the outlet ductwork 114.

The generator and gas turbine vibration transducers (FIG. 12) can be conventional velocity transducers or pickups which transmit basic vibration signals to a vibration monitor for input to the control system. For example, the Reliance Vibration Monitor Model 2000 can be employed with three Reliance Model 028F velocity transducers and a CEC Model 4-122 High Temperature velocity transducer (for the hot exhaust bearing 189). A pair of conventional speed detectors (FIGS. 12 and 20) are associated with a notched magnetic wheel (FIG. 20) supported at appropriate turbine-generator shaft locations. Signals generated by the speed detectors are employed in the control system in determining power plant operation.

Thermocouples (FIG. 12) are associated with the gas turbine bearing oil drains. Further, thermocouples (FIG. 12) for the blade flow path are supported about the inner periphery of the exhaust manifold 250 to provide a fast response indication of blade temperature for control system usage particularly during plant startup periods. Exhaust temperature detectors (FIG. 12) are disposed in the exhaust ductwork 114 primarily for the purpose of determining average exhaust temperature for control system usage during load operations of the power plant 100. Suitable high response shielded thermocouples for the gas turbine 104 are those which use compacted alumina insulation with a thin-wall high alloy swaged sheath or well supported by a separate heavy wall guide.

e. Fuel System

A fuel system 251 is provided for delivering gaseous fuel to the gas nozzles 222 under controlled fuel valve operation as schematically illustrated in FIG. 9. Gas is transmitted to a diaphragm operated pressure regulating valve 54 from the plant gas source. A pressure switch 255 provides for transfer to oil fuel at a low gas pressure limit. Pressure switches 257 and 259 provide high and low pressure limit control action on the downstream side of the valve 254. It is noted at this point in the description that IEEE switchgear device numbers are generally used herein where appropriate as incorporated in American Standard C37.2-1956.

A starting valve 256 determines gas fuel flow to the nozzles 222 at turbine speeds up to approximately 10% rated flow, and for this purpose it is pneumatically positioned by an electropneumatic converter 261 in response to an electric control signal. At gas flow from 10% to 100% rated, a throttle valve 258 determines gas fuel flow to the nozzles 222 under the pneumatic positioning control of an electropneumatic converter 263 and a pneumatic pressure booster relay 265. The converter 263 also responds to an electric control signal as subsequently more fully considered.

A pneumatically operated trip valve 260 stops gas fuel flow under mechanical actuation if turbine overspeed reaches a predetermined level such as 110% rated speed. A pneumatically operated vent valve 262 allows trapped gas to be vented to the atmosphere if the trip valve 260 and an on/off pneumatically operated isolation valve 264 are both closed. The isolation valve fuel control action is initiated by an electric control signal applied through the pressure switch and gauge cabinet 152 (FIG. 1 and FIG. 12). A pressure switch 267 indicates fuel pressure at the inlet to the nozzles 222.

As schematically shown in FIG. 10, a liquid fuel supply system 266 provides for liquid fuel flow to the eight nozzles 218 from the plant source through piping and various pneumatically operated valves by means of the pumping action of a turbine shaft driven main fuel pump 268. Pump discharge pressure is sensed for control system use by a detector 269. A bypass valve 271 is pneumatically operated by an electropneumatic converter 270 and a booster relay 272 to determine liquid fuel bypass flow to a return line and thereby regulate liquid fuel discharge pressure. An electric control signal provides for pump discharge pressure control, and in particular it provides for ramp pump discharge pressure control during turbine startup. A throttle valve 272 is held at a minimum position during the ramp pressure control action on the discharge pressure regulator valve 270. A pressure switch 269 provides for DC backup pump operation on low pressure, and a pressure switch 271 indicates whether the pump 268 has pressurized intake flow.

After pressure ramping, the pneumatically operated throttle valve 272 is positioned to control liquid fuel flow to the nozzles 218 as determined by an electropneumatic converter 274 and a booster relay 276. An electric control signal determines the converter position control action for the throttle valve 272. The bypass valve 270 continues to operate to hold fuel discharge pressure constant.

As in the gas fuel system 251, a mechanically actuated and pneumatically operated overspeed trip valve 278 stops liquid fuel flow in the event of turbine overspeed. A suitable filter 280 is included in the liquid fuel flow path, and, as in the gas fuel system 251, an electrically actuated and pneumatically operated isolation valve provides on/off control of liquid fuel flow to a liquid manifold 283.

Eight positive displacement pumps 284 are respectively disposed in the individual liquid fuel flow paths to the nozzles 218. The pumps 284 are mounted on a single shaft and they are driven by the oil flow from the manifold 283 to produce substantially equal nozzle fuel flows. Check valves 286 prevent back flow from the nozzles 218 and a pressure switch 288 indicates fuel pressure at the oil nozzles 218. A manifold drain valve 290 is pneumatically operated under electric signal control during turbine shutdown to drain any liquid fuel remaining in the manifold 283.

4. Plant Performance Characteristics

The power plant 100 with the W251G gas turbine 104 provides the following standard performance:

| Type of Fuel | Firing Level Mode | Plant Net Rating KW | Plant Heat Rate BTU/KW Hr | Nominal Exhaust Flow LBS/Hour | Nominal Exhaust Temperature Degrees F. |
|---|---|---|---|---|---|
| Gas | Base | 26,800 | 13,150 | 1,184,000 | 872 |
| | Peak | 30,000 | 12,770 | 1,184,000 | 936 |
| | Reserve | 31,800 | 12,600 | 1,184,000 | 967 |
| Oil | Base | 26,100 | 13,780 | 1,184,000 | 872 |
| | Peak | 29,250 | 13,360 | 1,184,000 | 936 |
| | Reserve | 31,000 | 13,190 | 1,184,000 | 967 |

Ambient conditions of 80° F. temperature and 14.17 psia barometric pressure (1000 ft.). Performance based on lower heating value of natural gas or distillate oil fuel. All performance is based on standard inlet and exhaust (sound level "A") systems.

A similar power plant (not shown) with the higher rated Westinghouse W501-G gas turbines provides the following standard performance:

GAS TURBINE GENERATOR - STANDARD PERFORMANCE

| Type of Fuel | Firing Level Mode | Plant Net Rating KW | Plant Heat Rate BTU/KW Hr | Nominal Exhaust Flow LBS/Hour | Nominal Exhaust Temperature Degrees F. |
|---|---|---|---|---|---|
| Gas | Base | 51,780 | 12,220 | 2,352,000 | 810 |
|  | Peak | 58,000 | 11,930 | 2,352,000 | 862 |
|  | Reserve | 61,480 | 11,830 | 2,352,000 | 894 |
| Oil | Base | 50,580 | 12,630 | 2,352,000 | 810 |
|  | Peak | 56,650 | 12,330 | 2,352,000 | 862 |
|  | Reserve | 60,050 | 12,210 | 2,352,000 | 894 |

Ambient conditions of 80° F. temperature and 14.17 psia barometric pressure (1000 ft.). Performance based on lower heating value of natural gas or distillate oil fuel. All performance is based on standard inlet and exhaust (sound level "A") systems.

With reference again to the gas turbine power plant 100, the following rated performance data indicates the plant availability for power generation:

| Starting Sequence | Normal | Fast* |
|---|---|---|
| Synchronous speed in min. from ready to start | 8 | 4.5 |
| Warm-up synchronous speed | 0 | 0 |
| Loading time - min. | 2 | 0.5 |
| Total time to rated load- min. | 10 | 5 |

For the NORMAL starting sequence, the loading cycle consists of an approximately 25% step load followed by a loading rate of 37½% per minute.
*Available with optional oversized diesel staring engine and control system modification.

The following data is similarly indicative of plant availability for power generation for a W501-G plant:

| Starting Sequence | Normal | Fast | Emergency |
|---|---|---|---|
| Synchronous speed in min. from ready to start | 15 | 15 | 8 |
| Load acceptance upon synchronizing, MW | 4 | 4 | 4 |
| Warm-up at synchronous speed, min. | 0 | 0 | 0 |
| Loading rate, %/min. | 6.6 | 20 | 50 |
| Loading time, min. | 15 | 5.0 | 2.0 |
| Total time to rated base load, min. | 30 | 20 | 10 |

Figure 11A:
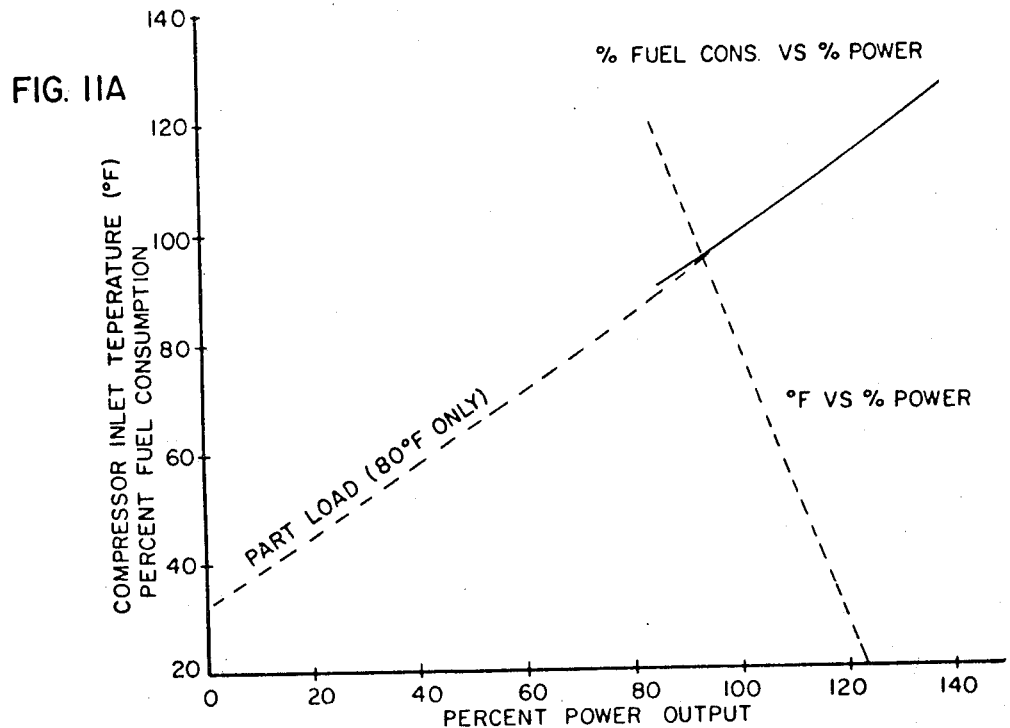
FIGS. 11A-G show various performance curves associated with the turbine-generator unit of FIG. 4.
Figure 11B:
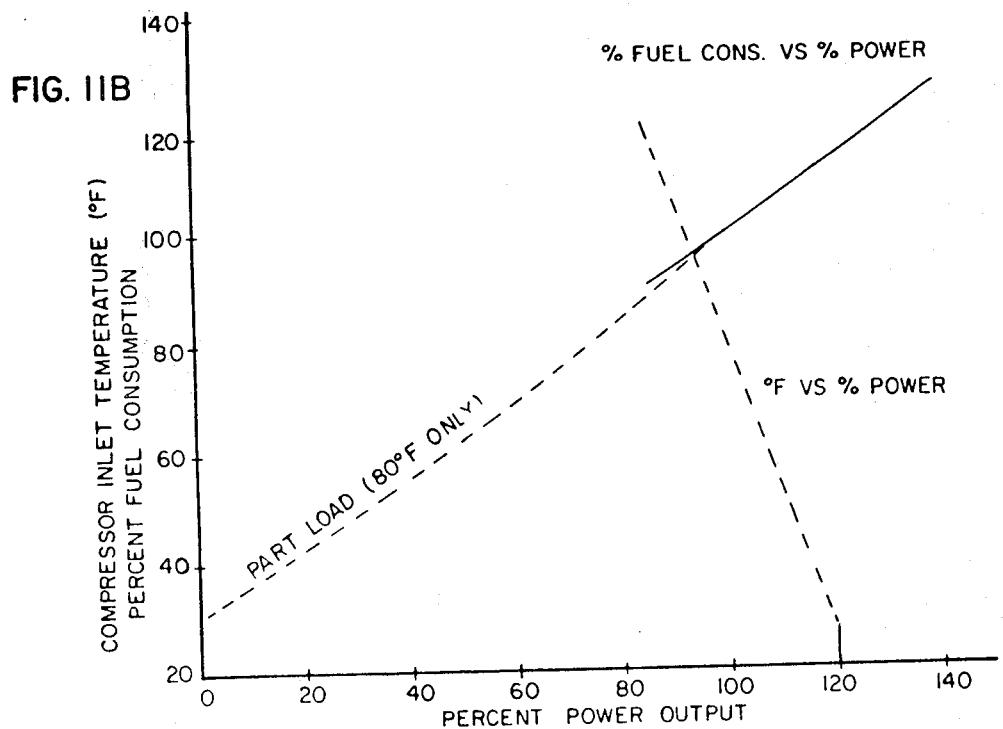
Figure 11C:
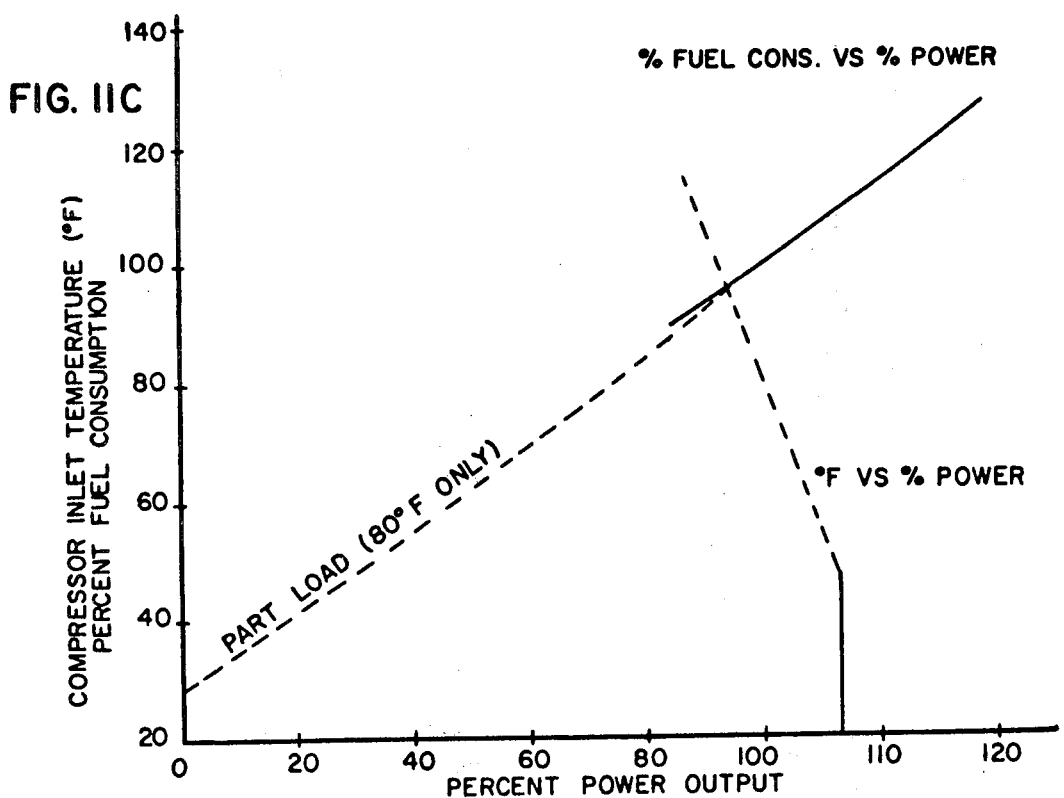

In FIGS. 11A-11C there are shown respective curves pertaining to the power generation as a function of fuel consumption and compressor inlet temperature for the power plant 100. The curves in FIGS. 11A-11C respectively pertain to the base, peak and system reserve levels of turbine firing operation. The following data pertains to the respective FIGS. 11A-11C:

FIG. 11A

| | Rated (100%) Performance | | | |
|---|---|---|---|---|
| Fuel | Fuel Ratio HHV/LHV | Power KW | Heat Rate BTU/KW-HR LHV | Fuel Input MM BTU/HR |
| Nat. Gas | 1.11 | 26,800 | 13,150 | 352.420 |
| Dist. Oil | 1.11 | 26,100 | 13,780 | 359.658 |

Inlet/Exhaust Excess Losses Zero in. H₂O - Elevation 1,000 Ft.
Firing Level Base - Maximum Power 35,000 KW.

FIG. 11B

| | Rated (100%) Performance | | | |
|---|---|---|---|---|
| Fuel | Fuel Ratio HHV/LHV | Power KW | Heat Rate BTU/KW-HR LHV | Fuel Input MM BTU/HR |
| Nat. Gas | 1.11 | 30,000 | 12,770 | 383.100 |
| Dist. Oil | 1.06 | 29,250 | 13,360 | 383.546 |

Inlet/Exhaust Excess Losses Zero in. H₂O
Elevation 1,000 Ft.
Firing Level Peak - Maximum Power 35,000 KW.

FIG. 11C

| | Rated (100%) Performance | | | |
|---|---|---|---|---|
| Fuel | Fuel Ratio HHV/LHV | Power KW | Heat Rate BTU/KW-HR LHV | Fuel Input MM BTU/HR |
| Nat. Gas | 1.11 | 31,800 | 12,600 | 400.680 |
| Dist. Oil | 1.06 | 31,000 | 13,190 | 408.890 |

Inlet/Exhaust Excess Losses Zero in. H₂O -
Elevation 1,000 Ft.
Firing Level Reserve - Maximum Power 35,000 KW.

Figure 11D:
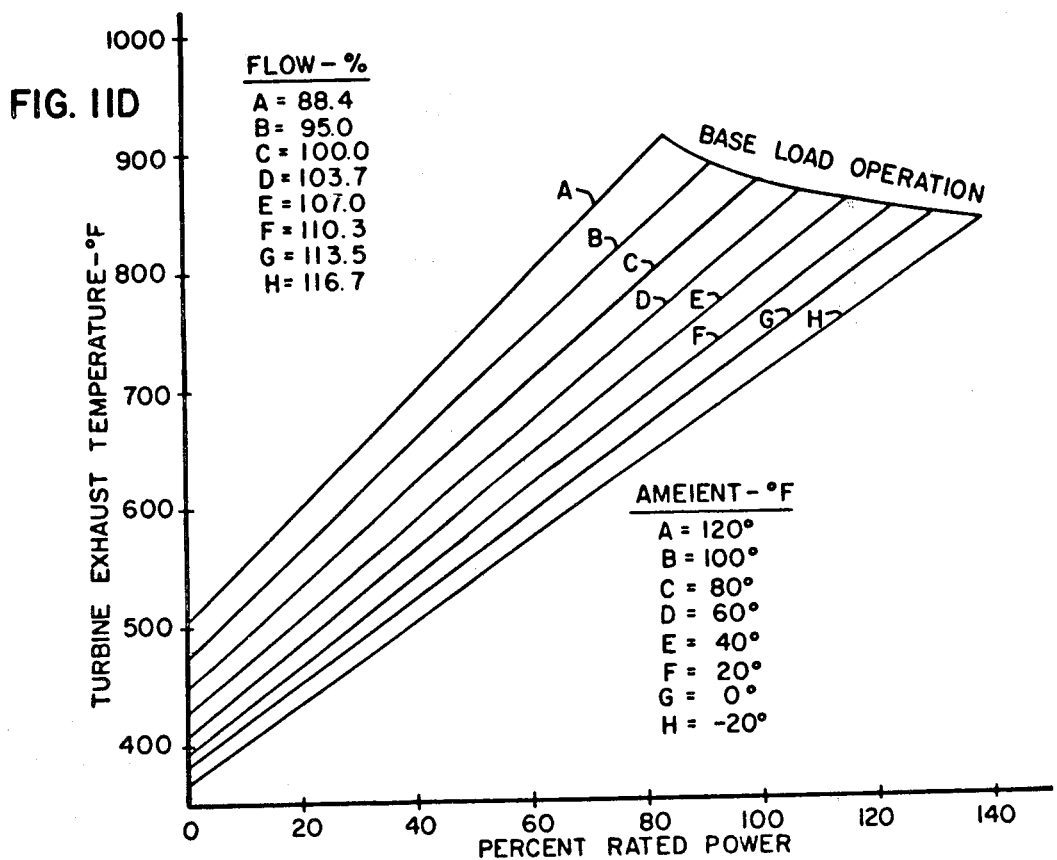

Another typical performance characteristic for the power plant 100 is illustrated in FIG. 11D. The illustrated set of curves shows the manner in which turbine exhaust temperature is expected to vary as a function of the ambient temperature at the specified exhaust flow rates. The data pertains to operation at an altitude of 1000 feet, a 100% exhaust flow value of 1,184,000 LBS/HR, and a 100% power value of 26,800 KW (natural gas) or 26,100 KW (distillate gas).

Figure 11E:
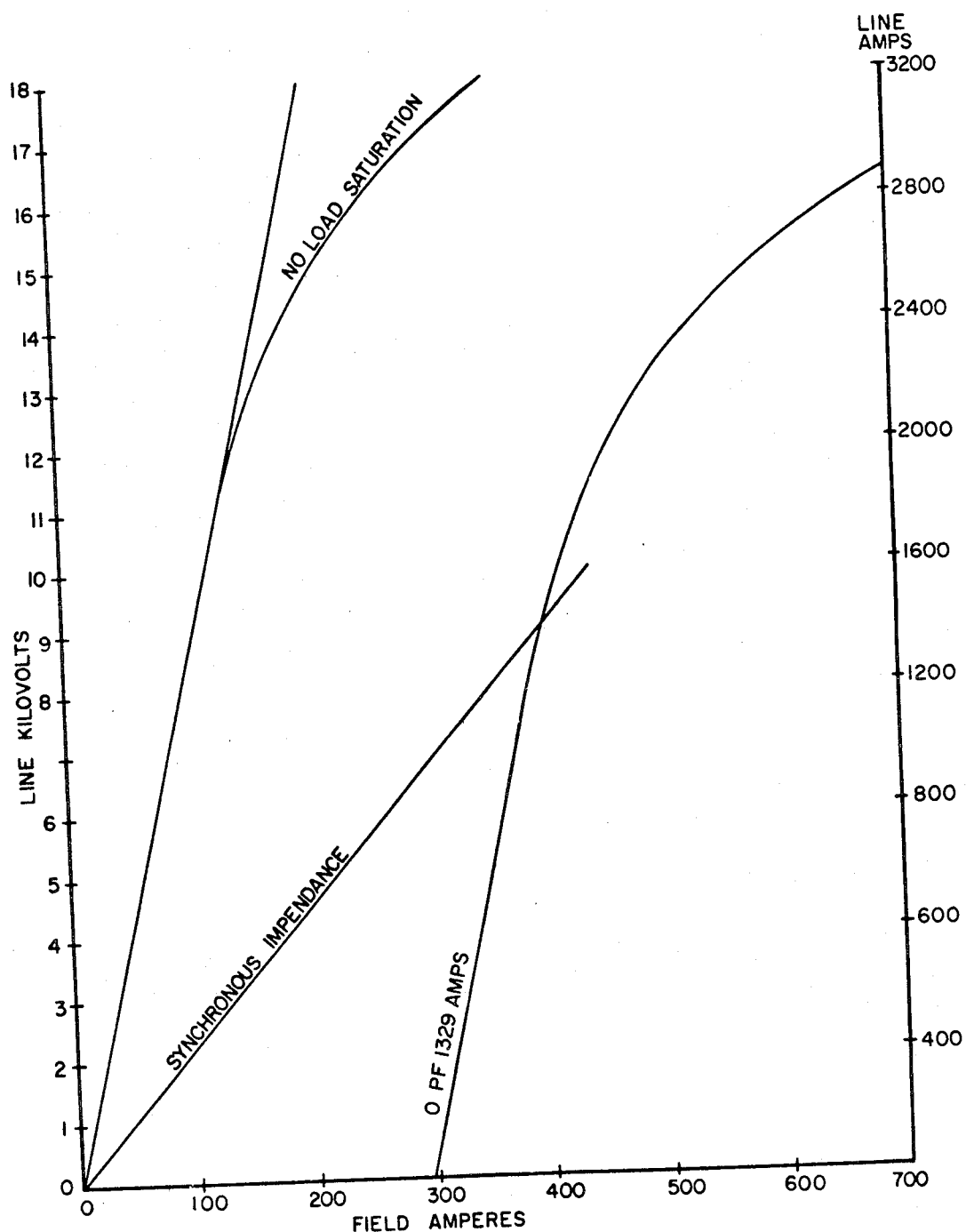
Figure 11G:
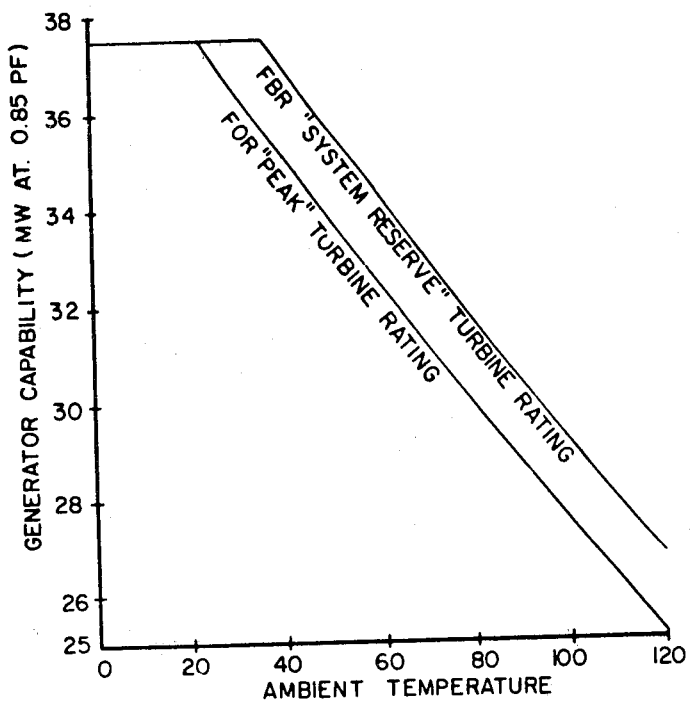
Figure 11F:
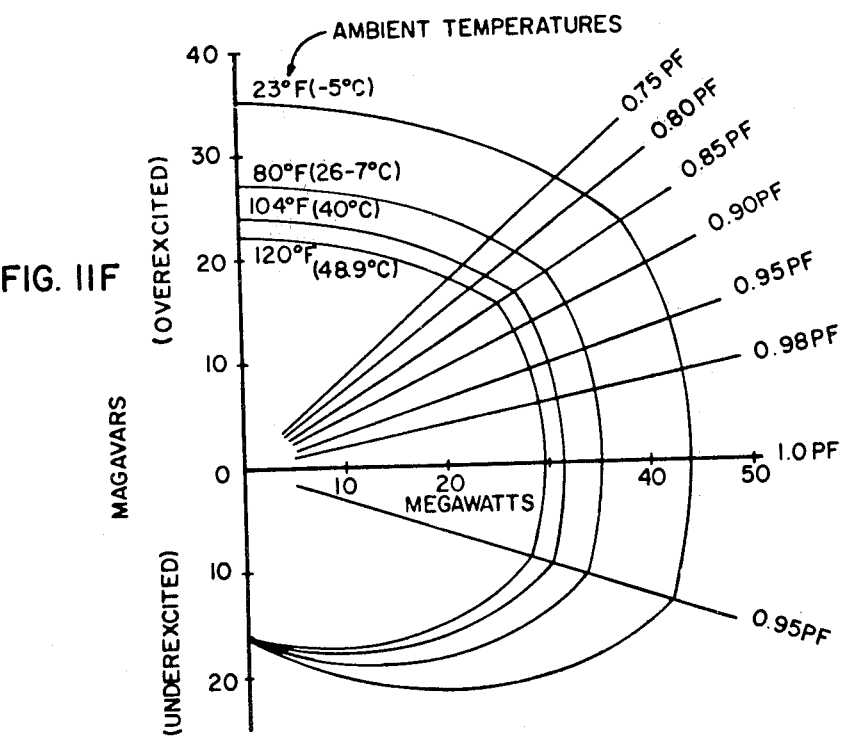

In FIGS. 11E-11G, there are various curves which illustrate the performance capability of the generator 102. These curves pertain to a generator rated at 31,765 KVA, 0.85 PF, 27,000 KW, 13.8 KV, 1329 amps, three phase, 60 HZ, 3600 rpm, 0.58 scr, 215 volt excitation, with 104° F. ambient air at 1000 FT. altitude.

B. POWER PLANT OPERATION AND CONTROL

1. General

The power plant 100 is operated under the control of an integrated turbine-generator control system 300 which is schematically illustrated in FIG. 12. In its preferred embodiment, the control system 300 employs analog and digital computer circuitry to provide reliable hybrid gas turbine and gas turbine power plant control and operation. The plant control system 300 embraces elements disposed in the control cabinet 118, the pressure switch and gauge cabinet 152 and other elements included in the electric power plant 100 of FIG. 1. If multiple plants like the power plant 1000 are to be operated, the control system 300 further embraces any additional circuitry needed for the additional plant operations.

The control system 300 is characterized with centralized system packaging. Thus, the control cabinet 118 shown in FIG. 1 houses an entire speed/load control package, an automatic plant sequencer package, and a systems monitoring package. As previously considered, up to four turbine generator plants can be operated by the centralized control system 300 and such operation is provided with the use of a single computer main frame. A second control cabinet is required if two or three plants are controlled and a third control cabinet is required if four plants are placed under controlled operation as previously considered in connection with FIG. 1. Generally, the control cabinet package is factory prewired and it and field interconnecting cables are completely checked and calibrated at the factory.

As a further benefit to the plant operator, turbine and generator operating functions are included on a single operator's panel in conformity with the integrated turbine-generator plant control provided by the control system 300. Final field calibration is facilitated by calibration functions for control system variables which can be selectively displayed on the operator's panel. System troubleshooting is facilitated by maintenance functions provided on the operator's panel.

The control system 300 provides automatically, reliably and efficiently sequenced start-stop plant operation, monitoring and alarm functions for plant protection and accurately, reliably and efficiently performing speed/load control during plant startup, running operation and shutdown. The plant operator can selectively advance the turbine start cycle through discrete steps by manual operation and, more generally, can obtain a wide variety of plant management benefits through the operator/control system interfaces subsequently considered more fully.

Under automatic control, the power plant 100 can be operated under local operator control or it can be unattended and operated by direct wired remote or supervisory control. Further, the plant 100 is started from rest, accelerated under accurate and efficient control to synchronous speed preferably in a normal fixed time period to achieve in the general case extended time between turbine repairs, synchronized manually or automatically with the power system and loaded under preferred ramp control to a preselectable constant or temperature limit controlled load level thereby providing better power plant management.

In order to start the plant 100, the control system 300 first requires certain status information generated by operator switches, temperature measurements, pressure switches and other sensor devices. Once it is logically determined that the overall plant status is satisfactory, the plant startup is initiated under programmed computer control. Plant devices are started in parallel whenever possible to increase plant availability for power generation purposes. Under program control, completion of one sequence step generally initiates the next sequence step unless a shutdown alarm occurs. Plant availability is further advanced by startup sequencing which provides for multiple ignition attempts in the event of ignition failure.

The starting sequence generally embraces starting the plant lubrication oil pumps, starting the turning gear, starting and operating the starting engine to accelerate the gas turbine 104 from low speed, stopping the turning gear, igniting the fuel in the combustion system at about 20% speed, accelerating the gas turbine to about 60% speed and stopping the starting engine, accelerating the gas turbine 104 to synchronous speed, and loading the power after the generator breaker closure. During shutdown, fuel flow is stopped and the gas turbine 104 undergoes a deceleration coastdown. The turning gear is started to drive the turbine rotating element during the cooling off period.

2. Control Loop Arrangement-Without Hardware/Software Definition

Figure 13C:
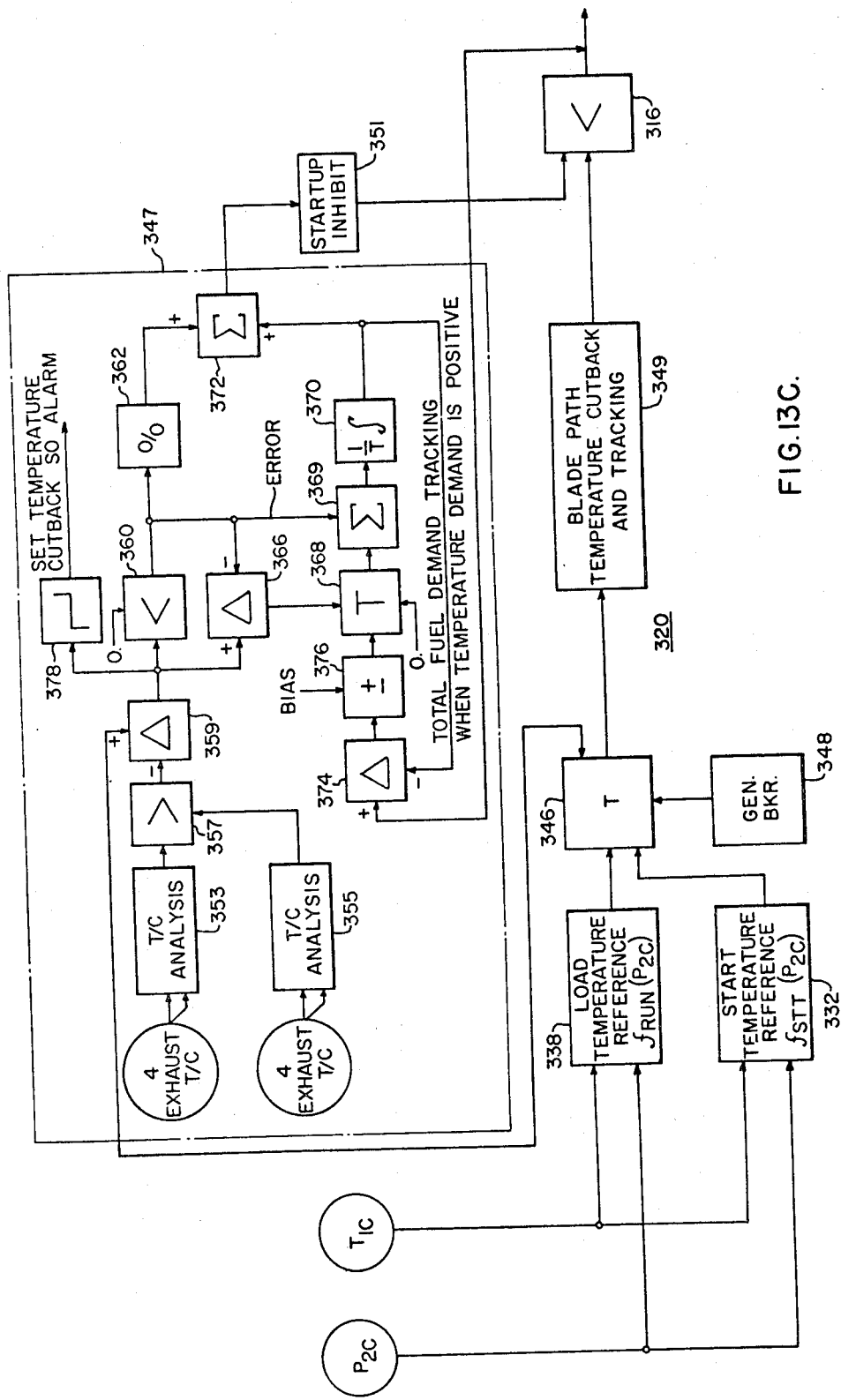

A control loop arrangement 302 shown in FIG. 13A provides a representation of the preferred general control looping embodied in the preferred control system and applicable in a wide variety of other applications of the invention. Protection, sequencing, more detailed control functioning and other aspects of the control system operation are subsequently considered more fully herein. In FIGS. 13A-D, SAMA standard function symbols are employed.

The control loop arrangement 302 comprises an arrangement of blocks in the preferred configuration of process control loops for use in operating the gas turbine power plant 100 or other industrial gas turbine apparatus. No delineation is made in FIG. 13A between hardware and software elements since many aspects of the control philosophy can be implemented in hard or soft form. However, it is noteworthy that various advantages are gained by hybrid software/hardware implementation of the control arrangement 302 and preferably by implementation in the hybrid form represented by the control system 300.

Generally, a feedforward characterization is preferably used to determine a representation of fuel demand needed to satisfy speed requirements. Measured process variables including turbine speed, the controlled load variable or the plant megawatts, combustor shell pressure and turbine exhaust temperature are employed to limit, calibrate or control the fuel demand so that apparatus design limits are not exceeded. The characterization of the feedforward speed fuel demand, a surge limit fuel demand and a temperature limit fuel demand are preferably nonlinear in accordance with the nonlinear characteristics of the gas turbine to achieve more accurate, more efficient, more available and more reliable gas turbine apparatus operation. The control arrangement 302 has capability for maintaining cycle temperature, gas turbine apparatus speed, acceleration rate during startup, loading rate and compressor surge margin.

The fuel demand in the control arrangement 302 provides position control for turbine gas or liquid fuel valves. Further, the control arrangement 302 can provide for simultaneous burning of gas and liquid fuel and it can provide for automatic bumpless transfer from one fuel to the other when required. The subject of bumpless plant transfer between different fuels and the plant operation associated therewith is disclosed in the previously noted. fuel transfer copending patent application now U.S. Pat. No. 3,919,623.

Generally, the control arrangement 302 involves little risk of exceeding gas turbine design temperature limits. This reliability stems from the particular process variables from which fuel demand is determined and the manner in which the fuel demand is determined from the variables.

During startup and after ignition, a feedforward loop 304 provides a representation of a speed reference from a nonlinear predetermined constant turbine inlet temperature characterization 306 (normal) or 307 (emergency) to the input of a feedback control loop 308 where it is summed with a measured turbine speed representation in block 310. A variable speed regulation of 2!% to 6% is applied in block 312 and a proportional plus rate amplifier block 314 generates a speed fuel demand representation.

Figure 14:
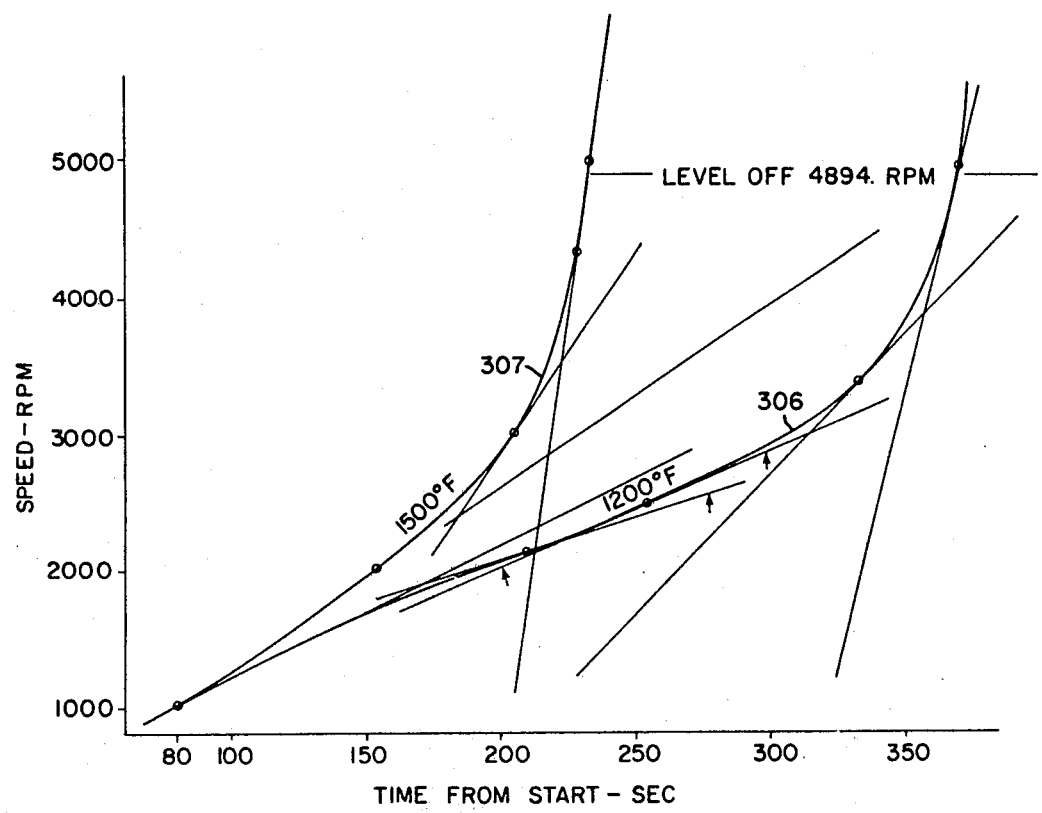
FIGS. 14-17 illustrate various curve data employed in the control system computer in the operation of the gas turbine power plant.

Preferably, the operation of the loops 304 and 308 normally provide for turbine acceleration in a fixed interval of time as determined from a suitable and preferably nonlinear characterization such as that shown in FIG. 14. The fixed acceleration time period is maintained regardless of compressor inlet air temperature, fuel supply pressure, fuel heating value and cycle component efficiencies.

With constant acceleration time between ignition and synchronism, the time interim between gas turbine overhauls is extended. Thus, when operation occurs in periods with reduced ambient and compressor inlet air temperature, a reduced turbine inlet temperature and reduced turbine temperature transients occur with the normally fixed acceleration time period. Reduced cycle temperature would occur for example during cold weather operation or where compressor inlet air cooling is employed.

In the combination of plural control loop functions in the arrangement 302, a low fuel demand selector block 316 is preferably employed to limit the speed reference fuel demand representation if any of three limit representations are exceeded by it during startup. These limit representations are generated respectively by a surge control 318, a blade path temperature control 320, and an exhaust temperature control 322. In this application, a load control block 324 becomes operative after synchronization with the limit blocks 318, 320 and 322.

Figure 15:
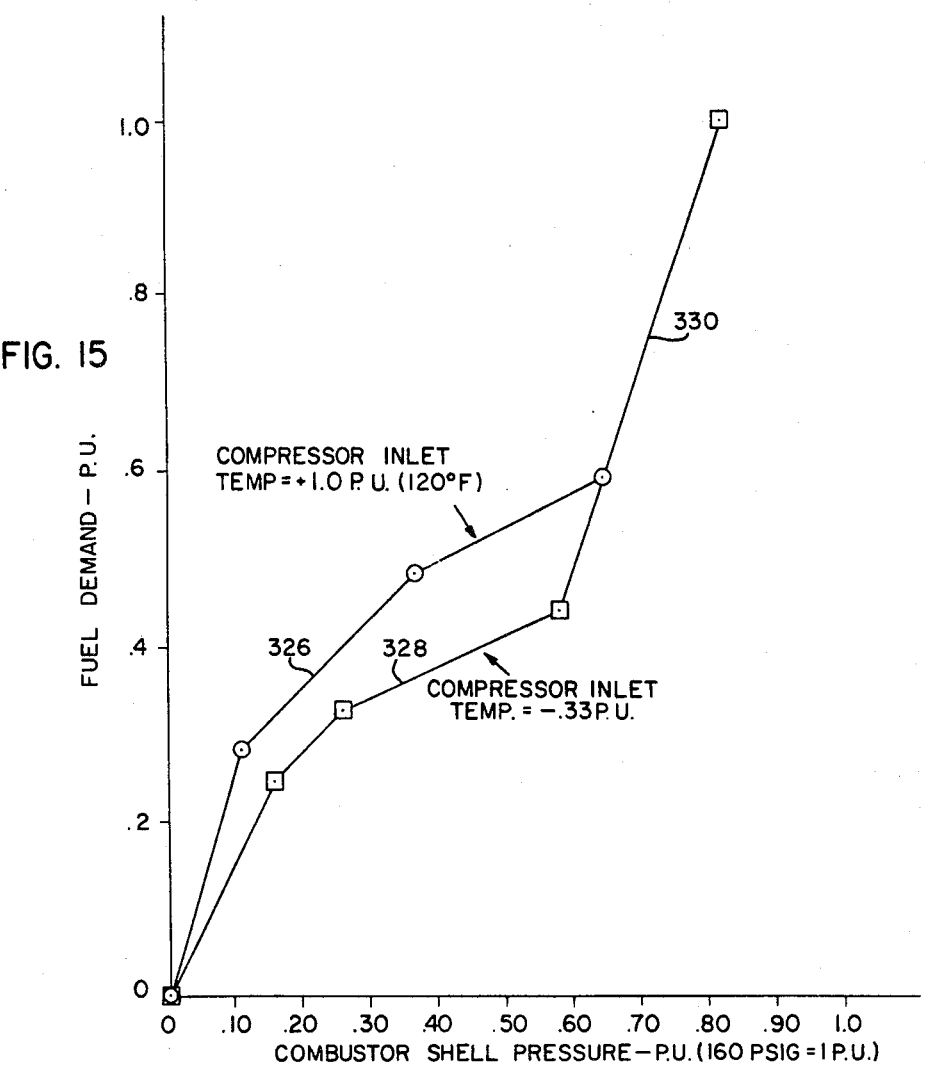

The surge control 318 includes a characterization block 325 which responds to sensed combustion shell pressure and compressor inlet temperature to generate the surge limit representation for compressor surge prevention as illustrated in FIG. 13B. The characterization provided by the block 325 is preferably nonlinear, i.e. characterizations represented in FIG. 15 are employed. The curve 326 limits startup fuel demand for an ambient temperature of 120° F. and the curve 328 limits startup fuel demand for an ambient temperature of −40° F. Common curve portions 330 are operative at various ambient temperatures to provide a substantially linear surge limit during load operations.

Figure 16:
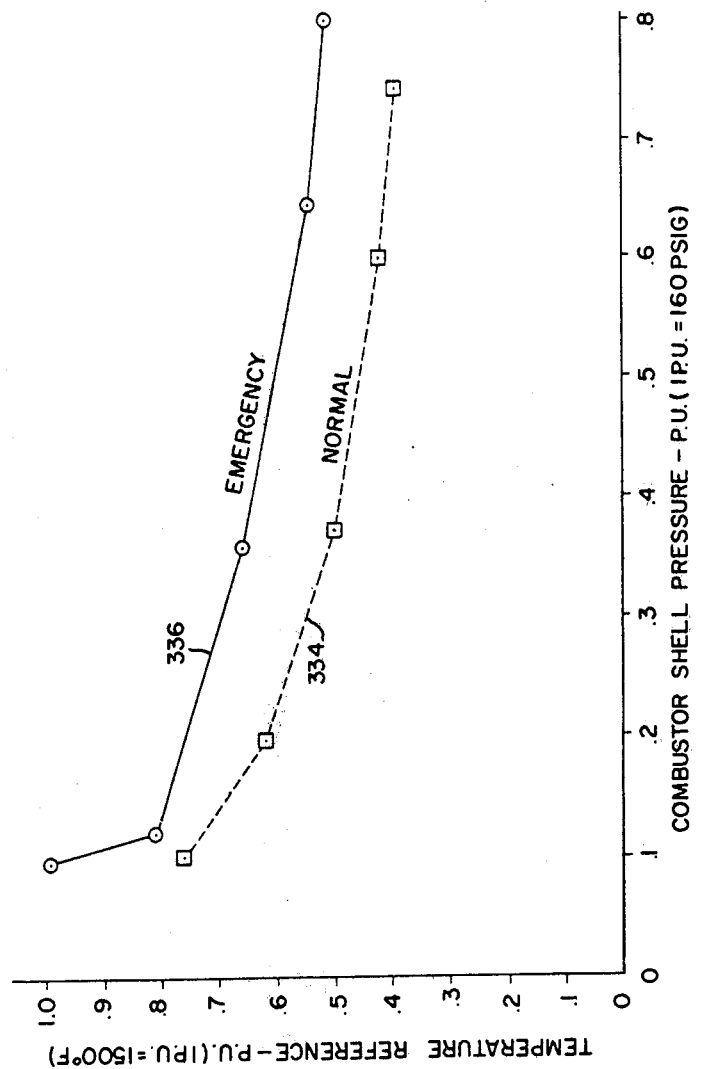
Figure 17:
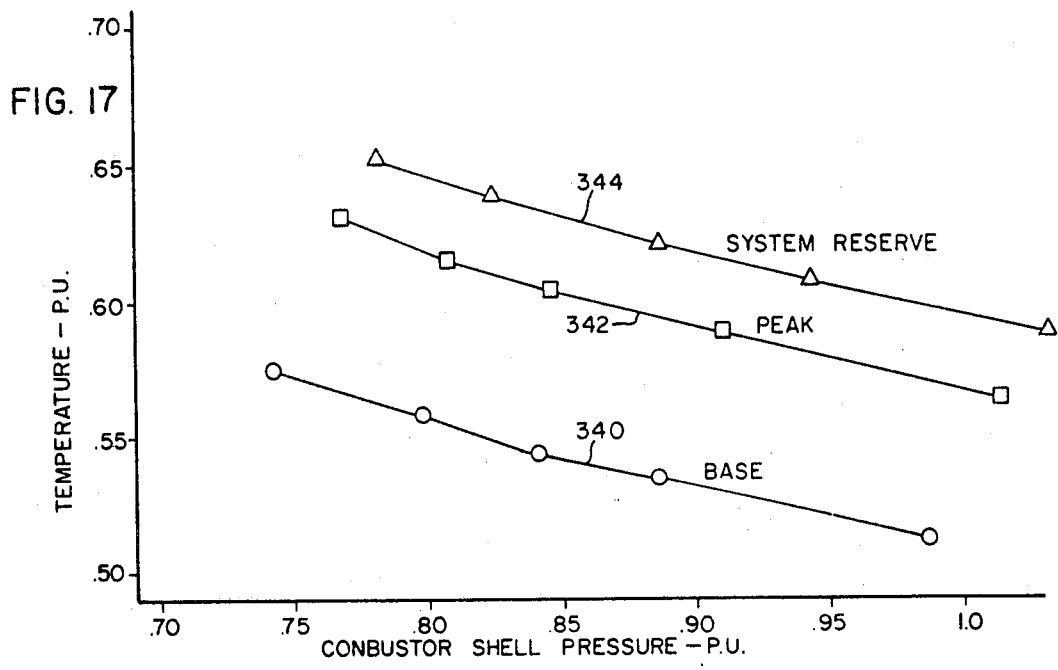

As shown in FIG. 13C, the blade path temperature control 320 includes a block 332 which responds to combustor shell pressure in accordance with a first preferably nonlinear temperature reference characteristic 334 for normal startup and a second preferably nonlinear temperature reference characteristic 336 for emergency startup as illustrated in FIG. 16. The exhaust temperature control 322 includes a block 338 which responds to combustor shell pressure in accordance with a first preferably nonlinear temperature reference characteristic 340 for base load operation, a second preferably nonlinear temperature reference characteristic 342 for peak load operation and a third preferably nonlinear temperature reference characteristic 344 for system reserve load operation as shown in FIG. 17. The startup curves 334 and 336 correspond respectively to 1200° F. and 1500° F. turbine inlet temperature while the load curves correspond to respectively higher values of turbine inlet temperature operation.

In this case, a transfer block 346 (FIG. 13C) selects the exhaust temperature reference for further processing in an exhaust temperature cutback and tracking control clock 347 during load operations if block 348 generates a representation that the generator breaker is closed. Otherwise the transfer block 346 selects the blade path temperature reference for further processing in a blade temperature cutback and tracking control block 349 during startup or isolated plant operations. The block 349 is identical with the block 347 except that the block 349 uses eight blade path thermocouples in place of eight exhaust thermocouples used in the block 347. During startup, an inhibit block 351 preferably prevents the low fuel demand selector 316 from responding to the exhaust temperature control block 322 because a reliable average exhaust temperatuare ordinarily is not available during most of the startup transient.

As shown in FIG. 13C, the block 347 or 349 in this instance includes a pair of groups of four thermocouples which are coupled process blocks 353 and 355 in separate channels where the following processing is performed:
1. Linearization
2. Open circuit test and alarm
3. Short circuit test and alarm
4. High error and absolute limits and alarm
5. Bad input rejection In the preferred control system 300, computer program operations subsequently considered more fully provide the described thermocouple data processing.

Block 357 next selects the highest of the two average temperatures determined for the two thermocouple groups in accordance with the following formula:

$$T_{AV} = \Sigma / NT_N$$

where:
$T_{AV}$ = average temperature
N = valid inputs to be averaged.

An error between the temperature reference selected by the transfer block 346 and the output from the high thermocouple select block 357 is generated by a difference block 359.

When the temperature error representation is positive, a zero is generated by low selector block 360 so that a proportional controller 362 generates no outputs. To prevent integral windup of a reset controller 370, difference block 365 in this case applies the positive error representation to transfer block 368 to cause the reset controller 370 to generate an output representation which tracks the output representation of the low fuel demand selector 316. In this manner, the input temperature limit representation to the fuel demand selector 316 from the blade path temperature block 320 or the exhaust temperature block 322 through block 372 is always at or close to a value which needs only to be decremented to produce temperature limit control action in the event the temperature error sign changes from positive to negative. To provide for the tracking operation, the output of the reset controller 370 is applied to an input difference block 374 along with a representation of the output fuel demand representation from the fuel demand selector 316. A bias is summed with the resultant error signal by block 376 to cause the reset controller output to exceed the fuel demand signal slightly thereby providing some + and − control range for the selector input control which is driving the selector 316.

If the temperature error at the output of the difference block 359 is negative, the reset controller 370 is switched from its tracking operation by transfer block 368 through the routing of a zero representation to reset controller summer input block 369 through the transfer block 368. Further, the negative temperature error signal is then selected by the low select block 360 for application to the input of the proportional controller 362 and the reset controller 370 through the summer block 369. For negative temperature error, the blocks 362 and 370 thus form a proportional plus reset controller having their outputs summed in block 372 for application to the low fuel demand selector 316. In the preferred control system 300, it is noteworthy that rate action is also provided in the temperature control channels as considered more fully subsequently.

A negative temperature error is alarmed through block 378 to cause turbine shutdown if the temperature error is more than a predetermined amount. A deadband is provided in the block 378 to prevent alarms for small temperature errors.

After the generator 102 has been synchronized with the line with the use of the preferred control system 300, the gas turbine speed is regulated by the system frequency if the power system is large and the speed reference applied to the difference block 310 in FIG. 13A is set at a higher value such as 106%. The speed fuel demand signal applied to the input of the fuel demand selector 316 thus is normally much higher than other inputs to the selector 316 during system load operation. If the generator 102 is separated from the power system for isolated operation, the turbine 104 is controlled to operate at the 106% speed reference.

The load control block 324 becomes operative during load operation of the gas turbine power plant 100. A feedforward control embodiment of it is shown in greater schematic detail in FIG. 13D. A feedback control embodiment is employed in the preferred control system 300 as subsequently described. More particularly, the load control block 324 in FIG. 13D includes a kilowatt reference block 380 which generates a reference representation applied to a feedforward characterization block 382 through a summer block 384 to which a bias is applied. The characterized output kilowatt reference representation is applied to a summer block 386 where a calibration summation is made with the output from a reset controller 388. The output from the summer block 386 defines the corrected load fuel demand limit for application to the low fuel demand selector 316 through a transfer block 389. In startup, the transfer block 389 causes a high value to be applied to the low demand selector 316 so that the load control is nonlimiting.

For mode 3 fixed or constant load control, transfer block 390 enables the reset controller 388 to integrate any error between actual generator kilowatts and the kilowatt reference representation from the block 380 as determined in difference block 392 to provide a trim correction to the sum block 386. Under turbine temperature load limit operation, an error between the output of block 386 and the fuel demand signal is generated by block 387 and applied to the input of the reset controller 388 by the transfer block 390 to obtain tracking action (with bias if desired) for reasons like those considered previously in connection with temperature limit control. In the temperature load limit case, the temperature control limit imposed preferably by the exhaust temperature control 322 prevent overloading of the turbine-generator and in so doing provides load control by limit action.

Fixed load operation is referred to as Mode 3 and it occurs after the generator and line breakers are closed if minimum load is selected and if fixed load control is included in the control package and selected for operation. In Mode 3 a kilowatt limit is accordingly imposed on the low fuel demand selector 316 in addition to the previously described limits. At minimum load operation, the kilowatt reference representation is fixed and, in the FIG. 13D embodiment, feedforward control action is developed as just described. On base, peak or system reserve operation in Mode 4, the reference representation generated in FIG. 13D by the block 380 is preferably ramped to the maximum value causing the temperature control to take over and control the load by exhaust or blade path temperature limit.

In the preferred control system 300, a load rate of 50% per minute is provided. Under selectable emergency start, a faster load rate can be provided. Operator raise and lower pushbuttons can also be employed for load control, and when so used they increment or decrement the kilowatt reference representation. For pushbutton operation, the increment rate is 50% load per minute and the decrement rate is 100% per 30 to 40 seconds per NEMA specifications.

At the output of the low fuel demand selector 316, the fuel demand representation is applied to a dual fuel control where the fuel demand signal is processed to produce a gas fuel demand signal for application to the gas starting and throttle valves or a liquid fuel demand signal for application to the oil throttle and pressure bypass valve or as a combination of gas and liquid fuel demand signals for application to the gas and oil valves together.

To generate a speed reference representation in Mode 1, the following algorithm is employed in the preferred control system 300:

$$W_{R(t)} = W_{R(t-\Delta t)} + a_{(t-\Delta t)}\Delta t$$

where:
$a = fn(W_R)$ for normal acceleration (derived from FIG. 14)
$a = fe(W_R)$ for emergency acceleration (derived from FIG. 14)
$W_R$ = speed reference $$W_{MIN} \leq W_R \leq W_{SYNCH}$$

$W_{R(c)}$ = initial speed value.

To compute a load demand representation, the following algorithm may be employed:

$$D_R = \frac{1}{T_D} \int_{t=\text{Synchr}}^{T=\text{Desired Load}} (100\%)\, dt + D_R(0);$$

$$D_{MIN} \leq D_R \leq D_{SYS\,RES}$$

where:
$D_R$ = load reference
$T_D$ = repeats/second required for fixed time to reach desired load
$D_R(O)$ = Initial load value.

To determine the fuel demand representation the following algorithms may be employed:
$Q_{FW} = (W_R - W) K$ for speed
$Q_{FD} = KD_R + 1/S\,(D_R - D)$ for load with load conrol
or
$Q_{FD} = KD_R$ without load control.

The algorithms implemented in the preferred control system 300 are more fully described subsequently.

In addition to Mode 3 and Mode 4, the control modes of operation as defined herein further include Mode 0, Mode 1, and Mode 2. Mode 0 is the pre-ignition mode which applies to the startup period up to approximately 20% speed. During Mode 0 operation, plant status information is determined by the control system 300 for sequencing and protection purposes.

Reference is made to FIG. 18 where there is shown a schematic diagram representative of the events involved in gas turbine startup embraced by operating Modes 0, 1 and 2 in the preferred embodiment. FIG. 18 also illustrates the sequencing involved in shutdown.

After ignition, the control loops are automatically transferred to Mode 1 by sequencing operations. The speed fuel demand reference $W_R$ is then increased as previously considered in connection with FIG. 14 for a normal or an emergency start. In addition, the surge control limit and temperature cutback control action are provided as already considered.

During Mode 2 sequence operations transfer the control for synchronization which can be performed manually or automatically. The subject matter of automatic synchronization and its relationship to power plant operations is disclosed in the previously identified Reuther and Reed copending applications W. E. 40,218 and WIS 70-01. The procedure for manual synchronization is subsequently considered more fully herein. As in the case of Mode 0 operation, sequence and protection operations are interfaced with the control loops during Mode 1 and 2 operations as generally indicated in FIG. 18.

The control arrangement 302 generally protects gas turbine apparatus against factors including too high loading rates, too high speed excursions during load transients, too high fuel flow which may result in overload too low fuel flow which may result in combustor system outfires during all defined modes of operation, compressor surge, and excessive turbine inlet exhaust and blade over-temperature. Further, the control arrangement 302 as embodied in the control system 300 meets all requirements set forth in the NEMA publication "Gas Turbine Governors", SM32-1960 relative to system stability and transient response and adjustment capability.

3. Control System

The control system 300 is shown in block diagram detail in FIG. 12. It includes a general purpose digital computer system comprising a central processor 304 and associated input/output interfacing equipment such as that sold by Westinghouse Electric Corporation under the trade name PRODAC 50 (P50). Generally, the P50 computer system employs a 16,000 word core memory with a word length of 14 bits and a 4.5 microsecond cycle time. The P50 is capable of handling a large volume of data and instructions so as readily to provide for handling the tasks associated with controlling and operating multiple gas turbine plant units as generally considered previously and as more fully considered subsequently.

The P50 core memory is expandable, and by addition of functional modular units the P50 is capable of substantial increase in its analog unit capacity, contact closure inputs, and contact closure outputs. Data communication is provided for the P50 by 64 input and output channels, each of which provides a 14 bit parallel path into or out of the computer main frame. The P50 addressing capability permits selection of any of the 64 input/output channels, any of the 64 word addresses for each channel and any of the 14 bits in each word. Over 50,000 points in a process can thus be reached individually by the P50 computer system.

More specifically, the interfacing equipment for the computer 304 includes a contact closure input system 306 which scans contact or other similar signals representing the status of various plant and equipment conditions. The status contacts might typically be contacts of mercury wetted relays (not shown) which are operated by energization circuits (not shown) capable of sensing the predetermined conditions associated with the various plant devices. Status contact data is used for example in interlock logic functioning in control and sequence programs, protection and alarm system functioning, and programmed monitoring and logging.

Input interfacing is also provided for the computer 304 by a conventional analog input system 308 which samples analog signals from the gas turbine power plant 100 at a predetermined rate such as 30 points per second for each analog channel input and converts the signal samples to digital values for computer entry. A conventional teletypewriter system or printer 310 is also included and it is used for purposes including for example logging printouts as indicated by the reference character 312.

A conventional interrupt system 314 is provided with suitable hardware and circuitry for controlling the input and output transfer of information between the computer processor 304 and the slower input/output equipment. Thus, an interrupt signal is applied to the processor 304 when an input is ready for entry or when an output transfer has been completed. In general, the central processor 304 acts on interrupts in accordance with a conventional executive program considered in more detail hereinafter. In some cases, particular interrupts are acknowledged and operated upon without executive priority limitations. There are up to 64 independent available for the central processor 304 in the P50 computer system. Each of the employed interrupt inputs causes a separate and unique response within the computer main frame without need for additional input operations thereby allowing the processing of interrupt input signals with very little main frame duty cycle.

Output interfacing generally is provided for the comuter by means of a conventional contact closure output system 316. Analog outputs are transmitted through the contact closure output system 316 under program control as subsequently considered more fully.

The plant battery 132 considered previously in connection with FIG. 1 is also illustrated in FIG. 12 since it provides for operating an inverter 318 which provides the power necessary for operating the computer system, control system and other elements in the power plant 100. The inverter 318 can be an equipment item sold by Solidstate Controls, Inc. and identified as Model No. W-CR-267-DCA. Battery charging is provided by a suitable charger 320.

The contact closure input system 306 is coupled by cabled wire pairs to the operator's console panel 120, considered previously in connection with FIG. 1, and to a remote operator's panel 322. As shown in FIG. 12, connections are also made to the contact closure input system 306 from the inverter 318 and the battery charger 320 and various turbine, protective relay, switchgear, pressure switch and gauge cabinet, and starting engine contacts. In addition certain customer selected contacts and miscellaneous contacts such as those in the motor control center 130 (FIG. 1) are coupled to the contact closure input system 306.

Figure 19A:
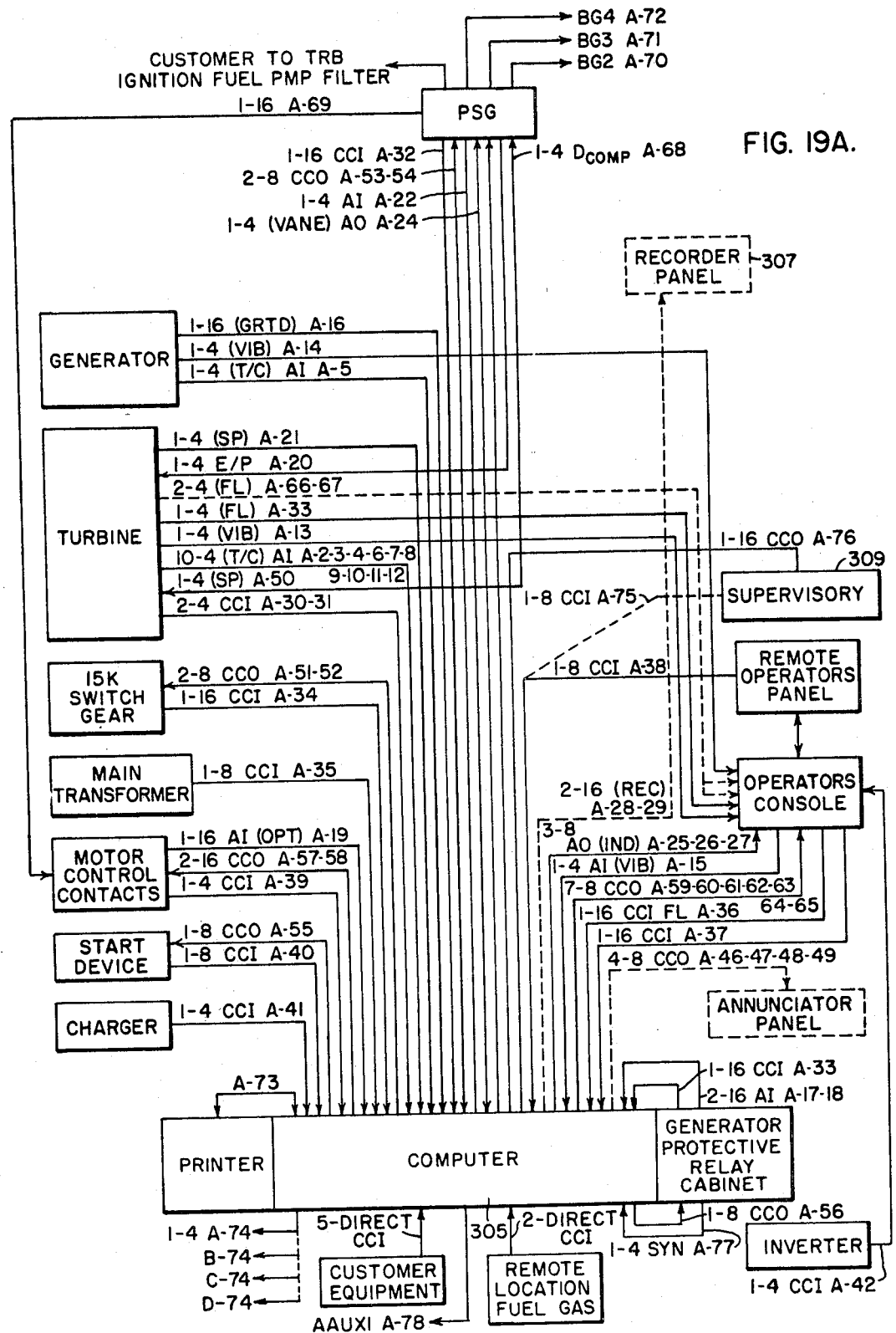
FIGS. 19A-B show a cable and wiring diagram employed for a computer control system and various power plant apparatus elements in a preferred embodiment of the invention.
Figure 19B:
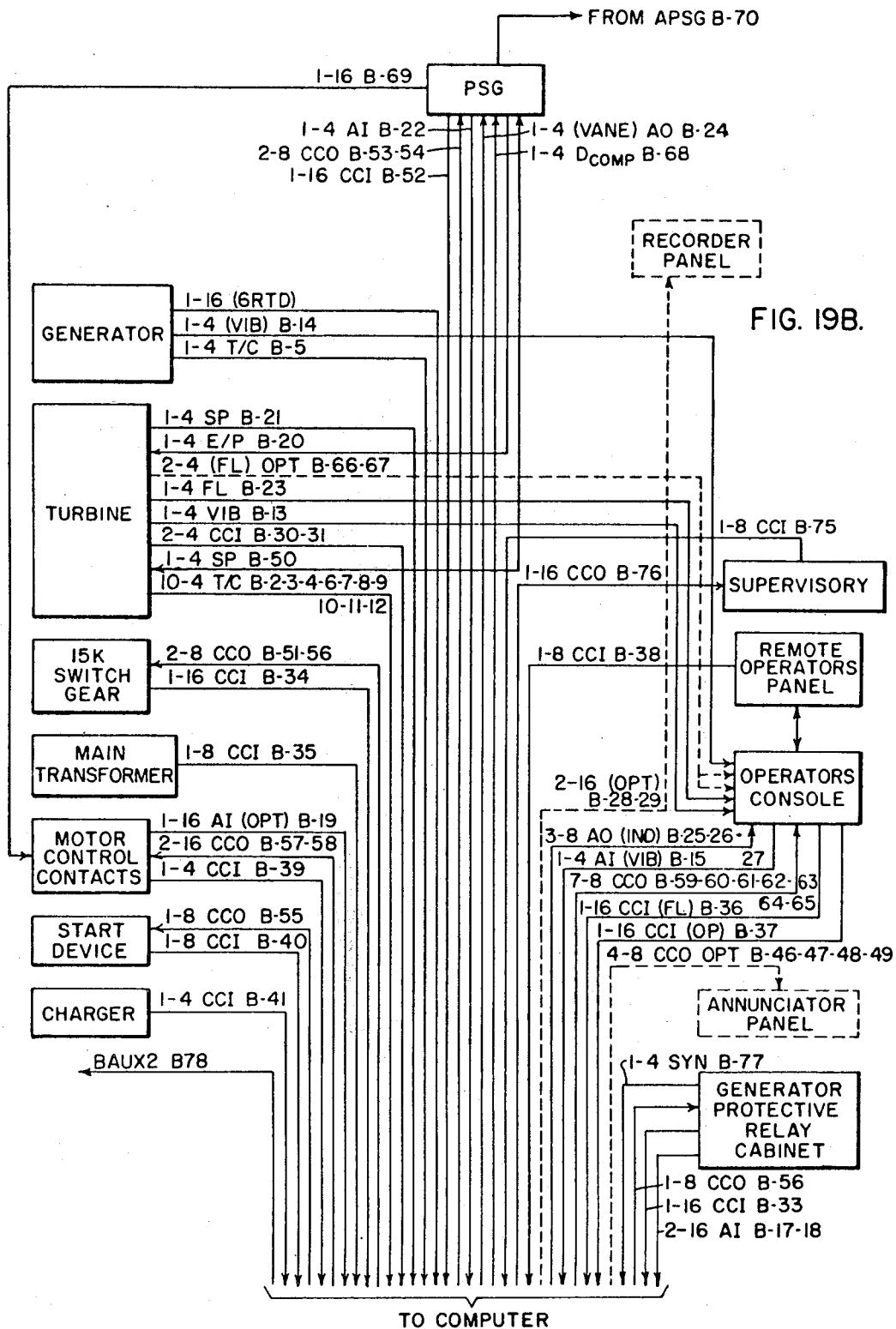

In FIGS. 19A and 19B there is schematically illustrated a cabling diagram generally corresponding to the block diagram shown in FIG. 12. However, the central processor 304 and associated computer system equipment shown in FIG. 12 are grouped together as a single computer system block 305 in FIGS. 19A and 19B. In addition, a recorder panel 307, a supervisory control 309 and an annunciator panel 311 are shown in FIGS. 19A and 19B as options.

Generally, FIG. 19A shows the cabling needed for control system interfacing with a first gas turbine power plant designated by the letter "A", and FIG. 19B shows the cabling needed for interfacing the control system with a second gas turbine power plant designated by the letter "B". As already indicated, a total of four gas turbine power plants can be operated by the P50 computer system and additional cabling diagrams similar to FIG. 19B are provided when needed for the other two gas turbine plants C and D.

Each line connection in FIG. 19A and FIG. 19B includes a designation which identifies the mnemonic, the cable size and the type of coupling or function. For example, the designation for the topmost turbine connection in FIG. 19A indicates that its identification is A21 and that there is one four-wire pair cable used for at least one speed feedback signal. Contact closure inputs associated with the contact closure input system 306 in FIG. 12 are represented by the symbol CCI on the line connections in FIGS. 19A and 19B. The symbol CCO refers to contact closure outputs and the symbol AI refers to analog inputs.

The P50 analog input system 308 has applied to it the outputs from various plant process sensors or detectors, many of which have already been briefly considered. Various analog signals are generated by sensors associated with the gas turbine 104 for input to the computer system 305 where they are processed for various purposes. The turbine sensors include eight blade path thermocouples, eight disc cavity thermocouples, eight exhaust manifold thermocouples, eight bearing thermocouples, compressor inlet and discharge thermocouples, and, as designated by the block marked miscellaneous sensors, two oil reservoir thermocouples, a bearing oil thermocouple, a control room temperature thermocouple, and a main fuel inlet thermocouple.

A combustor shell pressure sensor and a main speed sensor and a backup speed sensor also have their output signals coupled to the analog input system 308. The speed sensor outputs are coupled to the analog input system 308 through an analog speed control 324 and an auxiliary speed limiter 326, respectively. A speed reference signal and a speed/load limit signal generated as outputs by the computer 304 and a fuel demand signal developed by the analog speed control 324 are all coupled to the analog input system 308 from the analog speed control 324. A turbine support metal thermocouple is included in the miscellaneous block.

Sensors associated with the generator 102 and the plant switchgear are also coupled to the computer 304. The generator temperature sensors include six stator resistance temperature detectors, an inlet air thermocouple, an outlet air thermocouple, and two bearing drain thermocouples. Vibration sensors associated with the generator 102 and the gas turbine 104 are coupled with the analog input system 308 through the operator's console 120 where the rotating equipment vibration can be monitored. As indicated by the blocks in FIG. 12, additional sensors which are located in the protective relay cabinet generate signals representative of various bus, line, generator and exciter electrical conditions. The operator's panel 120 also generates analog inputs including five calibration input connections as indicated by the reference character 328.

Various computer output signals are generated for operating meters at the operator's console 120 (or for operating recorders which are optional as shown in FIG. 19A) and they are applied as computer analog inputs as indicated by the reference character 330. Each instrument output circuit included in an instrument output block 331 comprises an integrating amplifier which operates in a manner like that described subsequently in connection with the analog output integrating amplifier employed for converting the computer digital speed reference output to an analog signal value.

With respect to computer output operations, the contact closure output system 316 transfers digital speed reference, speed/load limit and fuel transfer outputs to external circuitry as indicated respectively by the reference characters 332, 334 and 336. The coupling of the contact closure output system 316 with the analog speed control 324 is within the framework of the preferred software/hardware hybrid control system. Another contact closure output 338 to the analog speed control 324 provides for a minimum fuel flow into the turbine combustor system in order to prevent flameout after ignition.

An analog dual fuel control system 337 is operated by the speed control 324 to determine the position of the liquid and gas fuel valves considered in connection with FIGS. 9 and 10. A contact closure output coupling to the dual fuel control 337 provides for transfer between fuels or relative fuel settings for two fuel or single fuel operation as indicated by the reference character 336. A guide vane control circuit 338 is also operated by the speed control 324 to control the position of the guide vanes through a guide vane electropneumatic converter 340 which actuates the positioning mechanism.

The contact closure output system 316 is also connected to the operator's panel 120 and to sequence the starting engine 126. A synchronizer detection circuit 342 has bus, line and generator potential transformers coupled to its input and the contact closure output system 316 signal provides a visual panel indication for manual synchronization. The detection circuit 342 also applies signals to the analog input system 308 for automatic synchronization when such synchronization is employed as considered more fully in the aforementioned Reuther and Reed copending patent applications.

Other devices operated by contact closure outputs include the generator field breaker and the generator and line breakers 132 and 137. The motor operated generator exciter field rheostats 171 and 177 and various devices in the motor control center 130 and the pressure switch and gauge cabinet 152 also function in response to contact closure outputs. The printer or teletype 310 is operated directly in a special input/output channel to the main frame 304.

Pressure Switch and Gauge Cabinet Equipment List

The following items are located in the pressure switch and gauge cabinet and include devices for interconnection with the gas turbine 104 and for interfacing with the computer control system:

| Item | Description |
|---|---|
| 65 | EMERGENCY STOP BUTTON<br>CAT. OT1D2C DPDT RED<br>MUSHROOM HEAD<br>LEGEND: EMERG.-STOP |
| 66 | SAFE RUN SWITCH<br>CAT. OT1S3C 3 POSITION<br>SELECTOR, DPDT |

| Item | Description |
|---|---|
| 67 | LEGEND: TG. - SAFE - TRB TG. IGNITION SWITCH CAT. OT1S3C 3 POSITION SELECTOR, DPDT |
| 68 | LEGEND: MAN - OFF - AUTO INSTRUMENT AIR SOL 20/35 SWITCH CAT. OT1S3C 3 POSITION SELECTOR DPDT |
| 69 | LEGEND: MAN - OFF - AUTO GAS ISOLATION SWITCH CAT. OT1S3C 3 POSITION SELECTOR DPDT |
| 70 | SELECTOR: MAN - OFF - AUTO OIL ISOLATION SWITCH CAT. OT1S3C 3 POSITION SELECTOR DPDT |
| 71 | LEGEND: MAN - OFF - AUTO OVER SPEED TRIP SWITCH CAT. OT1S3C 3 POSITION SELECTOR DPDT LEGEND: MAN - OFF - RESET |
| 63-8-1 | COMPRESSOR BLEED VALVE ACT PRESS SWITCH (HP) RANGE 5 |
| 63-8-2 | COMPRESSOR BLEED VALVE ACT PRESS. SW. (LP) RANGE 5 |
| 63-111 | INSTRUMENT AIR COMPRESSOR PRESS SWITCH RANGE 7 |
| 63-10 | COMPRESSOR INLET PRESS SWITCH RANGE 1-30" |
| 63-7 | OVERSPEED TRIP PRESSURE SWITCH RANGE 5 |
| 63-11 | INSTRUMENT AIR PRESS SWITCH RANGE 7 |
| 63-4 | BEARING OIL PRESS SWITCH RANGE 3A |
| 63-1 | BEARING OIL PRESS SWITCH RANGE 3A |
| 63-3 | HIGH PRESS OIL SWITCH RANGE 5 |
| 20-10-1 | 3 WAY COMP BLEED VALVE ACT AIR (HP) SOLENOID VALVE |
| 20-10-2 | 3 WAY COMP BLEED VALVE ACT AIR (LP) SOLENOID VALVE |
| 20-25 | 2 WAY COMBUSTOR SIGNAL LINE BLOWDOWN SOLENOID VALVE |
| 20-35 | 3 WAY INSTRUMENT AIR ISOL. VALVE SOLENOID VALVE |
| SC1 | E/P SIGNAL CONVERTER INLET GUIDE VAINE 1 to 5 VOLTS = 6 to 30 PSIG |
| SC2 | P/E SIGNAL CONVERTER COMBUSTOR SHELL PRESSURE 0 to 160 PSIG = 1 to 5 VOLTS |
| PCV-4 | INSTRUMENT AIR COMPRESSOR REGULATOR, RANGE 0-100 PSI GAGE FOR PIPE MTG. |
| PCV-3 | AIR DRYER OUTLET REGULATOR RANGE 0-50 PSI GAGE FOR PIPE MTG. |
| PCV-28 | AIR DRYER OUTLET REGULATOR RANGE 0-50 PSI GAGE FOR PIPE MTG. |
| PCV-50 | TRANSDUCER SUPPLY REGULATOR, RANGE 0-50 PSI GAGE FOR PIPE MTG. |
| PCV-51 | COMPRESSOR BLEED VALVE ACT AIR REGULATOR RANGE 0-100 PSI GAGE FOR PIPE MTG. |
| PCV-22 | TURB. INSTR. AIR REGULATOR RANGE 0-50 PSI GAUGE FOR PIPE MTG. |
| F1 | INSTRUMENT AIR FILTER |
| F2 | COMBUSTOR SHELL AIR FILTER |
| PI-34 | 4½" INSTRUMENT AIR SUPPLY PRESS. GAUGE, 1379A RANGE 0-160 PSIG - BOTTOM CONN. |
| PI-35 | 4½" OVERSPEED TRIP PRESS GAUGE, 1379B, RANGE 0-60 PSIG BOTTOM CONN. |
| PI-36 | 4½" BEARING OIL PRESS GAUGE, 1377B, RANGE 0-30 PSIG |
| PI-37 | 4½" COMBUSTOR SHELL PRESSURE GAUGE 1377A RANGE 0-169 PSIG |
| CV-1 | CHECK VALVE, ½" |
| CV-2 | CHECK VALVE, ½" |
| 63-21 | ATOMIZING AIR TANK PRESS SWITCH RANGE 9 |
| 63-9DT | FUEL SUPPLY PRESS. SWITCH, RANGE 4 |
| 20-2B | 3 WAY MANIFOLD DRAIN SOLENOID VALVE |
| 63-962 | GAS ISOL. VALVE ACT. AIR PRESS. SWITCH RANGE 4 |
| 63-9DS | MAIN FUEL PUMP INLET PRESS SWITCH, RANGE 263 |
| 20-17 | 3 WAY ATOMIZING AIR ISOLATION VALVE SOLENOID VALVE |
| 20-1D | 3 WAY FUEL OIL ISOLATION VALVE SOLENOID VALVE |
| 20-1G | 3 WAY FUEL GAS ISOLATION VALVE SOLENOID VALVE |
| 30-3B | 3 WAY GAS VENT VALVE SOLENOID VALVE |
| SC-3 | P/E SIGNAL CONVERTER FUEL PUMP DISCHARGE 0-1000 PSIG = 1-5 VOLTS |
| PI-33 | 4½" INLET GUID VANE PRESS GAUGE, 1379B, RANGE 0-60 PSIG BOTTOM CONN. |
| PI-61 | 4½" ATOMIZING AIR PRESS GAUGE, 1379A, RANGE 0-160 PSIG BOTTOM CONN. |
| PI-63 | 4½" FUEL DISTRIBUTION INLET PRESS GAUGE 1377S RANGE 0-1000 PSIG |
| PI-64 | 4½" FUEL PUMP DISCHARGE PRESS GAUGE 1377 - TAS RANGE 0-1500 PSIG |
| 74 | MOUNTING PLATE ASSY. FOR 12 - 56 POINT ELCO CONNECTORS |
| 79 | 36 POINT ELECTRICAL TERM BLOCK |
| 81 | 15 PT. TERMINAL BLOCK |
| 82 | DIODES, 1000V, 1 AMP. (SEM TECH. CORP. MODEL SC-10) |
| AC-84 | 150 CU. IN. ACCUMULATOR VOLUME |
| 86 | MG-6-RELAY |
| 87 | MG-6-RELAY |
| 88 | MG-6-RELAY |
| 89 | MG-6-RELAY |
| 90 | 24 PT. ELECTRICAL BLOCK |
| 91 | MG-6-RELAY |
| 92 | VIBRATION DAMPENER |
| 96 | MG-6-RELAY |

Analog Circuitry

Figure 20A:
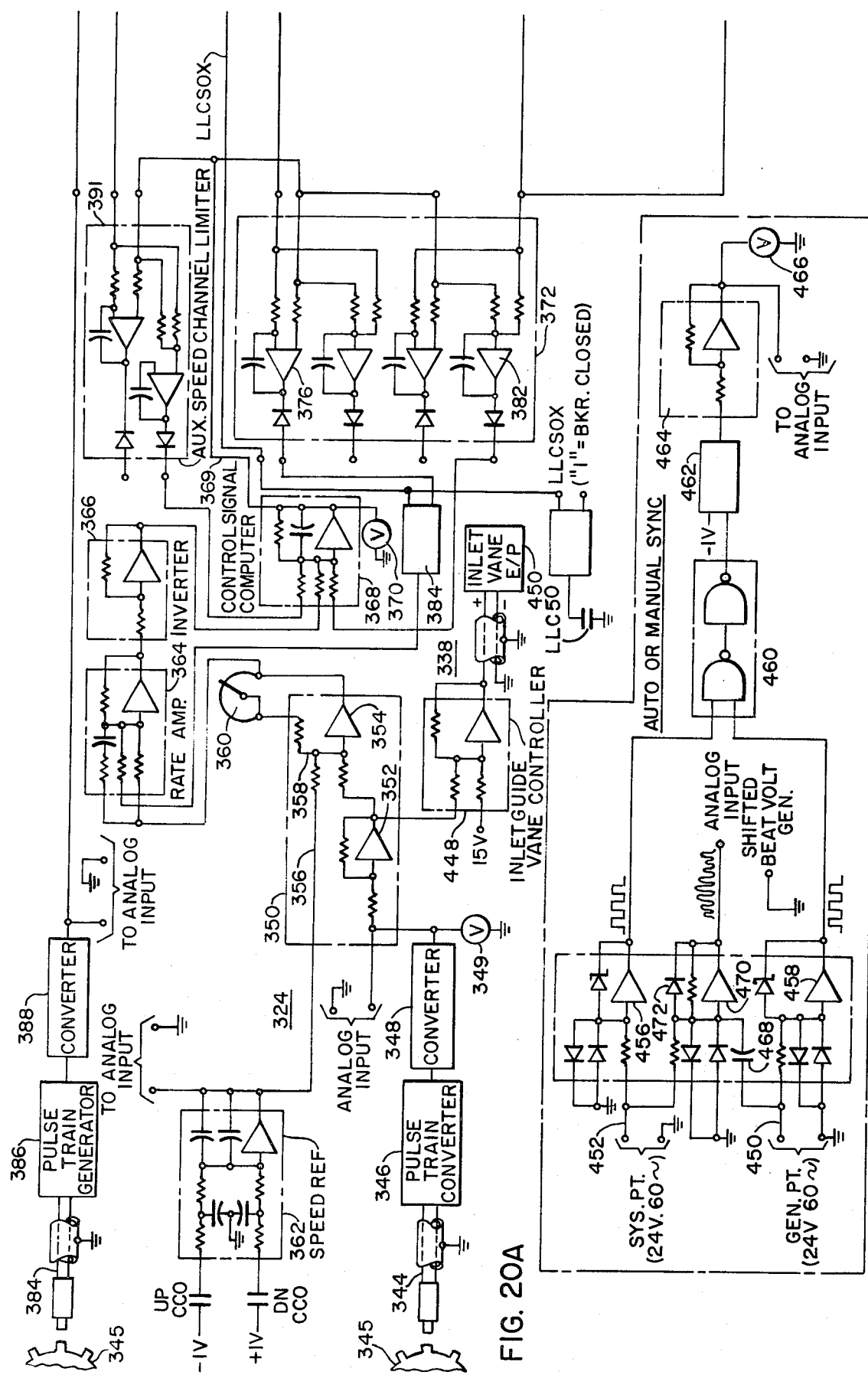
FIG. 20A-B shows a schematic diagram of analog circuitry associated with the computer in the control system to provide control over gas turbine fuel supply sysem operations and certain other plant functions.
Figure 20B:
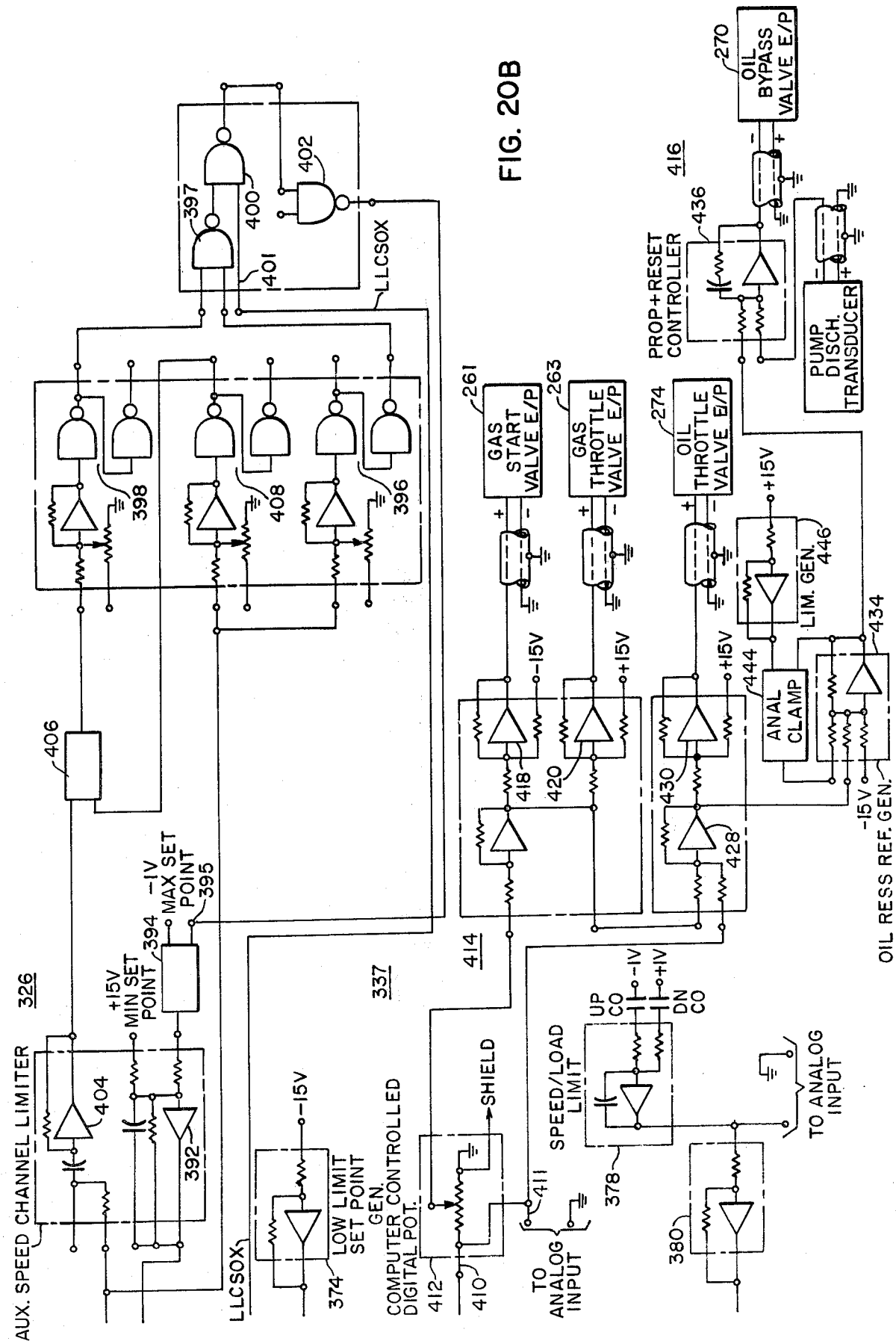

The speed control circuit 324 operates in response to a main speed generated by a main turbine speed sensor 344 associated with a 44 tooth magnetic rotor wheel 345 as shown in greater detail in FIG. 20. The speed sensor 344 is a conventional reluctance type device which generates a sinusoidal output waveform. Circuit block 346 converts the sinusoidal speed signal into an output signal having a constant width pulse at twice the input frequency.

Generally, the circuit block 346 includes a zero crossing sense amplifier which produces a pulse of approximately 15 microseconds duration every time the input waveform crosses zero. To detect zero crossing, to the block 346 the input is compared with zero by a two stage comparator which changes state every time the input crosses zero. The edges of the comparator square wave output are differentiated to produce a pulse train having twice the input frequency. In turn, the resultant output pulse train is applied to counter enable circuitry which initiates the operation of a clocked counter on the occurrence of each pulse. The counter enable circuitry is reset by the clocked counter 85 microseconds after the application of each set pulse. Accordingly, a circuit block output is generated by the counter enable circuitry in the form of a train of 85 microsecond pulses occurring at twice the input frequency.

The output pulse train from the circuit block 346 is applied to circuit block 348 which converts the pulse train into a direct voltage proportional to the pulse frequency. Generally, the circuit block 348 comprises a transistor switch network which is coupled to an R-C averaging network. The ON time of the transistor switch network is a constant 85 microseconds but the OFF time varies inversely with the input frequency. The averaging network generates a DC voltage output which is amplified and it is a function of the relationship between the ON and OFF times of the transistor switch network. Accordingly, the amplitude of the averaging network output is directly proportional to the frequency of the input constant width pulse train.

From the circuit block 348, an output is applied to a turbine speed meter 349 and to the input of an error detector circuit block 350. It is noted at this point in the description that each circuit block in FIG. 20 denotes a circuit card which is mounted in the control cabinet.

The actual speed signal at the output of the circuit block 348 is also applied to the analog input system 308 (FIG. 12). The computer thereby obtains a representation of the actual turbine speed determined by the main turbine speed sensor 344.

At the input of the speed error detector circuit 350, the speed signal is amplified and inverted by an operational amplifier 352. It is then applied to the input summing junction of an error detector operational amplifier 354.

A speed reference signal as indicated by the reference 356 and an adjustable speed regulation feedback signal indicated by the reference character 358 are also applied to the error detector summing junction. An adjustable potentiometer 360 determines the gain of the amplifier 354 by determining the magnitude of the amplifier circuit feedback signal, and the potentiometer resistance variation provides for adjustment in the gain and the speed regulation over a range from 2% to 6%.

The speed reference signal is an analog signal obtained from an analog output circuit block 362 which operates as a digital to analog converter in responding to a speed reference signal generated at the computer output in digital form. Generally, the analog output block 362 comprises an integrating amplifier to which up and down computer contact closure outputs are coupled. Programmed computer operation determines the period of closure of the respective contact outputs to determine the output voltage from the analog output block 362. In turn, the output voltage from the analog output block 362 is coupled to the computer 304 through the analog input system 308. The output contacts associated with the block 362 are held open when the speed reference analog voltage is detected to be at the digital command value.

With reference again to the error detector block 350, the summation of the speed reference, actual speed and speed feedback regulation signals results in the generation of a speed error output signal for application to a proportional plus rate amplifier 364. The amplified speed error signal is then inverted to obtain the correct polarity by an inverter block 366. If no fuel demand limit action is applied, the speed error signal is further amplified by a mixer amplifier circuit block 368 to generate a contact signal output (CSO) or a fuel demand signal on line 369 for input to the fuel control system 337 and for fuel demand or control output signal monitoring by meter 370.

A clamp circuit block 372 includes two circuits which are used to impose high and low limits on the fuel demand signal. A low limit setpoint of 1.25 volts is generated by a low limit setpoint generator circuit block 374 and applied to the negative input of clamp amplifier 376 for comparison with the fuel demand signal which is applied to the positive input from the fuel demand amplifier 368.

Similarly, a high limit for the fuel demand signal is established by a setpoint signal generated by an analog output circuit block 378 and an inverter 380 and applied to the positive input of another clamp amplifier for comparison with the fuel demand signal which is also applied to the positive clamp amplifier input. The computer output signal coupled to the analog output block 378 is the lowest of the fuel demand limit representations generated by control blocks 318, 320, 322 and 324 (FIG. 13A) under programmed computer operation.

The output of the clamp amplifier 382 is coupled to the input of the amplifier block 368 to produce low select fuel demand limit action on the fuel demand signal. Similarly, the output of the clamp amplifier 376 is applied to the input of the proportional plus rate amplifier 364 through an analog switch 384 which becomes conductive if a low fuel limit signal LLCSOX has been generated by the computer, i.e. if the fuel demand signal has reached 1.25 V (logic shown in FIG. 33C), to prevent flame out particularly on load transients through low limit fuel demand action.

If the fuel demand signal tends to drop below 1.25 volts, the low limiter clamp amplifier 376 operates through the analog switch 384 to clamp the input to the proportional plus rate amplifier at a level which results in the fuel demand signal output from the circuit block 368 having a voltage level of 1.25 volts. Similarly, the high limiter clamp amplifier 382 clamps the fuel demand amplifier 368 to prevent the fuel demand signal from exceeding the present value of the fuel demand limit as determined and output by the computer 304.

The auxiliary or backup speed limiter 326 is preferably employed to provide backup speed protection in conjunction with the main speed control 324. The turbine speed value at which the backup speed protection is provided is above the maximum speed range over which the speed control 324 is intended to provide control. For example, the maximum speed reference value within the speed control range of the speed control 324 may be 104% rated speed and the auxiliary speed limiter circuit 326 may provide backup speed limit protection at a speed of 108% rated. The mechanical backup speed limiters associated with the fuel systems referred to previously in connection with FIGS. 9 and 10 then provide further backup speed protection at a speed of 110% rated.

An auxiliary speed sensor 384 cooperates with the 44 tooth magnetic wheel 345 on the turbine-generator rotating element to generate a sinusoidal speed signal in the manner described for the main speed sensor 344. A pulse train is then generated by pulse train generator block 386 in the manner described for the circuit block 346 in the main speed control channel. Next, a converter block 388 generates an analog speed signal in response to the pulse train output from the circuit block 386 in the manner considered in connection with the main speed converter circuit 348.

The backup speed limit is imposed on the turbine operation by an analog clamp circuit 390 in circuit block 391. The output of the amplifier clamp circuit 390 is applied to the summing junction input of the mixing amplifier 368 to produce limit action on the fuel demand signal generated by the amplifier 368 in a manner similar to that described in connection with the limit action produced by the clamp amplifier circuit 376.

More particularly, the backup speed clamp amplifier circuit 390 causes the fuel demand signal to be cut back to the minimum value of 1.25 volts to cause turbine deceleration without flameout when a speed limiter setpoint generator circuit 392 is caused to apply a low limit setpoint of −1.25 volts to the positive input of the clamp amplifier for comparison with the fuel demand signal which is also applied to the positive input. An analog switch 394 is made conductive by input 395 to couple a one volt supply to the input of the setpoint generator circuit 392 and cause the generation of the low limit setpoint if either of two logic conditions is satisfied.

To provide low limit setpoint generation and auxiliary speed backup protection if the turbine speed exceeds the predetermined limit value of 108% as a first logic condition, the auxiliary speed signal is applied to the input of a comparator circuit 396 which generates an output signal for application to an OR circuit 397 when the speed signal is too high. An AND circuit 400 responds if LLCSOX exists to generate a switching signal at the input 395 of the analog switch 394 through a logic inverter 402.

The second logic condition which causes auxiliary speed backup limit protection is preferably included so that the turbine operation is cut back if the rate of speed change is too great at any turbine speed value over a predetermined speed range such as 102% rated speed to 108% rated speed. For this purpose, the auxiliary speed signal is applied to the input of a rate amplifier 404 which generates a speed derivative signal applied to the switching path of an analog solid state switch 406.

The speed derivative signal is coupled through the switch path of the switch 406 to the input of another comparator 398 if the turbine speed is above the bottom range value of 102% rated speed. As indicated by reference character 407, a switching action input is applied to the speed derivative analog switch 406 by a comparator 408 if the auxiliary speed signal applied to its input exceeds the predetermined value corresponding to 102% rated speed. If the turbine speed is excessive, the speed derivative signal is compared to a predetermined acceleration limit by the comparator 398. If the acceleration is also excessive, an output from the comparator 398 is coupled through the logic circuits 397, 400 and 402 to the control input of the logic switch 394 which causes low limit action on the fuel demand signal through the clamp amplifier 390 as already described.

The fuel demand signal generated at the output of the fuel demand amplifier 368 accordingly is representative of the fuel needed to satisfy the computer generated speed reference, the fuel needed to satisfy a computer determined limit action, the low limit fuel demand needed to prevent flameout during mormal speed operations, or to cause turbine speed cutback without flameout when overspeed conditions are detected by the auxiliary speed limiter circuit 326. At an input 410 to the dual fuel control system 337, the fuel demand signal is applied across a digital potentiometer 412 which is illustrated schematically as an analog potentiometer. The fuel demand signal is also applied to the computer analog input system 308 for programmed computer operations as indicated by the reference character 411.

In the leftmost position of the dual fuel demand potentiometer 412, the fuel demand signal is fully applied to a gas fuel control system 414. In the rightmost potentiometer position, the fuel demand signal is fully applied to a liquid fuel control system 416. At intermediate potentiometer positions, the total fuel demand signal is ratioed between the gas and fuel control systems 414 and 416 to produce the individual fuel flows which satisfy gas turbine operation commands.

The digital potentiometer position is determined by programmed computer operation of contact output closures to produce the desired fuel or mixed fuel flow to the burners. Fuel transfer operations are also placed under automatic computer control through the digital potentiometer 412, but that subject is considered more fully in the aforementioned copending Reuther application.

Figure 21:
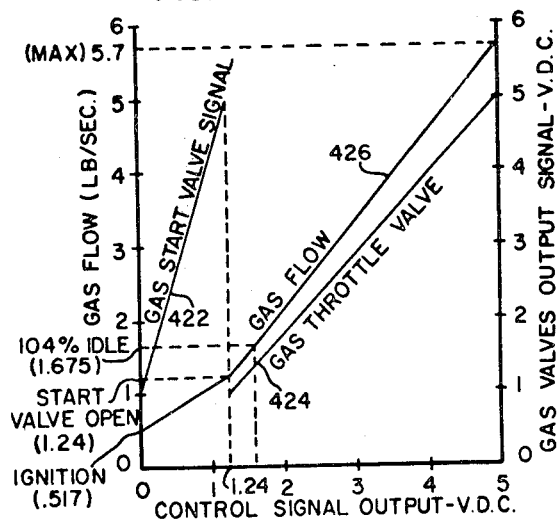

The gas fuel demand signal is applied to the input of a signal range adjuster amplifier 418 to produce the predetermined gain and bias characterization for operation of the gas start valve. Similarly, the gas demand signal is applied to the input of a signal range adjuster amplifier 420 to provide the predetermined gas throttle valve characterization. In FIG. 21, there are shown the respective characterization 428 and 428 for the adjuster amplifiers 418 and 420. Further, there is shown a net starting valve and throttle valve gas flow characteristic 426 which results from the characterized control placed on the starting valve and throttle valve electropneumatic converters by the amplifiers 418 and 420 as a function of the fuel demand control signal.

The gas fuel demand signal and the total fuel demand signal are differenced at the summing junction of an operational amplifier 422 to generate the liquid fuel demand signal. As already indicated, the liquid fuel demand signal is equal to the total fuel demand signal when the potentiometer 412 is positioned at its rightmost location to make the gas fuel demand signal zero.

Figure 22:
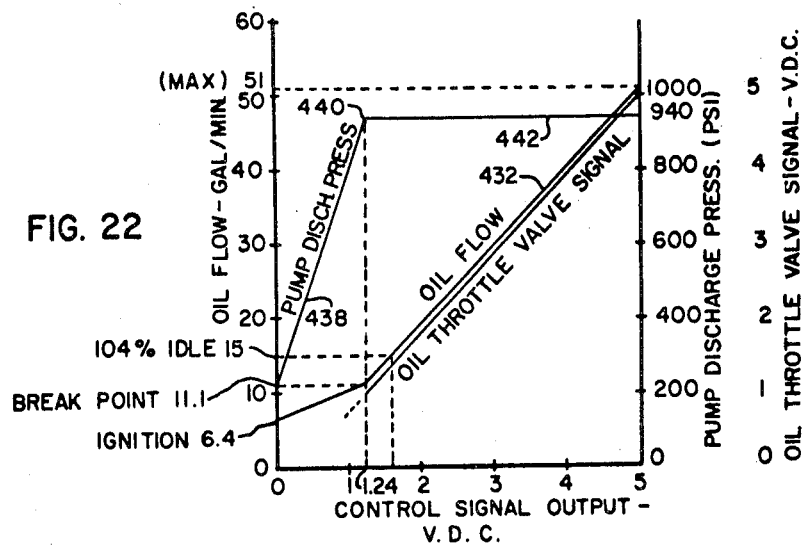
FIGS. 21-23 show certain control signal characteristics associated with the analog circuitry of FIG. 20.

A signal range adjuster amplifier 424 operates on the liquid fuel demand signal to produce control on the liquid fuel throttle valve electropneumatic converter in accordance with the characteristic 432 shown in FIG. 22. The oil demand signal is also applied to the input of an oil pressure reference generator 434 which generates a ramp reference for a proportional plus reset plus rate controller 436. The pump discharge pressure transducer (FIG. 10) generates a feedback signal which is summed with the ramp reference and the resultant error signal is operated upon with proportional plus reset plus rate action by the controller 436 to operate the liquid fuel bypass valve electropneumatic converter 270 in accordance with the pump discharge pressure characterization indicated by the reference character 438 in FIG. 22. When gas fuel is selected, the oil discharge pressure is regulated to a predetermined minimum value.

When the liquid fuel demand signal reaches a value of 1.25 volts, the pump discharge pressure ramp is terminated as indicated by the reference character 440 in FIG. 22 and the pump discharge pressure is then held constant as indicated by the reference character 442 for higher liquid fuel demand signals. Thus, an analog clamp circuit 444 compares a limit voltage generated by a limit setpoint generator 446 to the oil pressure reference signal and clamps the output from the oil pressure reference generator 434 at a value which causes the pump discharge pressure to remain constant at the value indicated by the reference character 442.

Figure 23:
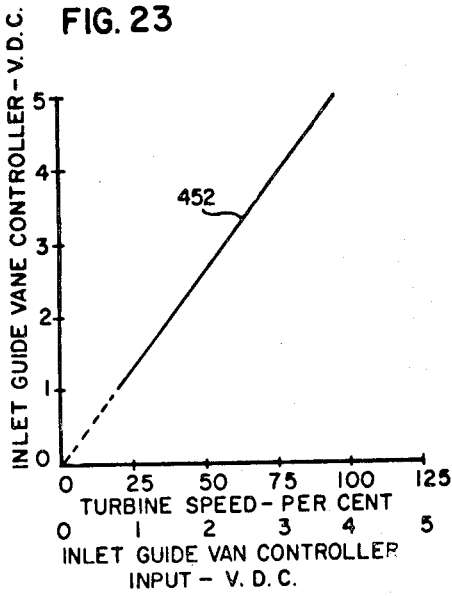

The inlet guide vane control 338 considered previously in connection with FIG. 12 includes a controller 448 which generates a guide vane position control signal as a linear function of the sensed speed signal derived from the error detector block 350 in the main speed channel. An inlet vane electropneumatic converter 450 is provided for operating the previously mentioned positioning ring of the guide vane assembly. As illustrated in FIG. 23, the controller position control signal characteristic 452 provides for a minimum open guide vane position at the 20% ignition speed value and increased opening of the guide vanes with increased turbine speed until the guide vanes are at the maximum open position at approximately 95% rated turbine speed.

The synchronizer detection circuit 342 is responsive to sensed system voltage derived in this case from a bus potential transformer as indicated by the reference character 452 and sensed generator voltage derived in this instance from a generator potential transformer as indicated by the reference character 454 to detect the relative conditions of the two sensed waveforms for operator or automatic synchronization of the generator 102 with the system by closure of the generator breaker after completion of the startup period. For line breaker synchronization, the inputs are computer switched to the proper potential transformers. Respective square wave signals are generated by Zener diode clipped amplifiers 456 and 458 to which the system and generator voltage signals are respectively applied.

The two square waves are applied to an AND circuit block 460 which generates an output only when both squarewave signals are in the ON condition. In turn, an analog switch 460 applies an input to a phase difference amplifier 464 during the time period that a signal is generated by the AND circuit block 460.

The output voltage from the phase difference amplifier is proportional to the phase difference between the generator and system voltages and it is applied to an operator's panel voltmeter 466 for use by the plant operator during manual synchronization. At the extreme limits, a 180° phase difference results in a phase difference voltage approaching zero volts and a 0° phase difference results in a phase difference voltage of 5 volts. The phase difference voltage is also applied to the computer 304 through the analog input system 308 when programmed automatic synchronization is employed.

It is also noteworthy that the generator voltage signal is phase shifted 90° by a capacitor 468 for vector summation with the system voltage signal at the input of a beat voltage generator amplifier 470. A diode 472 operates in the amplifier circuit to cause a beat frequency signal to be generated for input to the computer 304 through the analog input system 308 as a relative speed indication for programmed automatic synchronizing.

Control Panels

Figure 24A:
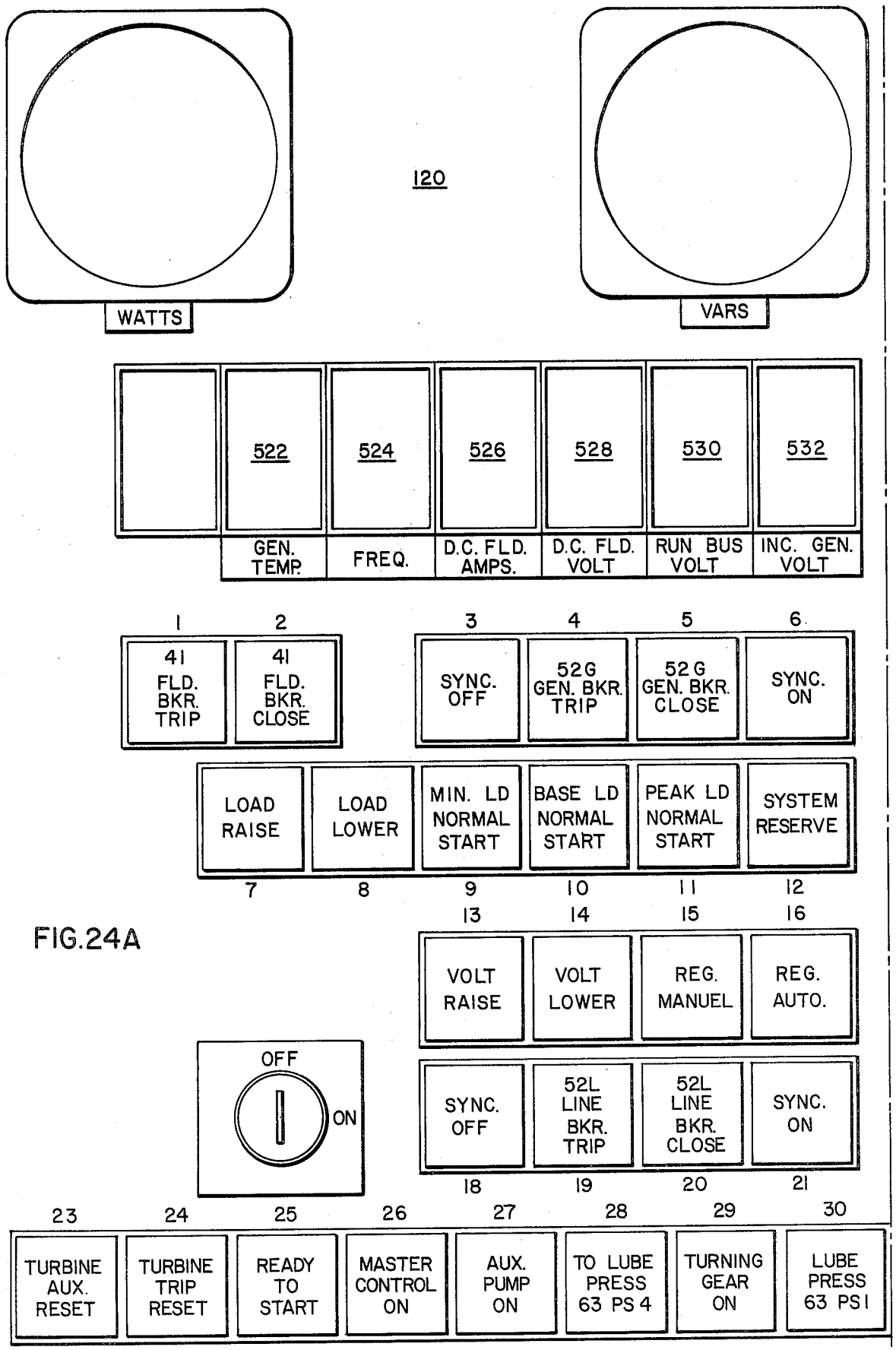
Figure 24C:
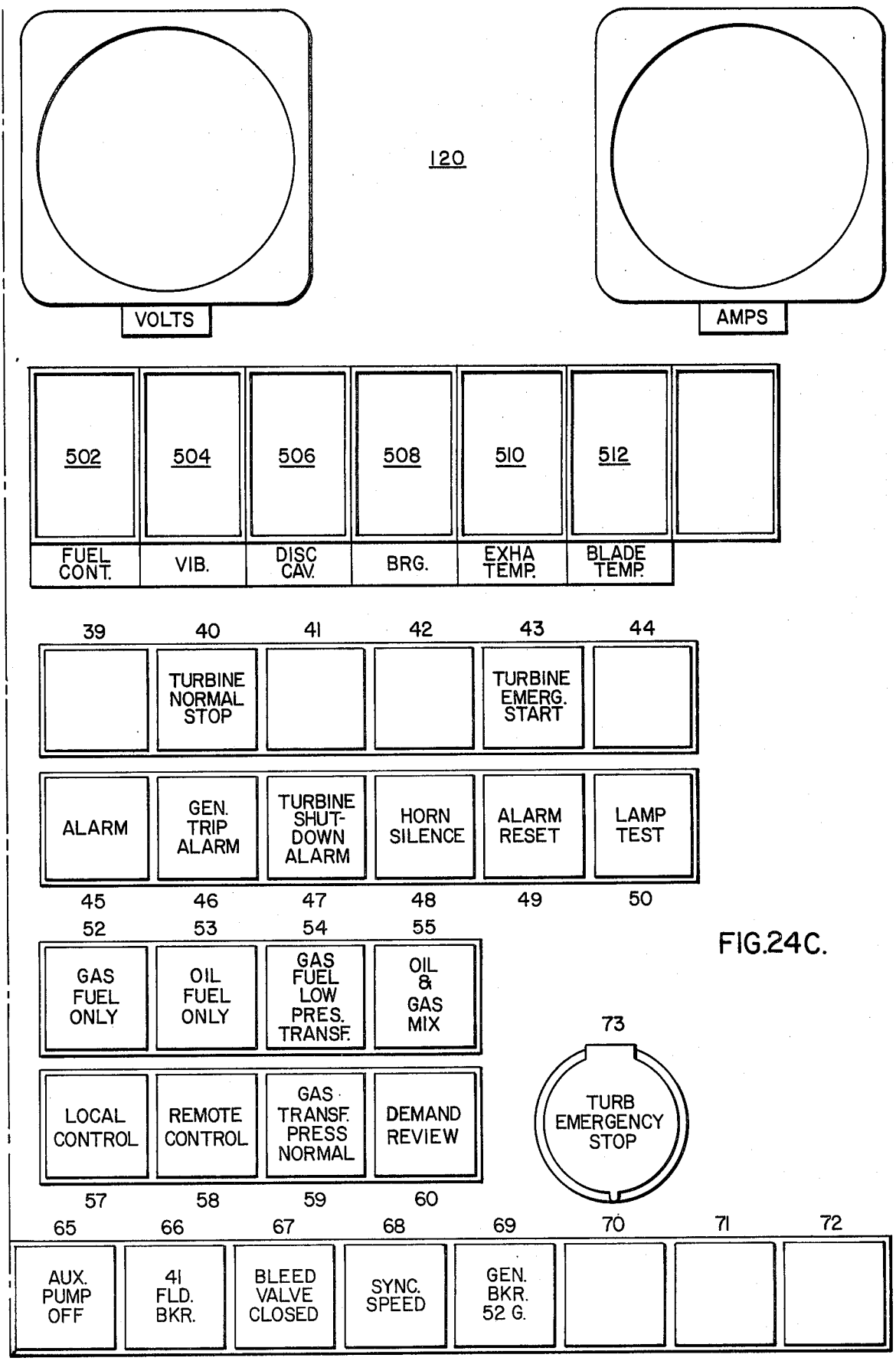

The operator's panel 120 considered in connection with FIG. 1 is included as part of an operator's console and it is shown in greater detail in FIG. 24. Continuous display meters are provided for the following turbine variables as indicated by the reference characters in parentheses:

Turbine Speed (Dual Scale)—(349)
Fuel Demand Signal—(502)
Vibration (Turbine or Generator)—(504)
Disc Cavity Temperature—(506)
Bearing Temperature (Turbine or Generator)—(508)
Exhaust Temperature—(510)
Blade Path Temperature—(512).

Continuous display meters are also provided for the following generator variables:

Watts (Dual Scale Optional)—(514)
VARS—(516)
Phase Difference for Synchronizing—(466)
Volts (Dual Scale Optional)—(518)
Amperes (Dual Scale Optional)—(520)
Stator Winding Temperature—(522)
Frequency—(524)
DC Field Amperes—(526)
DC Field Volts—(528)
Running Volts—(530)
Incoming Volts—(532).

Many of the meters or indicators can display one of several quantities as an operational and maintenance aid. The SELECT INDICATOR and SELECT DEVICE pushbuttons are used in conjunction with a two decade thumbwheel switch 534 to select and display the desired quantities. Each selective display meter has an assigned number which can be set into the thumbwheel switch to cause that meter to be turned off when the SELECT INDICATOR pushbutton is pressed. If a variable such as a thermocouple temperature is to be displayed, a number associated with the variable is registered by the thumbwheel switch and the SELECT DEVICE pushbutton is pressed. The selected meter then indicates the selected variable.

During remote control, generator watts, VARS and phase A volts are automatically selected for the remote watt, VAR and volt meters corresponding to the watt, VAR and volt meters 514, 516 and 518. The local operator panel pushbuttons effective during remote control are:

Turbine Emergency Stop
Local Control

Generally, a plurality of control pushbuttons are located in the illustrated arrangement beneath the meters just considered. One word of contact closure inputs and one interrupt is assigned to the operator panel 120. Identical additional assignments are made for each additional operator's panel used under multiple gas turbine plant control. Within the fourteen bit contact closure input word, eight bits are assigned for reading the two decade thumbwheel switch 534 and the other six bits are employed to identify the pushbutton depressed to produce the computer input.

All of the pushbuttons cause a circuit to be closed while depressed so as to cause a single normally open pushbutton contact to be connected to a diode matrix.

A pushbutton operation energizes the common interrupt the operator's panel 120 and applies voltage to a unique combination of the six bits assigned to the pushbutton. The contact closure input word is read within milliseconds and the bit combination is stored for further processing.

Operation of a second pushbutton while a first one is still depressed causes no additional interrupt but generally only one pushbutton should be operated at a time. Mechanical barriers are provided between adjacent pushbuttons, and critical group of pushbuttons are mechanically interlocked.

Once a panel contact closure input word is read, it is repetitively read until the bit pattern changes to indicate that the pushbutton has been released or another button has been depressed. In this manner, raise, lower and test actions can be continued during the period of pushbutton depression.

The breaker pushbutton control switches are effective only under local, manual synchronizing control. In addition, lockout must be reset to close the field breaker and the generator breaker must be tripped before the field breaker can be tripped. To close the generator breaker, the field breaker must be closed, the master contact function must be in the ON state, lockouts must be reset and the manual synchronizing equipment must be in service. The manual synchronizing equipment also must be in service to close the line breaker.

Synchronizing ON and OFF pushbuttons are associated with both the generator and line breaker pushbuttons. If the synchronizing equipment is in service for one breaker and a similar request is made for the other breaker, the request is ignored. The SYNC ON lamps are in parallel to display the fact that the synchronizing equipment is in use regardless of the row of breaker pushbuttons under observation.

A pair of synchronizing lights are placed under the speed meter 349 as shown to act as conventional synchronizing lights driven by reduced voltage transformers in the transformers in the protective relay cabinet. The AUTO SYNC and MANUAL SYNC pushbuttons provide for selecting the synchronizing mode to provide for generator breaker closing after the gas turbine 104 has been accelerated to idle speed.

With respect to gas turbine control, pushbuttons are provided for both normal and emergency starting and stopping. The emergency stop operation causes immediate opening of the generator circuit breaker and turbine shutdown. The normal stop operation first reduces the load to minimum (approximately 10%) and turbine shutdown is then initiated.

The normal turbine start selection is combined with load selection. Thus, pressing the pushbuttons associated with minimum, base or peak load provides for initiating a normal turbine start. After the generator breaker is closed the selected load level is automatically generated. The minimum, base and peak load levels can be selected at any time, but the system reserve load level can be selected by the associated pushbutton only after the generator breaker has been closed. The SYSTEM RESERVE pushbutton accordingly cannot be used to initiate a start. On emergency start, the gas turbine unit 104 is driven to the base load level of operation after it has reached idle speed and the generator breaker has been closed. However, a different load can be selected if desired. The LOAD RAISE and LOAD LOWER pushbuttons provide manual control over sped reference during synchronizing in Mode 2 and during temperature control in Mode 4. In Mode 3, these pushbuttons control the kilowatt reference.

The operator is provided with generator control by VOLT RAISE and VOLT LOWER pushbuttons which control generator voltage during manual synchronization and after manual or automatic synchronization. A pair of pushbuttons are also provided to control a pair of contact closure outputs from the computer 304 to place the generator voltage regulator on automatic or manual operation. On automatic operation, the voltage regulator is switched into service when the generator field breaker closes. The VOLT RAISE and VOLT LOWER pushbuttons control the base adjusting rheostat in manual operation and the voltage adjusting rheostat in automatic operation.

Pushbuttons are also provided for fuel selection, in this instance gas or oil or an oil and gas mix. Another pushbutton provides for automatic transfer between gas and oil prior to burner ignition or after synchronization or from gas to oil on loss of gas supply pressure. The gas turbine unit 104 can be started on gas or oil, and if a fuel mix is selected, the gas turbine 104 starts on gas and mixes oil to a predetermined ratio after synchronization. The predetermined gas/oil ratio in the fuel mix can be varied with the use of the thumbwheel switch 634 and the SELECT DEVICE and SELECT INDICATOR pushbuttons.

On the occurrence of an alarm, the light is flashed and a horn blow is caused unless the plant is under remote control. A HORN SILENCE pushbutton provides for stopping the horn blow. The ALARM RESET pushbutton causes any flashed alarm to go from the flashing condition to a steady ON condition and the turbine lockout conditions to be reset. When the faulty conditions are cleared, the alarm lamp goes dark. Generator lockout relays are flashed when tripped by the GEN TRIP ALARM light and they must be reset manually. A LAMP TEST pushbutton causes all lights on the operator's panel 120 to flash ON and OFF for lamp test purposes.

The following startup sequence lamps are located in a bottom row across the bottom of the operator's panel 120:

| Color | Function |
| --- | --- |
| Red | Turbine Auxiliaries Reset |
| Red | Turbine Trip Reset |
| Green | Ready to Start |
| Red | Master Control On |
| Yellow | Auxiliary Pump On |
| Red | Turbine Tube Pressure 63-4 |
| Yellow | Turning Gear On |
| Red | Lube Pressure 63-1 |
| Yellow | Start Device On |
| Red | Overspeed Trip Valve |
| Yellow | Overspeed Trip Pressure |
| White | Ignition On |
| Red | Fuel On |
| Red | Flame Combustor 6 |
| Red | Flame Combustor 7 |
| White | Start Device Off |
| White | Auxiliary Pump Off |
| Red | Field Breaker 41 |
| Red | Bleed Valve Closed |
| Yellow | Synchronous Speed |
| Red | Generator Breaker 52G |

Some of the startup sequence lights are pushbuttons which can be depressed before or during a startup to cause the startup sequence to hold at the process point represented by the pushbutton. A HOLD pushbutton causes the speed reference to stop advancing during acceleration, and it is automatically cleared on shutdown. The hold point pushbuttons flash when selected and, at the selected hold point, the corresponding light burns steady and the HOLD pushbutton light flashes. A hold is released by depressing the GO pushbutton which has a light normally not lit but energized during lamp test for uniformity. The HOLD POINT pushbuttons are AUX PUMP ON, TURNING GEAR ON, START DEVICE ON, OS TRIP PRESS, and SYNC SPEED. Maintenance operations are facilitated with the use of the sequence lights and pushbuttons and the HOLD and GO pushbuttons. The operator's panel 120 also provides for selection of local control or remote control by the associated pushbutton. A DEMAND REVIEW pushbutton provides for printout of current alarm conditions.

One operating advantage associated with the operator's panel 120 and its interaction with other elements of the control system 300 is that selected analog and CCI points can be read and selected CCO points can be operated in conjunction with plant maintenance operations. Among other advantages, control system potentiometers and other adjustable elements can be conveniently manipulated for meter calibrations during setup procedures.

An annunciator panel to which reference was previously made in connection with FIG. 19B can be mounted on top of the operator's panel 120 on the control console. The annunciator panel can be part of an alarm system and it contains a predetermined number of lamps driven by respective contact closure outputs from the computer 304.

The vibration monitors to which reference has already been made are also mounted in the operator's control console. Similarly, flame detection monitors are mounted at the control console.

Figure 25:
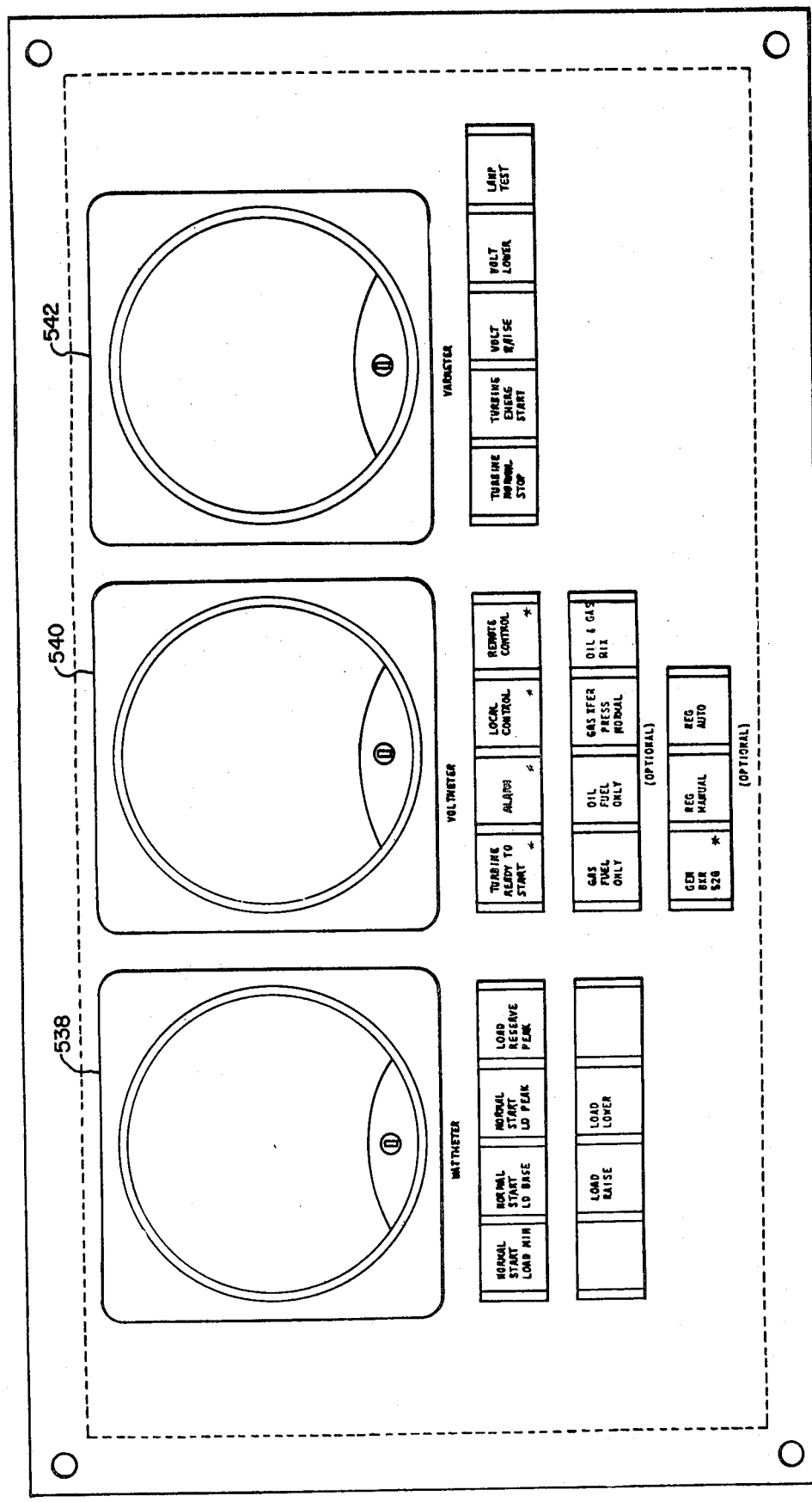

A remote control panel 536 is shown in greater detail in FIG. 25. It includes meters 538, 540 and 542 which display the indicated quantities or quantities selected at the local operator's panel in the manner previously indicated. The remote panel control pushbuttons duplicate the functions of the corresponding pushbuttons on the local operator's panel 120.

When a remote control pushbutton is depressed, a diode matrix converts the operation to an interrupt and a five bit binary code. The remote interrupt channel is provided in addition to the local operator's panel interrupt channel, and five separate contact closure inputs are provided for the remote panel 536. The lamps provided for the control pushbuttons included with the remote panel 536 are connected in parallel with corresponding lamps on the operator's panel 120. Generally, the remote panel 536 is suitable for direct wire connection up to 2500 feet from the operator's panel 120.

If supervisory control is selected, the remote control panel 536 is not used. Instead, the local supervisory contacts are coupled to the computer system 305 where a diode matrix converts them to an interrupt and a five bit code for connection to the five contact closure inputs otherwise used for remote panel operation. Seven contact closure outputs are employed to indicate the status of the local operator panel lamps otherwise connected to the remote panel.

The following listings respectively describe the local and remote operator's panel pushbutton codes, the operator's panel contact closure output assignments, and the entering of control parameter changes into the control system 300.

| LOCAL OPERATOR'S PANEL PUSHBUTTON CODES | | | |
|---|---|---|---|
| Octal Code | Matrix Terminal | Switch Iden. | Pushbutton Description |
| 00 | — | — | — |
| 01 | 1-1 | S-100 | Fld. Bkr. Trip |
| 02 | 1-2 | S-101 | Fld. Bkr. Close |
| 03 | 1-3 | S-103 | Gen. Bkr. Trip |
| 04 | 1-4 | S-104 | Gen. Bkr. Close |
| 05 | 1-5 | S-106 | Load Raise |
| 06 | 1-6 | S-107 | Load Lower |
| 07 | 1-7 | S-110 | Min. Load Norm. Start |
| 10 | 1-8 | S-111 | Base Load Norm. Start |
| 11 | 1-9 | S-112 | Peak Load Norm. Start |
| 12 | 1-10 | S-102 | Sync. Off (Gen) |
| 13 | 1-11 | S-105 | Sync. On (Gen.) |
| 14 | 1-12 | S-116 | Reg. Man. |
| 15 | 1-13 | S-117 | Reg. Auto. |
| 16 | 1-14 | S-113 | System Reserve |
| 17 | 1-15 | S-114 | Volts Raise |
| 20 | 1-16 | S-115 | Volts Lower |
| 21 | 1-17 | S-130 | Select Indicator |
| 22 | 1-18 | S-131 | Hold |
| 23 | 1-19 | S-120 | Sync. Off (Line) |
| 24 | 1-20 | S-123 | Sync. On (Line) |
| 25 | 1-21 | S-121 | Line Bkr. Trip |
| 26 | 1-22 | S-122 | Line Bkr. Close |
| 27 | 1-23 | S-165 | Turning Gear (Hold 2) |
| 30 | 1-24 | S-163 | Aux. Pump on (Hold 1) |
| 31 | 1-25 | S-167 | Start Device on (Hold 3) |
| 32 | 1-26 | S-171 | O.S. Trip Pres. (Hold 4) |
| 33 | 1-27 | S-154 | Local Control |
| 34 | 1-28 | S-155 | Remote Control |
| 35 | 1-29 | S-133 | Go |
| 36 | 1-30 | S-202 | Sync. Speed (Hold 5) |
| 37 | — | — | — |
| 40 | — | — | — |
| 41 | 2-1 | S-124 | Auto. Sync. |
| 42 | 2-2 | S-125 | Man. Sync. |
| 43 | 2-3 | S-134 | Turbine Emerg. Stop |
| 44 | 2-4 | S-135 | Turbine Normal Stop |
| 45 | 2-5 | S-136 | Spare |
| 46 | 2-6 | | Spare |
| 47 | 2-7 | S-132 | Select Device |
| 50 | 2-8 | S-150 | Gas Fuel Only |
| 51 | 2-9 | S-151 | Oil Fuel Only |
| 52 | 2-10 | S-153 | Oil and Gas Mix |
| 53 | 2-11 | S-152 | Gas Pressure Low Pres. Transfer |
| 54 | 2-12 | S-140 | Turbine Emerg. Start |
| 55 | 2-13 | S-157 | Demand Review |
| 56 | 2-14 | S-145 | Horn Silence |
| 57 | 2-15 | S-146 | Alarm Reset |
| 60 | 2-16 | S-147 | Lamp Test |
| 61 | 2-17 | | |
| 62 | 2-18 | | |
| 63 | 2-19 | | |
| 64 | 2-20 | — | |
| 65 | 2-21 | — | |
| 66 | 2-22 | — | |
| 67 | 2-23 | — | |
| 70 | 2-24 | — | |
| 71 | 2-25 | — | |
| 72 | 2-26 | — | |
| 73 | 2-27 | — | |
| 74 | 2-28 | — | |
| 75 | 2-29 | — | |
| 76 | 2-30 | — | |
| 77 | — | — | |

Prototype - channel $20_8$ bits 5-0 Interrupt Location $22_8$

| 13 | 10 | 9 | 6 | 5 | 0 |
|---|---|---|---|---|---|
| Thumbwheel Tens | | Thumbwheel Units | | P.B. Matrix | |

| REMOTE OPERATOR'S PANEL PUSHBUTTON CODES | | | |
|---|---|---|---|
| Octal Code | Matrix Terminal | Switch Identification | Pushbutton Description |
| 00 | — | — | |
| 01 | 1 | S-1 | Minimum Load Normal Start |

-continued

| | | | |
|---|---|---|---|
| 02 | 2 | S-2 | Base Load Normal Start |
| 03 | 3 | — | — |
| 04 | 4 | S-4 | System Reserve |
| 05 | 5 | — | — |
| 06 | 6 | — | — |
| 07 | 7 | S-5 | Spare |
| 10 | 8 | S-6 | Load Raise |
| 11 | 9 | — | — |
| 12 | 10 | — | — |
| 13 | 11 | S-15 | Volt Raise |
| 14 | 12 | — | — |
| 15 | 13 | S-17 | Lamp Test |
| 16 | 14 | — | — |
| 17 | 15 | — | — |
| 20 | 16 | — | — |
| 21 | 17 | S-18 | Gas Fuel Only |
| 22 | 18 | S-19 | Oil Fuel Only |
| 23 | 19 | S-3 | Peak Load Normal Start |
| 24 | 20 | S-20 | Gas Fuel Low Pressure Transfer |
| 25 | 21 | S-13 | Turbine Normal Stop |
| 26 | 22 | S-14 | Turbine Emergency Start |
| 27 | 23 | S-21 | Oil and Gas Mix |
| 30 | 24 | S-22 | Generator Breaker 52G |
| 31 | 25 | S-7 | Load Lower |
| 32 | 26 | S-8 | Spare |
| 33 | 27 | S-23 | Regulator Manual |
| 34 | 28 | S-16 | Volt Lower |
| 35 | 29 | S-24 | Regulator Auto |
| 36 | 30 | S-25 | VM |
| 37 | — | | |

OPERATOR'S PANEL CCO ASSIGNMENT

| Prototype Word | Lamp Bit | Iden.** | Description of Indication |
|---|---|---|---|
| 01 | 00 | (S-100), S-101, S-200 | Fld. Bkr. Position |
| ↓ | 01 | (S-103), S-104, S-203 | Gen. Bkr. Position |
| ↓ | 02 | S-106, S-107, S-114, S-130, S-132, S-145, S-146, S-147 | — |
| ↓ | 03 | *— | KWH Counter Contact |
| ↓ | 04 | S-110 | Min. Load |
| ↓ | 05 | S-111 | Base Load |
| ↓ | 06 | S-112 | Peak Load |
| ↓ | 07 | (S-102), S-105 | Sync. Sw. - Gen. |
| ↓ | 08 | (S-116), S-117 | Reg. Auto. (Man.) |
| ↓ | 09 | S-113 | System Reserve |
| ↓ | 10 | — | — |
| ↓ | 11 | — | — |
| ↓ | 12 | — | — |
| ↓ | 13 | S-131 | Hold |
| 02 | 00 | (S-120), S-123 | Sync. Sw. - Line |
| ↓ | 01 | (S-121), S-122 | Line Bkr. Position |
| ↓ | 02 | S-160 | Turbine Aux. Reset |
| ↓ | 03 | S-161 | Turbine Trips Reset |
| ↓ | 04 | S-162 | Master Control On |
| ↓ | 05 | S-164 | TG Lube Pres. 63-4 |
| ↓ | 06 | S-165 | Turning Gear |
| ↓ | 07 | (S-163), S-177 | Aux. Pump Off |
| ↓ | 08 | (S-167), S-176 | Start Device Off |
| ↓ | 09 | S-166 | Lube Pres. 63-1 |
| ↓ | 10 | S-170 | O.S. Trip Valve |
| ↓ | 11 | S-171 | O.S. Trip. Pres. |
| ↓ | 12 | S-172 | Ignition On |
| ↓ | 13 | S-173 | Fuel On |
| 03 | 00 | (S-154), S-155 | Remote Control (Local) |
| ↓ | 01 | ( — ), S-133 | Go |
| ↓ | 02 | S-174 | Flame Comb. 6 |
| ↓ | 03 | S-175 | Flame Comb. 7 |
| ↓ | 04 | S-201 | Bleed Valve Closed |
| ↓ | 05 | S-207 | Ready to Start |
| ↓ | 06 | S-202 | Syn. Speed |
| ↓ | 07 | (S-124), S-125 | Man. Sync. (Auto) |
| ↓ | 08 | ( — ), S-142 | Alarm |
| ↓ | 09 | S-143 | Gen. Trip |
| ↓ | 10 | S-134 | Turbine Emerg. Stop |
| ↓ | 11 | S-135 | Turbine Normal Stop |
| ↓ | 12 | S-136 | Spare |
| ↓ | 13 | S-156 | Gas Xfer. Press. Normal |
| 04 | 00 | *(S-150), S-151 | (Gas Fuel Only), Oil Fuel Only |
| ↓ | 01 | *(WD03, Bit 00), S-153 | Oil Gas Mix |
| ↓ | 02 | S-152 | Gas Pres. Low Pres. Transfer |
| ↓ | 03 | *— | Horn Contact |
| ↓ | 04 | S-140 | Turb. Emerg. Start |
| ↓ | 05 | S-157 | Demand Review |
| ↓ | 06 | S-144 | Turbine Shutdown |

*NOTE:
Refer to Schemes Below:

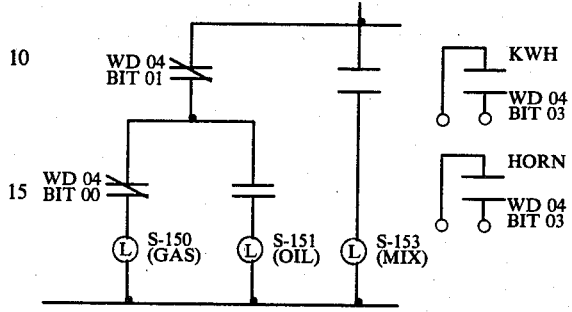

**NOTE:
Parentheses indicate N.C. contact

CONTROL PARAMETER CHANGES

1. General

Any core location in the P-50 computer can be changed through the ASR-35 typewriter. This set of instructions is an aid in selecting the proper core location and value. All locations appear in the listings for the control and sequence programs and their resident tables.

The general procedure, after having determined the proper location(s) and value(s) is as follows:

a. Preferably make changes with the turbine(s) shutdown and the "SYNC" switch on the P-50 maintenance panel turned off. If not, typing speed must be slowed so that the keys are only struck when the acknowledge lamp in the yellow attention interrupt button on the ASR set is lit. Typing too fast with "SYNC" on may result in error messages or misreading of the information.

b. Octal dump the locations to be changed and check their contents against the listings if possible to verify that the correct location has been chosen—also to know what was in core in case it must be restored.

c. Set the limits for loading as close as possible (1 location if only 1 is to be changed) to limit the effect of errors.

d. Numeric load the information taking care if "SYNC" is on, to only type when the yellow light on the ASR set is on.

e. Octal dump the locations to verify that the correct information has been entered. Note if decimal information had been loaded by preceding the value with a + or (−) sign, the octal equivalent will print out.

f. Binary punch the locations changed if the change is to be permanent and attach tape to the end of the proper computer punched paper tape.

2. Bearing, Disc Cavities, Vibration

Alarm and shutdown values are stored as octal ADC values for disc cavity temperatures and vibration values. To convert 1000° F. to ADC type:

$$EA \_+1000/1 \rangle$$

To convert 4 mils to ADC for vibration, type:

EA_+400/161↵

(The symbol represents a space and ↵ line feed and return. Typing is preceeded by attention interrupt. The ASR set will type back the ADC value, the index and the value with the correct decimal place.

The locations when these are stored are listed below. Note bearings, etc, having the same alarm or shutdown level may use a common location and changing the level for 1 may change the level for a group.

| Mnemonic | Description | Alarm Location | Shutdown Location |
|---|---|---|---|
| DC1 | Disc Cavity 1 | 15311 | 15315 |
| DC2 | Disc Cavity 2 | 15312 | 15316 |
| DC3 | Disc Cavity 3 | 15313 | 15317 |
| DC4 | Disc Cavity 4 | 15314 | 15320 |
| LT17 | Gen. Brg. Drain (Gen. End) | * | 15507 |
| LT18 | Gen. Brg. Drain (Turb End) | * | 15510 |
| LT19 | Pinion Brg. Drain (Gen. End) | * | 15511 |
| LT20 | Main Gear Drain | * | 15512 |
| LT21 | Pinion Brg. Drain | * | 15513 |
| LT22 | Comp. Journal Brg. (Babbitt) | * | 15514 |
| LT23 | Thrust Bearing Shoe (Babbitt) | * | 15515 |
| LT235 | Thrust Bearing Shoe (Babbitt) Spare | * | 15516 |
| LT24 | Turb. Brg. (Babbitt) | * | 15517 |
| LT25 | Gen. Brg. Drain (Turb. End) (In Board) | * | 15520 |
| LT26 | Gen. Brg. Drain (Exc. End) | * | 15521 |
| LT36= LT33 | Gear Support Metal Temp. Diff. | Shutdown only | 17275 |
| 39V1 | Exc. Vib.-Starting | 14307 | 14270 |
| 39V2 | Gen Vib.-Exec. End-Starting | 14307 | 14270 |
| 39V3 | Gen Vib.-Comp. End-Starting | 14307 | 14771 |
| 39V4 | Comp. Vib.-Starting | 14307 | 14771 |
| 39V1 | Exec. Vib.-Running | 14304 | 14271 |
| 39V2 | Gen. Vib.-Exec. End-Running | 14304 | 14271 |
| 39V3 | Gen. Vib.-Comp. End-Running | 14304 | 14775 |
| 39V4 | Comp. Vib.-Running | 14304 | 14775 |

* Alarms . . . a nominal 6° Delta before shutdown. This delta value is stored in location 17647.

3. Generator Resistance Temperature Detectors

All 6 generator RTD readings may be displayed on the operator's console but only 1, RTD1, is checked for exceeding the alarm temperature limit. After operating experience has been gained the hottest RTD should be connected to the #1 RTD bridge. This is the one connected to terminals J15 and J16 on half shell 0051 for turbine A and half shell 0111 for turbine B.

| Mnemonic | Description | Alarm Location |
|---|---|---|
| RTD1 | Generator RTD 1 | 17635 |

The octal ADC value for a temperature level in ° F. may be found by typing (for 221° F. or 105° C.):

EA_+2210/63↵

4. Deadbands

Several functions use deadbands for operation or alarm and shutdown. To convert engineering units to the proper ADC units use the ASR set as in the following samples and enter the octal ADC values as desired in the locations listed below.

1. Percent Speed (70%)    EA_+700/273↵
2. Combustor Shell Pressure (68 PSIG)    EA_+680/327↵
3. Thermocouple Temperature (180° F.)    EA_+180/1↵

| Input to Deadband | Function | High Location | Low Location |
|---|---|---|---|
| LT29 | Low oil cooler fan | 13734 | 13732 |
| LT29 | High oil cooler fan | 13731 | 13727 |
| LT33 | High oil cooler fan | 13726 | 13723 |
| LT29 | Turning gear permissive | 13366 | 13363 |
| 14M | Starting device permissive | 13356 | 13354 |
| COMBR | Bleed Valve 1 operation | 13711 | 13706 |
| COMBR | Bleed Valve 2 operation | 13711 | 13706 |
| LT29 | 52G Close permissive | 14347 | 14344 |
| LT29 | Alarm and shutdown | 17310 | 17305 |
| LT28 | Start permissive | 14730 | 14725 |
| LT35 | Fuel Pump Inlet | 17272 | 17267 |

5. Second Time Delays

Each second timer has 2 locations it uses. Both should be set to the new number, preferably when the turbine is not being fired. The decimal number to be numeric loaded is 5/6 of the number of seconds time delay desired rounded to the nearest integer. Thus to get a 300 second time delay, the number to be entered is 5/6×300 or +250. Note that the + sign must be used for the number to be interpreted as a decimal number. Limits for loading must be set first and a typical entry using the ASR set is shown here:

```
LM_10025/10026↵
NL_↵
= 10025↵
+ 250↵
+ 250↵
)
```

Note the closed parenthesis is the termination character for a numeric load. The timers are listed in the sequence program resident tables but are repeated below for convenience. Note that when the values are octal dumped, the octal equivalent of the decimal will be typed. Maximum delay is 9828 seconds. Independent locations are furnished for each turbine.

| Timer | Description | Turb. A Locations | Turb. B Locations |
|---|---|---|---|
| STD0 | Seq. check 1 (ignition) | 10015-16 | 10145-46 |
| STD1 | Ignition | 10017-20 | 10147-50 |
| STD2 | Purge | 10021-22 | 10151-53 |
| STD3 | Seq check3(Flame verification) | 10023-24 | 10153-54 |
| STD4 | Seq. check 4(Motor Trip to idle) | 10025-26 | 10155-56 |
| STD5 | Turning Gear | 10027-30 | 10157-60 |
| STD6 | Vibration shutdown | 10031-32 | 10161-62 |
| STD7 | Spare | 10033-34 | 10163-64 |
| STD8 | Seq check 2 (O.S.T.Press) | 10035-36 | 10165-66 |
| STD9 | OPX | 10037-40 | 10167-70 |
| STD10 | Atomizing air | 10041-42 | 10171-72 |
| STD11 | 639 DS | 10043-44 | 10173-74 |
| STD12 | L636 Prestart | 10045-46 | 10175-76 |
| STD13 | Volt. adj. rheostat prestart | 10047-50 | 10177-200 |

-continued

| Timer | Description | Turb. A Locations | Turb. B Locations |
|---|---|---|---|
| STD14 | AC & DC Transfer Pump Motor Control | 10051-52 | 10201-02 |
| STD15 | AC & DC Transfer Pump Motor Control | 10053-54 | 10203-04 |
| STD16 | AC & DC Transfer Pump Motor Control | 10055-56 | 10205-06 |
| STD17 | Fuel Oil under pressure | 10106-07 | 10236-37 |

6. Hour Time Delays

The hour time delays are set similar to the second time delays but have 3 locations associated with each. The first location should be initialized to +3000 while the other 2 should be loaded with the time in hours minus 1 as a decimal number. Maximum delay is 8192 hours. Below are the locations:

| Timer | Description | Turbine A Locations | Turb. B Locations |
|---|---|---|---|
| HTD0 | Auto Start | 10004-06 | 10134-36 |
| HTD1 | Cooling period | 10007-11 | 10137-41 |
| HTD2 | Shutdown | 10012-14 | 10142-44 |

7. Curves

Individual curves for each trubine appear in the control resident table. Each curve is stored as 5 sets of coordinates. The 5 values of the independent variable are stored first and must be in ascending order. Next come the 5 associated values of the dependent variable. Thus the curves are approximated by 4 straight lines defined by 5 points. The lines are extrapolated beyond the end points of the curve. However, the control signal output, CSO is limited to 0–5 V, and this feature may be used to gain another line segment at 0 CSO in the surge curve at light off.

Except for the acceleration curves, the parameters are stored as octal ADC/2. Sample "EA" conversions from engineering units to ADC/2 are shown here:

| | |
|---|---|
| 1. Pressure (112PSG) | EA ⌐+ 1120/327/2 ↓ |
| 2. Temperature (1000° F.) | EA ⌐+ 1000/1/2 ↓ |
| 3. CSO (1 Volt) | EA  + 100/323/2 ↓ |

In the case of the acceleration curves, speed is the independent variable and acceleration is the dependent variable. At intermediate speed points the acceleration is interpolated giving a smoother curve and allowing easier matching at ignition and transfer from normal to emergency acceleration and back during acceleration. The decimal value stored for speed is the speed in RPM while the decimal value stored for acceleration is 38.4 times the acceleration in RPM/sec.

As an aid in selecting values of speed for which the acceleration is to be stored it is suggested that ignition speed and synchronous speed be selected. At ignition speed, the acceleration must be somewhat greater than that expected at ignition with minimum pump pressure or speed control may tend to reduce the pump pressure until a flameout occurs. Another desirable point is at a point of inflection where acceleration stops decreasing and begins increasing. If there is a long linear region with constant acceleration, it is probably best to choose a point at each end of the linear region.

A cut and try method may be used where tangents are drawn to the acceleration curve (speed (w) vs. time (t)) at the selected speed points. With the turbine at rest or on turning gear, the curve can be checked by changing the control program to jump to mode 1 instead of mode 0 and recording the speed reference (test point 11) on a strip chart recorder. Restoring the control program will bring the speed reference back down to track 1½% above the turbine speed. The acceleration values may be modified and the resulting curve checked on the recorder until the desired starting curve is attained.

Another method is offered which predicts the necessary acceleration values more accurately. If the acceleration ($\alpha_1$) is known at one end of a curve segment, the necessary acceleration ($\alpha_2$) at the other end of the segment may be calculated knowing the desired change in speed ($\Delta\omega$) for the desired time increment ($\Delta t$). This calculated value may then be used to determine the acceleration needed at the other end of the next curve segment, etc. until all acceleration coordinates have been determined. Since acceleration at ignition is critical, it is best to start at this end of the curve.

In FIG. 1, the slope or acceleration at point 1 is $\alpha_1$, expressed as RPM/sec, and at point 2 it is $\alpha_2$. The following relationship applies:

$$\frac{\ln(\alpha_2/\alpha_1)}{(\alpha_2/\alpha_1) - 1} = \frac{\alpha_1 \Delta t}{\Delta\omega}$$

The accompanying curve (FIG. 1) may be used to determine the ratio $\alpha_2/\alpha_1$ knowning $\alpha_1\Delta t/\Delta\omega$. Knowing $\alpha_1$ and $\alpha_2/\alpha_1 3\alpha_2$ may be easily found. This $\alpha_2$ becomes $\alpha_1$ for the next segment etc. until all 5 acceleration values are determined for storage. The curve should be checked on a strip chart recorder as described previously. Note the speed ref. amplifier is limited to about 36 rpm/sec.

The surge function is really a 2 input parameter function. Two curves are stored, 1 for a low compressor inlet temperature (−40° F.) and 1 for a high temperature (+120° F.). The ADC/2 values for these 2 temperatures are stored at the 1st 2 locations followed by 2 sets of curve coordinates corresponding to these 2 temperatures. Each curve is evaluated for the given combustor shell pressure and then the final value is determined by interpolating between these two points as a function of compressor inlet temperature.

The following table is given to assist in locating the curve in the control resident tables.

| MNEMONIC | TURBINE A 1st LOCATION | TURBINE B 1st LOCATION | DESCRIPTION |
|---|---|---|---|
| EMGACC | 33426 | 33676 | Emergency Acceleration (option) |
| NRMACC | 33307 | 33357 | Normal Acceleration |
| NORMST | 33323 | 33573 | Normal Start Temperature |
| BASELD | 33335 | 33605 | Base Load Temperature |
| PEAKLD | 33347 | 33617 | Peak Load Temperature |
| SYSRLD | 33361 | 33631 | System Reserve Load Temperature |
| SURGFN | 33373 | 33643 | Surge Curves |

-continued

Miscellaneous Control Locations

| MNEMONIC | TURBINE A LOCATION | TURBINE B LOCATION | DESCRIPTION | UNITS |
|---|---|---|---|---|
| SPLMIT | 33267 | 33537 | Max. speed after acceleration + RPM | |
| PATTERN | 33247 | 33517 | Loading Rate Pattern | |
| DIFERR | 33272 | 33542 | Differential Temp. Error Limit | ADC/2 |
| MAX BPT | 33273 | 33543 | Maximum Blade Path Temp. | ADC/4 |
| MAX EXT | 33274 | 33544 | Maximum Exhaust Path Temp. | ADC/4 |

Auto Synch.

| LOCATION | DESCRIPTION |
|---|---|
| 6723 | Gen Bkr Closing Time |
| — | Line Bkr Closing Time |

D. PROGRAM SYSTEM

1. General Configuration

Figure 26:
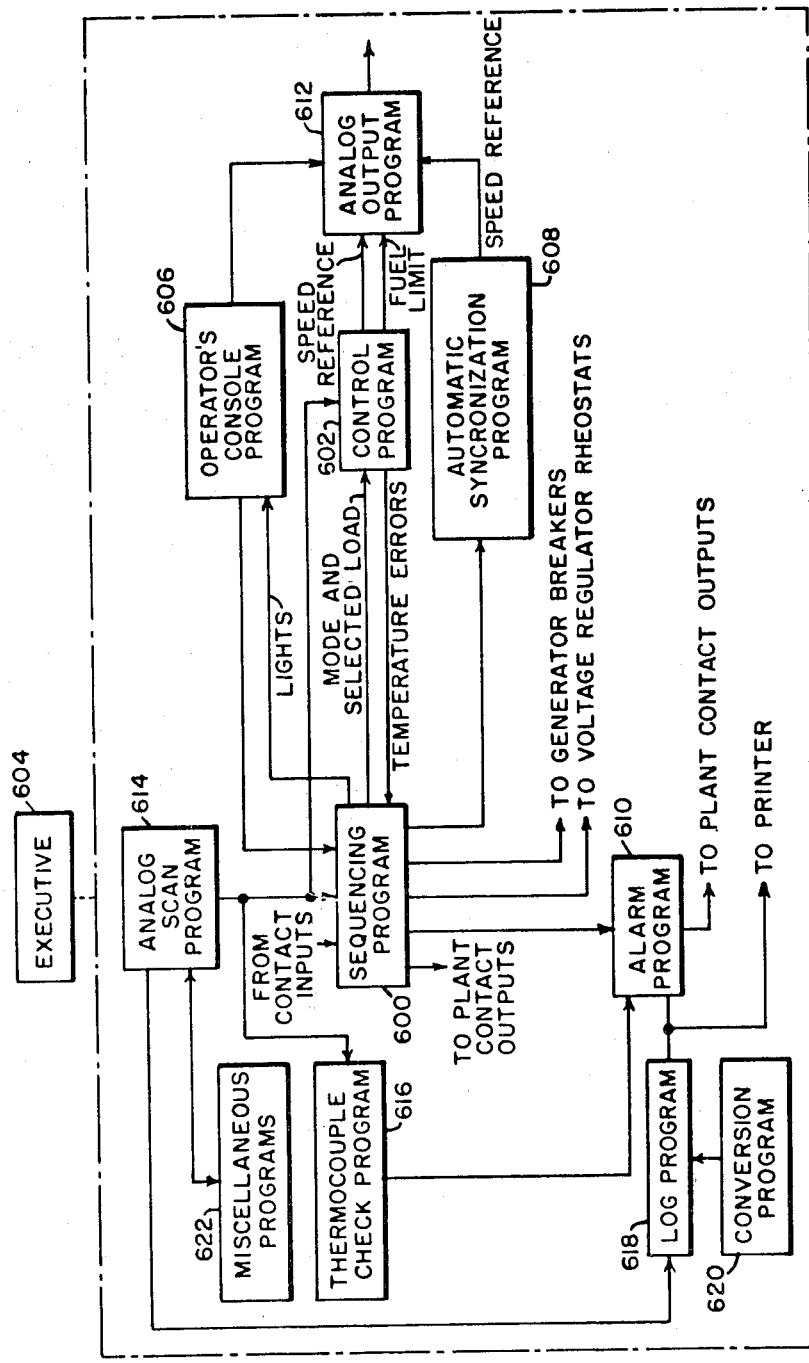
FIG. 26 shows a general block diagram of the organization of a program system employed in the control system computer.

The computer program system is organized to operate the computer system 305 so that it interacts with other control system elements and plant devices to operate the gas turbine plant 100 and other similar plants as required to produce electric power with many user advantages. As schematically illustrated in FIG. 26, the program system comprises a sequencing program 600 and a control program 602 which make most of the plant operational determinations for output to the control system interfacing and control hardware. An executive program 604 schedules the use of the computer 304 by the various programs in the software system in accordance with a predetermined priority structure. The executive program 604 also provides certain other functions considered more fully subsequently.

Generally, the sequencing program 600 accepts contact closure inputs, analog inputs, and operator console inputs from an operator console program 606 to provide through contact closure outputs plant startup and other functions including alarm and houskeeping tasks prior to, during and after startup. As indicated in FIG. 26, the sequencing program 600 supervises the control program 602 by specifying the control mode and the selected load. The control program 602 transmits data to the sequencing load. The control program 602 transmits data to the sequencing program 600 including for example hot blade path temperature indications during load operation which require plant alarm and shutdown.

An automatic synchronization program 608 is also supervised by the sequencing program 600 to provide for generator voltage regulator rheostat operation and turbine speed adjustment during automatic synchronization. The sequencing program 600 processes manual synchronization operation. It also transmits lamp light determinations to the operator's console program 606 and alarm determinations to an alarm program 610.

The operator's console program 606 is a package of subprograms which provides for interfacing the operator's panel 120 with the computer 304. The alarm program 610 provides for printout of detected alarms.

During the various modes of plant operation, the control program 602 makes intermediate control determinations which result in the determination of a turbine speed reference representation and a fuel demand limit representation for application as analog signals to the analog speed control 324 as previously described. Analog outputs from the control program 602, the automatic synchronization program 608 and the operator's console program 606 are processed by an analog output pulser program 612 to provide for generation of accurate external analog voltages corresponding to the internal digital determinations. Analog inputs for the sequencing program 600 and the control program 602 and other programs are determined and stored by an analog scan executive program 614.

A thermocouple check program 616 makes a validity check on the thermocouples not checked by the sequency program 600 or the control program 602 and generates an alarm for alarm program printout when a thermocouple reading indicates an open circuit. A log program 618 operates in conjunction with a conversion program 620 to generate a periodic printout of the values of predetermined analog inputs. Other programs included in the program system are classified as miscellaneous programs 622.

2. Executive Systems

Generally, the executive program 604 provides for the execution of other programs on a priority basis, facilitates communication between the input and output equipment and other programs in the program system, and standardizes the handling of interrupts from the interrupt system 314. In the particular case of the P50 computer system, the executive program is a commercially available package which is operable in a wide range of applications. For a particular application like that present one, the executive program is initialized or tailored to the particular application by the entry of certain system parameters. Since the executive program is per se a part of the prior art, its functioning will be considered here only insofar as it will aid in reaching an understanding of the program system and the control system and power plant operations of the preferred embodiment.

In the program system, the individual programs are repeatedly executed, typically with only the program variables changed. The executive priority system accordingly defines the order in which programs are executed since some programs must be executed as soon as data is available while other programs are of lesser importance. In the P50 executive priority structure, a dominant priority level and a secondary priority level are provided. Each of the main priority levels in turn is divided into a number of sublevels. Generally, higher numbers imply higher sublevel priority.

The priority executive program administers the priority scheme outside the priority structure. On the dominant level, programs are executed according to real time, i.e. a program which is first bid is executed first if two programs are bidding to run simultaneously. On the secondary level, the programs are executed according to a preestablished order. Any time two programs are bidding to run the program on the highest sublevel is executed first. On both main priority levels, the programs run to completion before another program can be started on that level.

Dominant level programs can be initiated periodically through an auxiliary synchronizer routine, or they may be initiated by interrupt, or they may be initiated by an error condition detected by a program execution on a sublevel of the secondary level. The secondary lower priority level runs when the dominant level is not running. The secondary level in this case contains 14 sublevels which run according to a calling priority established when the executive program 604 is initialized. A sublevel program may be bitting to run, running, in time delay, suspended, or turned off. Once a sublevel is initiated, it cannot be interrupted by a sublevel with higher priority on the secondary level. When a sublevel program turns off, is suspended or enters a time delay, the sublevel program with the highest calling priority which is bidding will run. Generally, the majority of the programs in the gas turbine power plant program system are assigned to the secondary level.

The priority executive element of the executive program 604 comprises the following executive programs:

1. Bid Executive for the Dominant Level—This program permits a program or an interrupt routine to place a dominant sublevel into the bidding state; a program on the dominant level cannot bid for another program on the dominant level.

2. Bid Executive for the Secondary Level—This program permits a program or an interrupt routine to place a secondary sublevel into the bidding state.

3. Turn Off Program Executive for the Dominant Level.

4. Turn Off Program Executive for the Secondary Level.

5. Time Delay Executive for the Secondary Level—This program routine is available only on the secondary level and it provides for downcounting a time delay with the synchronizer interrupt routine.

6. Suspend Program Executive for the Secondary Level—This program is also only available on the secondary level and it permits a call for an indefinite time delay.

7. Unsuspend Program Executive for the Secondary Level—This program is used in conjunction with the suspend program executive.

The following table provides a definition of the priority levels employed in the program system used to operate the P50 computer system 305:

| PRIORITY LEVELS | |
|---|---|
| *Dominant Level Programs* | |
| 1. | Analog output pulsing, span adjust and scan. |
| 2. | Operator's Console A. |
| 3. | Operator's Console B. |
| 4. | Operator's Console C. |
| 5. | Operator's Console D. |
| 6. | Automatic Synchronizing A |
| 7. | Automatic Synchronizing B. |
| 8. | Automatic Synchronizing C. |
| 9. | Automatic Synchronizing D. |
| 10. | Spare |
| 11. | Spare |
| 12. | Spare |

| -continued | |
|---|---|
| PRIORITY LEVELS | |
| 13. | Spare |
| 14. | Spare |
| *Secondary Sublevel Programs* | |
| Sublevel | Description |
| 14 | Spare |
| 13 | Message Writer Device 0 |
| 12 | Operator's Console |
| 11 | Sequencer |
| 10 | Control |
| 9 | Dead Computer |
| 8 | Analog Output |
| 7 | Alarm |
| 6 | Spare |
| 5 | Logging |
| 4 | Horn and Alarm Lamp |
| 3 | Cold Junction Comp. |
| 2 | Thermocouple Check |
| 1 | Programmer's Console |
| 0 | Confidence Check Conex |

The executive program 640 also includes an input/output program which is available to control the communication of digital variables between the computer 304 and the input/output systems. In this case, only the output contacts are grouped into registers to be placed under executive program control. Requests for contact outputs are queued by the input/output executive program and control is returned to the calling program until a hardware interrupt indicates the external circuitry is ready to accept a contact output. Input contacts are random accessed in the present case. The input/output executive element of the executive program 604 further includes the following subelements:

Bidding Subroutine
Input/Output BCD Character Routines
Contact Closure Output Executive
Programmer's Console Executive
Message Writer Executive.

Generally, an interrupt is initiated by a piece of hardware external to the computer 304. An interrupt stops the current program execution unless it is locked out or temporarily inhibited. The interruption causes a branch to an interrupt routine which is identified by the interrupt and the program structure. Generally, all interrupt routines provide for saving and restoring registers so that the interrupted program can again be processed from the interrupt point. Lockout can be generated by hardware or software.

Executive interrupts initiate programs which are executed under hardware interrupt lockout. Process interrupts initiate programs which are executed under software lockout on the dominant level.

The following executive interrupt routines are included in the executive program 604:

Synchronizer Interrupt
Contact Closure Output Completion Interrupt
Programmer's Console Attention Interrupt
Programmer's Console Input Interrupt
Programmer's Console Output Interrupt
Device Output Completion Interrupt The executive program 604 also includes a multiply/divide program. The multiply routine develops a 28 bit product from two 14-bit factors and the divide routine produces a 14 bit quotient from a 28 bit dividend and a 14 bit divisor. A binary to BCD conversion program is also included in the executive program 604 to convert binary numbers to decimal numbers which are placed in designated storage locations.

3. Programmer's Console Package

The programmer's console programs are provided to facilitate communication with the P50 computer. Generally, the console package provides a means for loading programs into the computer, executing programs, loading constants or instructions and dumping areas of main and extended core memory. Core locations can be dumped in binary or tape or in octal or a keyboard.

As already indicated, the programmer's console package operates within the priority structure of the executive program 604 and its elements are generally classified as a part of that program. After the programmer's console package has been bid by depressing a programmer's console interrupt button, the keyboard set is turned on and an input is requested. An input consists of a two letter mnemonic followed either by a space and up to four constants or by a return. If more than two letters precede the space or the return, only the last two letters are considered by the computer. The resulting two letter mnemonic is compared to the defines mnemonics and if no mnemonic is found in correspondence to the entered mnemonic and error is printed.

If the entered two letter mnemonic is equal to a stored mnemonic, a transfer to the proper program is made and if a space followed the mnemonic code any constants preceding the return will be input. The number of constants depends on the function being initiated. Constants may be entered in octal or decimal and a plus or minus sign preceding a constant specifies it to be a decimal number while unsigned integers are treated as being octal. Constants are terminated by a slash or by a return.

If the correction character left parenthesis "(" is encountered, all digits following the last slash or the space are ignored. If more than four constants are entered before a return, an error is printed and the programmer's console package turns the keyboard set off. If the number of constants entered is different from that required by the function being initiated, an error is printed and the keyboard set is turned off.

When a return is input to the programmer's console package, a transfer is made to the particular console program requested with the constants stored in the order in which they were input. When the programmer's console program completes the requested activity further constants are entered in the same manner as the initial constants if they are required.

The programmer's console package in the executive program includes the following programs:

1. Binary Load—Provides for loading a binary program tape through the programmer's console tape reader into main core.
2. Binary Punch—Causes the programmer's console punch to punch in binary a core area or core location, a transfer code or a stop code depending upon the number of input constants.
3. Check Tape—Provides for comparing a binary program tape with the main core contents on a word-by-word basis.
4. Numeric Load—Provides for making numeric entries into main memory.
5. Octal Dump—Provides for printing the contents of a core area of location in octal.
6. Run On Machine.
7. Set Limits—Provides for entry of alarm limits and the like.
8. Update Time—Provides for setting hours, minutes and seconds into the computer.

In addition, the programmer's console package includes an analog value to engineering units conversion program considered subsequently in connection with the log program.

4. Operator's Console Program

Figure 28:
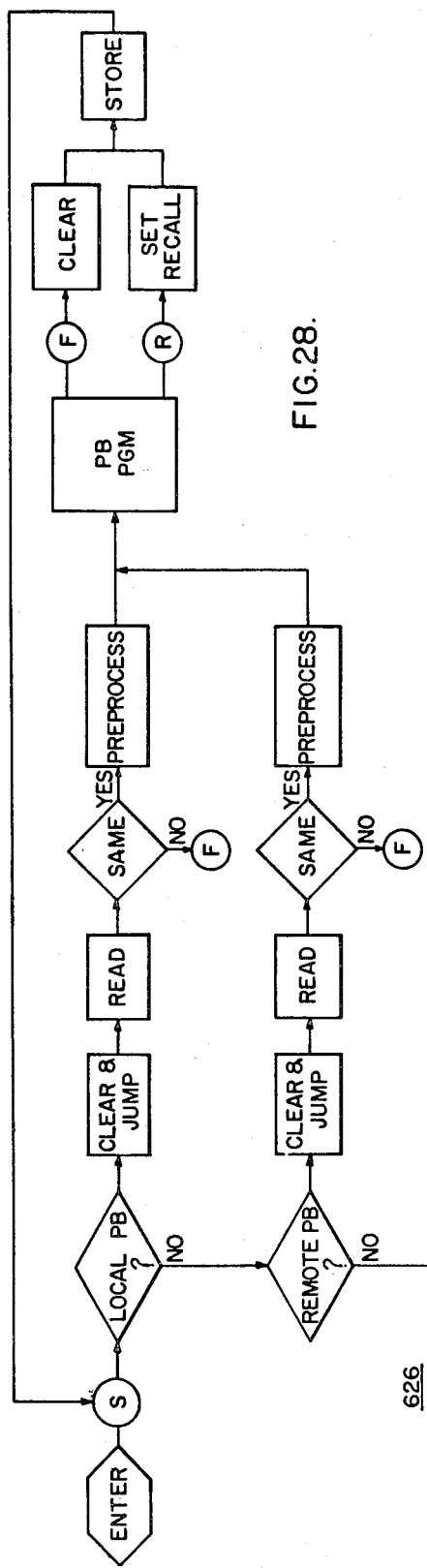
FIGS. 27 and 28 show respective flowcharts representative of operations associated with the operator's panel.
Figure 27:
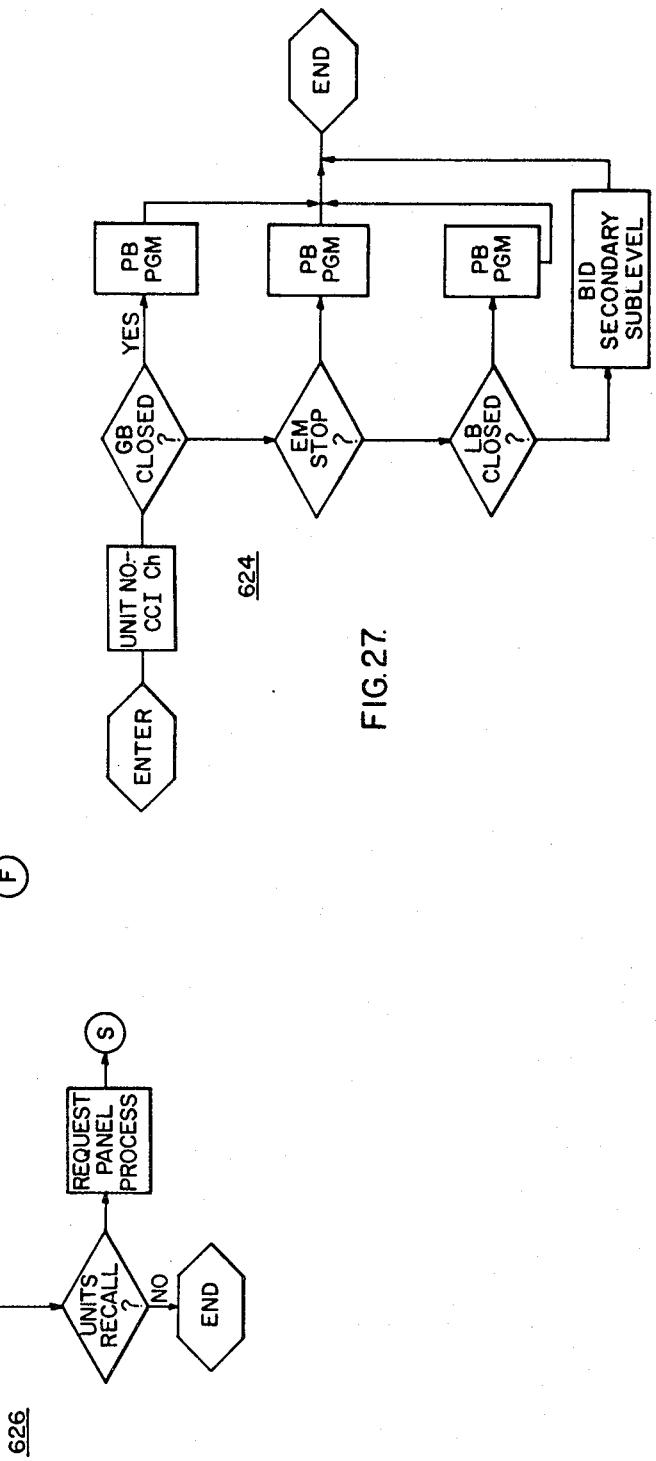

Flowcharts for the operator's console program are shown in FIGS. 27 and 28. Generally, a depressed local operator's pushbutton causes a unique six bit code and a panel interrupt. The interrupt routine bids a dominant level operator's console program represented by flowchart 624 in FIG. 27. A similar flowchart (not shown) applies for the remote direct wire control panel or for supervisory control.

The dominant level operator's console program first identifies the gas turbine or plant number and stores the contact closure input channel number for the local operator's panel associated with the identified turbine. The contact closure input channel includes six bits for the pushbutton code and eight bits for the thumbwheel switch input.

Determinations are then made as to whether generator breaker closing, line breaker closing or emergency shutdown has been requested. If so, immediate processing of the requested pushbutton control program is initiated. If not, a flag corresponding to the associated turbine is set in the secondary sublevel program and it is put into the bidding state.

The operator's console secondary sublevel program is represented by flowchart 626 in FIG. 28. When the secondary sublevel program is executed, a check is made of the local panel flags under lockout to determine whether any require processing. If a local panel flag has been set, that flag is cleared, a turbine identifying number is registered, lockout is cleared and a jump is made to a local operator's read program. The associated contact closure input is again read and compared with the previous input and if it is the same a preprocessor block is caused to pick up needed logical variables and a jump is made to the individual pushbutton program required by the panel pushbutton operation. Generally, the pushbutton programs are associated with other program blocks in the program system such as the sequencing program 600 or the control program 602. If no local panel flags have been set, an examination is made of the remote panel flags and if a remote panel flag has been set action similar to that just described for the local pushbutton flag is initiated for the remote panel flag.

Generally, the pushbuttons cause bits to be set in three words for each turbine in resident tables considered subsequently in connection with the sequence program 600. Some pushbuttons, such as the LOCAL and REMOTE pushbuttons have flip-flop action and the associated pushbutton programs accordingly run once and go to a final exit junction F. Other pushbuttons cause a bit set only as long as the pushbutton is depressed so that after the pushbutton program is run, it exits through a recall junction R. The F exit causes all bits in the operator's console bit table to be cleared except the flip-flop bits and then causes a jump to a program called STORE which post-processes and transfers the operator's console bit table to the turbine resident tables used by the sequencing program 600. Lockout is then set and a jump is made to the beginning S of the operator's console secondary sublevel program to determine whether any other panel inputs need to be processed. The R exit causes a recall flag to be set and a jump to be made to the store program.

After all operator panel inputs have been processed, an examination is made of the recall flags for each panel. If one of the recall flags is set, it is cleared, a common recall flag is decremented and a flag is set requesting the associated panel to be processed.

After all panel recall flags have been examined, the common recall flag is checked. If any operator panel inputs need to be reprocessed after a short time delay, the common recall flag is not zero. In such case, the common recall flag is reset to zero and the program is put into time delay after which the secondary sublevel program is restarted at junction S. When the common recall flag is set at zero, the sublevel program is turned off.

It is noteworthy that the SELECT INDICATOR and SELECT DEVICE pushbuttons are associated with programs used to load addresses into a table in the analog output program 612 to indicate from an analog input table associated with the analog scan program 614 those values which are to be displayed on the various operator's panel instruments. The analog output program 612 is subsequently considered more fully.

est time period are read within that period, and an appropriate fraction of other groups of analog points that must be read within longer periods are also read within the shortest time period. For example, slightly more than one-fifth of all inputs that require reading within a five second period are read during the same base period of one second.

The analog input system 308 (FIG. 12) includes a digital to analog converter and a multiplexer circuit. After each converter cycle, an interrupt starts the execution of the analog scan program 614. All points set up during the last converter cycle are read and the multiplexer is set for the next group of points as soon as possible after the interrupt has been received. At the last input command, the converter cycle is reinitiated and the necessary housekeeping and address modifying functions are performed to set up the input and output commands for the next converter interrupt.

Figure 29:
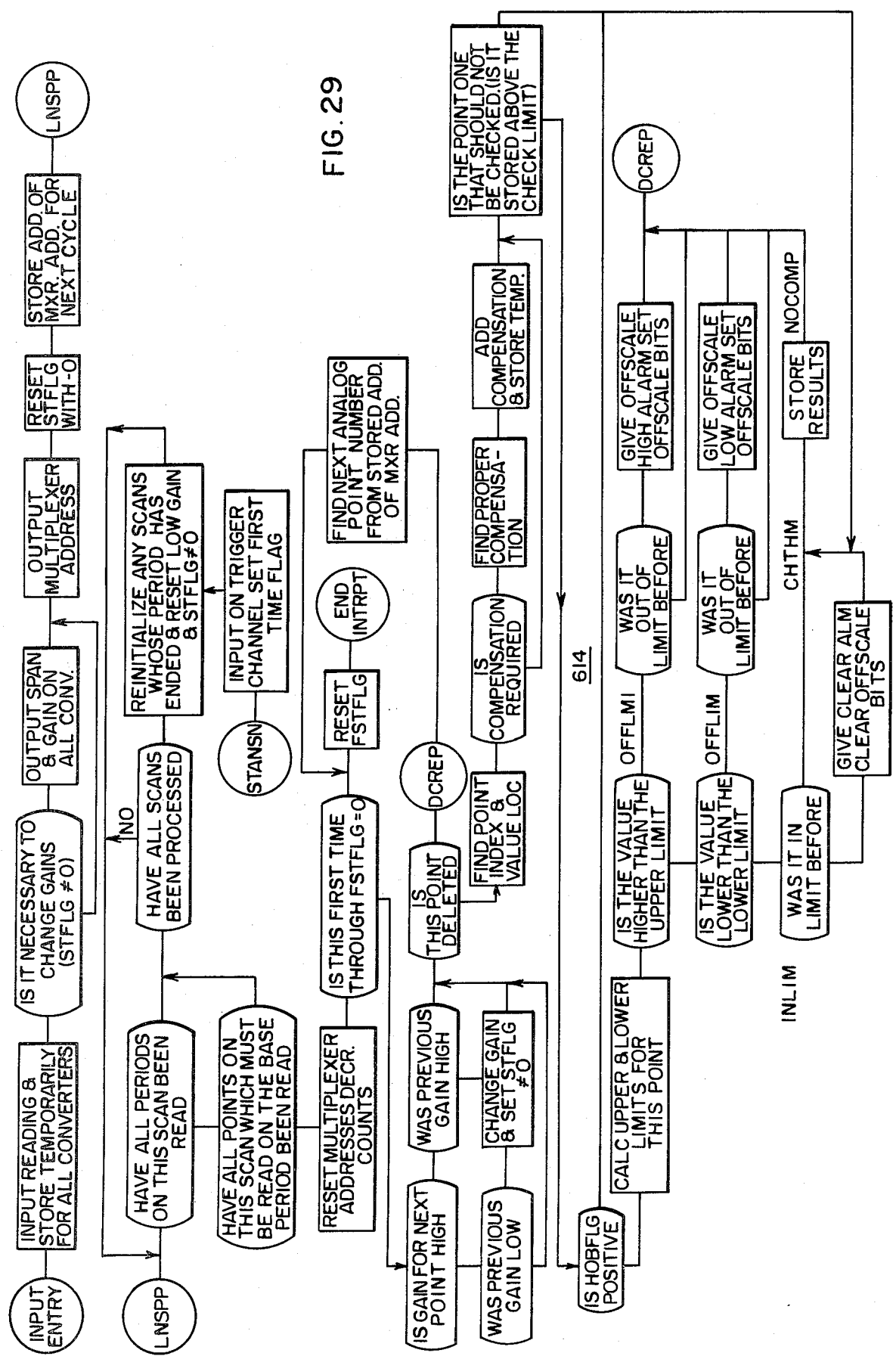
FIG. 29 shows a flowchart representative of an analog scan program associated with the computer for the acquisition of analog data from the gas power plant.

For thermocouples, cold junction correction is added by the analog scan program before the value is stored in core. Thermocouple data processing is otherwise executed by the check program 616 or the control program. A flowchart representation of the analog scan program 614 is shown in FIG. 29. The following is a list showing the tables and words employed by the analog scan program 614:

---

TABLE AND WORD DEFINITIONS

1. A table of multiplexer addresses (MXRTBL), ordered according to scan frequencies (See FIG. 10-18). If there are N converters, the addresses are ordered in groups of N with one point from each converter in each group, and ordered within the group as converter 1, converter 2, and converter N. The multiplex address word is made up as follows:

| Bit | Meaning |
|---|---|
| 13 | Indicates which set of offscale limits to use. |
| 12 | Indicates gain setting to be used: a 1 indicates 5V scale, a 0 indicates 50 mV scale. |
| 11–6 | Contain the multiplexer word to be output. |
| 5–2 | Contain the number of the accumulator bit to be set (0–$13_{10}$). |
| 1–0 | Indicate the multiplexer output channel to be used: 00 for channel 57, 01 for channel 37, 10 for channel 17, 11 for channel 77. |

In a group, bits 5–0 of a multiplexer address word must be the same for all converters - that is, the number of the bit to be output and the output channel must be the same.

2. A word (NOSCAN) indicating the number of scan periods plus 1.
3. A table (ANLTBL) of the number of points on each scan yet to be processed.
4. A table (NPSPCT) of the number of points to be read on the basic period for each scan period.
5. A table (BLOCKF) giving the beginning address of the multiplexer words for each scan.
6. A table of processing words (PCW1TB, Processing Word 1) (see below) which contains indices indicating the location of the value for each point. If the value read is within instrument limits, it is stored in the value location. If the value is outside instrument limits, the previous value is left in the value location. This table is ordered the same as the multiplexer address table and is made up as follows:

TABLE 10-2 - DATA WORD FORMATS FOR ANALOG SCAN (P50-SP12B-2)

| Bit | Meaning |
|---|---|
| 13 | Indicates operator delete for this point. The value will not be updated as long as this bit is a 1. |
| 12–10 | Indicate thermocouples and cold junctions used or flow compensation required. |
| 9–0 | Indicate the index for storing the value in the value table. |

---

5. Analog Scan Program

Generally, the analog scan program provides an executive function in reading all analog points associated with the power plant 100 and any similar plant units. The frequency at which the analog points are read is determined by the needs of the process operation, and in this instance it is set at 30 points per second. The analog scan program can be executed under hardware or software interrupt lockout.

The analog scan program 614 is arranged such that all points which require reading within a predefined short-

6. Analog Output Program

Figure 30A:
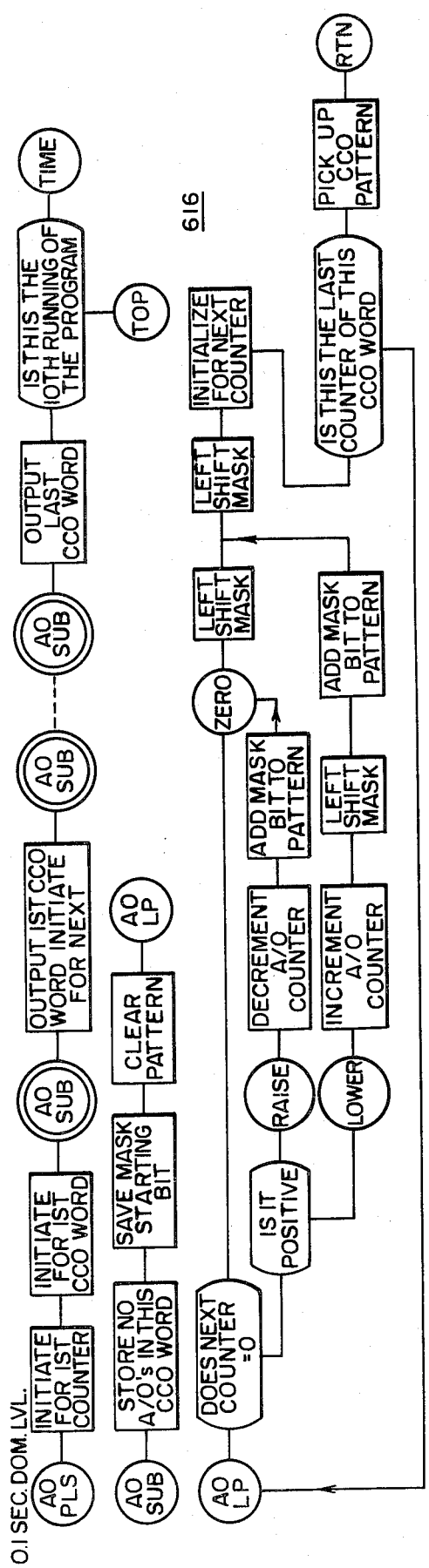
FIGS. 30A-C show flowcharts associated with an analog output program which is employed in the computer to cause the generation of output analog signals.
Figure 30B:
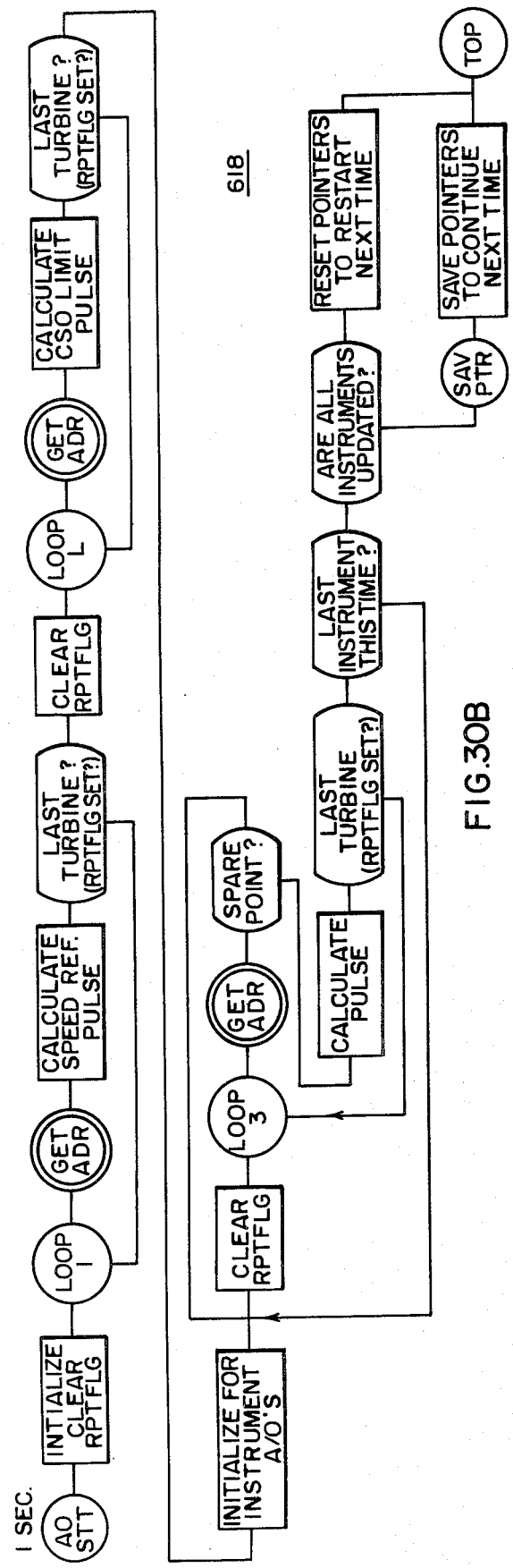
Figure 30C:
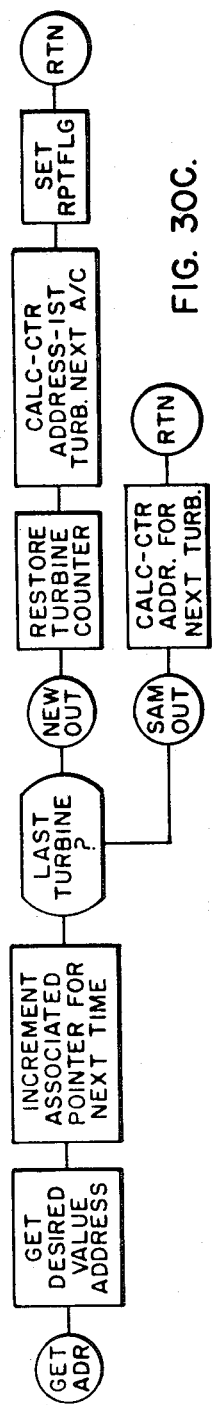

As previously considered, the general approach employed for generating analog outputs is to employ external holding type operational amplifiers with the amplifier outputs measured by the computer through the analog input system 308. The measured value is compared with the desired value and the difference is employed in determining how long raise or lower contact closure outputs must be closed to make the holding amplifier integrate to the desired value. The raise or lower value is computed in tenths of a second and it is determined by an element of the analog output program 612 which is run on a secondary level while the actual contact closure output pulsing is performed by a pulser element of the analog output program 612 run on a dominant level every tenth of a second. The secondary level analog output program element is run every second for speed reference and load limit and every five seconds for the remaining outputs. FIG. 30A illustrates a flowchart representative of the dominant level pulser element 616 of the analog output program 612. Flowcharts 618 and 620 representative of the secondary sublevel analog output program element are shown in FIGS. 30B and 30C.

The pulser program employs a counter table having a highest address at location AOCTR. One counter is provided for each analog output and the table is repeated for each turbine plant placed under control. The pulser program examines each analog output counter and if it is zero the associated raise and lower contact closure outputs are opened. If the counter is positive it is decremented by one and the raise contact closure output is closed. If the counter is negative, it is incremented by one and the lower contact closure output is closed.

The raise and lower contact closure outputs appear in two contact closure output registers and part of two other contact closure output registers for each turbine. The raise and lower contact closure outputs always appear as adjacent bits with the lower contact closure output being the odd-high bit. A macro AOM is defined which, in conjunction with a subroutine AOSUB, formulates and outputs one contact closure output word. The variables to be specified by each macro are determined by a one bit mask indicating the lowest raise bit to the output, a number indicating the number of adjacent analog contact closure output pairs to be formulated, and bits and registers used in the contact closure output call. The macro is repeated for each contact closure output word. The order of analog outputs in the counter table corresponds to the order of the register numbers in the macros and the order of the bits in the individual contact closure output word.

After initialization, the secondary sublevel analog output program element loads the counter table in three parts. First, the speed reference counters are loaded for all turbines. As observed in FIG. 20, these contact closure outputs are associated with an R-C delay in the hold integrator amplifier inputs, and an anticipation scheme is employed to take into account the energy stored in the capacitor. From the difference in the program calculated and desired value and the measured value for a speed reference output, there is subtracted any anticipated additional change as calculated the previous second. The error is limited to a value corresponding to a one second pulse. Half of the error is saved as the anticipated change which would not yet have occurred by the next second, and the error is right shifted several times and becomes the counter value.

Next, the fuel demand signal limit reference counters are loaded for all turbines. The count in this case is the difference between the desired and the measured values right-shifted several times for count scaling. Finally, instrument analog outputs are processed next. The instrument analog outputs are scanned every five seconds so that one fifth of them are output each second for each turbine. To calculate the pulse counter value, the desired value is added to an offset and the sum is multiplied by a constant. After shifting to the correct binary point, the measured value is subtracted and the difference is right-shifted several times for count scaling.

The length of tables and loop counters is correctly adjusted for various numbers of turbines by setting NOMCH in the symbol table equal to the number of turbines. The length of the counter table (AOCTR), the desired value address table (DVTB), and the speed reference anticipated change table (ANTTB) vary with the number of turbines while the other counter tables stay fixed in length. A desired value table DTTB contains the address of ASLP VALUE table locations which are to be output. For instruments, the desired value table is loaded by the operator's console program 606 and its order is also determined by this program.

A measured value table MVTB contains the addresses for turbine A of the ASLP VALUE table locations which contain the last measured value of the analog outputs. Because of interleaving in the ASLP VALUE table, the addresses for the other turbines are determinable. A conversion offset table COTB and a conversion slope table CSTB contain constants employed by the instrument analog output operations. A counter address table CTATB is employed to reconcile the difference in order of handling the instruments by the operator's console program 606 and the analog output pulser element of the analog output program 612. A counter table AOCTR contains the remaining time in tenths of a second that each integrator contact closure output should be closed.

7. Sequencing Program a. Functional Philosophy

Figure 31:
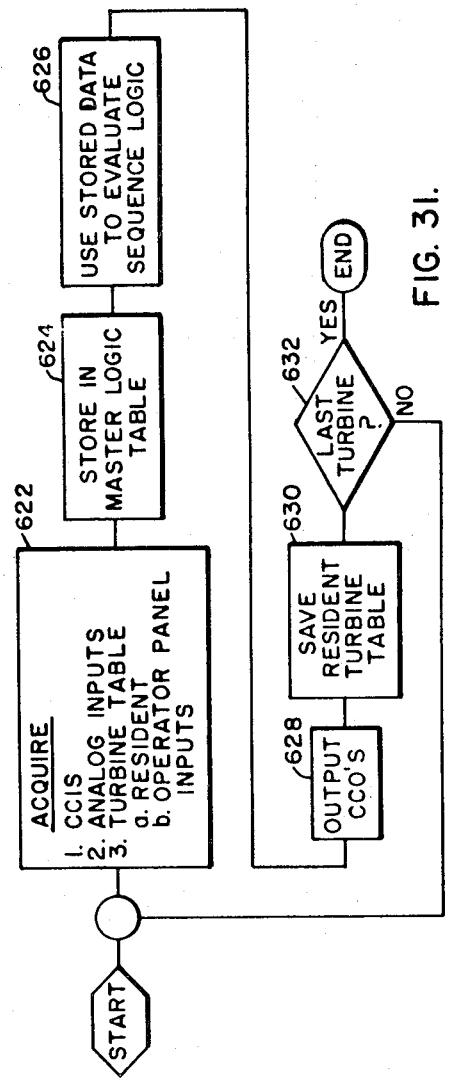
FIG. 31 illustrates a flowchart for a sequencing program associated principally with startup operations for the gas turbine.

Generally, the sequencing program 600 is represented by a flowchart shown in FIG. 31 and it is run once every second to provide the plant sequencing operations required during turbine startup, to provide certain alarm detections and to provide sequencing for various plant tasks during time periods other than the turbine startup time period. As indicated by block 622, certain information regarding the status of the turbine plant 100 and other controlled plants is required for sequencing program execution. The required plant status information which is acquired includes continuous analog data and contact input closures generated by operator panel switches, pressure switches, and other plant devices. The acquired information is stored in a master logic table as indicated by the block 624. Next, in providing ultimately for better plant startup management and better plant management generally, the stored data is employed in the evaluation of a plurality of blocks of sequence logic as indicated by block 626.

The results of the evaluation of the sequence logic may require communication with other programs in the program system in which event the results are stored for use by those programs. As indicated by block 628, the results of the evaluation of the sequence logic may also require certain contact closure outputs. In block 630, a resident table of turbine data acquired from core memory by the acquisition block 622 is saved in the original core memory location while nonresident turbine data comprising operator panel inputs is allowed to be destroyed.

Block 632 then determines whether any additional turbines need to be processed in the current run of the sequencing program 600. If not, the sequencing program 600 is ended. If one or more gas turbines remain for sequencing logic determinations in the current run of the sequencing program 600, the program 600 is re-executed for the next turbine and the process is repeated until the last turbine has been serviced with sequence logic processing in the current sequencing program execution.

Figure 32:
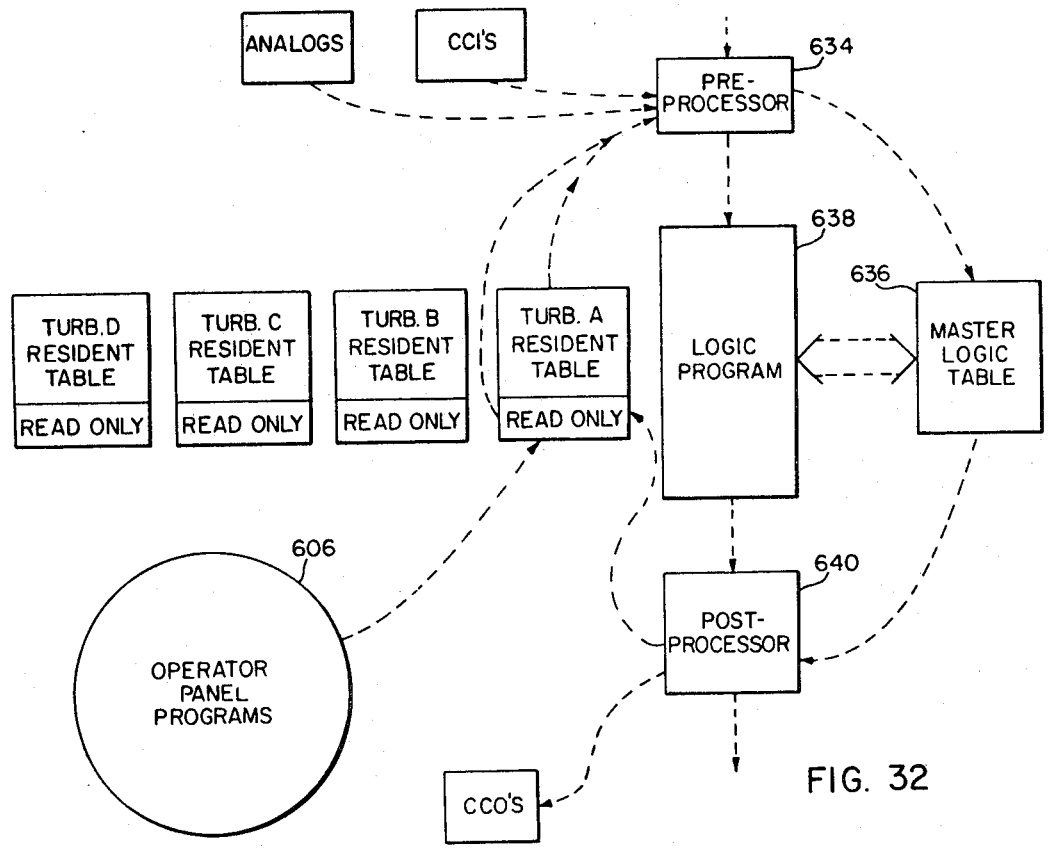
FIG. 32 shows a data flow diagram which illustrates the manner in which the sequencing program is executed to provide multiple power plant operations with a single control computer.

In FIG. 32, there is illustrated a data flow map for the sequencing program 600. As shown, there are four turbine data tables for the respectively designated gas turbines A, B, C and D. Each gas turbine data table comprises a resident portion and a read only portion which is derived from the operator panel program 606. A preprocessor block 634 corresponds to the block 622 shown in FIG. 31, and it obtains data from analog inputs, contact closure inputs, the resident turbine A table and the read only turbine A table. The acquired data is stored in a master logic table as indicated by block 636 which corresponds to block 624 in FIG. 31. The master logic table 636 is employed in the execution of logic program block 638 which corresponds to block 626 in FIG. 31.

After the sequence logic has been evaluated by the program 638 a postprocessor 640 is entered and it corresponds to blocks 628, 630 and 632 in FIG. 31. Thus, contact closure outputs are generated and the turbine A resident table is saved. The postprocessor 640 then provides for a repeat program execution for turbine B table data if a second gas turbine plant is under control. Similarly, repeat executions are made to provide for entry and restorage of turbine C table data and turbine D table data if C and D gas turbine plants are under control. After the last turbine sequence program execution has been completed, an exit is made from the postprocessor block 640.

b. Sequencing Program Table Data Tables And Preprocess and Postprocess Routine The following information shows the core organization of the turbine resident read/write and read only tables, contact closure input and contact closure output data tables, the master logic table and turbine alarm data tables. In addition, information on the contact closure input routines, analog input routines and contact closure output routines employed in the blocks 622 and 628 is included. A detailed program listing employed in a specific application involves certain minor changes from the following.

| WORD | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| | | | | | | | | | | | | | | |

TURBINE A RESIDENT BITS *READ*/WRITE

| WORD | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 10114 | MODE0 | MODE1 | MODE2 | MODE3 | MODE4 | MIN | BASE | PEAK | SYSR | NORSRT | ESTART | L86 | L94 | AUXRS |
| 10115 | | | N | I | V | E | R | P | 8 | 9 | EMERG | STRQ | L186 | LOKOT1 |
| 10116 | 0 | 1 | 2 | 3 | 4 | 5 | 6 | 7 | | | | | | |
| 10117 | 5X | FREEZ | 26CD | SHTDWN | PURGE | PURGTD | IGN | OIL | GAS | 66PNZ | RMPNZ | RMPNH | GBKROP | SDLBC1 |
| 10120 | FBKRTP | GBKRCL | ATOSNC | 27L | L25 | 39S | CIROIL | OILHTR | OILFNL | OLFNHI | BLVLV1 | BLVLV2 | EVPCOL | HLBOTP |
| 10121 | SEQCK2 | 26B | 26E | MIX | 39R | L38 | X | 27B | VB2MIL | N14M10 | LORSET | 88X | OPX | L4 |
| 10122 | VB3MIL | VB4MIL | SDSORR | SDNSRT | RUNSDN | XFER | ADJMIN | FLSH1 | FLSH2 | FLSH3 | FLSH4 | FLSH5 | FLSH6 | 66S |
| 10123 | DSLBKR | SDNBL1 | OLFNH2 | | | | | SPARE | | | | | | |
| | | | | | | | | SPARE | | | | | | |

TURBINE A RESIDENT TABLE (READ ONLY) OP. CONSOLE

| WORD | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 10124 | 43FG | 43FO | 43FM | 43FT | HOLD1 | HOLD2 | HOLD3 | HOLD4 | HOLD5 | 43STA | 43STM | SSG | 43L | 43R REMOTE |
| 10125 | RESET | 52LCL | 52LCT | 152LCR | 152LT | FXFRPB | EMGSRT | EMGSTP | NORSTP | 43LSM | 43LSB | 43LSP | 43LSR | SSL |
| 10126 | 52GCMN | 52GTMN | 41CMN | 41TMN | 65CR | 65CL | 43RA | 43RM | 70CR | 70CL | SPARE4 | SPARE3 | SPARE2 | SPARE1 |
| 10127 | | | | | | | | SPARE | | | | | | |

TURBINE B RESIDENT BITS *READ*/WRITE

| WORD | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 10244 | MODE0 | MODE1 | MODE2 | MODE3 | MODE4 | MIN | BASE | PEAK | SYSR | NORSRT | ESTART | L86 | L94 | AUXRS |
| 10245 | | | N | I | V | E | R | P | 8 | 9 | EMERG | STRQ | L186 | LOKOT1 |
| 10246 | 0 | 1 | 2 | 3 | 4 | 5 | 6 | 7 | | | | | | |
| 10247 | 5X | FREEZ | 26CD | SHTDWN | PURGE | PURGTD | IGN | OIL | GAS | 66PNZ | RMPNZ | RMPNH | GBKROP | SDLBC1 |
| 10250 | FBKRTP | GBKRCL | ATOSNC | 27L | L25 | 39S | CIROIL | OILHTR | OILFNL | OLFNHI | BLVLV1 | BLVLV2 | EVPCOL | HLBOTP |
| 10251 | SEQCK2 | 26B | 26E | MIX | 39R | L38 | X | 27B | VB2MIL | N14M10 | LORSET | 88X | OPX | L4 |
| 10252 | VB3MIL | VB4MIL | SDSORR | SDNSRT | RUNSDN | XFER | ADJMIN | FLSH1 | FLSH2 | FLSH3 | FLSH4 | FLSH5 | FLSH6 | 66S |
| 10253 | DSLBKR | SDNBL1 | OLFNH2 | | | | | SPARE | | | | | | |
| | | | | | | | | SPARE | | | | | | |

TURBINE B RESIDENT TABLE (*READ* ONLY) OP. CONSOLE

| WORD | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 10254 | 43FG | 43FO | 43FM | 43FT | HOLD1 | HOLD2 | HOLD3 | HOLD4 | HOLD5 | 43STA | 43STM | SSG | 43L | 43R REMOTE |
| 10255 | RESET | 52LCL | 52LCT | 152LCR | 152LT | FXFRPB | EMGSRT | EMGSTP | NORSTP | 43LSM | 43LSB | 43LSP | 43LSR | SSL |
| 10256 | 52GCMN | 52GTMN | 41CMN | 41TMN | 65CR | 65CL | 43RA | 43RM | 70CR | 70CL | SPARE4 | SPARE3 | SPARE2 | SPARE1 |
| 10257 | | | | | | | | SPARE | | | | | | |

TURBINE C RESIDENT BITS *READ*/WRITE

| WORD | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 10374 | MODE0 | MODE1 | MODE2 | MODE3 | MODE4 | MIN | BASE | PEAK | SYSR | NORSRT | ESTART | L86 | L94 | AUXRS |
| 10375 | | | N | I | V | E | R | P | 8 | 9 | EMERG | STRQ | L186 | LOKOT1 |
| 10376 | 0 | 1 | 2 | 3 | 4 | 5 | 6 | 7 | | | | | | |
| 10377 | 5X | FREEZ | 26CD | SHTDWN | PURGE | PURGTD | IGN | OIL | GAS | 66PNZ | RMPNZ | RMPNH | GBKROP | SDLBC1 |
| 10400 | FBKRTP | GBKRCL | ATOSNC | 27L | L25 | 39S | CIROIL | OILHTR | OILFNL | OLFNHI | BLVLV1 | BLVLB2 | EVPCOL | HLBOTP |
| 10401 | SEQCK2 | 26B | 26E | MIX | 39R | L38 | X | 27B | VB2MIL | N14M10 | LORSET | 88X | OPX | L4 |
| 10402 | VB3MIL | VB4MIL | SDSORR | SDNSRT | RUNSDN | XFER | ADJMIN | FLSH1 | FLSH2 | FLSH3 | FLSH4 | FLSH5 | FLSH6 | 66S |
| 10403 | DSLBKR | SDNBL1 | OLFNH2 | | | | | SPARE | | | | | | |
| | | | | | | | | SPARE | | | | | | |

TURBINE C RESIDENT TABLE (READ ONLY) OP. CONSOLE

| WORD | 13 | 12 | 11 | 10 | 9 | 8 | 7 | 6 | 5 | 4 | 3 | 2 | 1 | 0 |
|---|---|---|---|---|---|---|---|---|---|---|---|---|---|---|
| 10404 | 43R REMOTE | 43L | SSG | 43STM | 43STA | HOLD5 | HOLD6 | HOLD6 | FXFRPB | HOLD1 | 43FT | 43FM | 43FO | 43FG |
| 10405 | SSL | 43LSR | 43LSP | 43LSB | 43LSM | NORSTP | EMGSTP | EMGSRT | FXFRPB | 152LT | 152LCR | 43LCT | 52LCL | RESET |
| 10406 | SPARE1 | SPARE2 | SPARE3 | SPARE4 | 70CL | 70CR | 43RM SPARE | 43RA | 65CL | 65CR | 41TMN | 41CMN | 52GTMN | 52GCMN |
| 10407 | | | | | | | | | | | | | | |

TURBINE D RESIDENT BITS READ/WRITE

| WORD | 13 | 12 | 11 | 10 | 9 | 8 | 7 | 6 | 5 | 4 | 3 | 2 | 1 | 0 |
|---|---|---|---|---|---|---|---|---|---|---|---|---|---|---|
| 10524 | AUXRS LOKOT1 | L94 L186 | L86 STRQ | ESTART EMERG | NORSRT | SYSR | PEAK P 7 | BASE R 6 | MIN E 5 | MODE4 V 4 | MODE3 I 3 | MODE2 N 2 | MODE1 | MODE0 |
| 10525 | | | | | | | | | | | | | | |
| 10526 | SDLBC1 HLBOTP | GBKROP EVPCOL | RMPNH BLVLV2 | RMPNZ BLVLV1 | 66PNZ OLFNH1 | GAS OILFNL | OIL OILHTR | IGN CIROIL | PURGTD 39S | PURGE L25 | SHTDWN 27L | 26CD ATOSNC | FREEZ GBKRCL | 5X FBKRTP |
| 10527 | L4 | OPX | 88X | LORSET | N14MIO | VB2MIL | 27B | X | L38 | 39R | MIX | 26E | 268 | SEQCK2 |
| 10530 | 66S | FLSH6 | FLSH5 | FLSH4 | FLSH3 | FLSH2 | FLSH1 SPARE SPARE | ADJMIN | XFER | RUNSDN | SDNSRT | SDSORR OLFNHZ | VB4MIL SDNBL1 | VB3MIL DSLBKR |
| 10531 | | | | | | | | | | | | | | |
| 10532 | | | | | | | | | | | | | | |
| 10533 | | | | | | | | | | | | | | |

TURBINE D RESIDENT TABLE (READ ONLY) OP. CONSOLE

| WORD | 13 | 12 | 11 | 10 | 9 | 8 | 7 | 6 | 5 | 4 | 3 | 2 | 1 | 0 |
|---|---|---|---|---|---|---|---|---|---|---|---|---|---|---|
| 10534 | 43R REMOTE | 43L | SSG | 43STM | 43STA | HOLD5 | HOLD6 | HOLD6 | FXFRPB | HOLD1 | 43FT | 43FM | 43FO | 43FG |
| 10535 | SSL | 43LSR | 43LSP | 43LSB | 43LSM | NORSTP | EMGSTP | EMGSRT | FXFRPB | 152LT | 152LCR | 52LCT | 52LCL | RESET |
| 10536 | SPARE1 | SPARE2 | SPARE3 | SPARE4 | 70CL | 70CR | 43RM SPARE | 43RA | 65CL | 65CR | 41TMN | 41CMN | 52GTMN | 52GCMN |
| 10537 | | | | | | | | | | | | | | |

CCI

| BIT # | 13 | 12 | 11 | 10 | 9 | 8 | 7 | 6 | 5 | 4 | 3 | 2 | 1 | 0 |
|---|---|---|---|---|---|---|---|---|---|---|---|---|---|---|
| Channel 21 | | | | | 639GL Gas Pressure Low | 639GH Gas Pressure High | 639GI Gas Supply Pressure Switch | * | * | * | * | * | * | * |
| Channel 22 | * | 639DT Oil Pres. Main Pump Inlet-Alm. XFER to DC* | L6382 Pressure Valve 2 Closed* | L6381 Switches Valve 1 Closed* | 43PSG and of Pres. Test Switch (Auto)* | L634 Bearing Oil Pres. Switch* | L631 Bearing Oil Pres. Switch* | L633 High Lube Oil Pressure* | L637 Overspd. Trip Oil Pressure Switch* | 639D Flow Divider Outlet 2 Pressure* | L6310 Compress Inlet Pressure Switch* | L636 Combustor Shell Pressure Ign. Sw.* | 43SR 69SRO Safe Run* | L6311 Instrum. Air Pres. Switch* |
| Channel 23 | | 27DC Loss of DC to Aux. Oil Pump | 27D DC Cntrl Under-Voltage* | 27A AC Under-Voltage* | L332 Inlet Guide Vane Closed* | L331 Inlet Guide Vane Open* | L711 Float Sw. Oil Reservoir Low* | * | 45F2 Fire Detectors #2* | 45F1 Fire Detectors #1* | L2619 High Disc Cooling Air Temp.* | * | 639G2 Isolation Valve Diaphragm Pressure Switch* 70AP Volt. Adj. Rheo. in | 639DS Oil Pres. Fuel Pump Inlet* |
| Channel 24 | 43MC and Contacts | 88TGA Aux. Contact | 52LA Line Breaker | * | 41A Field Breaker | 52GA Generator Breaker | | | | | | | | * |

-continued

| | Motor Cntrl Cnt* | T.G. Line Strter* | A Contact* | A Contact* | A Contact* | | 18T Diesel Trip Contact* | 18A Starting Motor Bkr. Closed* | 43SM Start Motor* | 43SD Manual Sw-Start Device Mt.* | 52MA Start Motor Bkr. Closed | Preset Start Posn.* L49 Guard-ISTOR on Start Motor | 37L Low Speed Starting Current Detector |
|---|---|---|---|---|---|---|---|---|---|---|---|---|---|
| Channel 25 | * | * | | | | | | | | | | | |
| Channel 26 | * | * | * | * | | | | * | 86G Lockout Generator* FD6A Flame Detectors | * | * | * | * |
| Channel 27 | | | | FD7B Flame Detectors | FD7A Flame Detectors | | | FD6B Flame Detectors | | | | | |

*(available as switches)

INCCI
CCI Pre-Processor Routine

In order to minimize the amount of wasted space in the master data table, only the occupied bits of each CCI channel (including any unoccupied bits which might be between the first and last occupied bits) are unpacked into the CCI data area of the master data table. In this section an occupied bit is one which is of interest to the sequencing program. An unoccupied bit, on the other hand, is one which is of no interest to the logic program. When unoccupied bits are encountered between the first and last occupied bits of a CCI channel, a dummy value (OCT 0) is loaded into the corresponding location of the CCI data table.

The unoccupied bits which are located between the first and last occupied bits of a CCI channel are represented in the CCI data table because it is more efficient to unpack one sequential string of bits (the string possibly containing several unused bits) for each channel than to unpack only the bits which are of interest to the logic program.

The following example shows the method used to transmit the data on CCI channels to the CCI data area of the master data table.

NOTE:
a. CHANNEL #1 — Right shift twice to get contents of first occupied bit into bit 0. Bit 0 now contains A and bit 5 now contains E. Unpack sequentially beginning with Bit 0 and terminating with last occupied bit (bit 5). One unused bit encountered between first and last occupied bits. Therefore, load the corresponding location of CCI data table with dummy value (OCT 0).

b. CHANNEL #2 — Right shift seven times to get contents of first occupied bit in bit 0. Follow procedure found in a. above.

c. CHANNEL #7 — No right shifts necessary because contents of first occupied bit is already in bit 0. Unpack channel 7 sequentially beginning with bit 0 (first occupied bit) and terminating with bit 6 (last occupied bit). While unpacking this one string of bits, two unoccupied bits are encountered. Place a dummy value (OCT0) in the corresponding locations of the CCI data table. It is more economical to unpack in the manner above than to unpack, in the case of channel 7, 2 shorter strings of bits K thru M and N thru P (thus omitting the two unwanted bits).

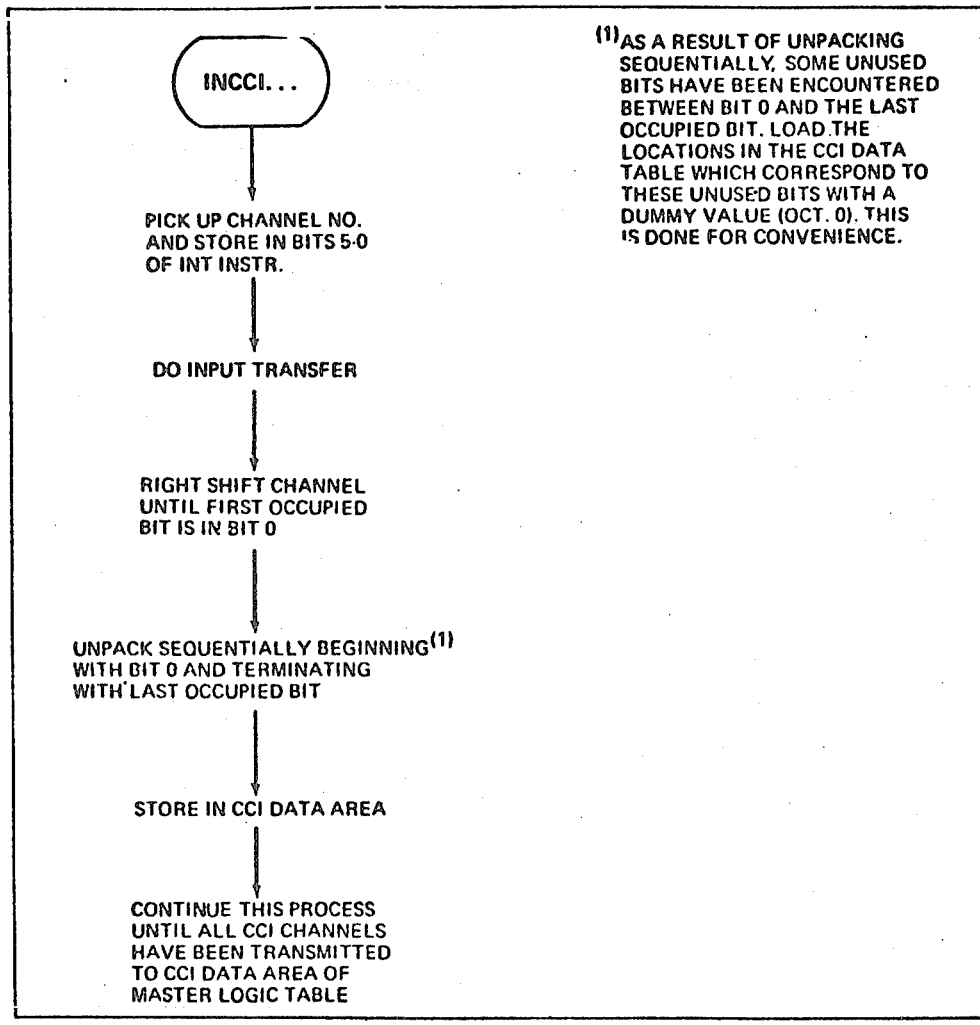

ANALOG INPUT ROUTINE

Define the following with EQU cards:

A. This table of EQU cards defines an address in the ASLP (analog signal list) which is related to each of the analog inputs.

These addresses are calculated by multiplying the index number of the input (corresponding to a one turbine system) by the number of units in the system. The resulting value is an address relative to the beginning location of the ASLP for the first turbine. To find the desired address, add the beginning location of ASLP which has been defined as VALUE plus one less than the number of turbines (See below). Remember that the addresses below correspond to turbine A only.

The addresses are used to construct a table which is used by the analog input routine. Below is a typical table.

```
CSOIND8EQU  56*NTURB+VALVE+NTURB-1
27BIN  8EQU  114*NTURB+VALUE+NTURB-1
LT35IN 8EQU  13*NTURB+VALUE+NTURB-1
27LIN  8EQU  114*NTURB+VALUE+NTURB-1
LT17IN 8EQU  0*NTURB+VALUE+NTURB-1
LT18IN 8EQU  1*NTURB+VALUE+NTURB-1
LT19IN 8EQU  2*NTURB+VALUE+NTURB-1
LT20IN 8EQU  3*NTURB+VALUE+NTURB-1
LT21IN 8EQU  4*NTURB+VALUE+NTURB-1
LT22IN 8EQU  5*NTURB+VALUE+NTURB-1
LT23IN 8EQU  6*NTURB+VALUE+NTURB-1
LT24IN 8EQU  7*NTURB+VALUE+NTURB-1
LT25IN 8EQU  15*NTURB+VALUE+NTURB-1
LT26IN 8EQU  16*NTURB+VALUE+NTURB-1
LT30IN 8EQU  11*NTURB+VALUE+NTURB-1
LT33IN 8EQU  12*NTURB+VALUE+NTURB-1
LT36IN 8EQU  14*NTURB+VALUE+NTURB-1
DC12IN 8EQU  32*NTURB+VALUE+NTURB-1
DC22IN 8EQU  33*NTURB+VALUE+NTURB-1
DC32IN 8EQU  34*NTURB+VALUE+NTURB-1
DC42IN 8EQU  35*NTURB+VALUE+NTURB-1
LT27IN 8EQU  42*NTURB+VALUE+NTURB-1
LT28IN 8EQU  43*NTURB+VALUE+NTURB-1
LT29IN 8EQU  44*NTURB+VALUE+NTURB-1
39V11N 8EQU  45*NTURB+VALUE+NTURB-1
```

-continued

```
39V2IN  8EQU  46*NTURB+VALUE+NTURB−1
39V3IN  8EQU  47*NTURB+VALUE+NTURB−1
39V4IN  8EQU  50*NTURB+VALUE+NTURB−1
DC11IN  8EQU  71*NTURB+VALUE+NTURB−1
DC21IN  8EQU  72*NTURB+VALUE+NTURB−1
DC31IN  8EQU  73*NTURB+VALUE+NTURB−1
DC41IN  8EQU  74*NTURB+VALUE+NTURB−1
ASPIND  8EQU 101*NTURB+VALUE+NTURB−1
ASPBCK  8EQU 102*NTURB+VALUE+NTURB−1
AKWATT  8EQU 103*NTURB+VALUE+NTURB−1
ACOMBR  8EQU 117*NTURB+VALUE+NTURB−1
ASPREF  8EQU 120*NTURB+VALUE+NTURB−1
```

1. Using LT30 as an example:
   (a) if NTURB = 1; LT30IN = $11_8$ + VALUE + 1 − 1
   LT30IN is the ASLP address for LT30 corresponding to turbine A in a one unit system.
   (b) if NTURB = 2; LT30IN = $22_8$ + VALUE + 2 − 1
   LT30IN is the ASLP address for LT30 corresponding to turbine A in a two unit system.
   (c) if NTURB = 3; LT30IN = $33_8$ + VALUE + 3 − 1
   LT30IN is the ASLP address for LT30 corresponding to turbine A in a three unit system.
   (d) if NTURB = 4; LT30IN = $44_8$ + VALUE + 4 − 1
   LT30IN is the ASLP address for LT30 corresponding to turbine A in a four unit system.
2. Using ASPREF as an example:
   (a) if NTURB = 1; ASPREF = $120_8$ + VALUE + 1 − 1
   (b) if NTURB = 2; ASPREF = $240_8$ + VALUE + 2 − 1
   (c) if NTURB = 3; ASPREF = $360_8$ + VALUE + 3 − 1
   (d) if NTURB = 4; ASPREF = $500_8$ + VALUE + 4 − 1
3. If turbine B, C, or D is being considered, a respective value of 1, 2, or 3 must be subtracted from the index calculated for turbine A. The analog input routine subtracted the correct amount from the turbine A index if turbine B, C, or D is being considered rather than turbine A.
   NTURB - the number of turbines in the system (1,2,3, or 4), NTURB must be defined before the correct index of an analog value can be determined. Thus, the value of the ASLP address of an analog input is dependent upon NTURB.

II. Certain tables are required by the analog input routine.
A. As ASLP address table (IDXTBL) which consists of an address (depending upon NTURB) for each of the analog input values. Remember that all of these addresses correspond to turbine A. This table must be in the same order as the destination table which will be discussed shortly. The ASLP address table is constructed using the symbols in Section I, part A. This table follows the analog input routine directly in the sequence program.
Typical ASLP address table.

```
IDXTBL OCT LT30IN
       OCT LT33IN
       OCT LT36IN
       OCT DC11IN
       OCT DC21IN
       OCT DC31IN
       OCT DC41IN
       OCT LT27IN
       OCT LT28IN
       OCT LT29IN
       OCT 39V1IN
       OCT 39V2IN
       OCT 39V3IN
       OCT 39V4IN
       OCT DC12IN
       OCT DC22IN
       OCT DC32IN
       OCT DC42IN
       OCT ASPIND
       OCT ASPBCK
       OCT AKWATT
       OCT ACOMBR
       OCT ASPREF
       OCT 38DIDX
TBLEND SYN L-1
```

B. Once the value of a particular analog input has been picked up from the ASLP table, it is stored in a destination table (see below). This destination table is used as an analog input information center by the sequencing. This destination table must be in the same order as the ASLP address table (Section II, part A).
The following are the Analog Input values used by the Logic Program. Order must be, same as IDXTBL.

| | | | (Binary point, engineering units) |
|---|---|---|---|
| FULIND | OCT | FUEL INDICATOR-CSO | (6,V) |
| 27B | OCT | DEAD BUS | (6,V) |
| 27L | OCT | DEAD LINE | (6,V) |

-continued

| | | | |
|---|---|---|---|
| LT35 | OCT | INLET MANIFOLD FUEL PUMP | (0,F) |
| LT17 | OCT | GEAR BEARING DRAIN (GEN. END) | (0,F) |
| LT18 | OCT | GEAR BEARING DRAIN (TURB END) | (0,F) |
| LT19 | OCT | PINION BEARING DRAIN (GEN. END) | (0,F) |
| LT20 | OCT | MAIN GEAR DRAIN | (0,F) |
| LT21 | OCT | PINION BEARING DRAIN (TURB END) | (0,F) |
| LT22 | OCT | COMPRESSOR JOURNAL BEARING BAB. | (0,F) |
| LT23 | OCT | THRUST BEARING SHOE BAB. | (0,F) |
| LT24 | OCT | TURBINE BEARING BAB. | (0,F) |
| LT25 | OCT | GENERATOR BEARING DRAIN (TURB END INBRD.) | (0,F) |
| LT26 | OCT | GENERATOR BEARING DRAIN (EXCITER END) | (0,F) |
| LT30 | OCT | COMPRESSOR DISCHARGE TEMPERATURE | (0,F) |
| LT33 | OCT | COMPRESSOR INLET TEMPERATURE | (0,F) |
| LT36 | OCT | GEAR SUPPORT METAL TEMPERATURE | (0,F) |
| DC11 | OCT | DISC CAVITY | (0,F) |
| DC21 | OCT | DISC CAVITY | (0,F) |
| DC31 | OCT | DISC CAVITY | (0,F) |
| DC41 | OCT | DISC CAVITY | (0,F) |
| LT27 | OCT | LUB OIL RES. TEMP. CNTRLS COOLER FAN | (0,F) |
| LT28 | OCT | LUB OIL RES. TEMP HTR CNTRLS AND MIN TEMP | (0,F) |
| LT29 | OCT | LUBE OIL TEMPERATURE | (0,F) |
| 39V1 | OCT | VIBRATION COMPRESSOR BEARING | (6,MIL) |
| 39V2 | OCT | VIBRATION-TURBINE BEARING | (6,MIL) |
| 39V3 | OCT | VIBRATION-GEN. INBOARD BEARING | (6,MIL) |
| 39V4 | OCT | VIBRATION-GEN. OUTBOARD BEARING | (6,MIL) |
| DC12 | OCT | DISC CAVITY | (0,F) |
| DC22 | OCT | DISC CAVITY | (0,F) |
| DC32 | OCT | DISC CAVITY | (0,F) |
| DC42 | OCT | DISC CAVITY | (0,F) |
| 14M | OCT | MAIN SPEED CHANNEL | (3,PERCENT) |
| 14A | OCT | AUX. SPEED CHANNEL | (3,PERCENT) |
| KW | OCT | KILOWATT | (6,MW) |
| COMBR | OCT | COMBUSTOR SHELL PRESSURE | (3,PSG) |
| D14R | OCT | SPEED REFERENCE | (3, PERCENT) |

CONFIGURATION OF ANALOG INPUT TABLE
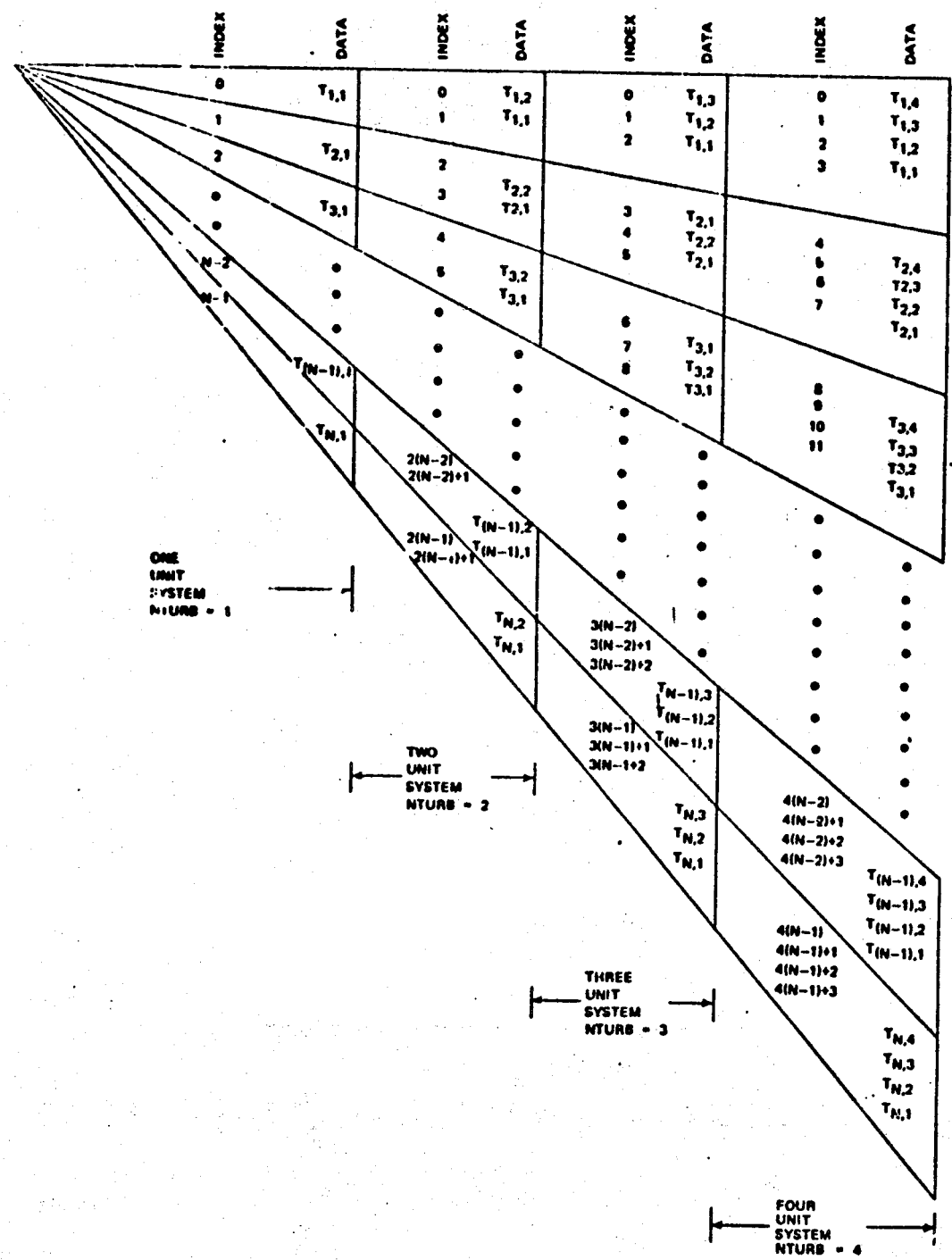

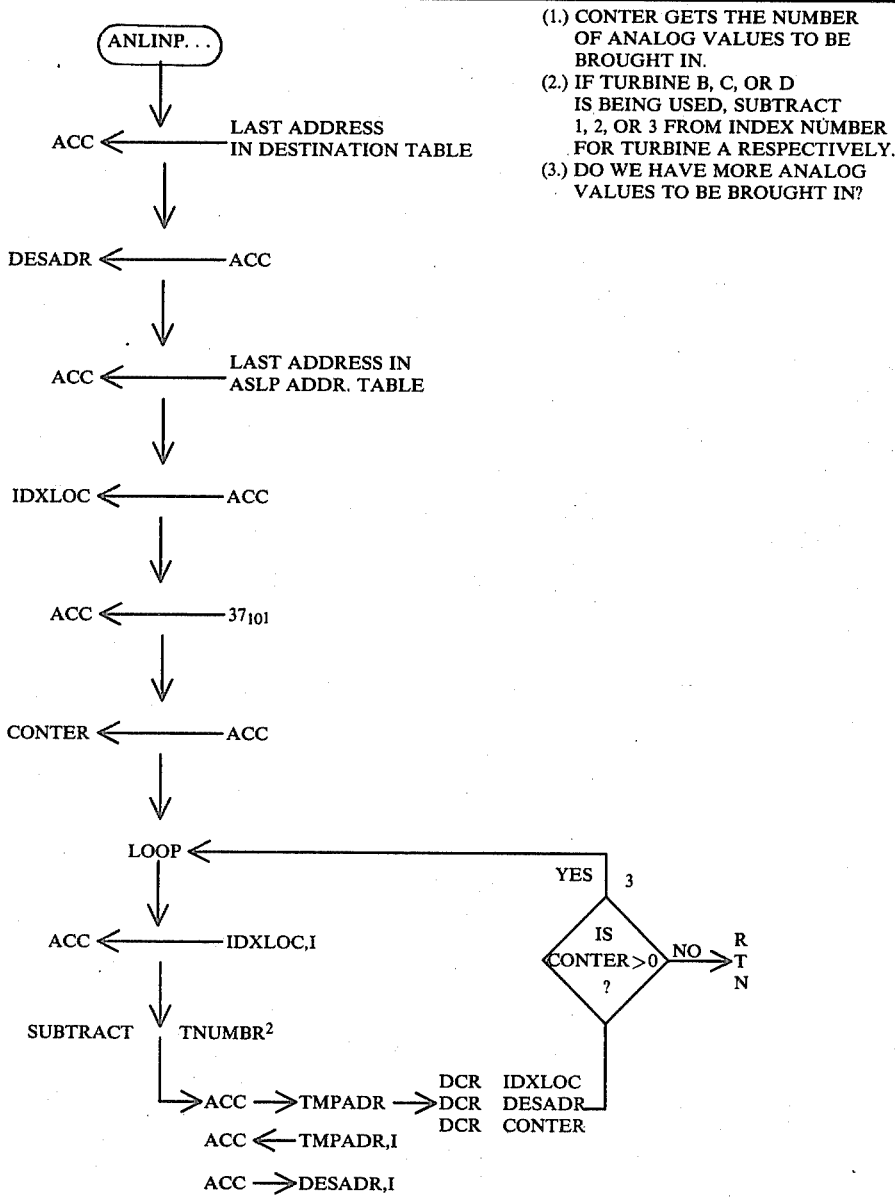

(1.) CONTER GETS THE NUMBER OF ANALOG VALUES TO BE BROUGHT IN.
(2.) IF TURBINE B, C, OR D IS BEING USED, SUBTRACT 1, 2, OR 3 FROM INDEX NUMBER FOR TURBINE A RESPECTIVELY.
(3.) DO WE HAVE MORE ANALOG VALUES TO BE BROUGHT IN?

TABLE OF ANALOG VALUES

| Mnemonic | Location | Index | Logic Mnemonic |
|---|---|---|---|
| ALT30 | 23411 | 11 | LT30 |
| ALT33 | 23412 | 12 | LT33 |
| ALT36 | 23414 | 14 | LT36 |
| A1DC11 | 23432 | 32 | DC11 |
| A1DC21 | 23433 | 33 | DC21 |
| A1DC31 | 23434 | 34 | DC31 |
| A1DC4 | 23435 | 35 | DC41 |
| ALT27 | 23442 | 42 | LT27 |
| ALT28 | 23443 | 43 | LT28 |
| ALT29 | 23444 | 44 | LT29 |
| A39V1 | 23445 | 45 | 39V1 |
| A39V2 | 23446 | 46 | 39V2 |
| A39V3 | 23447 | 47 | 39V3 |
| A39V4 | 23450 | 50 | 39V4 |
| A1DC12 | 23471 | 71 | DC12 |
| A1DC22 | 23472 | 72 | DC22 |
| A1DC32 | 23473 | 73 | DC32 |
| A1DC42 | 23474 | 74 | DC42 |
| ASPIND | 23501 | 101 | 14M |
| ASPBCK | 23502 | 102 | 14A |
| AKWATT | 23503 | 103 | KW |
| ACOMBR | 23517 | 117 | COMBR |
| ASPREF | 23520 | 120 | D14R |

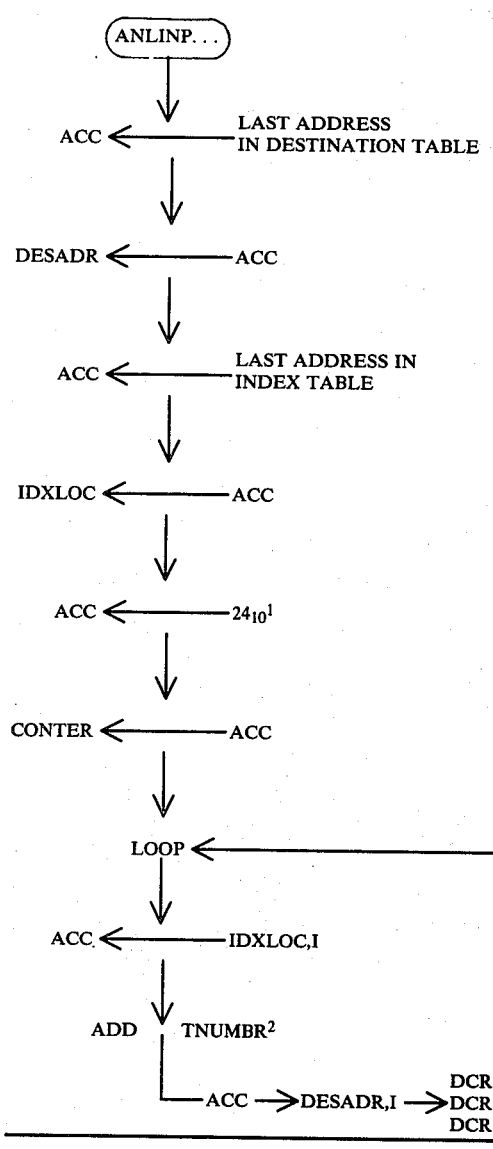

(1.) CONTER GETS THE NUMBER OF ANALOG VALUES TO BE CONVERTED.
(2.) IF TURBINE B,C, OR D IS BEING USED, ADD 1, 2, OR 3 TO INDEX NUMBER FOR TURBINE A RESPECTIVELY.
(3.) DO WE HAVE MORE ANALOG VALUES TO BE CONVERTED INTO ENGINEERING UNITS?

PRELOG...
Logic Pre-Processor

Upon entry into PRELOG routine, the beginning address of the turbine resident table (address depends on the turbine specified) must be in the accumulator.

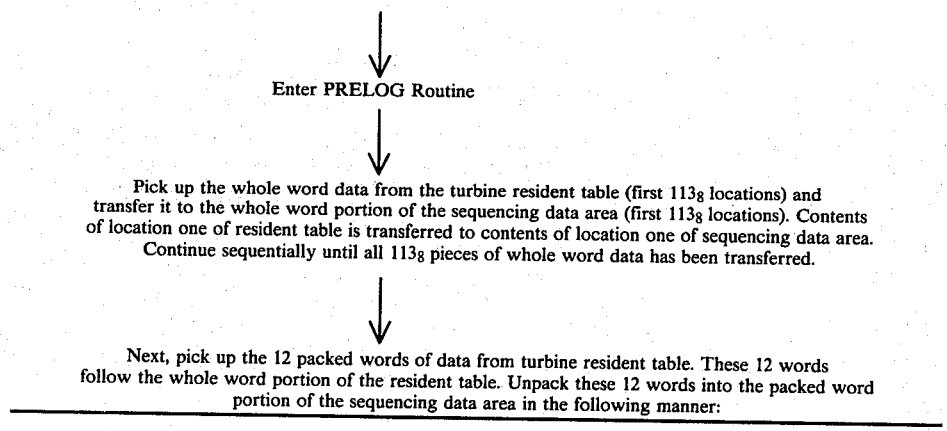

Enter PRELOG Routine

Pick up the whole word data from the turbine resident table (first $113_8$ locations) and transfer it to the whole word portion of the sequencing data area (first $113_8$ locations). Contents of location one of resident table is transferred to contents of location one of sequencing data area. Continue sequentially until all $113_8$ pieces of whole word data has been transferred.

Next, pick up the 12 packed words of data from turbine resident table. These 12 words follow the whole word portion of the resident table. Unpack these 12 words into the packed word portion of the sequencing data area in the following manner:

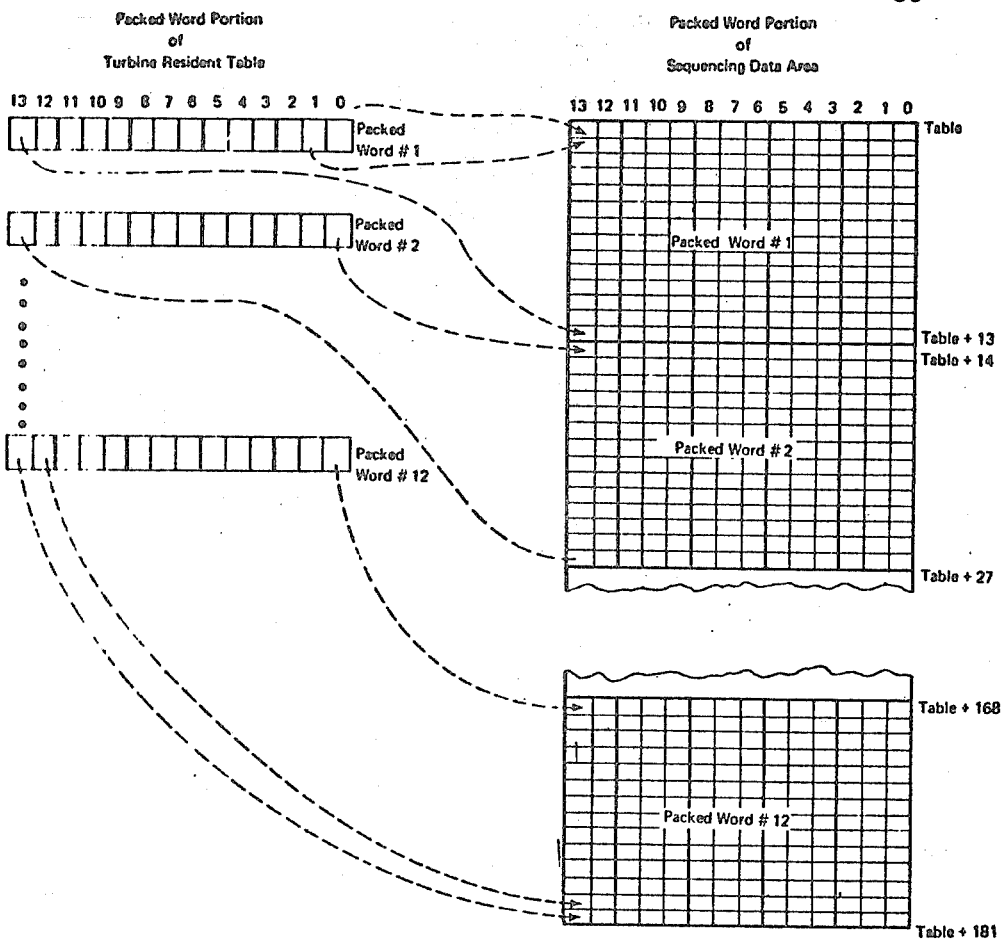

NOTE:
a. Bits 0 thru 13 of first packed word in turbine resident table are unpacked into most significant bits of words 1 thru 14 respectively of the packed word section of the sequencing data area.

b. Bits 0 thru 13 of second packed word are unpacked into most significant bits of words 15 thru 28 of packed word portion of sequencing data area.

c. Continue until all 12 packed words are unpacked.

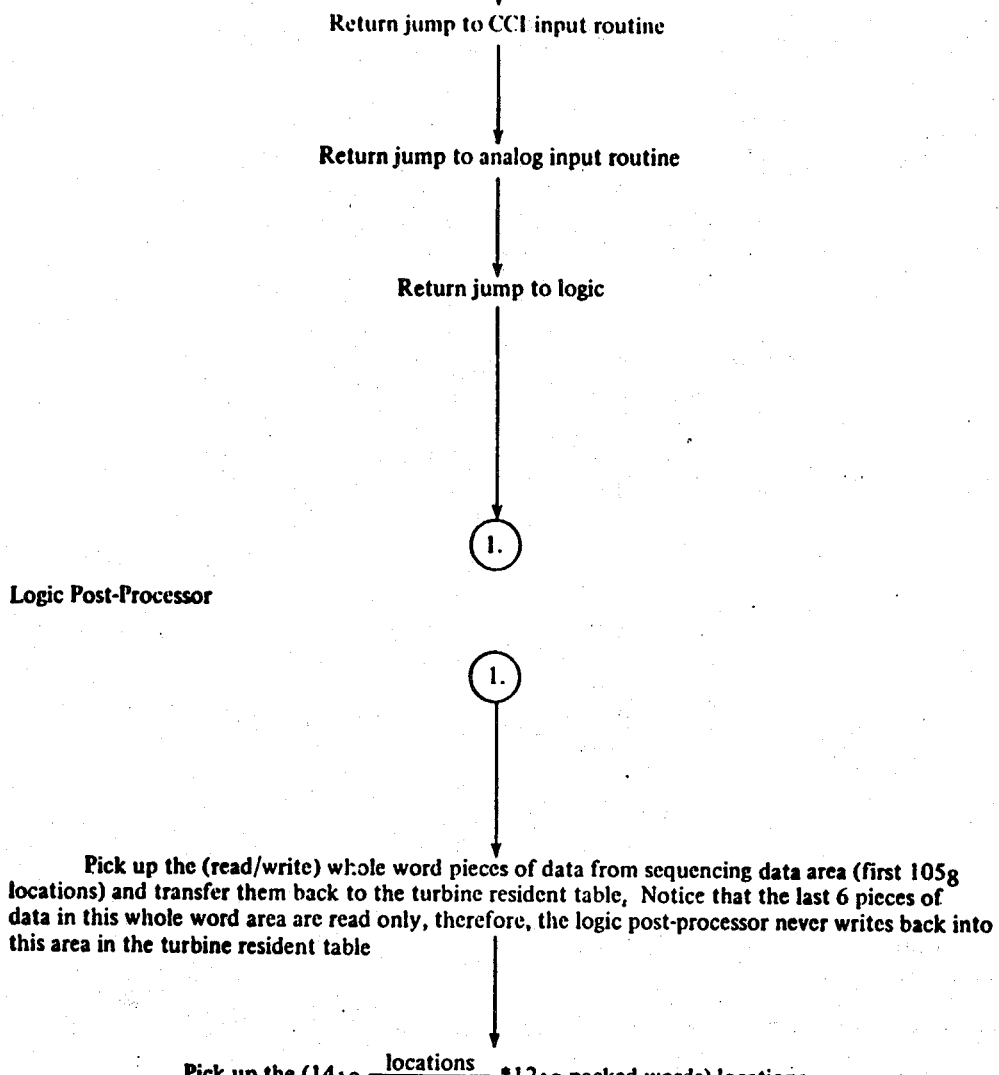

Logic Post-Processor

Pick up the (read/write) whole word pieces of data from sequencing data area (first $105_8$ locations) and transfer them back to the turbine resident table. Notice that the last 6 pieces of data in this whole word area are read only, therefore, the logic post-processor never writes back into this area in the turbine resident table Pick up the $(14_{10} \frac{\text{locations}}{\text{packed word}} * 12_{10}$ packed words) locations Following the whole word section of the sequencing data area and pack the most significant bits of these $(14_{10} * 12_{10})$ locations into the $12_{10}$ packed words in the packed word section of the turbine resident table. The packing is accomplished in the following manner:

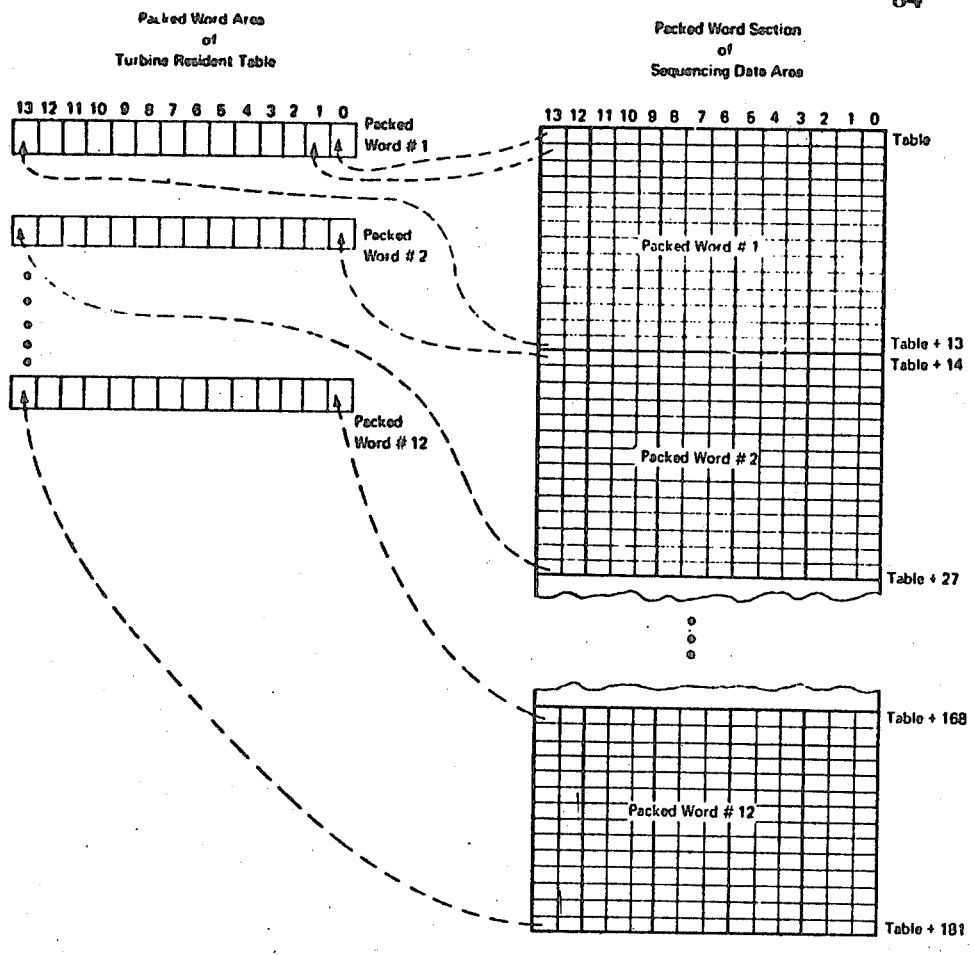

NOTE:  a. The most significant bits of the first 14 words in the packed word section of the sequencing data area are packed into bits 0 thru 13 of first packed word in turbine resident table as shown above.

b. Then the most significant bits of the second 14 words of the sequencing data area are packed into bits 0 thru 13 of second packed word in turbine resident table. This procedure continues until all words are packed into turbine resident table.

| MASTER LOGIC TABLE | TURBINE RESIDENT TABLE |
|---|---|
| IMAGE OF TURBINE RESIDENT TABLE (SEQUENCING DATA AREA) READ ONLY AREA - LOGIC INPUTS SET BY OPERATOR PANEL PROGRAM CCI'S (WHOLE WORD) CCO'S (WHOLE WORD) ANALOG INPUT VALUES LOCAL VARIABLES (WHOLE WORD-SET BY LOGIC PROGRAM) LOGIC PARAMETERS, CHECK LIMITS, ETC. | BEGINNING ADDRESS OF TABLE, TURBINE NUMBER, HIGH CCI CHANNEL NUMBER AND HIGH CCO REGISTER NUMBER OF TURBINE IDENTIFIED BY TURBINE NUMBER. HOUR TIME DELAYS (3 WORDS/DELAY) SECOND TIME DELAYS (2 WORDS/DELAY) COUNTERS ELAPSED HOUR TABLES FOR OPERATION MODES ALARM TABLES (PACKED BITS) SEVEN PACKED WORDS (READ/WRITE) ONE SPARE PACKED WORD THREE PACKED WORDS (READ ONLY) ONE SPARE PACKED WORD |

ALARM TABLE

| BIT# | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| | | | | | | TURBINE A | | | | | | | | |
| 10100 | 1 FLME 6A 15 43MC PERM 29 L631 LUBE 43 639D HI 57 ALM 71 LT35 HI | 2 FLME 6B 16 43PSG PERM 30 637 OVSPD 44 639D LO 58 DC4 SHDWN 72 27A LO CHG | 3 FLME 7A 17 41A CLOSED 31 27D LO CHG 45 VB2 ALM EX 59 DC4 RLY 61 73 26EA TMP | 4 FLME 7B 18 43SD/43SM 32 2619 HI 46 VB1 ALM GN 60 XMR XFR 74 26BA TMP | 5 FLME SHTDWN 19 VIB SHTDWN 33 VB4 ALM EX 47 6310 SUCT 61 FL PUMP TO OIL 75 LT26 BRGHI | 6 OPEN T/C 20 70AP FAIL 34 VB3 ALM IN 48 711 RES LO 62 INV XFR 76 LT25 BRGHI | 7 SEQ CK3 21 639GH GAS 35 FRI/2 FIRE 49 LT29 LUB HI 63 INV FAIL 77 LT24 BRGHI | 8 SEQ CK1 22 639GL GAS 36 639DS LO 50 6311 AIRLO 64 TRANS 78 LT23 BRGHI | 9 SEQ CK4 23 BLVLV1 OPEN 37 NOT ON TG 51 DC1 ALM 65 60CFVB >70°F. 79 LT22 BRGHI | 10 EXHT/C FAIL 24 BLVLV2 OPEN 38 LOSS STRT DEV 52 DC1 SH DWN 66 LT36-LT33 27B 80 LT21 BRGHI | 11 LT28 LO 25 332 NOT OP 39 LO-ATM AIR 53 DC2 ALM 67 81B GRD 81 LT20 BRGHI | 12 L636 HI 26 331 NOT CL 40 27DC OLAX 54 DC2 SHDWN 68 BUS GR2 82 LT19 BRGHI | 13 69SR PERM 27 26BD TMP 41 BLVLV1 CLOSED 55 DC3 ALM 69 GEN GR1 83 LT18 BRGHI | 14 SPD REF HI 28 26ED TMP 42 BLVLV1 CLOSED 56 DC3 SHDWN 70 GEN LOCKOUT 84 LT17 BRGHI |
| 10101 | | | | | | | | | | | | | | |
| 10102 | | | | | | | | | | | | | | |
| 10103 | | | | | | | | | | | | | | |
| 10104 | | | | | | | | | | | | | | |
| 10105 | | | | | | | | | | | | | | |
| | | | | | | TURBINE B | | | | | | | | |
| 10230 | 1 FLME 6A 15 43MC PERM 29 L631 LUBE 43 639D HI 57 DC4 ALM 71 LT35 HI | 2 FLME 6B 16 43PSG PERM 30 637 OVSPD 44 639D LO 58 DC4 SHDWN 72 27A LO CHG | 3 FLME 7A 17 41A CLOSED 31 27D LO CHG 45 VB2 ALM EX 59 XMR RLY 61 73 26EA TMP | 4 FLME 7B 18 43SD/43SM 32 2619 HI 46 VB1 ALM GN 60 FL PUMP XFR 74 26BA TMP | 5 FLME SHTDWN 19 V1B SHTDWN 33 VB4 ALM EX 47 6310 SUCT 61 XFR TO OIL 75 LT26 BRGHI | 6 OPEN T/C 20 70AP FAIL 34 VB3 ALM IN 48 711 RES LO 62 INV XFR 76 LT25 BRGHI | 7 SEQ CK3 21 639GH GAS 35 FRI/2 FIRE 49 LT29 LUB HI 63 TRANS FAIL 77 LT24 BRGHI | 8 SEQ CK1 22 639GL GAS 36 639DS LO 50 6311 AIRLO 64 60CFVB 78 LT23 BRGHI | 9 SEQ CK4 23 BLVLV1 OPEN 37 NOT ON TG 51 DC1 ALM 65 LT36-LT33 >70°F. 79 LT22 BRGHI | 10 EXHT/C FAIL 24 BLVLV2 OPEN 38 LOSS STRT DEV 52 DC1 SH DWN 66 81B 27B 80 LT21 BRGHI | 11 LT28 LO 25 332 NOT OP 39 LO-ATM AIR 53 DC2 ALM 67 BUS GRD 81 LT20 BRGHI | 12 L636 HI 26 331 NOT CL 40 27DC OLAX 54 DC2 SHDWN 68 GEN GR2 82 LT19 BRGHI | 13 69SR PERM 27 26BD TMP 41 BLVLV1 CLOSED 55 DC3 ALM 69 CEN GR1 83 LT18 BRGHI | 14 3PD REF HI 28 26ED TMP 42 BLVLV2 CLOSED 56 DC3 SHDWN 70 GEN LOCKOUT 84 LT17 BRGHI |
| 10231 | | | | | | | | | | | | | | |
| 10232 | | | | | | | | | | | | | | |
| 10233 | | | | | | | | | | | | | | |
| 10234 | | | | | | | | | | | | | | |
| 10235 | | | | | | | | | | | | | | |
| | | | | | | TURBINE C | | | | | | | | |
| 10360 | 1 FLME 6A 15 43MC PERM 29 L631 LUBE | 2 FLME 6B 16 43PSG PERM 30 637 OVSPD | 3 FLME 7A 17 41A CLOSED 31 27D LO CHG | 4 FLME 7B 18 43SD/43SM 32 2619 HI | 5 FLME SHTDWN 19 V18 SHTDWN 33 VB4 ALM EX | 6 OPEN T/C 20 70AP FAIL 34 VB3 ALM IN | 7 SEQ CK3 21 639GH GAS 35 FRI/2 FIRE | 8 SEQ CK1 22 639GL GAS 36 639DS LO | 9 SEQ CK4 23 BLVLV1 OPEN 37 NOT ON TG | 10 EXHT/C FAIL 24 BLVLV2 OPEN 38 LOSS STRT DEV | 11 LT23 LO 25 332 NOT OP 39 LO-ATM AIR | 12 L636 HI 26 331 NOT CL 40 27DC OLAX | 13 69SR PERM 27 26BD TMP 41 BLVLV1 CLOSED | 14 SPD REF HI 28 26ED TMP 42 BLVLV2 CLOSED |
| 10361 | | | | | | | | | | | | | | |
| 10362 | | | | | | | | | | | | | | |

ALARM TABLE-continued

| BIT# | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 10363 | 43<br>639D<br>HI | 44<br>639D<br>LO | 45<br>VB2<br>ALM EX | 46<br>VB1<br>ALM GN | 47<br>6310<br>SUCT | 48<br>711<br>RES LO | 49<br>LT29<br>LUB HI | 50<br>6311<br>AIRLO | 51<br>DC1<br>ALM | 52<br>DC1<br>SH DWN | 53<br>DC2<br>ALM | 54<br>DC2<br>SHDWN | 55<br>DC3<br>ALM | 56<br>DC3<br>SHDWN |
| 10364 | 57<br>DC4<br>ALM | 58<br>DC4<br>SHDWN | 59<br>XNR<br>RLY 61 | 60<br>FL PUMP<br>XFR | 61<br>XFR<br>TO OIL | 62<br>INV<br>XFR | 63<br>TRANS<br>FAIL | 64<br>60CFVB | 65<br>LT36-LT33<br>>70° F. | 66<br>81B<br>27B | 67<br>BUS<br>GRD | 68<br>GEN<br>GR2 | 69<br>GEN<br>GR1 | 70<br>GEN<br>LOCKOUT |
| 10365 | 71<br>ALM | 72<br>27A<br>LO CHG | 73<br>26EA<br>TMP | 74<br>26BA<br>TMP | 75<br>LT26<br>BRGHI | 76<br>LT25<br>BRGHI | 77<br>LT24<br>BRGHI | 78<br>LT23<br>BRGHI | 79<br>LT22<br>BRGHI | 80<br>LT21<br>BRGHI | 81<br>LT20<br>BRGHI | 82<br>LT19<br>BRGHI | 83<br>LT18<br>BRGHI | 84<br>LT17<br>BRGHI |

TURBINE D

| BIT# | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 10510 | 1<br>FLME | 2<br>FLME | 3<br>FLME | 4<br>FLME | 5<br>FLME<br>SHTDWN | 6<br>OPEN<br>T/C | 7<br>SEQ<br>CK3 | 8<br>SEQ<br>CK1 | 9<br>SEQ<br>CK4 | 10<br>EXHT/C<br>FAIL | 11<br>LT28<br>LO | 12<br>L636<br>HI | 13<br>69SR<br>PERM | 14<br>SPD<br>REF HI |
| 10511 | 6A<br>15<br>43MC<br>PERM | 6B<br>16<br>43PSG<br>PERM | 7A<br>17<br>41A<br>CLOSED | 7B<br>18<br>43SD/<br>43SM | 19<br>V18<br>SHTDWN | 20<br>70AP<br>FAIL | 21<br>639GH<br>GAS | 22<br>639GL<br>GAS | 23<br>BLVLV1<br>OPEN | 24<br>BLVLV2<br>OPEN | 25<br>332<br>NOT OP | 26<br>331<br>NOT CL | 27<br>26BD<br>TMP | 28<br>26ED<br>TMP |
| 10512 | 29<br>L631<br>LUBE | 30<br>637<br>OVSPD | 31<br>27D<br>LO CHG | 32<br>2619<br>HI | 33<br>VB4<br>ALM EX | 34<br>VB3<br>ALM IN | 35<br>FRI/2<br>FIRE | 36<br>639DS<br>LO | 37<br>NOT<br>ON TG | 38<br>LOSS<br>STRT DEV | 39<br>LO-ATM<br>AIR | 40<br>27DC<br>OLAX | 41<br>BLVLV1<br>CLOSED | 42<br>BLVLV2<br>CLOSED |
| 10513 | 43<br>639D<br>HI | 44<br>639D<br>LO | 45<br>VB2<br>ALM EX | 46<br>VB1<br>ALM GN | 47<br>6310<br>SUCT | 48<br>711<br>RES LO | 49<br>LT29<br>LUB HI | 50<br>6311<br>AIRLO | 51<br>DC1<br>ALM | 52<br>DC1<br>SH DWN | 53<br>DC2<br>ALM | 54<br>DC2<br>SHDWN | 55<br>DC3<br>ALM | 56<br>DC3<br>SHDWN |
| 10514 | 57<br>DC4<br>ALM | 58<br>DC4<br>SHDWN | 59<br>XMR<br>RLY 61 | 60<br>FL PUMP<br>XFR | 61<br>XFR<br>TO OIL | 62<br>INV<br>XFR | 63<br>TRANS<br>FAIL | 64<br>60CFVB | 65<br>LT36-LT33<br>>70° F. | 66<br>81B<br>27B | 67<br>BUS<br>GRD | 68<br>GEN<br>GR2 | 69<br>GEN<br>GR1 | 70<br>GEN<br>LOCKOUT |
| 10515 | 71<br>LT35<br>HI | 72<br>27A<br>LO CHG | 73<br>26EA<br>TMP | 74<br>26BA<br>TMP | 75<br>LT26<br>BRGHI | 76<br>LT25<br>BRGHI | 77<br>LT24<br>BRGHI | 78<br>LT23<br>BRGHI | 79<br>LT22<br>BRGHI | 80<br>LT21<br>BRGHI | 81<br>LT20<br>BRGHI | 82<br>LT19<br>BRGHI | 83<br>LT18<br>BRGHI | 84<br>LT17<br>BRGHI |

CCO Post-Processor (2.)

Enter and store number of 14-bit CCO register

Pick up and store (last address-13) address of CCO portion of master logic table Pick up and store the number of the last CCO register Enter and store the address of the mask of the last register Enter and store bit mask for last register Enter address of first word in CCO portion of master logic table to be packed. This address is the last address of the CCO portion of master logic table-13

(3.)

Return jump to the pack subroutine which will pack the CCO portion of the general logic table into 14-bit CCO registers as follows: (see PAK subroutine for method)

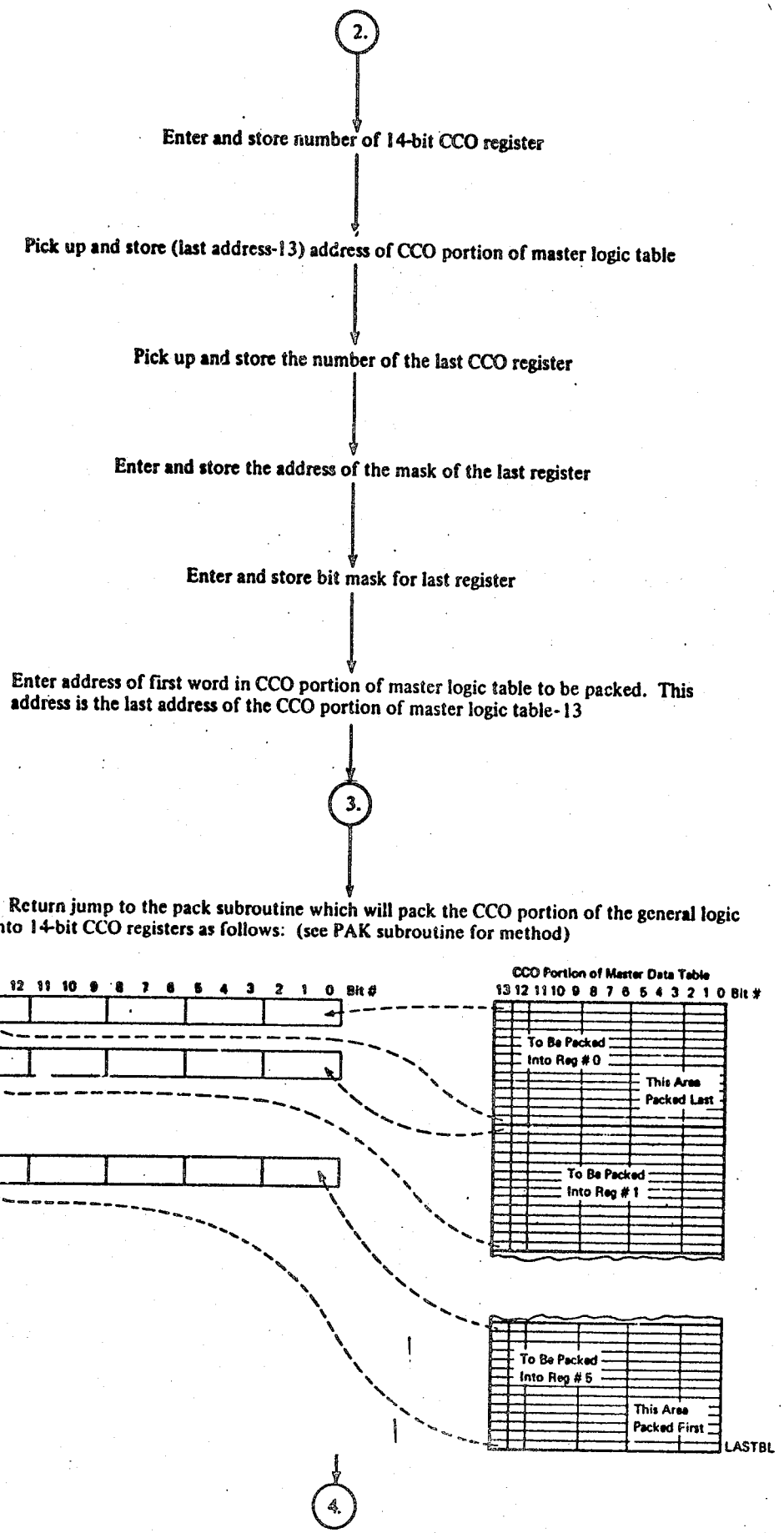

(4.)

Return jump to CCOENT routine with packed word (begin with last register) and mask corresponding to this packed word in the two locations immediately following the CCOENT call instruction.

The CCOENT routine compares the packed word and its mask. If respective bits in packed word and mask are set, set the corresponding output contact.

Continue this process until all the CCO portion of the general logic area has been packed into the registers and each register has been compared with its mask, setting the proper outputs

| BIT # | 13 | 12 | 11 | 10 | 9 | 8 | 7 | 6 | 5 | 4 | 3 | 2 | 1 | 0 |
|---|---|---|---|---|---|---|---|---|---|---|---|---|---|---|
| | | | | | | | CCO | | | | | | | |
| Register 0 | 52GT Gen. Bkr. Trip | 52GC Gen. Bkr. Close | 52MT Start Motor Bkr. Trip | 52MC Start Motor Bkr. Close | 2829D Diesel Trip Contact* | Start Diesel* | Combustor Shell Pressure Solenoid* | 202A Overspd. Trip Solenoid* | 31X Ignition Relay* | | | 41T Field Bkr. Trip Output | 41C Field Bkr. Close Output | |
| Register 1 | HOLDLP Hold Lamp | | | | SYSRLP System Reserve Lamp | | | PEAKLP Peak Lamp | BASELP Base Lamp | MINLP Min. Lamp | | | GBKRLP Gen. Bkr. Lamp | FBKRLP Field Bkr. Lamp |
| Register 2 | FLONLP Fuel On Lamp | IGNLP Ignition Lamp | OSTPLP Overspd Trip Press. Lamp | OSTVLP Overspd Trip Valve Lamp | BRPSLP Bearing Oil Press. Lamp | SDEVLP Start Device On Lamp | AXPONL Aux. Pump On Lamp | TGONLP Turning Gear On Lamp | LBPSLP Lube Oil Press. Lamp | MCONLP Master Contact On Lamp | TTRLP Turbine Trips Reset Lamp | AXRSLP Aux. Reset Lamp | | |
| Register 3 | GSNLP Gas Supply Normal Lamp | SPNLP Spin Lamp | NSPLP Normal Stop Lamp | ESPLP Emerg. Stop Lamp | GENTRL Generator Trip Lamp | | | SNCSPL Sync. Speed Lamp | RTSLP Ready To Start Lamp | BVCLDL Bleed Valves Closed Lamp | FLMC7L Flame Detector 7 Lamp | FLMC6L Flame Detector 6 Lamp | | |
| Register 4 | L2017 AMARSL Atomizer Air Solen. | L20102 Compr. Bleed Valve Solen. #2 | L20101 Compr. Bleed Valve Solen. #1* | 201D Oil Isolation Valve* | 203B Gas Blowdown Valve* | 201G Gas Isolation Valve* | L2035 C2035 Inst. Air Solenoid* | SDNLP Shut Down Lamp | | ESRTLP Emerg. Start Lamp | | XFRLP XFER Lamp | MIXLP Mix Lamp | GASLP Gas Lamp |
| Register 5 | 88EC Evap. Cooler* | | | 88VE Vapor Extractor* | 88CP 88CPX Lube Oil Circ. Pump* | 73LHX Lube Oil Heater* | 88LCL 88CLX Lube Oil Low* | 88LCH 88CHX Cool Fan High* | 88ALX Aux. Lube Pump Lines-Starter* | 88TC2 Turbine Cooler #2* | 88TC1 Air Fans #1* | 88TG Turning Gear* | 88TPD Fuel XFER DC* | 88TPA Pumps AC* |

*(available as lamps)

c. Plant Sequence Functions

Generally, the sequence control subsystem embraces certain logic operations which provide for an orderly advance of the process through startup, run and shutdown operations while providing many operating advantages. In providing sequence operations, the sequence control subsystem includes the sequencing program which interacts with the control program and with plant devices to provide direction to process events and simultaneously to provide plant and turbine protection.

The plant sequence functions associated with startup of the gas turbine 104 to operate the power plant 100 have previously been generally considered in connection with the startup chart shown in FIG. 18. In the startup process, a programmed computer master contactor function and operation selectors are employed to force the sequence of starting and operation to assure that turbine startup will normally take place over a fixed predefined time interval for the reasons previously considered. For plant startup to be enabled, certain plant conditions must exist.

Thus, the software master contactor serves to establish and disestablish logic conditions necessary for initiating the making and braking of external control circuits for equipment startup and shutdown operations under predetermined plant and equipment conditions. All maintenance and transfer switches including the following must be in the correct position for starting:

| Motor Control Center (43 MC) | Pressure Switch & Gauge Cabinet (43 PSG) |
|---|---|
| Diesel Heater | Ignition |
| Lube Oil Reservoir | Overspeed Trip |
| Instrument Air | Isolation Gas |
| Turbine Cooling Air #1 | Isolation Oil |
| Turbine Cooling Air #2 | Instrument Air Isolation |
| Vapor Extractor | |
| Lube Oil Cooler - Low | |
| Lube Oil Cooler - High | |
| Atomizing Air | |
| Auxiliary Lube Pump | |
| Lube Oil Circulating Pump | |
| Fuel Transfer Pump AC | |
| Fuel Transfer Pump DC | |

In addition, the turbine unit speed must be below 10% rated speed, the field breaker must be correctly positioned and all turbine malfunctions must be corrected. When the turbine unit is available for startup, the TURBINE AUX RESET and TURBINE TRIP RESET sequence lamps are lit and a third lamp READY TO START is lit if both of the reset lamps are lit.

Other conditions which should be preset include the closing of all associated control and service breakers as well as AB breakers which supply power to motor circuits. If the computer system 305 had been deenergized, the computer breakers must be closed and the computer must be started and the time of day entered. All alarm conditions must be acknowledged and lockout relays reset. A remote or local operator's control selection also must be made.

More prestart checks include;
1. At least one of each pair of flame detector contacts open.
2. Oil reservoir not too cold.
3. Speed reference & fuel demand signals in proper range.
4. Safe run switch on PSGC positioned properly.
5. Voltage regulator motor operated rheostats (voltage adjust & base) in preset start position.
6. Dead computer system reset & 48V CCI detection voltage source available.

Under local control, the LOAD MINIMUM or LOAD BASE or LOAD PEAK or EMERGENCY START pushbutton can be used to initiate a gas turbine startup. A master contactor function is then enabled to cause an auxiliary lubrication pump starter to be energized and an instrument air solenoid valve 20-35 (IEEE) to be opened. In addition, a combustor shell pressure transducer line drain solenoid valve 20-25 (IEEE) is closed and the AC or DC fuel transfer pump is energized. After the auxiliary lubrication pump builds up sufficient pressure to operate a pressure switch 63-4 (IEEE), a starter for the turning gear is operated. Thirty seconds are allowed by a timer 62Q (IEEE) for lubrication pressure to build up or the turbine unit is shut down. The sequence is continued if the turning gear line starter is operated. Next, the master contactor function enables startup operations for the starting engine 126 if lubrication oil pressure causes the operation of a pressure switch 63-1 (IEEE).

At about 15% rated speed, the turning gear motor is desirably turned off. However, it may be kept on to a higher speed such as 50% to keep the diesel on where diesel seal in is not used. At firing speed as sensed by an axial compressor pressure switch 63-6 (IEEE), a turbine overspeed trip solenoid 20-2A (IEEE) and under pneumatic control, a vent solenoid 20-3B (IEEE) are energized to reset. With adequate buildup of overspeed trip solenoid oil pressure, a pressure switch 63-7 (IEEE) is closed to allow ignition.

The ignition sequence includes energizing the ignition transformer and setting the fuel control circuits as determined from the mode of fuel selected by the operator. A selectable time period, in this case 30 seconds is allowed for establishing flame in both detected combustor baskets or, after three ignition attempts with appropriate purge times, the unit is shut down. An ignition timing function allows certain predetermined purge time between successive ignition attempts. Atomizing air flow is initiated as required for liquid or oil fuel supply.

At approximately 60% rated speed, shutdown of the starting engine 126 is initiated. As successive predetermined combustor shell pressures are detected near synchronous speed, the respective bleed valves are closed.

During the time period from the ignition to synchronous operation, the control system 300 is placed in the Mode 1 operation and the gas turbine speed reference is increased in a program controlled nonlinear manner to determine the fuel valve positioning. With the compressor inlet temperature at 80° F., the desired acceleration is achieved with the turbine inlet temperature limited to 1200° F. for a normal start and 1500° F. for an emergency start.

When the turbine has been advanced to idle (or top or synchronous) speed, it is ready to be synchronized and the control system 300 is transferred to Mode 2 operation in which either manual or automatic synchronizing is performed following field breaker closure. When the turbine-generator unit is synchronized and the generator breaker is closed, the control system 300 is transferred to Mode 3 or Mode 4 operation and the speed reference is set at a value of 106% rated speed. Load is ramped to a predetermined level at a predetermined rate under programmed computer operation as previously generally considered.

With respect to maintenance operations, the computer 304 is programmed to count the number of normal and emergency starts and to accumulate the number of hours at various levels of load operation. Maintenence procedures are speeded by the availability of the five hold points in the starting sequence considered previously in connection with the operator's panel 120 and the availability of manual procedures for operating the voltage regulator and for synchronizing from the operator's panel 120. The ability to display thermocouple temperatures, vibration levels, and various other variables and the ability to change limits through use of the operator's console package also provides maintenance convenience.

Shutdown of the gas turbine is caused if any of three time checks fail during the startup sequence. The first time check which measures time from initiation of the master contactor function to ignition speed has already been considered. In addition, a check is made on the time from detection of flame in both combustor baskets to 60% speed. Further, a check is made on the time from starting engine trip at 60% rated speed to idle speed.

If a normal shutdown is requested locally or remotely the load is first cut back at a predetermined rate until minimum load is reached and the generator main and field breakers and the fuel valves are then tripped. In an emergency shutdown, the generator main and field breakers and the fuel valves are tripped immediately without reducing the load to the minimum level. All trouble shutdowns are classified as emergency shutdowns.

The gas turbine 104 coasts down during shutdown and as the oil pressure from the shaft driven pump drops the DC auxiliary lubrication oil pump is energized. At about 15% rated speed, or at a higher speed such as 50% rated, the turning gear speed equal to about 5 RPM, a turning gear overrunning clutch engages to allow the turning gear motor to rotate the turbine at the turning gear speed. After the cooling period of up to 60 hours, the turning gear and the auxiliary lubrication oil pump are stopped and the shutdown sequence is completed.

d. Sequence Logic Charts

In FIGS. 33A through 33F, there are shown logic diagrams representing the various alarm and sequencing functions performed by the sequencing program 600 in the block 626 (FIG. 31) each time it is executed. Predetermined logic building blocks are employed in defining the conditions for the performance of the sequencing program functions. Each block contains a symbol identifying its function and a number of alphanumeric character providing a program block identification. The logic function identifying symbol is generally located above the program block identification character. The following is a list of the logic symbols and the logic functions to which they correspond:

| | |
|---|---|
| A | And |
| OR | OR |
| FL | Flip Flop |
| SS | SINGLE SHOT |
| DB | DEAD BAND |
| NOT | INVERSION |
| TDH | TIME DELAY - HOURS |
| TDS | TIME DELAY - SECONDS |

With respect to flip-flops FL, the letter S signifies a set input and the letter C signifies a clear input. On the rightmost side of each flip-flop block, the numerals 1 and 0 indicate outputs and the 1 output is assumed to have a logic state of 1 when the flip-flop is set and the 0 output is assumed to have a logic state of 1 when the flip-flop is cleared.

Figure 33A:
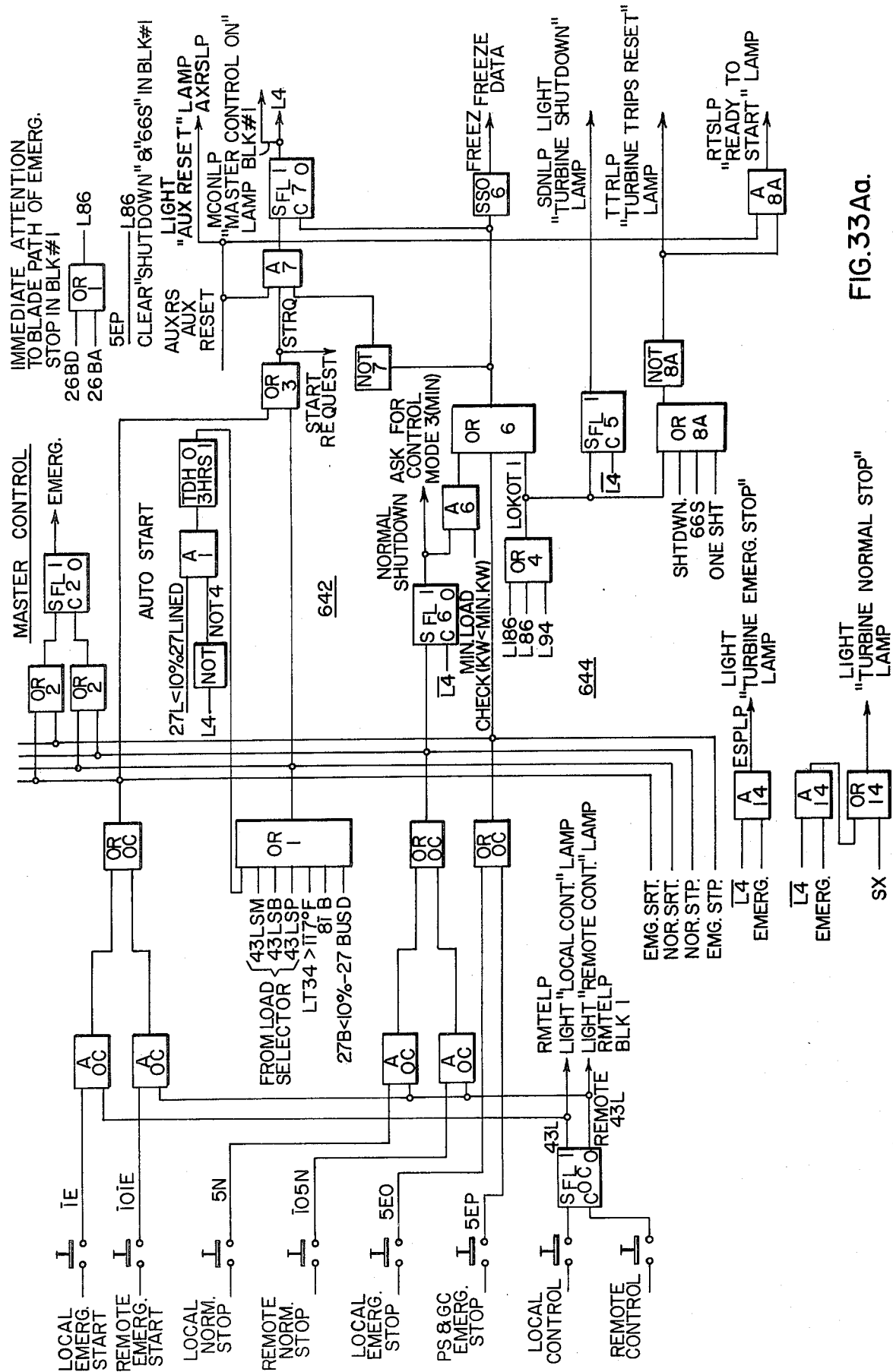
FIGS. 33A$a$ 33A$b$, 33B1$a$ 33B1$b$ 33B2 33C1 33C2 33D2 33D1$a$ 33D1$b$ 33E$a$ 33E$b$ 33F$a$ and 33F$b$ show a plurality of logic diagrams representative of teh sequencing logic performed by the sequencing program.

In Fig. 33A, there is principally shown the logic associated with start/stop operations and the master contactor or control function to which reference has already been made. Generally, logic diagram 642 pertains to the master contactor or control function generated by flip-flop FL7 as a function of pushbutton operations and other conditions. Similarly, logic diagram 644 relates to the generation of a shutdown operation in response to pushbutton, shutdown alarm and other conditions. Thus, shutdown OR block OR6 resets the master contact function flip-flop FL7 when a shutdown is initiated. In the logic diagram 644, alarm shutdowns are initiated by line L86 through block OR4 as derived from the lower left area of FIG. 33D. On shutdown, single shot block 6 provides for registering predetermined data. Shutdown operation of the starting engine is set forth in FIG. 33B.

Other sequencing program logic functions set forth in logic diagram form in FIG. 33A include a plurality of generator alarms designated as OR GEN BLK blocks. In addition, block OR1 provides for immediate shutdown on blade path over-temperature through block OR4. Single shot blocks 4, 5 and 14 respectively provide normal start counts, emergency start counts, and abort counts. A list of miscellaneous alarms is also included.

Figure 33A:
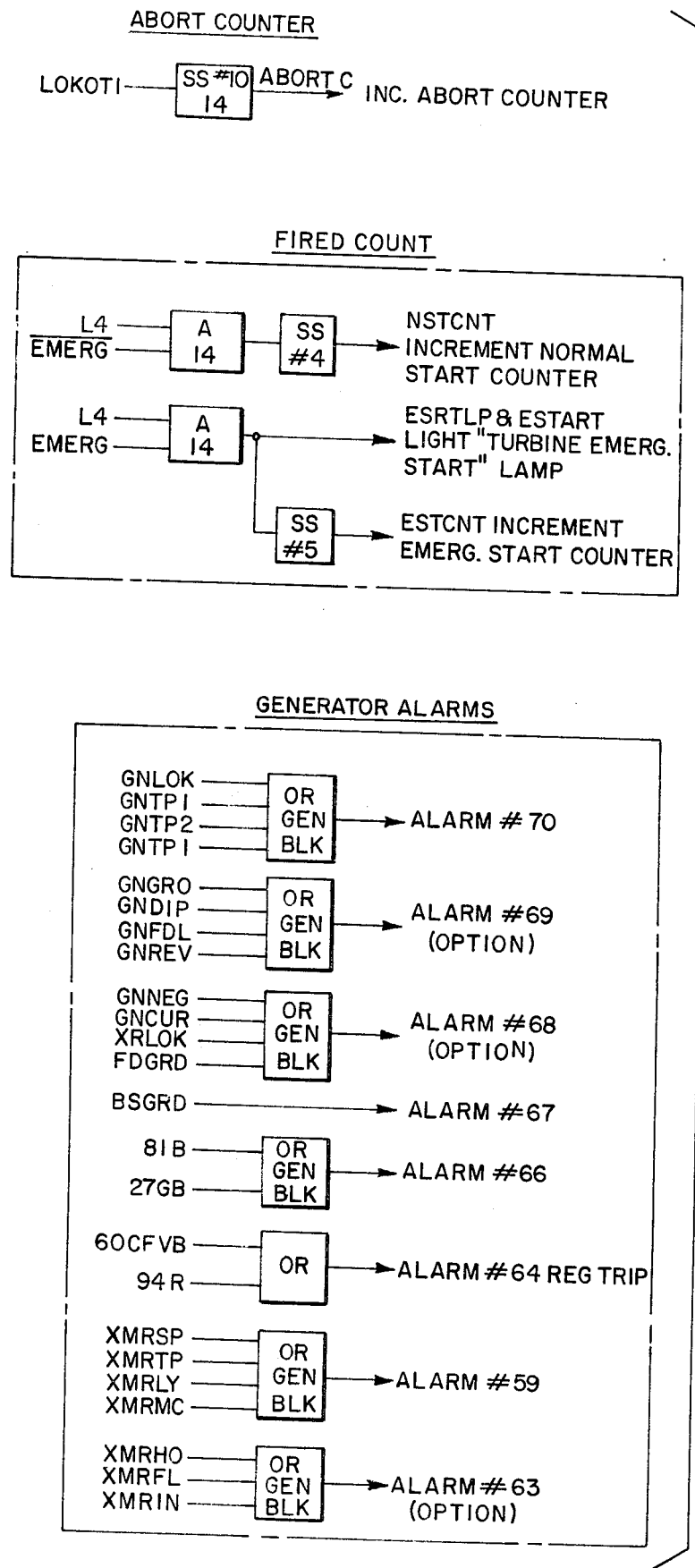

In FIG. 33 B, there are shown principally the logic diagrams associated with the turbine sequencing functions from the point in time at which the master contact function is initiated up to ignition. In logic diagram 646, flip-flop FL9 registers the master contactor function from line L4 to energize the auxiliary lubrication oil pump line starter. The turbine turning gear starter is then energized by a block A9 if no HOLD is present. The logic block A9 also causes the turning gear motor to be turned off at the selected speed such as 15% rated as in FIG. 18 or at 50% rated as in the application described herein. If the lubrication pressure does not build up within 30 seconds, the turbine shuts down. FL9 is cleared after a minimum of 60 hours cooloff to control turning gear cooloff operation.

Block OR14 provides for instrument air valve solenoid energization in response to the master contactor function L4. On shutdown, the instrument air is left on until coastdown to about 10% rated where 63-6 is reset. Block A10 causes diesel startup once the block input conditions are satisfied including the master contactor function L4, turning gear energization and adequate lubrication oil pressure. Overspeed trip valve solenoid operation and gas valve solenoid operation are initiated by block A11 when the gas turbine 104 has reached firing speed and when purge time has expired.

Once the input logic conditions are satisfied for block A17, the ignition relay is caused to be energized by block A20 and a time delay function is initiated by block TD19. When fuel oil is selected, block A20 provides for appropriately timed introduction of atomizing air into the combustor baskets. Other functions performed in firing logic diagram 648 include flame detector logic processing for alarms as provided by blocks A21 through A24. The logic for combustor basket purging and multiple ignition attempts and turbine shutdown following ignition failure is also included in logic diagram 648.

Other logic functions included in FIG. 33B are the time of ignition speed check provided by AND block A13 and the time check for flame verification to 60% speed provided by block A68A. The conditions which define starting motor trip are processed by block OR38 and diesel shutdown is initiated by block OR10 at 60% rated speed. Operation of the compressor bleed valve solenoids, the evaporative cooler, the circulating oil pump, and the lubrication oil cooler fan are provided as indicated by the associated logic blocks.

The sequencing logic associated with Mode 2 operation, i.e. synchronizing, is principally set forth in FIG. 33C. Under the indicated logic conditions, block OR41 in logic diagram 650 provides for field breaker closure. Manual field breaker operation is provided through block AOC while automatic operation is provided through block A41. Automatic and manual field breaker trip is provided through blocks OR42, A42 and SS42.

In logic diagram 652, block OR45 verifies bleed valve closure. If block FLOC indicates a manual sync selection, block AOC provides for generator breaker closure when block FLOC receives a set pulse from the GEN SYNC pushbutton if the GEN BKR CLOSE pushbutton is depressed. Automatic generator breaker closure is provided by block A45 after the automatic synchronization program 608 in response to a request made by block A45 when the appropriate conditions for synchronization are established. Generator breaker trip is provided by block SS47 and by the indicated bearing condition.

Automatic closing of the generator onto a dead bus is provided outside of the automatic synchronizing program. Further, programming interlocking is provided to make sure no more than one generator breaker will attempt to close onto the dead bus simultaneously by the added, unnumbered OR, NOT and TD blocks. Generator voltage must have built up above 13 KV.

Generator voltage control is provided by logic diagram 654 in accordance with operator selections detected by block FL1. The panel RAISE and LOWER pushbuttons cause base rheostat adjustment through the two topmost blocks A1 and voltage adjust rheostat operation through the two lowermost blocks A1. As already considered, voltage adjust rheostat position defines a voltage setpoint to which the local control circuitry resulates the generator voltage. Line breaker functioning is provided as indicated by logic diagram 656. Block A44 provides a time check for operation from starting engine trip to idle speed. Disc cavity temperature alarms are generated by blocks OR80 and A80. Another function includes in FIG. 33C is low limit action provided on the fuel demand signal by block FF91.

The logic processing of local and remote shutdown conditions is shown in logic diagram 658 in FIG. 33D. Blocks OR66 and OR68 cause shutdown through block FF68A and line L86 considered previously in connection with FIG. 33A. The various alarm conditions which result in shutdown are subsequently set forth in connection with consideration of the alarm program 610.

It is noteworthy that a multiple shot provision is provided for shutdown. Instead of the usual shutdown and lockout procedure which requires an attendant on the site for restart, a selection can be made by the plant owner as to when lockout will occur. Thus, a number of nonlockout shutdowns is specified for a selected time interval and lockout only occurs when the actual number of shutdowns in the selected time interval exceeds the selected shutdown number by one. For example, lockout may be set if more than one shutdown occurs within a one hour time period.

Other logic features included in FIG. 33D include block OR73-77 which inhibits start under the indicated logic conditions and the various blocks A and OR which generate vibration alarms. Further, remote shutdown and lockout is generated by block FL71. Miscellaneous alarms are provided by blocks A69, A68, A PATCH, and OR PATCH.

In FIG. 33E, logic diagram 660 provides the logic which processes the fuel selection pushbutton settings in determining the fuel control to be operated in the external circuitry at block FL81. Logic diagram 652 relates to a fuel transfer ramp generator which is considered more fully in the previously mentioned copending Reuther patent application. Finally, logic diagram 664 pertains to AC-DC fuel transfer pump control.

Figure 33F:
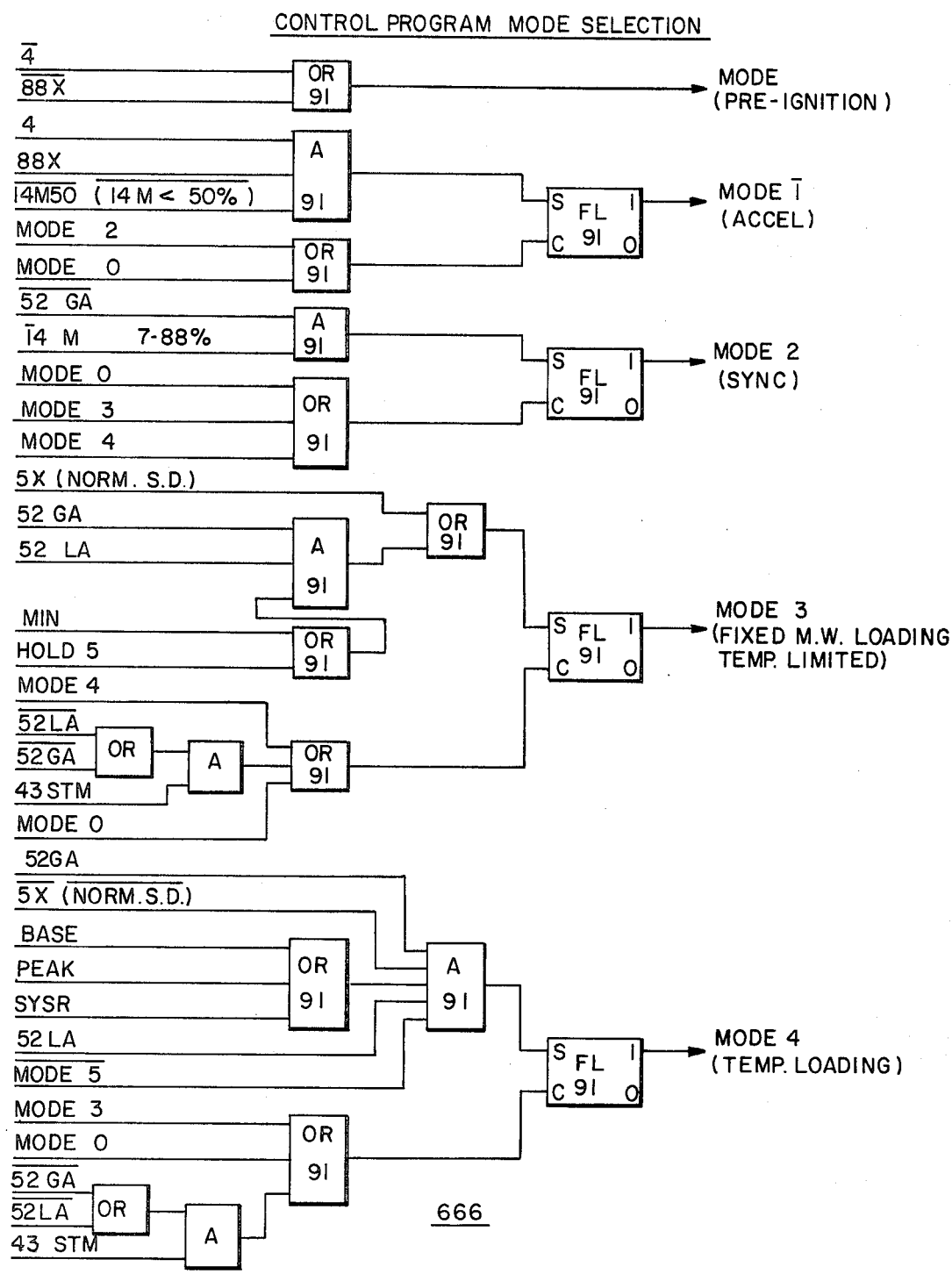

The logic associated with control program mode selection for interface with the control program 602 is set forth in logic diagram 666 in FIG. 33F. Block OR91 and the four blocks FL91 provide the output indications of the control mode. In logic diagram 668, a five state flip-flop FL responds to the indicated logic blocks to detect the pushbutton load selection. The outputs of the block FL are employed in the control program mode selection logic diagram 666 and in the control program 602. The logic employed for incrementing and decrementing the kilowatt reference from the operator's panel 120 is included in the control program 602.

In logic diagram 670, there are provided the logic blocks needed for responding to the various sequence pushbuttons and the HOLD pushbutton to determine when each of the five hold logic blocks FLOC should be set to signal a call for the associated hold. Logic diagram 670 also provides for holding the speed reference during acceleration. HOLD 5 is selected to avoid time out on sequence times. In addition, blocks A89 and OR89 provide for the previously described pushbutton flash conditions. The sequential illumination process on the panel 120 during startup logically and conveniently provides a display of startup information to the plant operator.

e. Macro Instructions For Sequencing Logic And Logic Subroutines And Related Macros In order to improve the efficiency with which desired functions are implemented in machine language instuctions for process control, a group of Macro instructions are employed to provide direct programming of repetitive and interacting elemental function blocks for assembly into machine language. The Macro instructions accordingly provide a compiler type function in the programming process for control system applications. In this case, a set of Macros are constructed to provide for direct programming of logic blocks in a logic system. The Logic Macros generally facilitate process control programming and are particularly advantageous in gas turbine power plant applications because of the volume of sequencing logic involved therein and, accordingly, because of the large amount of programming effort that can be avoided with use of the Logic Macros.

Generally, an assembly or higher level program for a particular computer operates in response to an input statement to generate a machine language form of the input statement. The assembly program is characterized with a set of instructions, and these instructions are used as language elements in making the input statement.

In the present use, the stand P50 assembly program has a macro instruction capability, i.e it is internally structured to accept macros initially defined by assembly language elements. Entry of the Logic Macros into the assembly program enables it to respond to a coding for the Logic Macros during assembly of another program which has been written with use of the Logic Macros along with the assembly language elements. Accordingly, with the use of a Logic Macro, the assembly program is made to respond to the Macro mnemonic and other related key data elements whch follow the mnemonic to generate an entire set of machine language instructions which would otherwise have to be individually entered into the assembly program as individual statements. In use of the assembled program, the Macro generated set of instructions then operates to perform the specified logic function. It is also noteworthy that certain Macros are structured so that the assembly program generates only the necessary machine language statements for processing particular input conditions specified for the Macro as opposed to generating the entire set of possible machine language instructions needed to embrace all of the possible input conditions.

The Logic Macros are made small enough for efficient use in "in line" or "on line" program execution, i.e. for repeated use as opposed to a jump to a single external subroutine. Further, they can be interspersed with assembly language statements or used alone in sequential combinations in the process of writing a program in assembly language. In use, the various Logic Macros represent logic functions for which various input logic conditions can be specified. Each Macro causes the assembly program to generate a set of instructions which operate on the specified Macro input conditions to generate a machine language instruction block which will execute the logic functions defined by the Macro for the specified input conditions. Similar types of results are achieved with the use of Control Macros also employed in the preferred embodiment and set forth in a subsequent section herein.

The Logic and Control Macro details are herein based on the assembly language available for the P50 computer. Other computer applications of the Macros involve the use of other languages associated with those applications.

Logic subroutines employed in the program system and other Macros related to those subroutines are also considered under this heading.

---

TIMING:
1. MACROS
  1. AL1      Load Accumulator

From ———▷ AL
              FORM: AL1 FROM, INDIR
              NOTE: (a) Load FROM in AL
  2. AS1      Store Accumulator A1 ———▷ WHERE
              FORM: AS1 WHERE, INDIR
              NOTE: Store AL at WHERE
  3. XFR      Transfer Value of One Variable to Another FROM ———▷ TO
              FORM: SFR FROM, TO
              NOTE: a. Transfer FROM to TO
                    b. AL is not a valid argument
  4. ORR      Logical Inclusive - Or

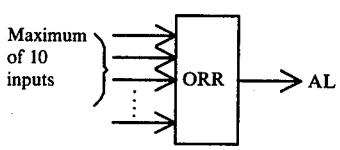

FORM: ORR N, I1, I2, I3, . . ., IN
                    a. N = 1, 2, 3, 4, . . ., 10 inputs
                    b. I = an input varible (AL is valid input argument if and only if
                       placed in I1 position in macro heading)
              NOTE: a. Exit with output in AL
  5. ANN      Logical AND Function

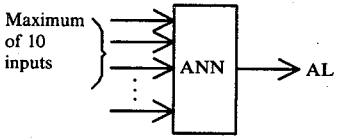

FORM: ANN, N, I1, I2, I3, . . ., IN
                    a. N = 1, 2, 3, 4, . . ., 10 inputs
                    b. I = an input variable (AL is valid input argument only if placed
                       in the I1 position in the macro heading)
              NOTE: a. Exit with output in AL
  6. MAK      Set the State of a Logical Variable

COND ———▷ VAR

-continued (True or False)
FORM: MAK VAR, COND
    a. VAR = Logical variable
    b. COND = condition TRUE or FALSE
NOTE: a. The TRUE condition sets the most significant bit of VAR equal
       to 1 (negative number). The FALSE condition sets the most
       significant bit of VAR equal to 0 (positive number).

7. IFF   Test the State of a Logical Variable

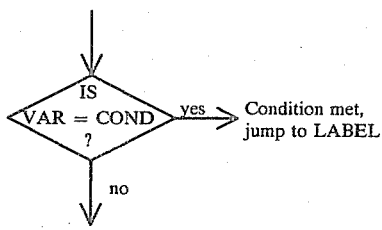

Condition not met,
take next Instruction
FORM: IFF VAR, COND, LABEL
    a. VAR = logical variable (AL is valid)
    b. COND = condition TRUE or FALSE
    c. LABEL = some unique mnemonic 8. NOT   Logical Complement

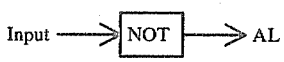

FORM: NOT INPUT
    a. INPUT = input variable (AL is valid)
NOTE: a. Exit with output in AL 9. ALM   Alarm Macro
FORM: ALM ALMBIT
    a. ALMBIT = Alarm bit number of alarm to be set
NOTE: a. Each alarm has been assigned an alarm bit number (1, 2, 3, 4,
      . . ., 84). Capable of handling up to and including 84 alarms since
      six 14-bit words have been alloted for the alarm table.

ALARM TABLE

| 14 | 13 | 12 | 11 | 10 | 9 | 8 | 7 | 6 | 5 | 4 | 3 | 2 | 1 | Word 1 |
|---|---|---|---|---|---|---|---|---|---|---|---|---|---|---|
| 28 | ← | — | — | — | — | — | — | — | — | — | — | — | 15 | Word 2 |
| 42 | ← | — | — | — | — | — | — | — | — | — | — | — | 29 | Word 3 |
| ░░ | ░░ | ░░ | ░░ | — | — | — | — | — | — | — | — | — | 43 | Word 4 |
| ░░ | ░SPARE░ | ░░ | ░░ | 65 | ← | — | — | — | — | — | — | — | 57 | Word 5 |
| ░░ | ░░ | ░░ | ░░ | ░SPARE░ | ░░ | ░░ | ░░ | ░░ | ░░ | ░░ | ░░ | ░░ | ░░ | Word 6 |

10. FFP   Flip - Flop

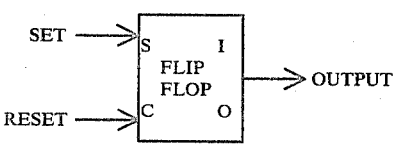

FORM: FFP SET, RESET, OUTPUT
    a. SET = set variable (AL is valid)
    b. RESET = clear variable (AL not valid)
    c. OUTPUT = a logical variable which must be in the turbine resident
        table (AL not valid)
NOTE: a. The OUTPUT remains in the TRUE state until the RESET vari-
      abel becomes TRUE. If both inputs are TRUE, the RESET vari-
      able takes precedence over the SET variable.

11. INC   Increment Specified Variable

VAR + 1 ⟶ VAR
    FORM: INC VAR
        a. VAR = Specified variable
    NOTE: a. Add 1 to the specified variable VAR and store results in VAR.

12. DBD   Dead Band

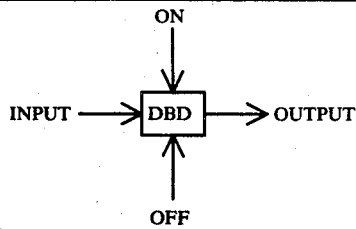

FORM: DBD INPUT, ON, OFF, OUTPUT
    a. INPUT, ON, and OFF arguments must refer to analog type quantities
    b. OUTPUT argument is a logical variable which must be in the turbine resident table (AL not valid)
NOTE: a. if INPUT > ON, OUTPUT = TRUE
         if INPUT < OFF, OUTPUT = FALSE
         if OFF < INPUT < ON, OUTPUT = LAST VALUE 13. JPT    Jump Macro
FORM: JPT LABEL
    a. LABEL = some unique mnemonic
NOTE: a. unconditional jump to LABEL 14. SSF    Single - Shot Function

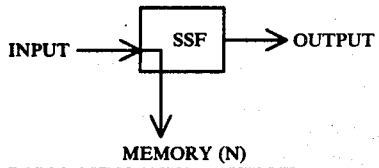

FORM: SSF N, INPUT, OUTPUT
    a. N = number assigned to the particular single shot.
    b. INPUT = input variable (AL valid)
    c. OUTPUT = a logical variable which must be in the turbine resident table (AL not valid)
NOTE: a. OUTPUT = TRUE only for the first period where the input is TRUE

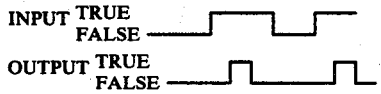

15. TDS    Second Time Delay Macro

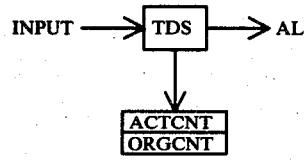

FORM: TDS NUMBER, INPUT
    a. NUMBER = number of the time delay - each second time delay has been assigned a number beginning with 0.
    b. INPUT = variable (AL valid)
NOTE: a. If INPUT is TRUE for "ORGCNT" consecutive periods AL set TRUE. If at any time INPUT goes FALSE, OUTPUT is set FALSE and "ACTCNT" is reset to "ORGCNT"
    b. Exit with output in AL 16. SUM    Add Specified Increment to Variable (VAR) + INCR ⟶ VAR FORM: SUM VAR, INCR
    a. VAR = variable
    b. INCR = specified increment
NOTE: a. Add specified increment to the variable and store the results in the variable location.

17. TDH    Hour Time Delay Macro

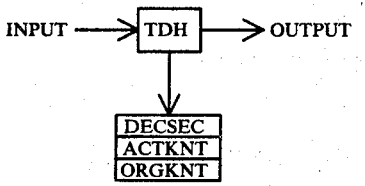

FORM: TDH NUMBER, INPUT
    a. NUMBER = number of the time delay - each hour delay has been assigned a number beginning with 0.
    b. INPUT = input variable (AL valid)
NOTE: a. If INPUT is TRUE for "ORGKNT" periods, AL set TRUE. If -continued at any time INPUT goes false output is set FALSE, "DECSEC"
is reset and "ACTKNT" is reset to "ORGKNT" valve.
b. Exit with output in AL 18. CPS Compare and Set Macro

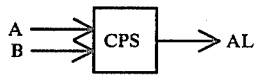

FORM: CPS A, B
 a. A and B are input variables
NOTE: a. If A $\geq$ B; AL set TRUE
   If A $\leq$ B; AL set FALSE
 b. Exit with output in AL 19. NRR Special Macro that "NOT"s Inputs Before "OR"ing

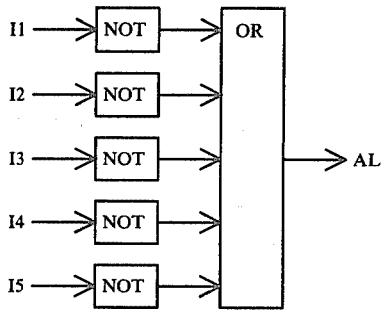

FORM: NRR N, I1, I2, ..., IN
 a. N = number of inputs - maximum capability is five inputs.
 b. I1, I2, ..., IN = input variables (AL valid if and only if used in I1
  position in macro heading)
NOTE: a. Take regular inputs (5 maximum, "NOT" them, and then "OR" them
 b. Exit with OUTPUT in AL 20. CPR Compare Macro

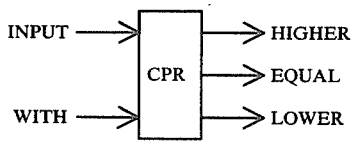

FORM: CPR INPUT, WITH, HIGHER, LOWER, EQUAL
 a. INPUT = input variable
 b. WITH = specified value
 c. HIGHER, LOWER, EQUAL = logic outputs
NOTE: a. INPUT > WITH: HIGHER = TRUE; LOWER = EQUAL = FALSE
   INPUT = WITH: EQUAL = TRUE; HIGHER = LOWER = FALSE
   INPUT < WITH: LOWER = TRUE; HIGHER = EQUAL = FALSE 1. PAK Pack Macro
FORM: PAK WORD, TABLE
 a. WORD = word in resident table where packed word is stored.
  (AL valid)
 b. TABLE = beginning address in sequencing data area where packing begins.

2. UPK Unpack Macro
FORM: UPK WORD, TABLE
 a. WORD = word to be unpacked (Al valid)
 b. TABLE = address where bit 0 of the word being unpacked will
  be stored. Bit 13 is placed in location "TABLE + 13"

3. HCT Hour Count Macro
FORM: HCT HOUR
 a. HOUR = beginning address of elapsed hours table (depending
  upon operation mode) in the sequencing data area.

4. RSF Right Shift Macro
FORM: RSF N
 a. N = number of times the word in question is to be shifted (N $\leq$ 13)

5. SBT Store Bit Macro
FORM: SBT N
 a. BIT N of Operator's Console BIT Table (BITTBL) to the value
  of the sign BIT in the Accumulator. The Accumulator sign BIT
  is left undisturbed.

II. LOGIC SUBROUTINES AND RELATED MACROS

1. Left Shift Subroutine (LSHSB)

With a single call to the left shift subroutine, a 14 bit word can be left shifted a maximum of thirteen times.

Since no macro has been defined to work in conjunction with this subroutine, the word to be shifted and the number of shifts (N $\leq$ 13) must be loaded in the accumulator and designator register respectively upon entry to this subroutine.

By incorporating the P-50 left shift instruction (LSH) and a loop to form the framework of this routine, time has been utilized more efficiently in comparison with using the P-50 left shift instruction solely. The above statement is especially true when it is necessary to left shift a word several times, remembering that one P-50 left shift instruction left shifts the operand to the left one bit position only.

2. Right Shift Subroutine (RSHSB) and Right Shift Macro (RSF)

The right shift subroutine differs from the left shift subroutine in only one respect.

The right shift routine works in conjunction with the right shift macro (RSF) whose only argument is the number of times the specified word is to be right shifted ($N \leq 13$). The prototype instruction of the RSF macro load the number of right shifts in the designator register before calling the right shift subroutine.

In all other respects this routine and the left shift subroutine are identical.

3. Accumulate Elapsed Hours Subroutine (ACMSUB) and Hour Count Macro (HCT)

Working with the hour count macro (HCT), the accumulate hours subroutine keeps track of the number of hours that have elapsed in the various operation modes (minimum, base, peak, and system reserve).

A record of elapsed hours is kept by the first reserving two locations (see table below) for each of the operation modes in the whole word (read/write) portion of the sequencing data area. The first of these two locations houses the number of elapsed hours that have accumulated in the particular operation mode (location initially set to zero). The second location contains the second count (initially set to $3600_{10}$(number of seconds/hour)). The second count is a function of the run period.

Each time the program runs the second count (location two) is decremented until it reaches a negative zero, remembering that when a one is decremented, a negative zero results. At this time the hour count (location one) is incremented and the second count is reset to $3600_{10}$. Thus, at this point in time (using the above as an example), one hour has accumulated in this particular operation mode.

Upon entry into the ACMSUB subroutine the last address in the elapsed hour table (both the address and the table depending upon the mode of operation) must be loaded in the accumulator. The HCT macro sets up this address in the accumulator before calling the ACMSUB subroutine.

difference ($>0, <0,$ or $=0$) is loaded in the accumulator before the compare routine is called. The three locations following the subroutine call instruction in the compare macro contain the address of the output variable to be set on the higher condition (difference$>0$), the address of the variable to be set on the lower condition (difference$<0$), and the address of the variable to be set on the equal condition (difference$=0$) respectively.

Upon entry, the compare subroutine expects the accumulator to be loaded with the difference mentioned above and the location of the outputs to be readily available.

The subroutine compares the difference with the outputs and sets or clears the most significant bits of the outputs to indicate the condition. If the difference$=0$, the most significant bit of the equal variable is set and the most significant bits of the remaining two output variable are cleared. If the difference$<0$, the most significant bit of the lower variable is set, and the most significant bits of the remaining two variables are cleared. If the difference$>0$, the most significant bit of the higher variable is set, and the most significant bits of the remaining two output variables are cleared.

The CPR instruction is used extensively in the ramp generation of the sequencing logic.

5. Second Time Delay Subroutine (TDLSEK) and Second Macro (TDS)

Since there are several second time delays in the sequencing logic which must be taken into consideration, the second time delay subroutine and macro have been defined.

The two arguments in the TDS macro heading are the number of the time delay and the input into this time delay. The prototype instructions of the TDS macro enter the input into the accumulator. The number of the time delay along with the beginning location of the second delay tables in the sequencing data area (SECTBL) are used to determine the last address of the second table for the particular delay being considered. This address is located immediately following the subroutine call instruction in the TDS MACRO.

Once the subroutine has been entered, the input must remain set for "ORGCNT" consecutive seconds before the output is set. That is, the contents of the second delay count location in the tables must be decremented to zero with the input set continuously. If at any time

| ELAPSED HOUR TABLES | | |
|---|---|---|
| HRMIN | Hour Count for Minimum Mode | Table for Minimum Mode |
| HRMIN +1 | Second Count for Minimum Mode | |
| HRBASE | Hour Count for Base Mode | Table for Base Mode |
| HRBASE +1 | Second Count for Base Mode | |
| HRPEAK | Hour Count for Peak Mode | Table for Peak Mode |
| HRPEAK +1 | Second Count for Peak Mode | |
| HRSYSR | Hour Count for System Reserve Mode | Table for System Reserve Mode |
| HRSYSR +1 | Second Count for System Reserve Mode | |

4. Compare Subroutine (CPRSB) and Compare Macro (CPR)

In the macro prototype instructions, a specified value is subtracted from the input, both of which are identified as arguments in the macro heading. The resulting the input goes false, the delay count is started anew and the output is set false.

The second time delay tables configuration is as follows:

SECOND TABLES

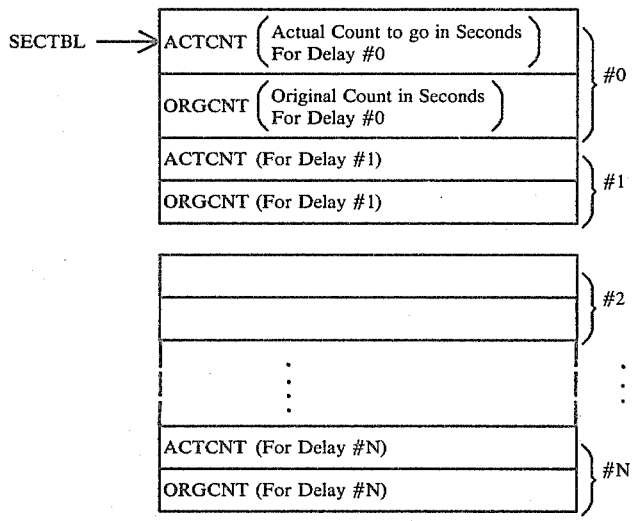

a. Each second time delay is numbered beginning with #0.

b. The beginning address of the second tables is SECTBL.

c. Each second time delay occupies two locations in the second time delay tables which lie in the whole word portion of the sequencing data area.

(1) Location one of each table: contains the actual count (ACTCNT) to to in seconds. Initially this is the amount of the delay in seconds. This location is counted down each time the program runs. The contents of this location is a function of the run period (RUNPER).

(2) Location two of each table: contains the original count (ORGCNT) in seconds. Initialized as the amount of the delay and never changes. This location is used to reset location one if the input should go false at any time.

6. Unpack Subroutine (UNPAK) and Unpack Macro (UPK)

The unpack macro and unpack subroutine work together to unpack the 14 bits of a word into the most significant bits of the words in a packed word table located in the sequencing data area.

The arguments in the unpack macro heading identify the word to be unpacked and the beginning address of the table in the sequencing data area where this word is to be unpacked. The last address in the table where this word is to be unpacked is located following the RJP instruction in the UPK macro. This last address is simply the beginning address +13.

Once all this necessary information is set up, the unpack subroutine unpacks the word as follows: Bit 1 of the word goes to the first address of the table, Bits 2,3, ..., 14 go into increasing core locations. Thus Bit 14 is stored in the last address of this table in the sequencing data area.

See the logic pre-processor write-up for further explanation of the method used in unpacking.

7. Pack Subroutine (PAK) and Pack Macro (PAK)

PAK and PAK are teamed together to accomplish the opposite of the unpack subroutine and macro. The format of the PAK macro is the same as the UPK macro.

First the pack macro sets up the beginning address of the packed word section of the sequencing data area where the packing is to begin.

The subroutine then packs the most significant bits of fourteen words (beginning with the word located at the address set up by the PAK macro and progressing sequentially from this beginning address). These fourteen most significant bits are packed into a single fourteen bit word. The first address in the turbine resident table where the first packed word is stored can be found following the subroutine call instruction in the PAK macro.

The above mentioned packing process is continued until all of the packed word section of the sequencing data area has been packed and stored in the turbine resident table.

8. Hour Time Delay Subroutine (TDLHRS) and Hour Macro (TDH)

The TDLHRS subroutine and TDH macro were originated to handle the hour time delays which were present in the sequencing logic. The format of the hour macro is the same as the second macro.

Before proceeding to the hour delay subroutine, the input must be loaded in the accumulator and the last address in the delay table of the hour delay being considered must be available. The TDH macro accomplishes the above. The last address in the delay table is found following the RJP instruction in the TDH macro.

Once the subroutine is entered the input must be set for "ORGKNT" consecutive hours before the output is set. If at any time the input goes false, the output is set false and the delay count is re-initialized.

The hour time delay tables configuration is as follows:

HOUR TABLES

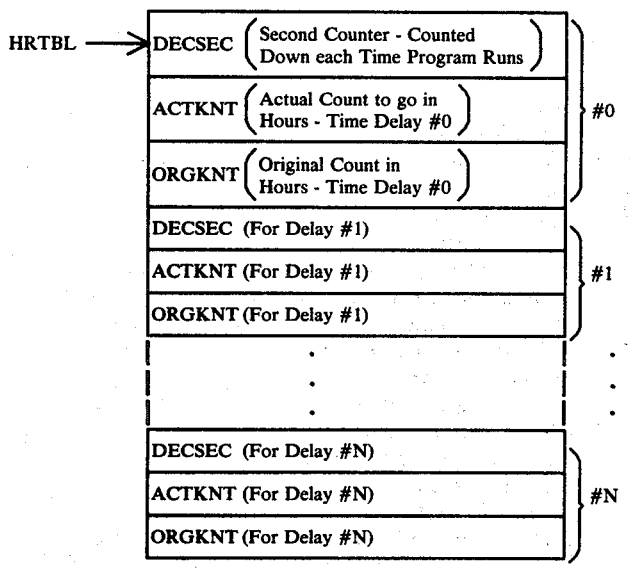

a. Each hour time delay is numbered beginning with #0.

b. The beginning address of the hour tables is HRTBL.

c. Each hour time delay occupies three locations in the hour time delay tables which lie in the whole word portion of the sequencing data area.

(1) Location one of each table: contains the second count (DECSEC) Initially this location contains the following:

3600* 4/RUNPER where RUNPER (run period) is specified in multiples of ¼ of a second. Therefore: ¼ * RUNPER=time (in seconds) it takes for the program to run. If the program runs once a second for example, ¼*RUNPER=1Sec.

RUNPER=4

Therefore, in this example, location one of the table equals initially:

3600*4/RUNPER=

3600*4/4=3600

After location one has been decremented 3600 times (one hour elapsed), location two (actual count to go in hours) is decremented provided the input has remained set throughout this period. If delay time has not expired location two is reset to its initial value.

(2) Location two of each table: contains the actual count (ACTKNT) to go in hours. This location initially contains the amount of the hour delay minus one and is counted down each time location one has been decremented to negative zero.

(3) Location three of each table: contains the original count (ORGKNT) in hours. This location always contains the total amount of the particular delay in hours minus one. If the input goes false at any time the contents of the location is used to reset the contents of location two.

9. Alarm Set and Find Bit Subroutines (ALMST & FNDBT) and Alarm Macro (ALM)

In order to set the correct alarm once an alarm condition has been encountered, two subroutines (ALMST & FNDBT) which work in conjunction with the alarm macro (ALM) have been employed.

The alarm number (ALMBIT=1,2,3, . . . , or 84) of the alarm to be set is the only argument in the ALM macro heading. This alarm number is loaded in the accumulator before entering ALMST.

Immediately after entering ALMST, advance to FNDBT to determine the word number (WRDNUM=0,1, . . . , or 5) and the bit number (BITNUM=0,1,2, . . . , or 13) which correspond to this particular alarm number. Both of these values are stored before returning to ALMST.

Once back in ALMST, the address in the alarm section of the sequencing data area where this alarm bit lies must be pinpointed. Adding the word mnumber (WRDNUM) found in FNDBT to the beginning address (ALMTBL) of the alarm section of the sequencing data area accomplishes this task. Now set the alarm bit in this word which corresponds to the original alarm number.

10. Compare & Set Subroutine (CPSSB) and Compare and Set Macro (CPS)

In order to compare two inputs and set the output either TRUE or FALSE according to the relative values of the inputs, CPSSB and CPS have been defined.

The compare and set macro identifies the two inputs to be compared in the arguments of the macro heading. The prototype instruction of CPS subtracts the second input identified from the first input identified leaving the results (positive or negative) in the accumulator before calling CPSSB.

Entering CPSSB with the difference in the accumulator, the output is set TRUE or FALSE depending upon whether the difference is positive or negative respectively.

11. Inclusive-or Subroutine (IORSB) and Macro (ORR)

Since the P-50 repertoire of instructions does not include an inclusive-or instruction, IORSB and its calling macro (ORR) have been defined. The inclusive-or macro has the capability of handling up to ten inputs to the IOR gate.

The arguments of ORR include the number of inputs (N≦10) to the IOR gate and the inputs. The addresses of the inputs are located following the delete instruction in the inclusive-or macro in the reverse order of their identification in the macro heading. Thus, the address of the last input identified in the macro heading is in the location immediately following the delete instruction.

Before proceeding to the inclusive-or routine, the value of the first input is loaded in the accumulator.

In IORSB, the first inputs is "inclusive-or"ed with the last input. The results of the first "or" is then "inclusive-or"ed with the next to last input and so on, until all the inputs have been "or"ed. This above process is terminated when a zero is encountered in the table of inputs which follows the call to the "or"ing subroutine in the "ORR" macro.

12. Function Generator and Interpolation Routines (2DIMN, 1DIMN, INTERP)

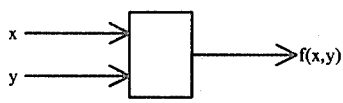

In a two dimensional case, the function will be specified in the following form:

following function can be utilized to approximate the function y(minimum)=f(x):

$$y = f(x) = y(n) + (x - x(n))\left(\frac{y(n+1) - y(n)}{x(n+1) - x(n)}\right)$$

where:
a. x is the given input variable
b. y is the f(x) corresponding to the given input variable x
c. $x(n) \leq x \leq x(n+1)$ and $y(n) \leq y \leq y(n+1)$
d. $\Delta X = x(n+1) - x(n)$.

1DIMN is the one dimensional function generator routine which is used to set up the necessary information for interpolation. Once all this information is set up, INTERP is entered. INTERP is the routine which executes the actual interpolation.

Once the f(x) for the minimum curve has been calculated and stored for later use, calculate f(x) for the maximum curve using the same procedure.

In the two dimension case, $Z = f(x,y)$ must be approximated. Several quantities must be made available in order to accomplish this approximation. 2DIMN is the two dimensional function generator routine which sets up these quantities in a manner that INTERP can again be used for interpolation. The quantities necessary for the approximation of f(x,y) are as follows:
a. x & y - given input variables
b. y(maximum)-location on the y-axis of the y=y (maximum) curve
c. y (minimum)-location on the y-axis of the y=y (minimum) curve
d. f(x) minimum = [f(x) calculated for minimum curve in first interpolation]
e. f(x) maximum - [f(x) calculated for maximum curve in the second interpolation]

The function used to approximate f(x,y) is as follows:

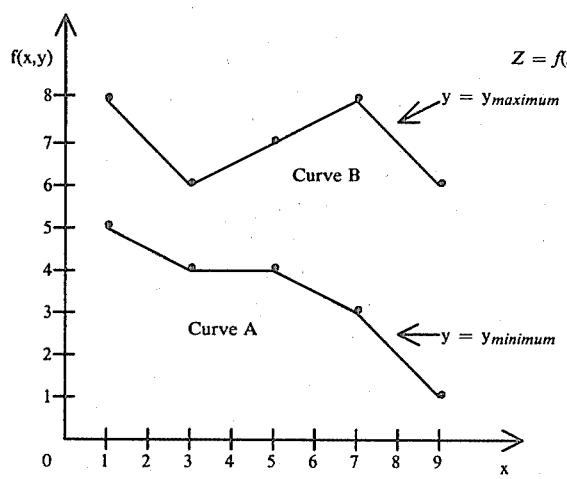

FIG. 12-1
Note: Viewing(x,f(x,y)) Plane in this Figure

A maximum of five segments will be given and breakpoints may occur anywhere.

For a given input variable x, f(x) can be determined for both the maximum cruve and the minimum curve.

First consider the minimum curve. Knowing the input variable x and the location of the table of breakpoints for the minimum curve (see table below), the $$Z = f(x,y) = \frac{(y - y(\text{minimum}))\ (f(x)\ \text{maximum} - f(x)\ \text{minimum})}{(y\ \text{maximum} - y\ \text{minimum})} + f(x)\ \text{minimum}$$

These routines have been designed to be as efficient, versatile, and general as possible.

Each function has a two dimensional function generator table connected with it. The configuration of this table is as follows:
y(minimum)
y(maximum)
NUMPTS values of x for curve A
NUMPTS values of f (x,y (minimum))
NUMPTS values of x for curve B
NUMPTS values of f (x,y(maximum))
a. NUMPTS=the number of breakpoints/curve.
b. 4* NUMPTS+2= length of each table.

8. Control Program

Figure 34:
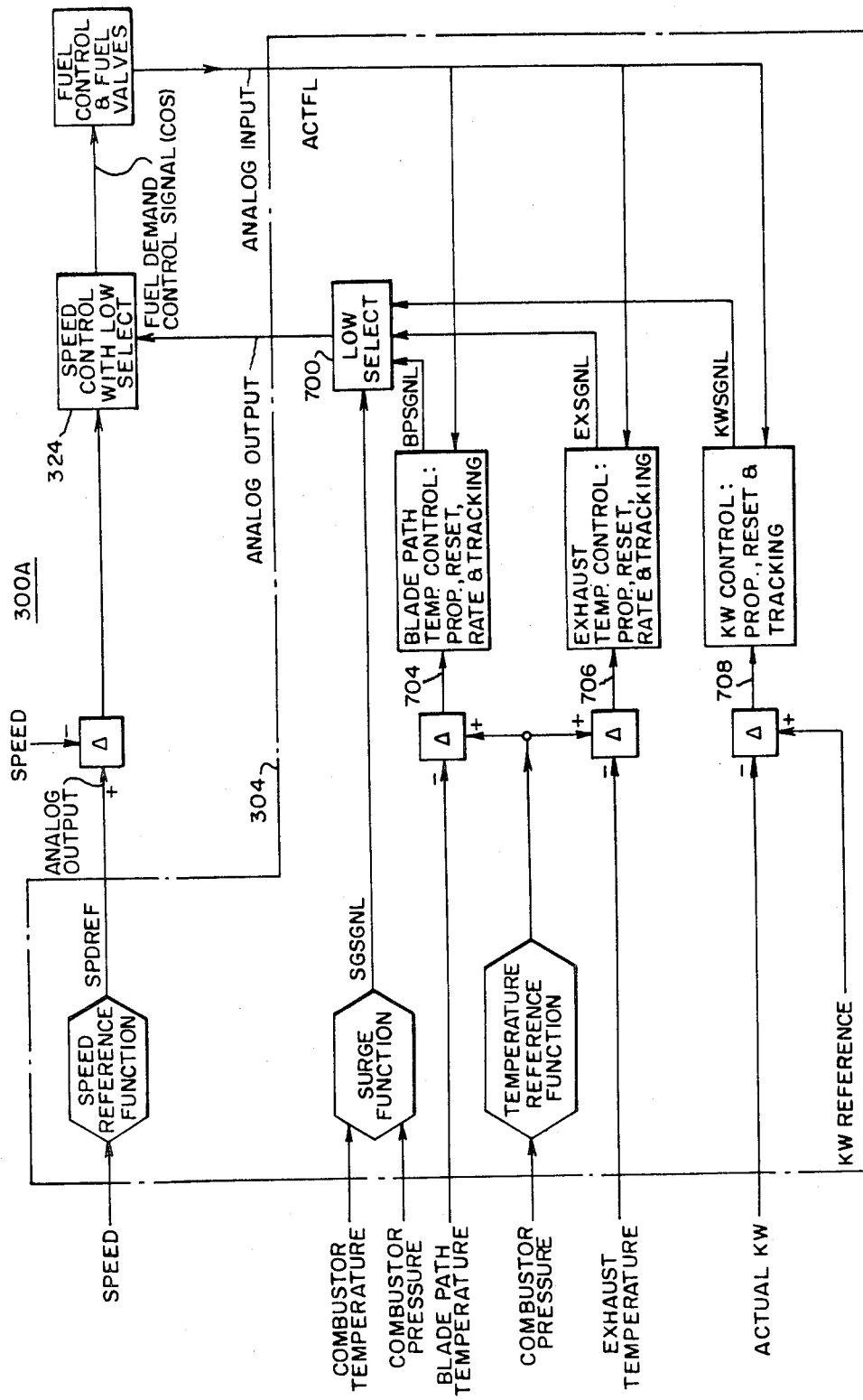
FIG. 34 shows a block diagram of a control loop arrangement implemented in the preferred embodiment.
Figure 35:
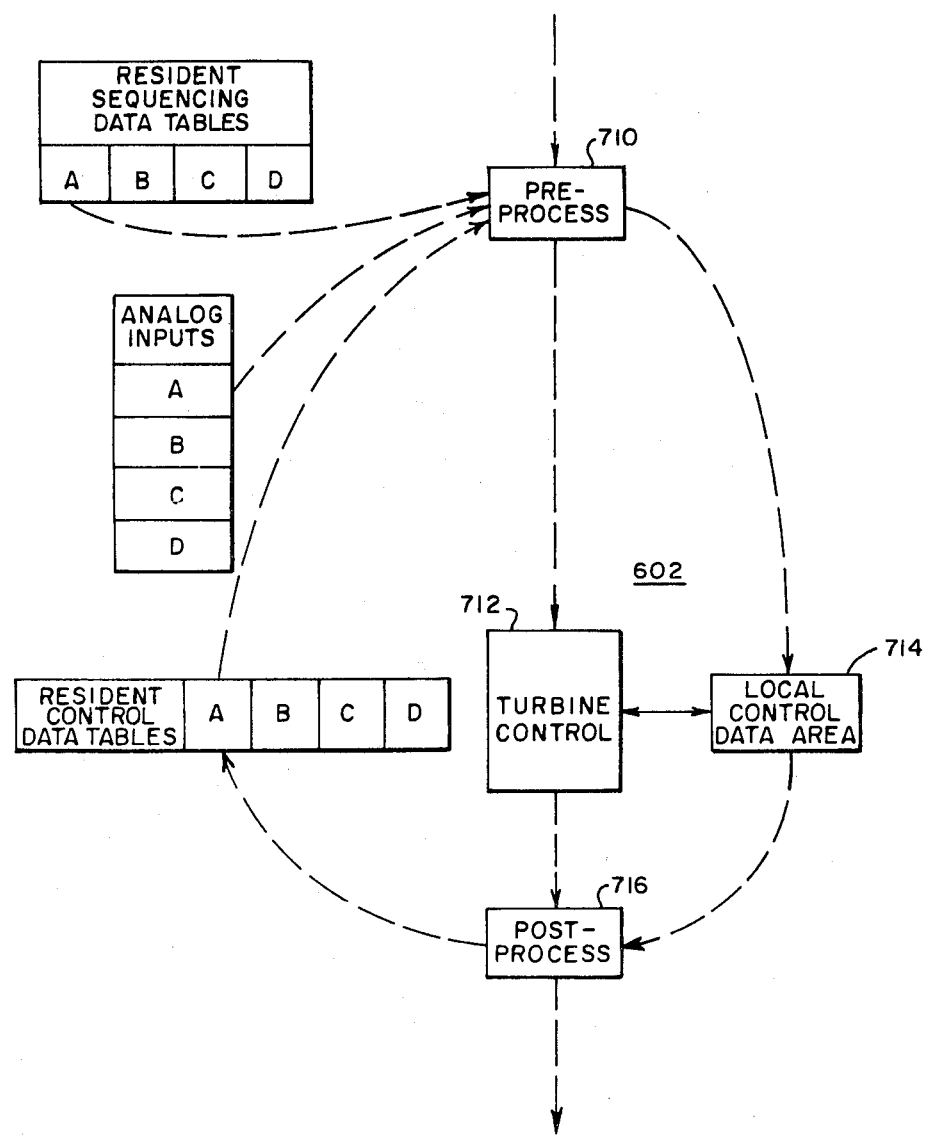
FIG. 35 shows a data flow diagram associated with control program operations during controlled operation of multiple gas turbine power plants with a single control computer.
Figure 36:
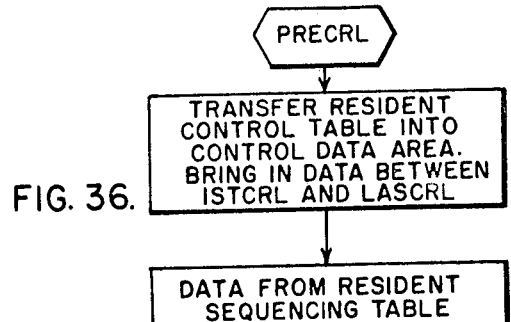
FIG. 36 illustrates a flowchart representative of preprocessor operations in the flow diagram of FIG. 35.

The control program 602 interacts with the sequencing program 600 generally to provide for control loop determination of the operation of the gas turbine power plant 100, and like plants if provided, in accordance with the control arrangement considered in connection with FIG. 34. As just considered, the sequencing program 600 is organized to provide efficient and reliable interfacing with the plant and the operator panel in determining the control mode in which the control program 602 is to be operated. Control mode directives are made compatible with protective turbine performance and orderly management over advances in the gas turbine operational process. The control system 300 is in this embodiment provided with a control loop arrangement 300A in which the hybrid interface is preferably made as shown to provide for software speed reference generation and software selection of a single low fuel demand limit in a software low select block 700 for application to the analog hardware speed control 324.

The output fuel demand signal is selected as the lowest of a speed error fuel demand signal and the computer output fuel demand limit signal as previously considered. The actual fuel demand control signal ACTFL is read as an analog input for tracking in various software control paths as considered more fully subsequently. Surge limit, blade path and exhaust temperature limit and load limit control loops are all provided with software control functions which respond to external data and generate outputs to the software low select block 700 as indicated by the respective reference characters 702, 704, 706 and 708.

Data flow for the control program 602 is similar to that considered previously in connection with the sequencing program 600. Thus, the control program 602 first provides for preprocessing of analog input data and other data in block 710 for use in block 712 where the gas turbine control functions are performed.

In the first execution of the control program 602, the preprocessor block 710 acquires a resident control data table for turbine A thereby acquiring all the required values which represent the current status of turbine A. For example, the resident table stores such values as the previous inputs and outputs for the reset functions and rate functions. Other tabled values include function generator tables for all functions along with control function gains.

The resident control data table also includes the address of the turbine sequencing resident table which enables the preprocessor 710 to access the sequencing table and determine the control mode of operation, the selected load and emergency or normal startup status. After acquisition of the sequencing data for the turbine A, an analog data acquisition is employed to obtain the analog data needed for control program execution. The analog data required includes the eight blade path temperatures, the eight exhaust temperatures, compressor inlet temperature, combustor shell pressure, actual fuel signal demand and actual kilowatt output. Critical analog inputs such as compressor inlet temperature and combustor shell pressure are preferably given special reliability checks by sequencing logic in FIG. 33.

Figure 42:
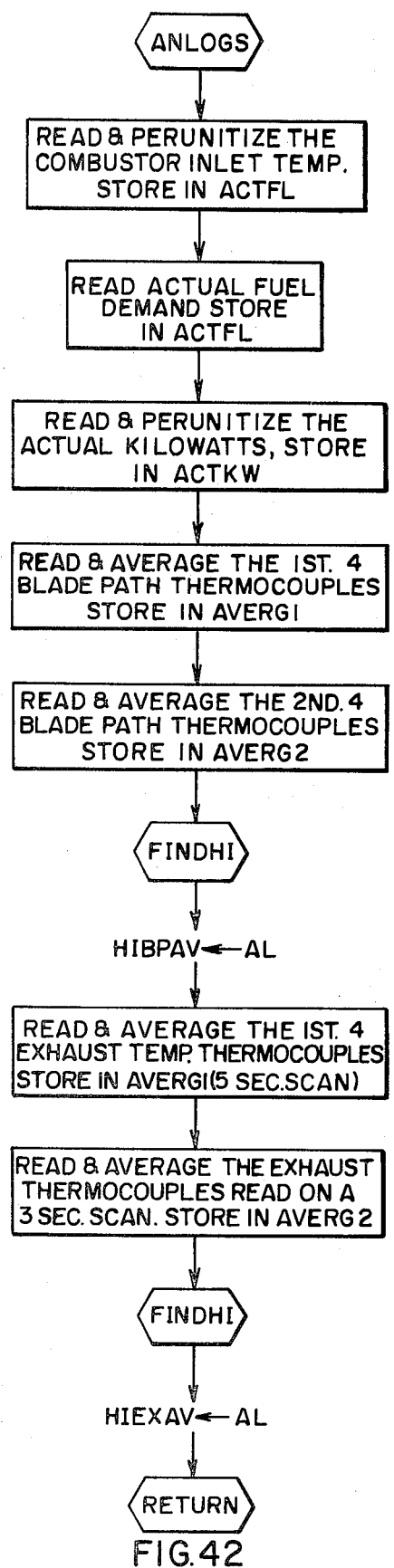
FIG. 42 illustrates a flowchart which represents the operations of an analog input routine employed in the control program.
Figure 43:
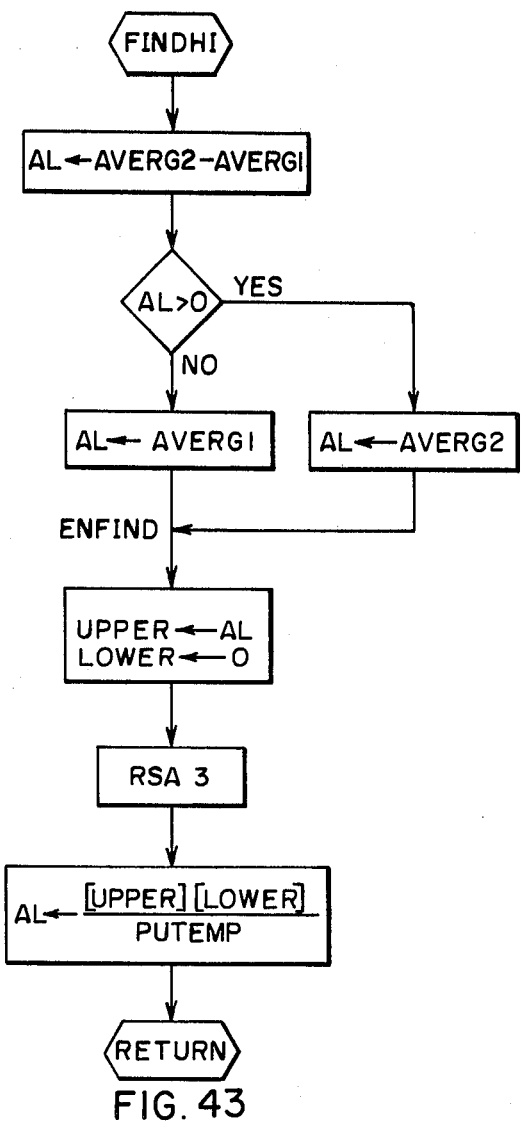
FIG. 43 shows a flowchart for a high temperature finding routine associated with the blade path and exhaust temperature processing in the analog input routine.

Preprocessing of the blade path and exhaust path temperature representations to find the respective high averages in the manner previously considered in connection with FIG. 15 is performed by the preprocessor block 710 as somewhat detailed in FIGS. 42 and 43 after the analog data is acquired. It is noted in further detail that the control program processing of the blade and exhaust temperature representations includes checking each thermocouple for open circuits. If a large negative test voltage value is detected for a thermocouple, the output of that thermocouple is discarded in calculating the average temperature indication. After the temperature average is calculated, each thermocouple output is compared to the average for its group and if it is lower than the average by more than a predetermined amount, the low thermocouple values are discarded and the average blade and/or exhaust temperature is recomputed. The described computational cycle is repeated until no low values are determined or until no values area left for discard in which case an alarm is generated. Data processing for the important blade and exhaust process thermocouples in this manner provides reliable plant protection against overheating and foreshortened turbine life.

Next, the turbine control block 712 is executed and it makes use of the acquired data including the sequencing, analog and resident control data which is stored in a table indicated by the block 714. After completion of the execution of the turbine control block 712, a postprocessor block 714 is executed to transfer an updated resident control table for turbine A back to its resident core area. The program process just considered is then repeated for turbines B, C and D according to the number of gas turbine plants placed under control. After the last turbine has been serviced with control program execution, an exit is made from the control program postprocessor block 714.

Figure 37:
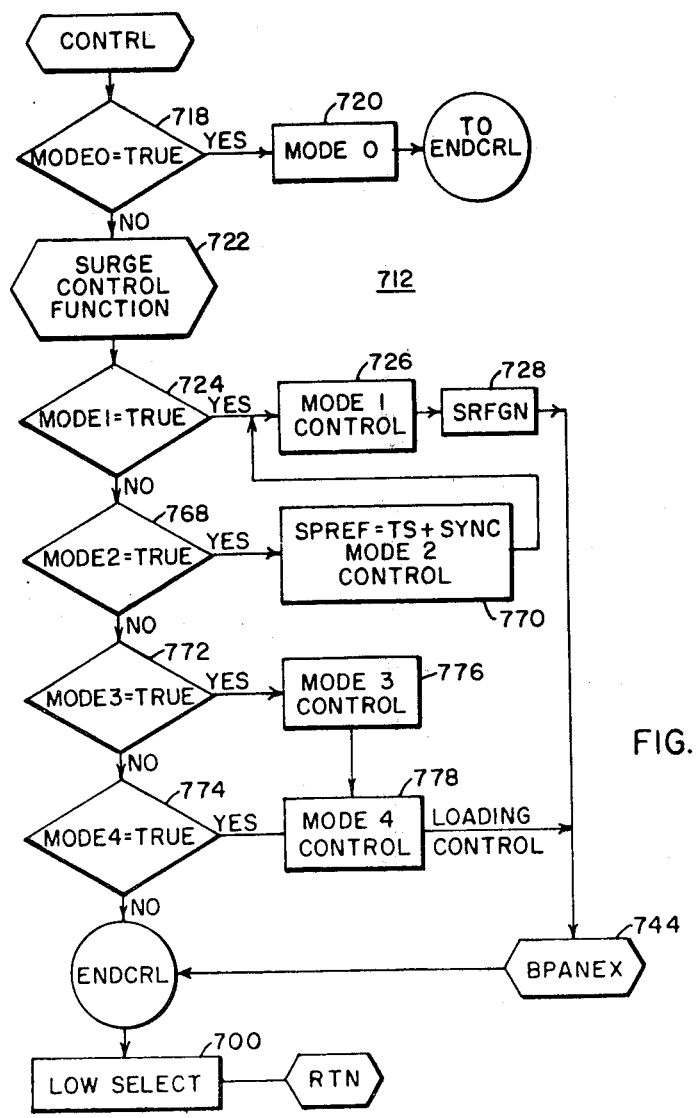
FIG. 37 illustrates a flowchart which represents control program operations in the preferred embodiment.

In FIG. 37, the control block 712 is shown in greater detail. A determination is first made from the turbine sequencing table by block 718 whether the turbine under control is in Mode 0 status. If so, block 720 is executed, but no control action is taken since Mode 0 is an initialization mode. Thus, block 720 zeroes the previous value locations for the blde path and exhaust temperature control and resets error flags. Block 720 also provides for tracking the actual turbine speed so that a smooth transition is made in the computer generated speed reference during transfer from Mode 0 to Mode 1.

If the control is not in Mode 0, block 722 next determines the surge control function for use in the surge limit control loop (FIG. 34) in all other modes of operation. To prevent compressor surge under excessive pumping demand, the surge control function determines a maximum fuel demand limit as a function of the compressor inlet temperature and the combustor shell pressure (compressor outlet pressure) which are obtained from reliability checked analog inputs.

As previously considered generally in connection with FIG. 15, the surge limit functional determination is made with the employment of stored nonlinear curve data which is representative of the nonlinear turbine surge operating limit over startup and load operating ranges. In this instance, the pair of nonlinear curves 326 and 328 are stored for respective compressor inlet temperatures of 120° F. and −40° F. The curves 326 and 328 are stored by the use of five points on each curve and intermediate curve points are determined by a linear interpolation routine considered previously in connection with the sequencing Logic Macro instructions. Curve points for compressor inlet temperatures between −40° F. and 120° F. are determined by a second linear interpolation procedure so that a dual interpolation operation is employed for a determination of the surge control function.

Once the combustor shell pressure is identified, the double linear interpolation is made along and between the curves 326 and 328. If the combustor shell pressure is below the point at which the coincident portions 330 of the curves 326 and 328 become applicable, the ordinate of the applicable surge limit function is determined by intercurve interpolation on the basis of measured compressor inlet temperature to define the surge limit value of startup fuel demand. In order to make the ordinate interpolation, interpolations are first made to determine points on the startup portions of the curves 326 and 328 corresponding to the measured combustor shell pressure. Surge limit determination is also made by linear interpolation, and in this case double linear interpolation, on the curve portions 330 during load operations, but the ordinate interpolation is applied to common points to generate the same point. As a result of the nonlinear surge function implementation, closer operation to turbine design limits is enabled.

After determination of the surge control function, block 724 determines whether the system is in operating Mode 1. If it is, block 726 is entered to provide for gas turbine acceleration control from ignition speed of approximately 1000 RPM to the top speed of 4894 RPM. Block 726 provides for fuel demand signal tracking in the same manner as that subsequently described in connection with blocks 764 and 767 (FIG. 39) and further generates a temperature reference with the use of stored curve data previously considered in connection with FIG. 16. The temperature reference curves 334 and 336 are nonlinear and respectively represent turbine discharge temperature conditions associated with respective constant turbine inlet temperatures of 1200° F. and 1500° F. for normal and emergency startups as a function of combustor shell pressure. Five points are stored for each curve 334 or 336 as indicated and linear interpolation is employed between points on the same curve as considered in connection with FIG. 15. To determine the current applicable temperature reference, the block 726 accordingly determines the acquired analog value of combustor shell pressure and whether the startup is in a normal or in an emergency status. Gas turbine operation with greater constancy of operation at design turbine inlet temperature is better enabled by the use of a nonlinear temperature reference in the block 726 and in block 792 subsequently considered.

Block 728 operates next in Mode 1 control to determine the speed reference for analog output to the speed control 324 from the computer 304. As shown in greater detail in FIG. 38, the speed reference program block 728 first provides for determining whether the gas turbine 104 is at top or substantially synchronous speed as indicated by block 730. For the top speed condition, the speed reference routine is bypassed as indicated by the reference character 732 and a return is made to the turbine control program execution. Below top speed, block 734 determines whether an emergency start has been requested and if it has, block 736 determines the change in the speed reference required for operation during the next sampling time interval from data representative of the curve 307 shown in FIG. 13. If a normal start has been requested, block 738 determines the speed reference charge in accordance with data representative of the curve 306 in FIG. 13.

As previously indicated, the nonlinear curves 306 and 307 respective and advantageously provide for fixed normal and fixed emergency startup times while holding substantially constant turbine inlet gas temperature. The faster emergency startup curve 307 corresponds to a higher turbine inlet temperature operation and, it may be noted, higher turbine temperature transients which produce greater stress damage to the turbine parts. Although blade temperature or surge limit control may possibly extend the startup period, the normal programmed fixed startup time, in this case from ignition speed to synchronous speed, is normally achieved to provide the previously considered advantages of fixed time startup.

Figure 54:
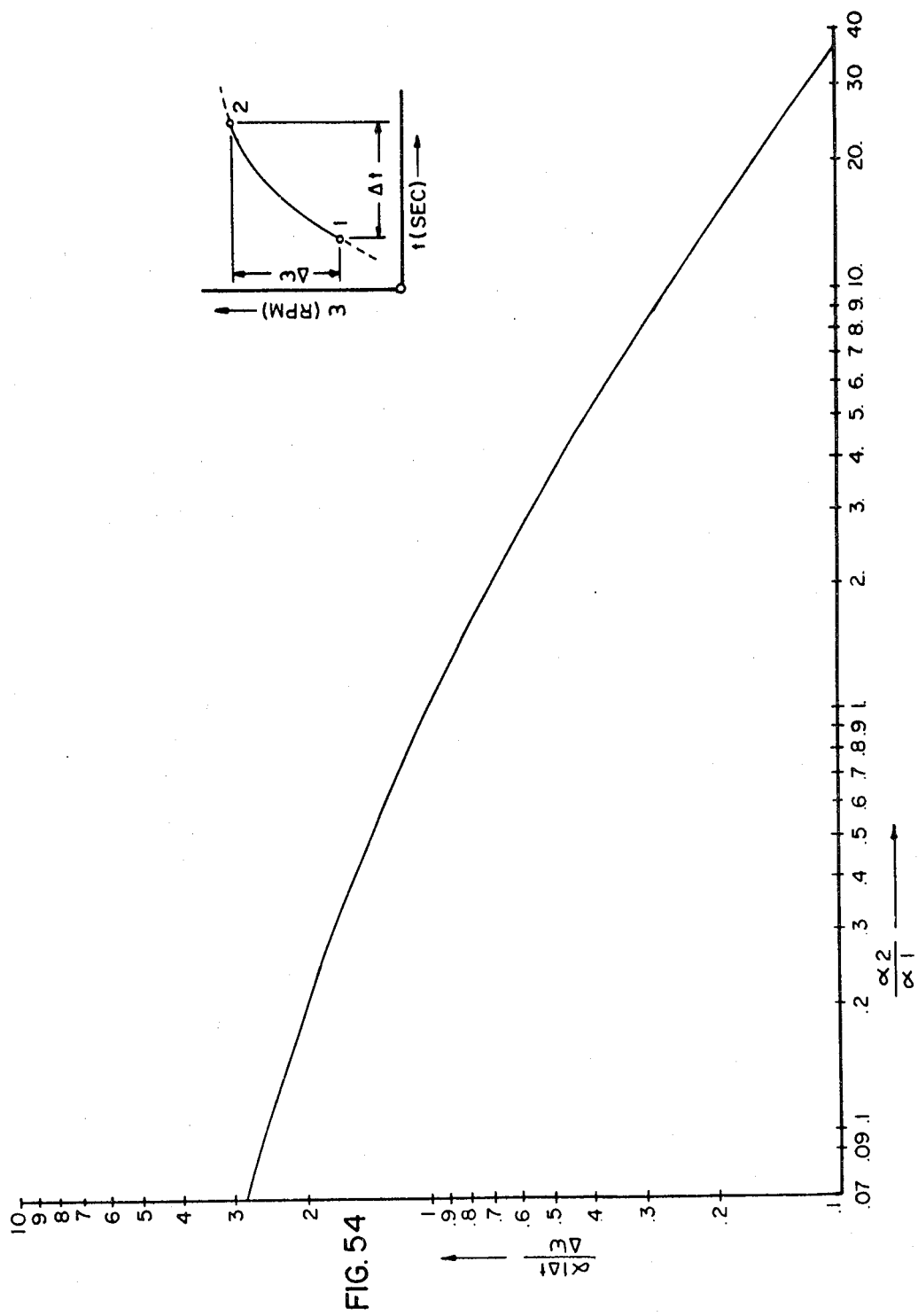
FIG. 54 shows a speed curve for calculation of speed reference changes.

Each of the speed curves 306 or 307 in FIG. 13 is placed in core storage with the use of five data points as indicated. The indicated speed curve slopes or accelerations corresponding to the denoted speed curve points are stored and a linear interpolation process is used to determine acceleration values at working time points between the time points corresponding to the stored curve points. As presented previously in connection with parameter change entries into the computer 704, a speed reference change calculation for block 736 or 738 is based upon the slope of the speed curve at the next preceding sample time point and the change in time associated with the next sample period (FIG. 54).

In block 740, the new speed reference is calculated by adding the calculated small speed reference step change to the preceding speed reference. The acceleration formula set forth in connection with parameter changes applies to FIG. 54 and it is used in making the speed change calculations. The speed reference algorithm previously noted in connection with section B provides an underlying representation of the speed reference generation.

Among other advantages associated with the speed reference generation scheme, the plant operator can switch between normal and emergency start procedures at any time in the startup process with smooth transition since no large steps occur in the speed reference function and accordingly no undesirable operating transients are imposed on the gas turbine 104. It is also noteworthy that a 0 speed change is added to the speed reference when the HOLD pushbutton is pressed.

A top speed limit is next placed on the speed reference by block 742 if block 744 detects an excessive speed referene value. If the speed reference is not excessive or if the speed reference is set at top speed, the speed reference value is stored and a return is made to the execution of the control block 712.

Generally, the blade path temperature control loop responds faster than the exhaust temperature control loop and it is therefore the controlling factor in Mode 1 control. The exhaust temperature control loop and the load limit control loop are both normally tracking the fuel demand signal during Mode 1 control for reasons of control loop availability. FIG. 40B illustrates the conditions of the various control loops considered during Mode 1 control.

Figure 40C:
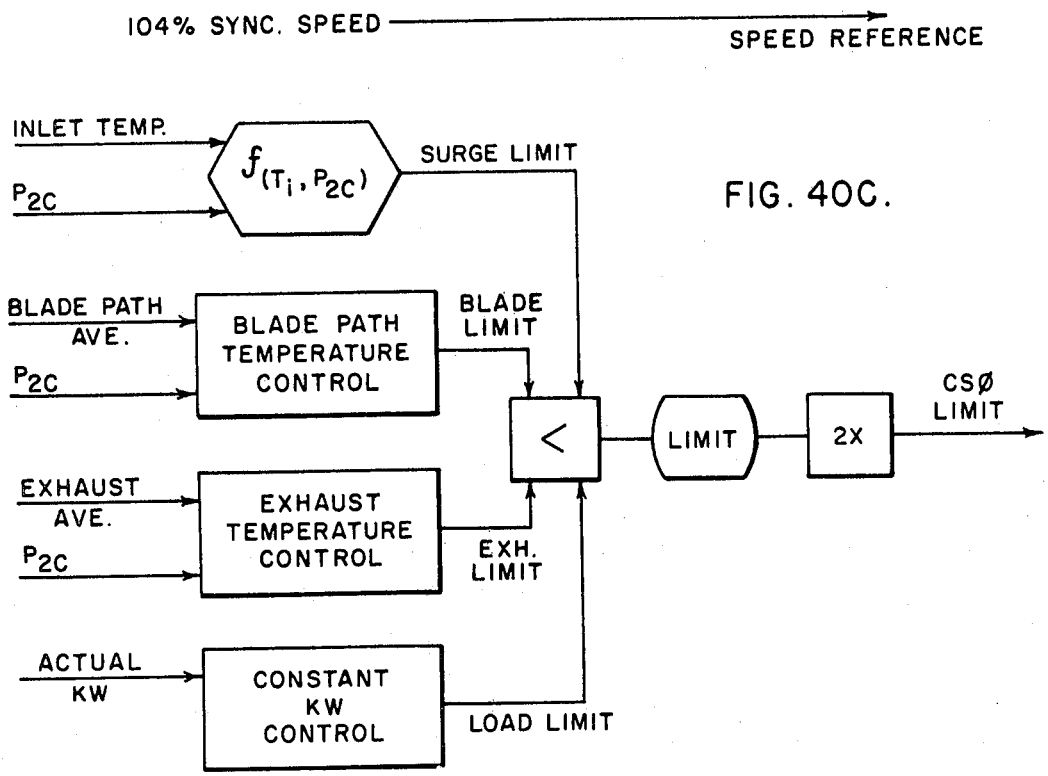

As detailed in FIGS. 40B and 40C all control Modes including Mode 1 employ a fuel demand limit check in the control path to keep the output fuel demand signal within the range of 0 to 2.5 volts as indicated in block 746. A multiplication by a factor of 2 is made in block 748 to put the analog output signal in the range of 0 to 5 volts.

Figure 46:
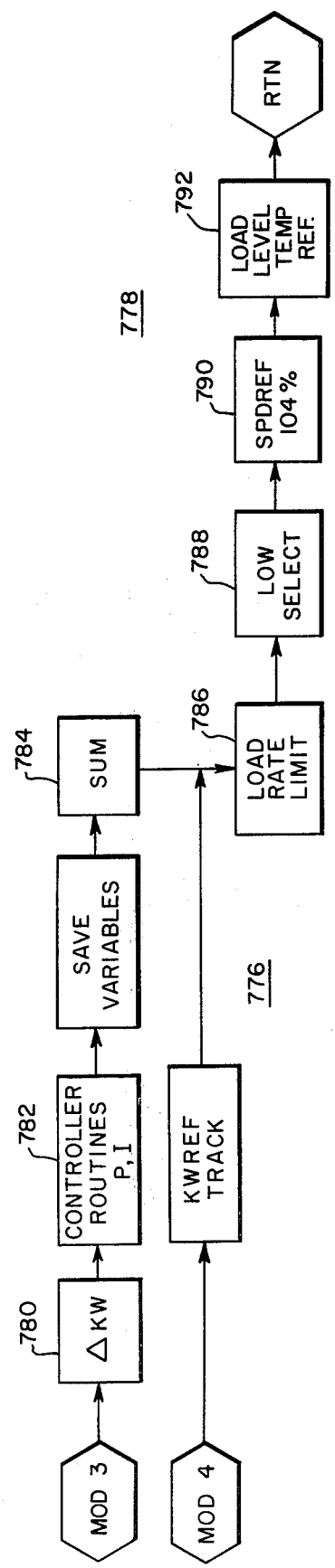
FIG. 46 shows a flow diagram for control program operations which provide load control and load limit functions for the gas turbine power plant.

In execution of the block 744 in the temperature limit routine 744, a determination is first made in block 746 of the temperature error by taking the difference between the temperature reference previously derived in the block 726 (or the block 792 in FIG. 46) and the actual and preprocessed average blade path temperature. As shown in FIG. 41A, the software blade path temperature control configuration includes a rate function 748 which is applied to the average blade path temperature representation. The temperature representation and its derivative are added together in summer 750.

Figure 45:
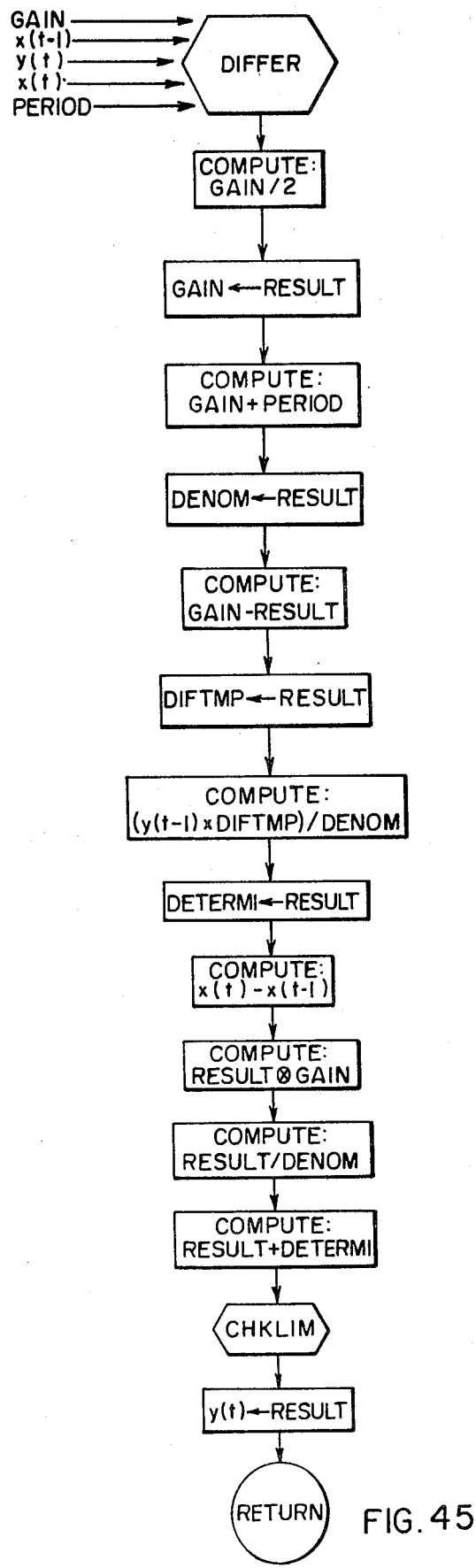
Figure 53:
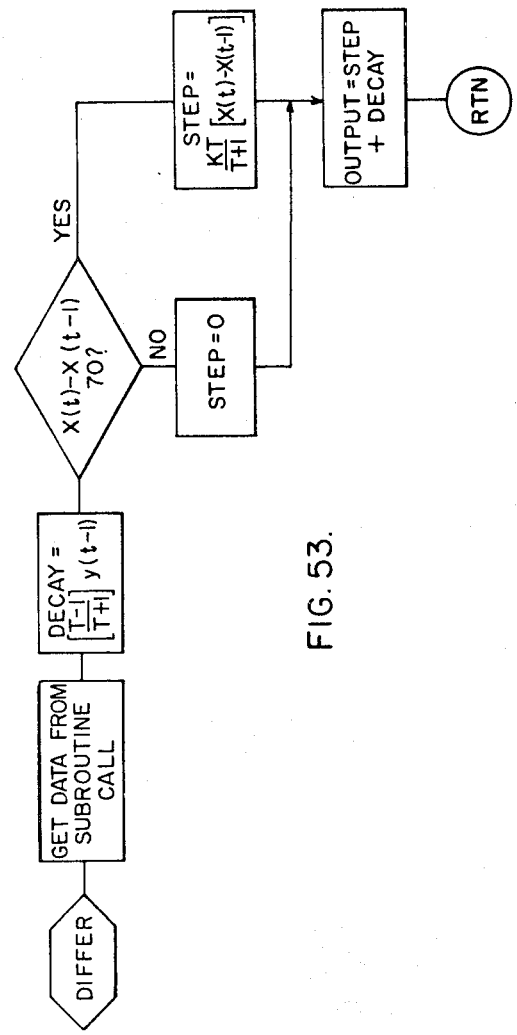
FIG. 53 shows a flowchart for a rate function employed in temperature limit operations.

FIG. 53 shows the rate function and its software control channel interaction in greater detail. Thus, after the necessary data is obtained, a decay term is calculated and if the temperature is increasing a step term is determined and added to the decay term. If the temperature is decreasing, no step term is used and the output is made equal to the decay term. FIG. 45 illustrates the process employed for differentiation.

As a result, the summer 750 in FIG. 41A has a temperature value and at most a remanent decay term applied to it during temperature drops so that tracking is provided for decreasing temperature. On temperature increases, the summer 750 generates the sum of a temperature value and a instantaneous step term and a decay term for anticipatory or predictive limit control with rising blade path temperature.

To obtain backup transient temperature limit protection, a summer 752 (FIG. 41A) provides a blade path offset to the temperature reference previously determined in the flowchart block 726 (FIG. 37) by an amount of 50° F. in control Modes 3 and 4 during which the slower responding exhaust control channel provides primary temperature limit control, but no offset is made in control Modes 1 and 2. The preprocessing performed by blocks 748, 750 and 752 in the control configuration of FIG. 41A is performed by the program block 746 in FIG. 39.

A predetermined deadband is applied to the determined blade path temperature error in block 754. If an error exists outside the deadband determined in the block 754, its sign is determined in block 756. If the blade path temperature error is negative, control action is imposed by block 758 with a proportional routine and an integral routine. The blade path temperature and temperature error variables are then stored by block 760 and block 762 sums the results of the proportional and integral operations of block 758 to generate the blade path output limit representation BPSGNL. If the blade path temperature errors is positive, block 764 obtains the fuel demand signal FDSIG or SCO in the hardware speed control 324, sets the blade path temperature error representation to zero and causes the reset function in block 758 to track the fuel demand signal (as indicated in the control configuration in FIG. 34). The blade path temperature representation is then kept slightly above the control signal output so that it is ready to take limit control if required.

After execution of the block 762, the exhaust temperature control or tracking action is determined in a series of blocks similar to those just considered in connection with blade path temperature control and tracking action. However, block 765 provides no offset for the temperature reference as indicated in the software control configuration for exhaust temperature control shown in FIG. 41B. Further, a save variables block 769 provides for storing the exhaust temperature error and the track function output initiated by block 767. Block 760 also saves the blade path variables.

The tracking action provided for by blocks 764 and 767 in the temperature limit loops enables the loops to enter their limit control configuration with faster control action following a change in temperature error from positive to negative since the reset routines do not have to integrate back from some saturated output value. In particular, the tracking action is such that the reset block output never exceeds the fuel demand signal by more than a difference value, in this case a value corresponding to 0.12 volts.

Figure 44:
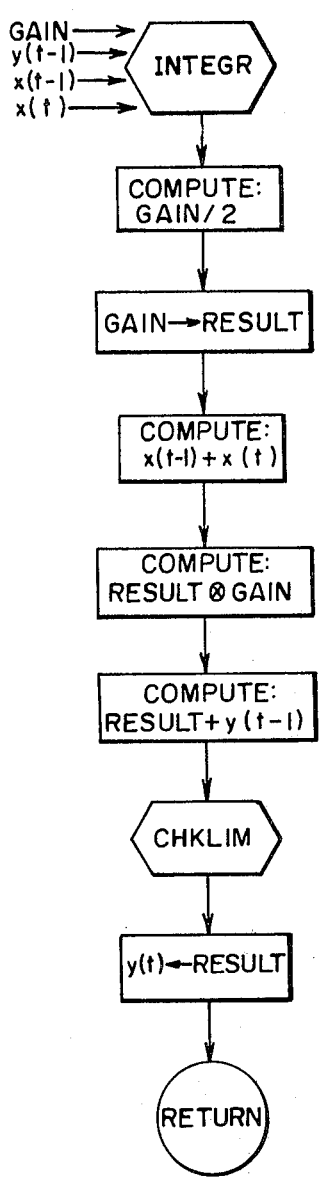
FIGS. 44 and 45 respectively illustrate flowcharts representative of digital integration and differentiation functions employed in the control program operations.

To obtain the tracking action, the desired difference value is added to the low selected fuel demand signal and the result is differenced from the output of a reset or integrator routine and applied to the input of the reset routine. FIG. 44 shows the process employed for integration. The output of the integration operation accordingly tracks the fuel demand signal with a positive bias. The described tracking operation accordingly allows the tracking control loop to enter quickly into fuel control if required by a change in the error quantity controlled by the tracking control loop, yet the fuel signal tracking output of the tracking control loop is sufficiently high to provide some degree of control freedom for the control loop which is actively controlling fuel through the low fuel demand selector block 700 (software) or the hardware low select arrangement previously described.

After the exhaust temperature output limit is determined in block 766 a return is made to the routine 712 in FIG. 37. Next, a software low selection is made by block 700 in the Mode 1 control program execution. Repeated executions of the control routine 712 are made during the time period that the gas turbine 104 is placed under sequencing and acceleration operations in Mode 1 control.

Once synchronous speed is reached, block 768 in FIG. 37 directs the program into Mode 2 control operations. In block 770, the speed reference is set equal to the top speed value plus any speed change entered into the control loop by manual synchronization operations or by automatic synchronization program execution. Further, the program operations are redirected through blocks 726, 728, 744 and 700 as in the case of Mode 1 control.

After synchronization, block 722 or 744 directs control program operations to a Mode 3 control block 776 or a Mode 4 control block 778 according to the operator's panel selection. As shown in greater detail in FIG. 46, the Mode 3 block 776 provides for determining kilowatt error from the difference between the kilowatt reference and actual kilowatts in block 780. Proportional and integral controller routines are then applied to the kilowatt error in block 782 and the resultant controller outputs are summed in block 784 in order to provide for constant kilowatt control with temperature limit backup in Mode 3. The kilowatt reference employed in the error determination block 780 is adjustable with the RAISE and LOWER pushbuttons on the operator's panel.

Figure 40D:
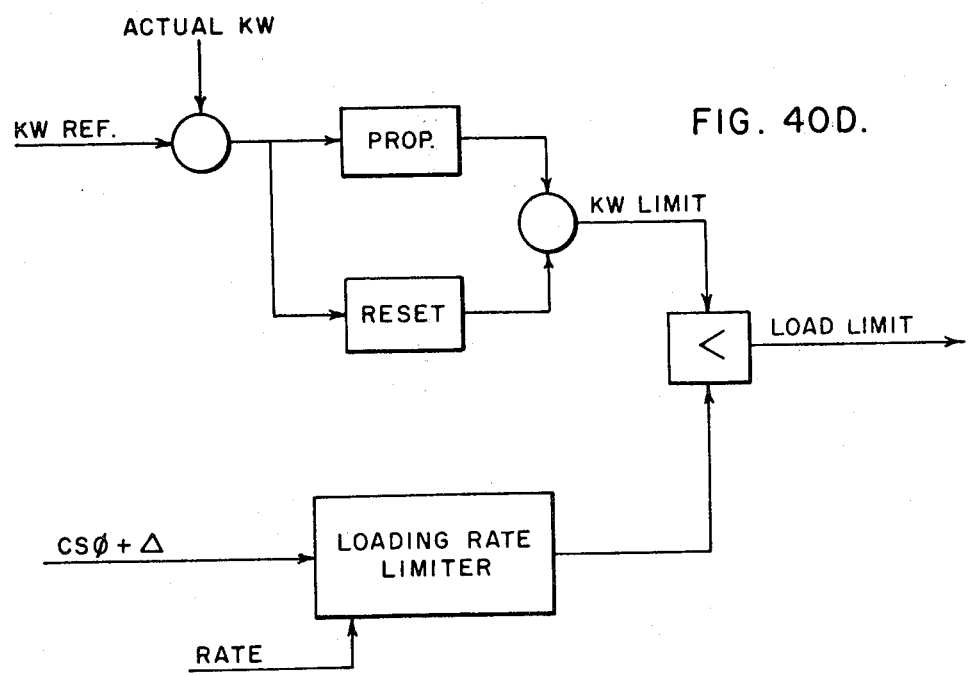

A loading rate limit is determined by block 786 to prevent excessive thermal transients due to excessive loading rates under automatic or manual incremental loading. The rate limit action is performed to produce the loading rates previously described. As shown in FIG. 40D, the loading rate limiter is a function generator which tracks the fuel demand signal CSO with a positive bias for control availability during nonramping periods. Once a load reference change is generated, the loading rate limiter adds a step term to its output to operate through the load and loading rate low select block (FIG. 40) and allow the fuel demand signal to ramp at the preset rate.

Figure 52:
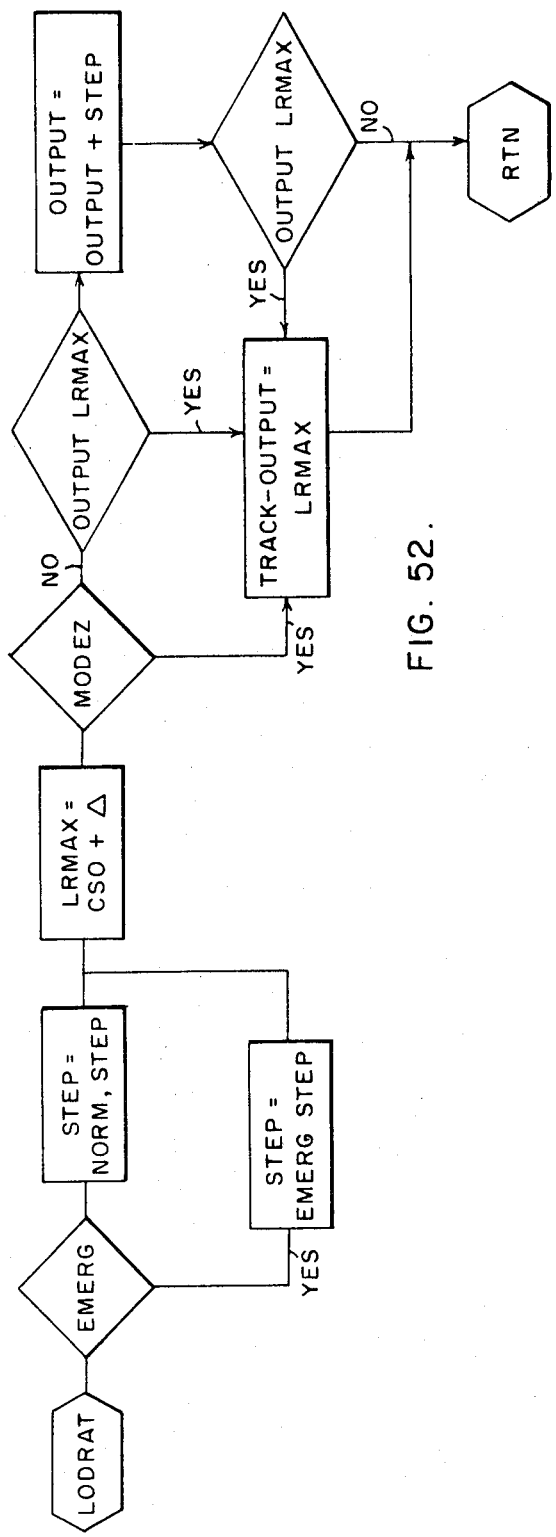
FIG. 52 illustrates a flowchart for a load rate limit function employed in the load control and limit operations illustrated in FIG. 46.

In FIG. 52, a relatively detailed flowchart is shown for the loading limit subroutine. If the control program is in Mode 1 or 2, the limiter output is made equal to LRMAX, i.e. tracking. If the control program is in Mode 3 or 4 and the limiter output is greater than or equal to LRMAX, the limiter is caused to track LRMAX. Otherwise the limiter output has a step term added to it and if the sum is less than LRMAX it is generated. However, if the sum is greater than or equal to LRMAX the limiter output again is caused to track the fuel demand signal. As shown, the size of the step term is different (higher) for emergency startups as compared to normal startups.

When Mode 3 is first entered, the kilowatt reference is set at a minimum value and the operator can then determine the kilowatt reference value thereafter. However, the reference cannot exceed that value corresponding to the base load exhaust temperature limit. The software control configuration associated with Mode 3 is shown in FIG. 40C, and the constant kilowatt control shown therein is illustrated in greater detail in FIG. 40D. As previously considered and as shown in FIG. 40O, the primary Mode 3 controls are the exhaust temperature control and the constant kilowatt control while the blade path and surge controls provide backup protection. The speed reference is set at a value of 106% rated speed to cause a speed error of 6% which is too high for selection by the low selection software block. If the generator 102 is disconnected from the system, the speed loop will regulate turbine speed to the 104% value with 2% droop to maintain the fuel level required for idle operation.

In Mode 4, the kilowatt reference is caused to track actual load and block 786 then makes a loading rate limit determination. Low selection block 788 functions in Mode 3 to determine the lowest fuel demand corresponding to the kilowatt control limit and the loading rate limit as previously considered but it simply passes the loading rate limit in Mode 4. Block 790 provides for setting the speed reference to the 106%value and the previously noted block 792 provides for determining the temperature reference with the use of the curves 334, 340 and 342 (FIG. 17) as considered in connection with the Mode 1 control block 726 for use in the blade path and exhaust temperature limit control block 744.

In both Mode 3 and Mode 4, the block 744 is executed in the manner considered previously in connection with Mode 1. Since no constant kilowatt function is provided for Mode 4, the block 744 provides for temperature loading operation through exhaust temperature limit action. Under temperature control, the generated power varies with the ambient air temperature such that more power is generated with lower inlet air temperature.

With respect to Mode 3, a 50° F. offset if provided for the blade path control function so that in the steady state the exhaust function provides control. However, the blade temperature control does protect against high and sudden temperature transients.

The software control configuration for Mode 4 is illustrated in FIG. 40E. Load Mode 3 and load Mode 4 program executions are completed through low select block 700 which selects the lowest fuel demand representation associated with the temperature, surge and load limits to provide the control operations described. Control program execution through the blocks 766, and/or 738, 744 and 700 continues for the duration of Mode 3 or Mode 4 load control.

| Special Macros for Control Program | |
|---|---|
| 1. DIF | Differencing Blocks |

-continued

| Special Macros for Control Program |
|---|

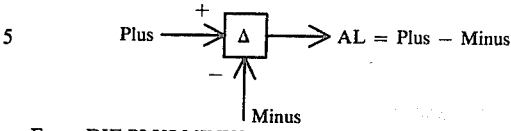

Form: DIF PLUS,MINUS
Comments:
Result is in AL upon exit from the macro. There is a built-in check for overflow. If overflow occurs, the output is set equal to the maximum value of 2.0 per-unit (B 11) with sign in the direction that overflow occurred.

2. SUM    Summing Block

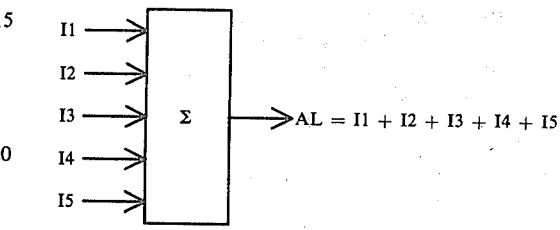

Form: SUM,N,I1,I2,I3,I4,I5
Comments:
N is the number of inputs. Result's in AL upon exit. The overflow check is built-in, and functions the same as the one in DIF.

3. MPL    Multiply

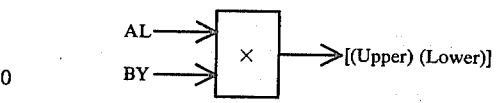

Form: MPL    BY
Comments:
The contents of the accumulator are multiplied by the contents of BY and the product is left in the two permanent locations UPPER and LOWER. High order bits are in UPPER.

4. DIV    Divide

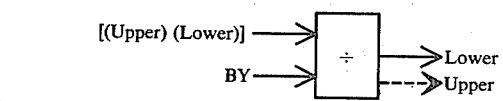

Form: DIV BY
Comments:
The double length contents of the permanent locations UPPER and LOWER are divided by the contents of BY. The answer is stored in LOWER and the remainder is stored in UPPER.

5. FID    1-Dimensional Function Generator

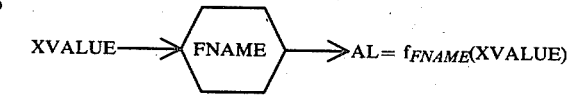

Form: FID FNAME, XVALUE
Comments:
The instructions for this macro cause the value contained in XVALUE to be stored in VARIN1, then there is a return jump to the 1-dimensional function generator subroutine 1DIMEN with the accumulator loaded with the address of the last independent variable in the function table. The subroutine uses the information given to find the value of the function corresponding to the value XVALUE. This value is in AL at the completion of the macro. The starting location of the function table is specified by FNAME.

6. F2D    2-Dimensional Function Generator

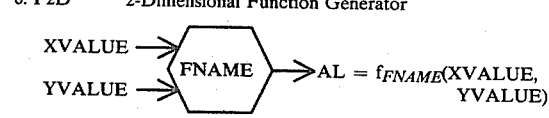

Form: F2D FNAME, XVALUE, YVALUE
Comments:
This macro stores XVALUE in VARIN1 and YVALUE in VARIN2 then it loads the accumulator with the address of the last independent variable in the the function table. The subroutine uses this information to find the value of the function corresponding to XVALUE and YVALUE.

-continued
Special Macros for Control Program

This value is in AL upon completion of the macro. The starting location of the function table is given by FNAME.

7. DFF     Differentiator or Rate Function

NEWVAL ⟶ DFF ⟶ OUTPUT $$\text{OUTPUT(S)} = \left[\left(\frac{\text{GAIN}}{1 + (\text{GAIN})\text{S}}\right)\text{S}\right]\text{NEWVAL(S)}$$

Form: DFF, GAIN OLDVAL, NEWVAL, OUTPUT
Comments:
This macro picks up the value for gain and does a return jump to the differentiator subroutine, DIFFER. Following the return jump are the addresses of the previous input value(OLDVAL), the address of the present input(NEWVAL) and the address of the output value(OUTPUT). The subroutine uses all this information to perform the numeric operations to bring about the transfer function shown above.

8. IGT     Integrator or Reset Function

NEWVAL ⟶ IGT ⟶ OUTPUT $$\text{OUTPUT(S)} = \left(\frac{\text{GAIN}}{\text{S}}\right)\text{NEWVAL(S)}$$

Form: IGT, GAIN, OLDVAL, NEWVAL, OUTPUT
Comments:
The macro picks up the value for gain and return jumps to the integrator subroutine, INTEGR. Following the jump are the addresses of the previous input value(OLDVAL), the present input(NEWVAL), and the output(OUTPUT). The subroutine uses this data to numerically effect the transfer function shown above.

9. IFP     Positive Check

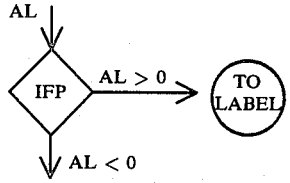

Form: IFP, LABEL
Comments:
If the contents of the accumulator, AL, are positive, jump to LABEL.

10. LOS     Low Select

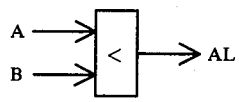

Form: LOS A,B
Comments:
The macro finds the lower of the two values and leaves it in AL.

D. The Integrator or Reset Function Subroutine INTEGR
This subroutine numerically performs the integration or reset control function using information furnished to it in the subroutine call. The IGT macro is the subroutine call and has the form:

ENJ     GAIN
RJP     INTEGR
OCT     OLDVAL     Address of X(N − 1)
OCT     NEWVAL     Address of X(N)
OCT     OUTPUT     Address of Y(N − 1)

The subroutine is entered with the GAIN in AL. Once this is divided by two and stored, the addresses of the other variables of interest are picked up and stored. The subroutine is now ready to begin the actual calculation. The algorithm used for the reset function is:

$$y(N) = y(N-1) + \left(\text{Period} * \left(\frac{\text{GAIN}}{2}\right)\right) * (X(N-1))$$

where y(N), X(N) indicate the values at the Nth time sample and y(N − 1) indicates the value at the previous time sample. The subroutine does not save or initialize the previous values needed for the calculation. This must be done as a part of the main program.

-continued
Special Macros for Control Program

In order to maintain accuracy the variables and gain are at a B point of 11. The result is stored in the output address at B of 11. Care is taken in the calculation to see that the B point is maintained.

E. The Differentiator or Rate Function Subroutine, DIFFER
This subroutine numerically performs the differentiation or rate function using information contained in the subroutine call. The call is contained in the DFF macro and has the form:

ENL     GAIN
RJP     DIFFER
DEC     OLDVAL     Address of X(N − 1)
DEC     NEWVAL     Address of X(N)
DEC     OUTPUT     Address of Y(N − 1)

In this subroutine as in the reset subroutine, the calculations are done in fixed point at a B point of 11. The values stored in OLDVAL, NEWVAL, and OUTPUT are per-unit B 11. The value of GAIN is at a B of 9. As long as the GAIN and the PERIOD are at the same B point, the answer will come out at the same B point as the input. The algorithm used for this function is:

$$y(N) = \left(\frac{2*\text{GAIN} - \text{PERIOD}}{2*\text{GAIN} + \text{PERIOD}}\right) *y(N-1) +$$

$$\left(\frac{2*\text{GAIN}}{2*\text{GAIN} + \text{PERIOD}}\right) * (X(N) - X(N-1))$$

This algorithm numerically calculates the s domain transfer function:

$$y(s) = \left(\frac{\text{GAIN}}{1 + (\text{GAIN})s}\right) s\, X(s)$$

Note that the transfer function contains a damping term, 1/(1+(GAIN)s). This damping is desirable because a pure differentiating action is highly sensitive to noise and may yield numerical instability. We will now see how the subroutine does the calculation.

The first operations in the subroutine take the gain that is in AL and multiply it by 2. Next, the addresses of the input variables are picked up and stored in the subroutine area. All the data is now in for the calculation. The calculation is done in two steps. The first step calculates the first term in the algorithm and the second step calculates the second term. These are summed and the result checked to see if it exceeds the maximum value of 2.0 per-unit.

The final answer is stored in OUTLOC which up until the time of storage has contained the previous output. The subroutine does not save or initialize the values of the previous values; this must be done in the main program.

9. Alarm and Thermocouple Check Programs

In the alarm system, alarms are generated in response to sensors considered in connection with FIG. 12. Printout of alarms is made as in the following example:

| Time | Status | Turbine Identification | Description |
| --- | --- | --- | --- |
| 12:30 | ALRM | A | Flame A |

The status conditions of the alarms are listed below:
NORM—Normal
ALRM—Alarm

Figure 47:
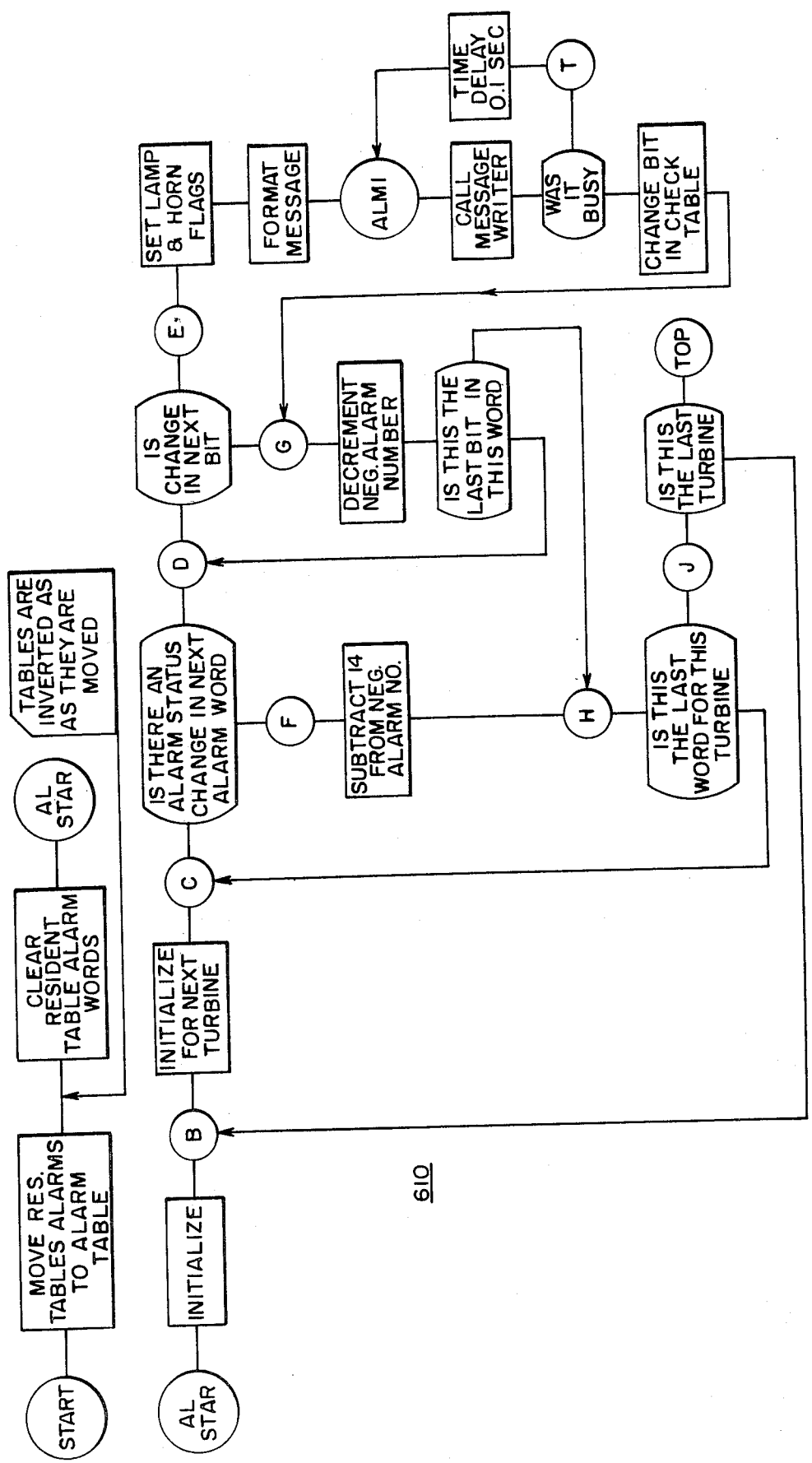
FIG. 47 illustrates a flowchart for an alarm program included in the program system.
Figure 48:
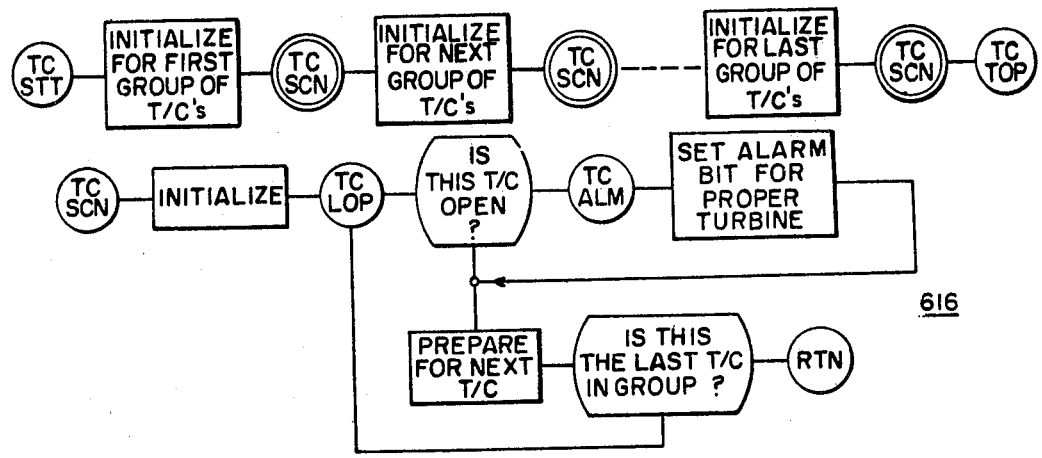
FIGS. 48 and 49 respectively show flowcharts for a thermocouple check program and a log program employed in programmed computer operations.

A flowchart for the alarm program 610 is shown in FIG. 47. Alarms are determined by the sequencing program 600 and the thermocouple check program 616 as previously considered. A flowchart for the thermocouple check program 616 is shown in FIG. 48. Alarm printouts generated by the alarm program 610 result from the use of two tables of bits. In the first table, the bits are set On and OFF by the sequencing program 600 and the thermocouple check program 616 and the second table is used to store the previous condition of the alarm bits. The alarm program 610 compares the two tables and generates alarm messages when the bit patterns of the two tables differ. The alarm program 610 is periodically executed to print out all points in alarm as follows.

In the case of shutdown alarms, one operational and maintenance advantage associated with the operation of the control system 300 is that the alarm condition which causes a shutdown can be readily determined. Thus, logic processing provided by the sequencing program in the implementation of the sequence logic (FIG. 33) avoids the generation of multiple spurious alarms which are caused by the shutdown itself and follow the shutdown causing alarm. Multiple confusing alarm lightings as encountered with conventional annunciator panels are thus avoided.

3.6 ALARMS-AUXILIARIES

|   | Generator Trip | Alarm |
|---|---|---|
| A. Generator - 87-64G-40 46-51V-67 81G-27G 87T | X | X |
| B. Generator Bus Grd | X | X |
| C. Generator 81B 27B | X | X |
| D. Generator 60 CFVB | X | X |
| E. Generator Optional Alarms 1. Ground 2. Differential 3. Loss of Field 4. Reverse Power 5. Negative Sequence 6. Over Current 7. Exciter Field Ground 8. Aux. Transformer Alarm | X | X |
| F. Transformer SPR Relay Oil Temperature Oil Level Miscellaneous | X | X |
| G. Transformer Optional Alarms 1. Hot Spot 2. Oil Flow 3. Instrument Air | X | X |

3.7 STARTING AND RUNNING SHUT DOWN

|   | Local Start | Local Run | Remote Start | Remote Run |
|---|---|---|---|---|
| Blade Path Overtemperature | SD | SD | SD | SD |
| Turbine Exhaust Overtemperature (Manifold) | SD | SD | SD | SD |
| Low Lube Oil Pressure | SD | SD | SD | SD |
| Low Fuel Supply Pressure(Gas) (PS9GL) | SD | SD | SD | SD |
| Turbine Overspeed | SD | SD | SD | SD |
| Loss of Computer | SD | SD | SD | SD |
| Low DC Control Voltage(BUS) LDC (Charger) | SD | SD | SD | SD |
| High Vibration (Run)50 to 100% Speed | SD | SD | SD | SD |
| High Bearing Temperature | SD | SD | SD | SD |
| Fire Detection(FR1, FR2) | SD | SD | SD | SD |
| Low Compressor Suction | A | A | SD | SD |
| Low Lube Oil Level | A | A | SD | SD |
| High Lube Oil Temperature | A | A | A | SD |
| Low Instrument Air Pressure(PS11) | A | A | SD | SD |
| High Vibration(Start)0-50% Speed | SD | A | SD | A |
| Loss DC to Auxiliary Pump | SD | A | SD | A |
| Unit Not on Turning Gear(start & Stop) | SD | — | SD | — |
| Sequence Failure | SD | — | SD | — |
| Loss of Starting Device(Active to 50%) | SD | — | SD | — |
| Combustor Outfire #1 6A, 6B | SD | SD | SD | SD |
| Combustor Outfire #2 7A, 7B | SD | SD | SD | SD |
| #1 Bleed Valve Position Failure to Open(Start) | SD | — | SD | — |
| #1 Bleed Valve Position-Failure to Close | A | A | A | A |
| #2 Bleed Valve Position-Failure to Open(Start) | SD | — | SD | — |
| #2 Bleed Valve Position-Failure to Close | A | A | A | A |
| Fuel Supply Pressure High(Gas) (PS9GH) | SD | A | SD | A |
| Emergency Stop-(PS & G Cabinet) | SD | SD | SD | SD |
| Remote Stop | SD | SD | SD | SD |
| Local Stop | SD | SD | SD | SD |
| Low Fuel Oil Supply Pressure (PS9DS) | SD | SD | SD | SD |
| High Fuel Oil Pressure(PS9D) | SD | — | SD | — |
| Low Fuel Oil Pressure(PS9D) | — | SD | — | SD |
| Inlet Guide Vane Fail to Open (Start & Run) | A | A | A | A |
| Inlet Guide Vane Fail to Close(Start) | SD | — | SD | — |
| Exhaust Overtemperature | SD | SD | SD | SD |
| Disc Cavity Area 1 O.T. | A | A | A | A |
| Disc Cavity Area 2 O.T. | A | A | A | A |
| Disc Cavity Area 3 O.T. | A | A | A | A |
| Disc Cavity Area 4 O.T. | A | A | A | A |
| Disc Cavity Areas 1"4(2 in Same Area) | SD | SD | SD | SD |
| High Temperature Inlet of of Main Pump | SD | SD | SD | SD |

A - Alarm Only
SD - Alarm and Shutdown

The thermocouple check program 616 also runs on a periodic basis. When it is executed, a check is made of the values stored for all thermocouples not checked by the control program 602 to determine if the thermocouple value is more negative than a predetermined check number stored in location CHKNO. An excessive negative number is considered an open circuit and an alarm bit is set for the alarm program 610.

10. Data Logging Program

A formated log is printed in response to execution of the log program 618 on a periodic basis selected by the plant operator within the range of 15 minutes to two hours. The printed readings are instantaneous values obtained from the last analog scan cycle. The plant operator selects any 20 analog points per turbine under control, such as the more useful analog points included in the following:

| (1) | (10) | points-Bearing temperatures. |
|---|---|---|
| (2) | (2) | points-compressor inlet and discharge air temperature |
| (3) | (1) | point-lube oil cooler discharge temperature |
| (4) | (2) | points-generator air cooler in and out temperature |
| (5) | (8) | points-disc cavity temperature |
| (6) | (8) | points-blade plate temperature |
| (7) | (8) | points-exhaust manifold temperature |
| (8) | (4) | points-vibration |
| (9) | (1) | point-speed |
| (10) | (1) | point-watt |
| (11) | (1) | point-for VARS |
| (12) | (1) | point-volts |
| (13) | (1) | point-amperes |
| (14) | (1) | point-frequency |
| (15) | (6) | points-RTD for generator temperature. |

Figure 49:
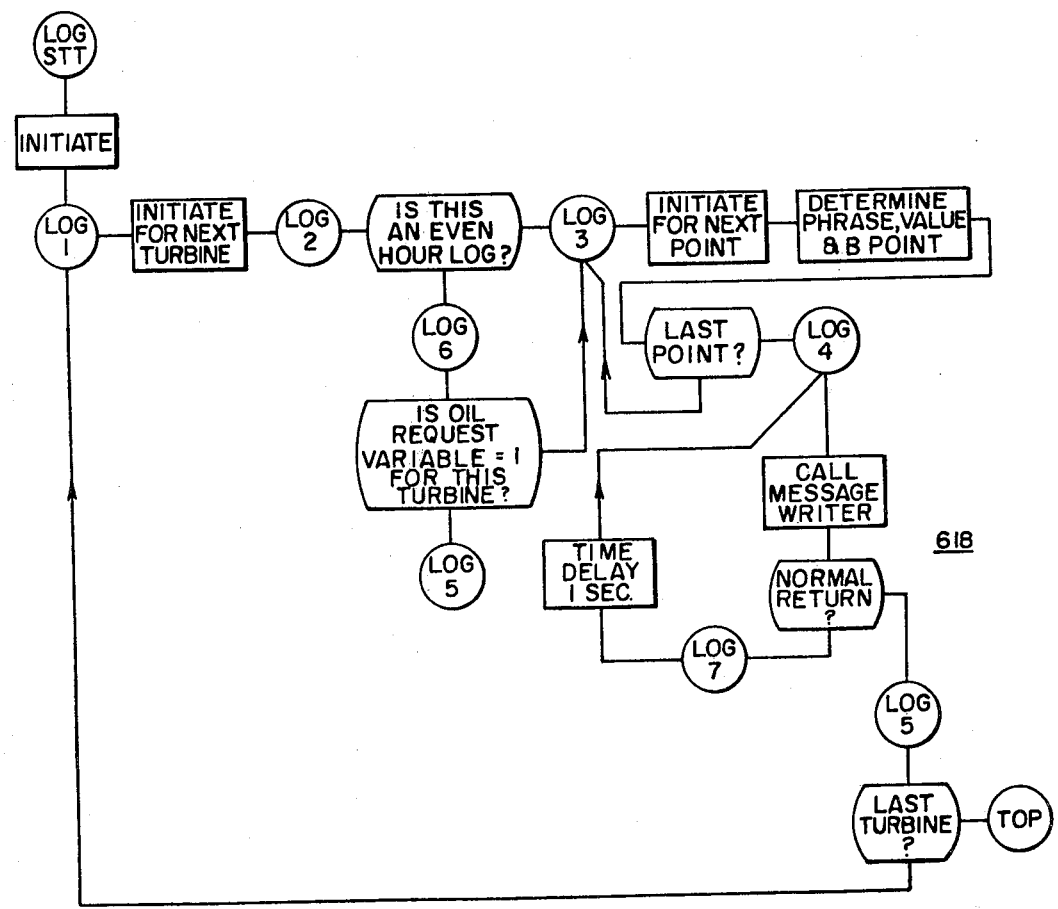

A flowchart is shown for the log program 618 in FIG. 49.

Figure 50A:
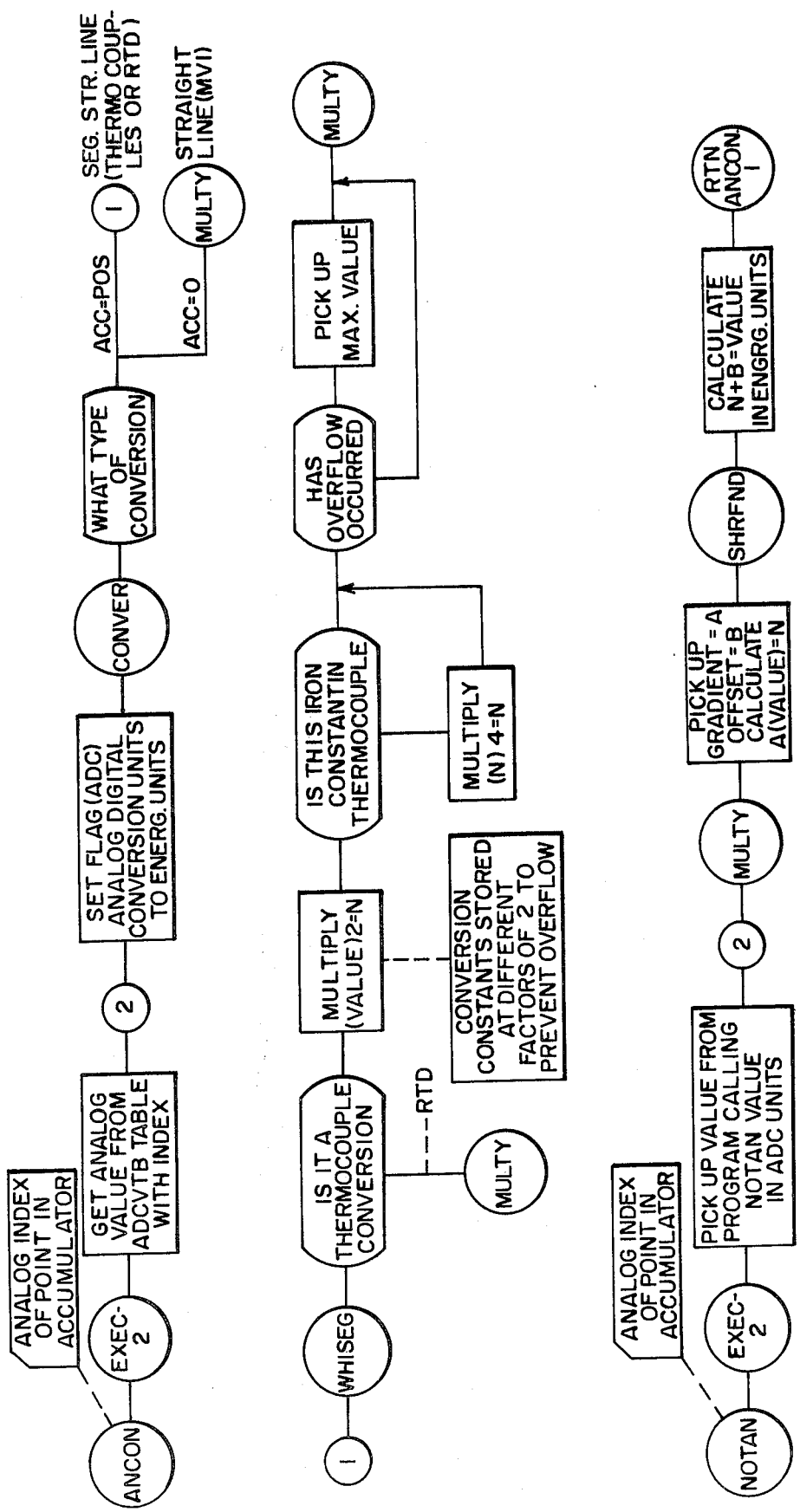
FIGS. 50A-D show the flowcharting which represents a program used to convert analog input system units to engineering units for log program operations.
Figure 50B:
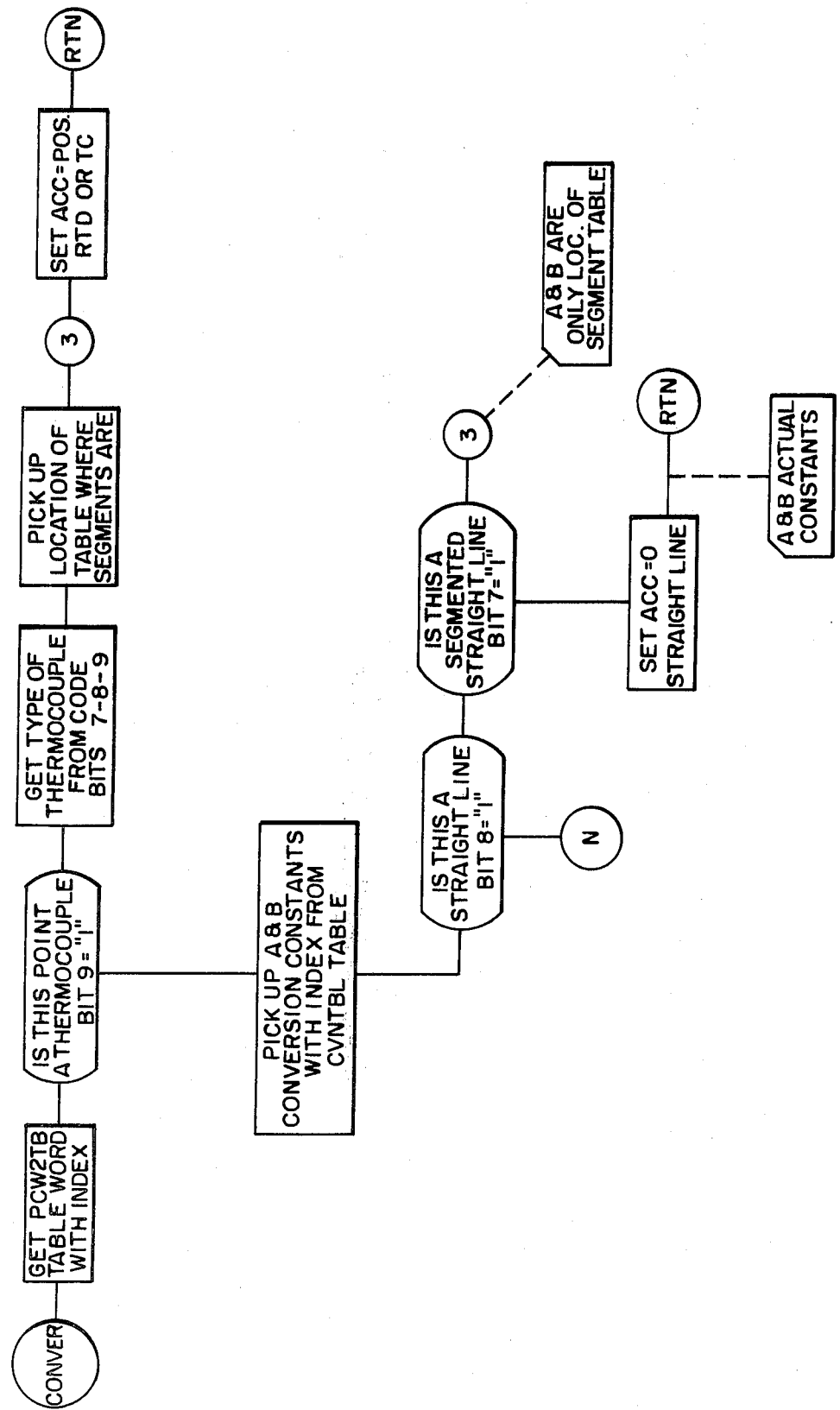
Figure 50C:
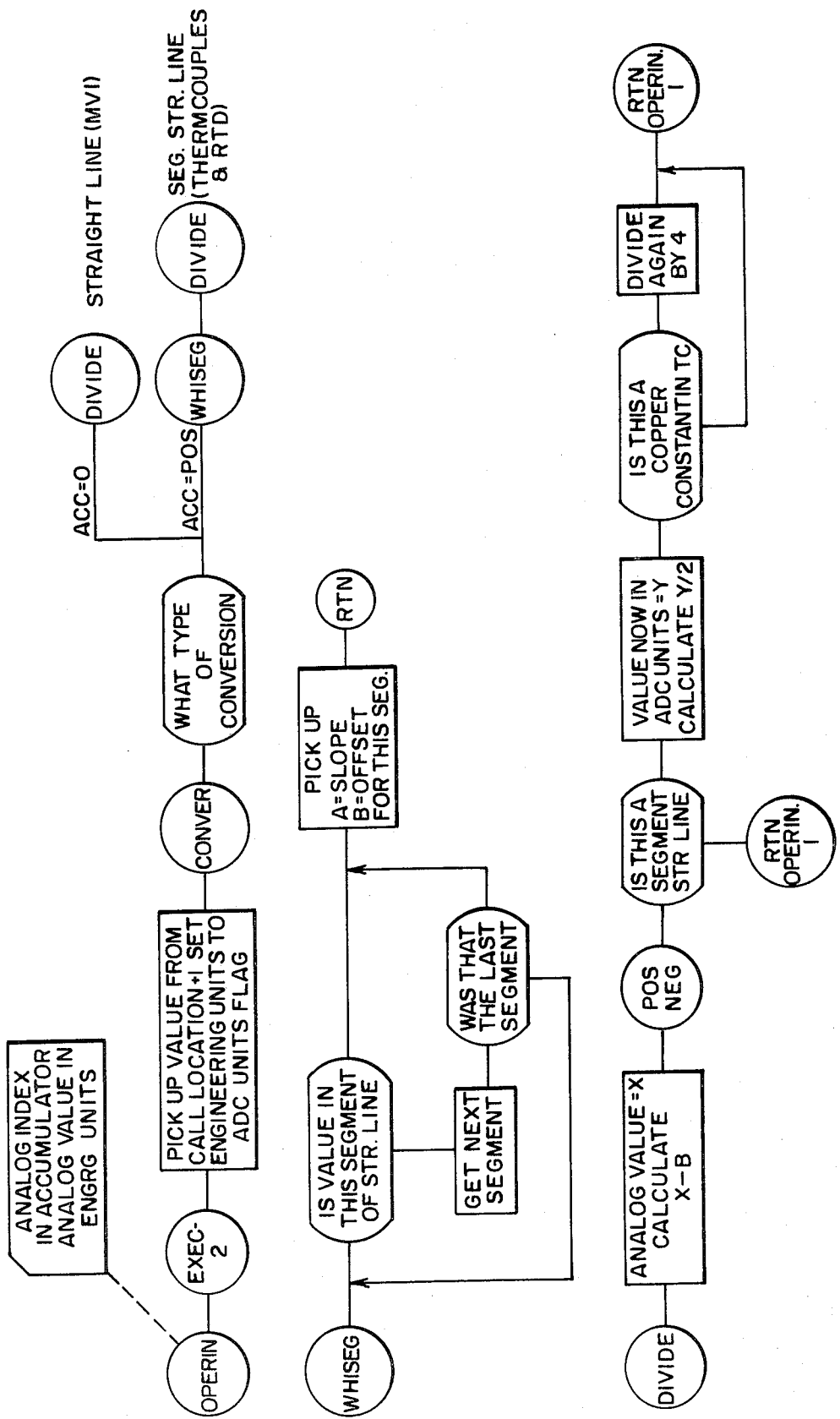
Figure 50D:
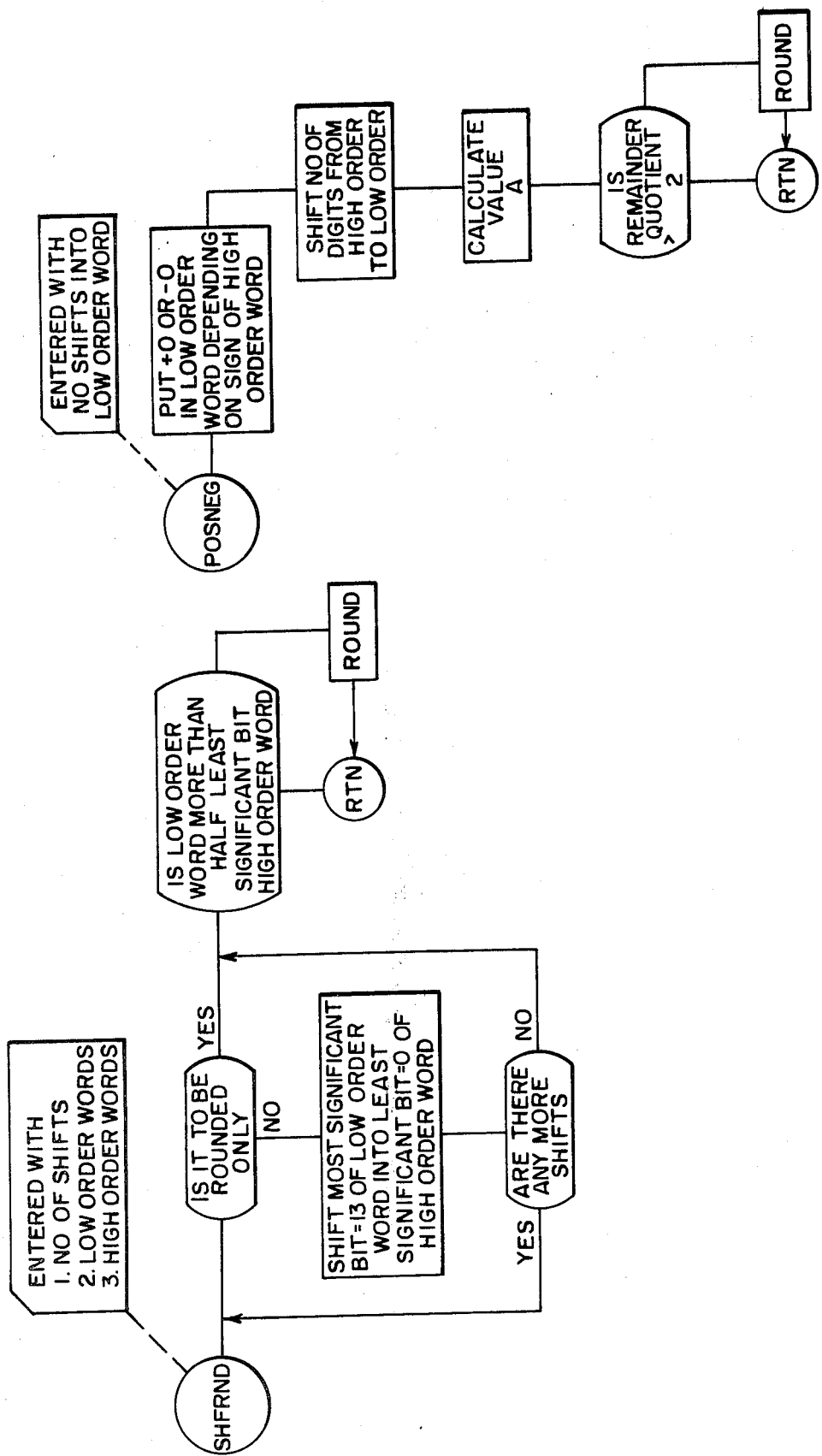

The conversion program 620 is illustrated by flowcharts shown in FIGS. 50A, B, C and D. Generally, the analog conversion program 620 provides for converting entered analog values into the engineering value represented by the input and vice versa. Generally, four types of conversion are provided, i.e., flow straight-line, thermocouple, and segmented straight-line.

11. Miscellaneous Programs

Figure 51:
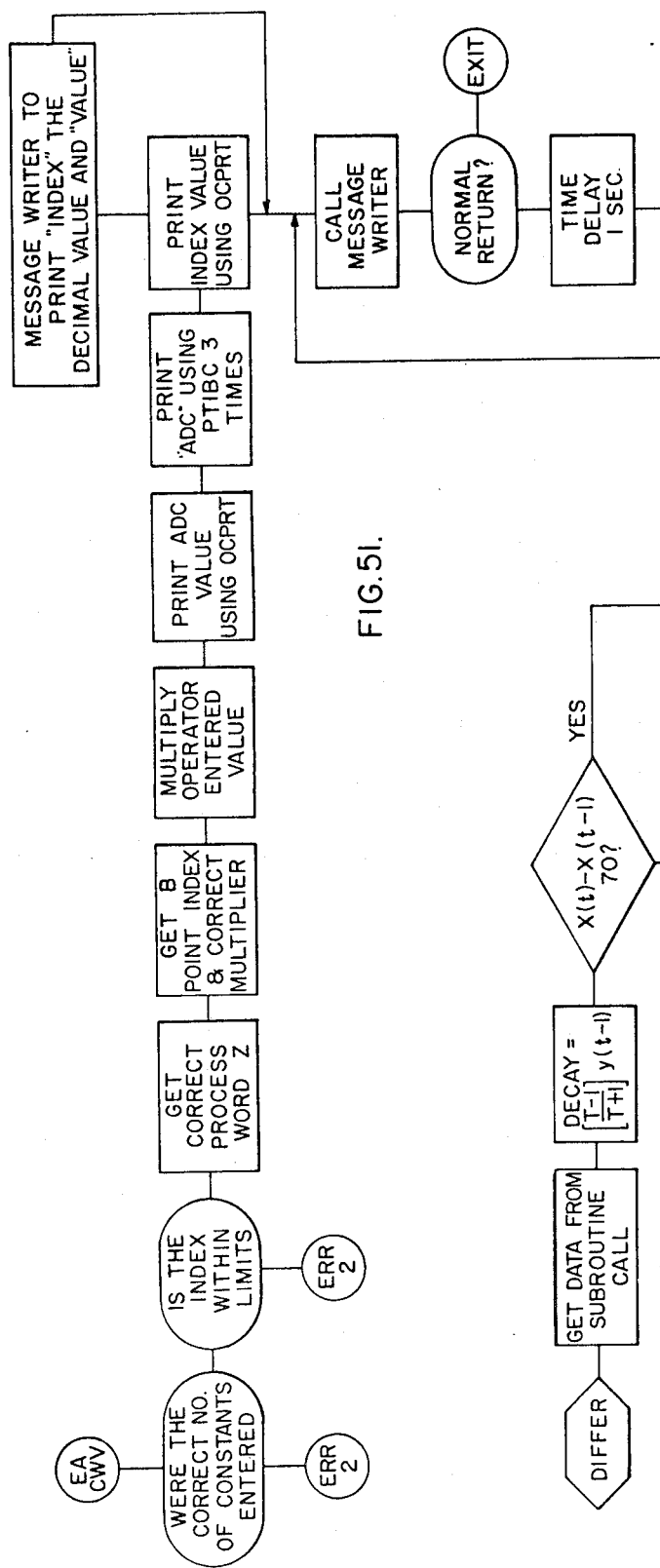
FIG. 51 shows a flowchart for a program which converts engineering units to analog input system limits.

The miscellaneous programs 622 includes a programmer's console function program for converting engineering units to values corresponding to the analog input system as shown in FIG. 51. It is essentially the reverse of the analog conversion program 620 and provides for convenient operator communication with the computer through the teletypewriter or printer. For example, alarm setpoint limits can be conveniently adjusted in the sequencing program 600 with the use of the engineering units to analog conversion program. A flowchart 800 is shown in FIG. 51 for the engineering units to analog conversion program.

Other programs includes in the miscellaneous category are a deadswitch computer program which verifies that certain basic functions of the computer are operating as expected. A power failure and restart program interfaces with the executive program 604 to save registers and stop the computer 304 when a power failure interrupt is received, and it restarts the main computer subsystems when the power supply voltage is returned to normal.

E. LIST OF MACROS, INPUTS/OUTPUTS AND PROGRAMS WRITTEN IN ASSEMBLY LANGUAGE (NOT PRINTED)

The deposited microfiche appendix, cross-referenced before, discloses a printout of a listing which includes the logic and control Macros, the contact closure inputs and outputs, the analog inputs and the devices associated with sequencing control in a specific embodiment of the control system 300 shown in FIG. 12. The deposited listing also includes a printout of specific programs employed in the embodiment. The program system described in section D hereof substantially embraces the programs in the listing. Generally, the programs were written in assembly language and stored in a P50 core memory 16K in size. With more judicious use of core areas and increased use of subroutining, it is expected thsat substantially the same subject matter and related additions can be programmed in less than 12K of core memory.

Although the detailed flowcharting corresponding to the program printout does have certain differences from certain aspects of the described flowcharting, the listed programs do provide for an essential implementation of the subject matter described herein. Generally, in addition to being embraced by the described program system as already indicated, the programs are arranged for application in the control loop arrangement 300A (FIG. 34) as embodied in the control system 300 (FIG. 12).

Most developed system software may be characterized with relatively minor faults known as bugs which sometimes take long periods of time to detect and/or diagnose. Ordinarily, the correction of such faults is within the skill of control and system programmers. The program listing which follows accordingly may be expected to contain some faults of this kind but all such faults which have been detected have required only programmer skill for correction in field applications.

As an aid to the reader, the following notes are made relative to the format of the program listing:

a. The first line on each page contains the title of the program and/or the page number for that program.

b. The first column of octal digits is a sequential record number listing corresponding to the punched card or other program input records.

c. The second column of five octal digits is a machine language statement of the memory address of the instruction which is described on that line.

d. Each row in the third column of six octal digits is separated into fields of two digits, one digit and three digits, and it expresses the contents of the memory address separated into the instruction format. The fields contain:

1. Operation code—left two digits
2. Addressing mode—middle, single digit
3. Operand address—right three digits.

e. The fourth column of one mark, i.e., or V, indicates that an address or value was generated by the assembler to satisfy the requested instructions.

f. Each row in the fifth column up to six characters; letters or numerals contains the symbolic title assigned to the corresponding memory address by the programmer in the assembly language.

g. Each row in the sixth column of three letters contains the operation code assigned to the corresponding memory address by the programmer in the assembly language. The operation code includes a large number of directives to the assembler program and the various available machine instructions.

h. Each row in the seventh column of up to six characters represents the operand address assigned to the corresponding memory location by the programmer in the assembly language.

i. The remaining columns contain comments made by the programmer to aid in understanding the program operation.

What is claimed is:

1. A combustion turbine electric power plant comprising a combustion turbine having a compressor and combustion and turbine elements, a generator having a field winding and being coupled to said combustion turbine for drive power, a fuel system for supplying fuel to the combustion turbine combustion element, means for exciting said generator field winding, a control system including digital computer means and signal input/output means therefor, means for operating said fuel system to energize said turbine and for controlling said exciting means, means for generating a turbine speed and other predetermined feedback signals, means for operating said computer means to make control action determinations for implementation by said fuel system operating means and said exciting control means, said computer operating means generating a feed forward speed reference representation as one of said control action determinations, said computer operating means further generating a turbine load level determining representation in response to at least one of said other predetermined turbine signals, said computer operating means combining said representations to generate a fuel demand, and means external to said computer means for controlling said fuel system operating means in response to the fuel demand and said speed signal means for turbine and generator speed control.

2. A combustion turbine electric power plant comprising a combustion turbine having a compressor and combustion and turbine elements, a generator coupled to said combustion turbine for drive power, a generator breaker for coupling said generator to a power system, a fuel system for supplying fuel to said combustion turbine combustion element, a control system including digital computer means and signal input/output means therefor, means for controlling and operating said fuel system to energize said turbine, means for generating a turbine speed and ther predetermined feedback signals, means for operating said computer means to make control action determinations for implementation by said fuel system operating means and to control the opening and closure of said generator breaker, said computer operating means generating a feed forward speed reference representation as one of said control action determinations, said computer operating means further generating a turbine load level determining representation in response to at least one of said other predetermined turbine signals, said computer operating means combining said representations to generate a fuel demand, and means external to said computer means for controlling said fuel system operating means in response to the fuel demand and said speed signal generating means for turbine and generator speed control.

3. An electric power plant as set forth in claim 2 wherein said computer operating means generates said load level representation as a function of a nonlinear turbine operating limit characterization.

4. A method of operating an electric power plant including a gas turbine having compressor, combustion and turbine elements, a generator coupled to the turbine for drive power, a fuel system for supplying fuel to the gas turbine combustion element, means for operating the fuel system to energize the turbine, a programmable digital computer and an input/output system therefor, the steps of said method comprising:
(a) operating the computer to generate a fuel demand representation for desired turbine operation characterized in accordance with the nonlinear response characteristics of the turbine;
(b) converting said computer determined fuel demand representation to an analog signal;
(c) utilizing said analog signal as a feedforward speed/load fuel demand signal for the turbine and driven generator;
(d) operating the computer to generate a plurality of generator and turbine parametric fuel demand limit representations;
(e) utilizing said developed parametric representations to limit and calibrate, where necessary, said feedforward speed/load fuel demand signal over the entire range of expected plant operation; and
(f) utilizing said limited feedforward speed/load fuel demand signal to control the means for operating the fuel system.

5. An electric power plant as set forth in claim 3 wherein said computer operating means determines an operating limit representation for an exhaust temperature limit based on a function of determining exhaust temperature and a nonlinear temperature reference characterization applicable during turbine startup and load operation and in addition an operating limit representation for a nonlinear surge limit characterization applicable during turbine startup.

6. An electric power plant as set forth in claim 5 wherein means are provided for detecting generator load and said computer operating means further provides for controlling said fuel system operating means in response to detected load to regulate the generator load substantially to a predetermined value.

7. An electric power plant as set forth in claim 6 wherein means are provided for limiting the rate at which said fuel demand representation changes during load operating level changes.

8. An electric power plant as set forth in claim 2 wherein means are provided for detecting genrator load and said computer operating means further provides for controlling said fuel system operating means in response to detected load to regulate the generator load substantially to a predetermined value and wherein means are provided for limiting the rate at which said fuel demand representation changes during load operating level changes.

9. A combustion turbine electric power plant comprising a combustion turbine having a compressor and combustion and turbine elements and having speed and load modes of operation, a generator having a field winding and being coupled to said combustion turbine for drive power, a fuel system for supplying fuel to the combustion turbine combustion element, means for exciting said generator field winding, a control system including digital computer means and signal input/output means therefor, means for operating said fuel system to energize said turbine and for controlling said exciting means, means for generating a turbine speed signal and other predetermined feedback signals, means for operating said computer means to make control action determinations for implementation by said fuel system operating means and said exciting control means, said computer operating means generating a fuel demand for turbine speed and load control in response to a turbine speed demand and a turbine load demand or limit, means for generating at least one of said speed and load demand signals in response to a nonlinear turbine operating limit characterization, and means for controlling said fuel system operating means in response to a computer means output signal corresponding to said fuel demand.

10. An electric power plant as set forth in claim 9 wherein the characterization is for an exhaust temperature limited based on a function of determined exhaust temperature and a nonlinear temperature limit reference applicable during turbine startup and load operation.

11. An electric power plant as set forth in claim 9 wherein the characterization is for a non-linear surge limit which operates in said generating means at least during the startup mode of operation.

12. An electric power plant as set forth in claim 9 wherein means are provided for detecting generator load and said computer operating means further provides for controlling said fuel system operating means in response to detected load to regulate the generator load substantially to a predetermined value.

13. An electric power plant as set forth in claim 12 wherein means are provided for incrementally varying the predetermined value to which the load is regulated.

14. An electric power plant as set forth in claim 9 wherein means are provided for detecting generator load and said computer operating means further provides for controlling said fuel system operating means in response to detected load to regulate the generator load substantially to a predetermined value and wherein means are provided for limiting the rate at which said fuel demand representation changes during load operating level changes.

15. An electric power plant as set forth in claim 9 wherein said computer operating means determines an operating limit representation for an exhaust temperature limit based on a function of determining exhaust temperature and a nonlinear temperature reference characterization applicable during turbine startup and load operation and in addition an operating limit representation for a nonlinear surge limit characterization applicable during turbine startup.

16. A combustion turbine electric power plant comprising a combustion turbine having a compressor and combustion and turbine elements, a generator coupled to said combustion turbine for drive power, a generator breaker for coupling the generator to a power system, a fuel system for supplying fuel to the combustion turbine combustion element, a control system including digital computer means and signal input/output means therefor, means for controlling and operating said fuel system to energize said turbine, means for generating a turbine speed and other predetermined feedback signals, means for operating said computer means to make control action determinations for implementation by said fuel system operating means and to control the opening and closure of said generator breaker, said computer operating means generating a feed forward speed reference representation as one of said control action determinations, said computer operating means further generating a turbine load level determining representation in response to at least one of said other predetermined turbine signals, said computer operating means combinining said representations to generate a fuel demand, and means external to said computer means for generating at least one of said speed and load demand signals in response to a nonlinear turbine operating limit characterization, and means for controlling said fuel system operating means in response to a computer means output signal corresponding to said fuel demand.

17. An electric power plant as set forth in claim 16 wherein the characterization is for an exhaust temperature limit based on a function of determined exhaust temperature and a nonlinear temperature limit reference applicable during turbine startup and load operation.

18. An electric power plant as set forth in claim 16 wherein the characterization is for a nonlinear compressor surge limit which operates in said generating means at least during the startup mode of operation.

19. An electric power plant as set forth in claim 16 wherein said computer operating means determines an operating limit representation for an exhaust temperature limit based on a function of determined exhaust temperature and a nonlinear temperature reference characterization applicable during turbine startup and load operation and in addition an operating limit representation for a nonlinear surge limit characterization applicable during turbine startup.

20. An electric power plant as set forth in claim 16 wherein means are provided for detecting generator load and said computer operating means further provides for controlling said fuel system operating means in response to detected load to regulate the generator load substantially to a predetermined value and wherein means are provided for limiting the rate at which said fuel demand representation changes during load operating level changes.

21. An electric power plant as set forth in claim 16 wherein said computer operating means determines a fuel demand representation for desired turbine operation, said fuel demand representation includes a speed demand representation which is converted to an analog output speed reference signal from said computer means, and said fuel system controlling means includes means for detecting actual turbine speed and means for generating a fuel demand signal in response to the difference between the actual speed and the speed reference.

22. An electric power plant as set forth in claim 21 wherein the fuel demand representation includes a plurality of fuel demand limit representations, and means are provided for selecting the lowest fuel demand signal or representation as said fuel demand signal generating means.

23. An electric power plant as set forth in claim 21 wherein means are provided for detecting generator load and said computer operating means further provides for controlling said fuel system operating means in response to detected load to regulate the generator load substantially to a predetermined value.

24. An electric power plant as set forth in claim 22 wherein means are provided for detecting generator load and said computer operating means further provides for controlling said fuel system operating means in response to detected load to regulate the generator load substantially to a predetermined value.

25. An electric power plant as set forth in claim 23 wherein means are provided for limiting the rate at which said fuel demand representation changes during load operating level changes.

26. An electric power plant as set forth in claim 24 wherein means are provided for limiting the rate at which said fuel demand representation changes during load operating level changes.

27. A combustion turbine electric power plant comprising a combustion turbine having a compressor and combustion and turbine elements, a generator coupled to said combustion turbine for drive power, a generator breaker for coupling the generator to a power system, a fuel system for supplying fuel to the gas turbine combustion element, a control system including digital computer means and signal input/output means therefor, means for controling and operating said fuel system to energize said turbine, means for generating a turbine speed and other predetermined feedback signals, means for operating said computer means to make control action determinations for implementation by said fuel system operating means and to control the opening and closure of said generator breaker, said computer operating means generating a feed forward speed reference representation as one of said control action determinations, said computer operating means further generating a turbine load level determining representations in response to at least one of said other predetermined turbine signals, said computer operating means combining said representations to generate a fuel demand, means external to said computer means for controlling said fuel system operating means in response to the fuel demand and said speed signal means for turbine and generator speed control, means for detecting generator load, said computer operating controlling said fuel system operating means in response to detected load to regulate the generator load substantially to a predetermined value, and means for limiting the rate at which said fuel demand changes during load operating level changes.

28. An electric power plant as set forth in claim 27 wherein means are provided for incrementally varying the predetermined value to which the load is regulated.

29. A combustion turbine electric power plant comprising a combustion turbine having compressor, combustion and turbine elements, a generator coupled to said gas turbine for drive power, a fuel system for supplying fuel to said combustion turbine combustion element, means for operating said fuel system to energize said turbine, programmable digital computer means and signal input/output means therefor, means for generating a turbine speed and other predetermined feedback signals, means for operating said computer means to generate a feedforward speed demand representation for desired turbine operation, said computer operating means further generating a turbine load level determining representation in response to at least one of said other predetermined turbine signals, said computer operating means combining said representations to generate a fuel demand, and circuit means external to said computer for controlling said fuel system operating means in accordance with said speed signal and a computer means output signal corresponding to said fuel demand.

30. A combustion turbine power plant as set forth in claim 29 wherein said fuel demand representation includes a speed demand representation and said fuel system controlling circuit means includes means for converting said speed demand representation to an analog speed reference signal, and means for generating a fuel demand signal in response to the difference between actual speed and said analog speed reference signal.

31. A combustion turbine power plant as set forth in claim 30 wherein said fuel demand representation includes a plurality of fuel demand limit representations, and wherein there is further provided selection means for selecting the lowest fuel demand signal or representation as the outputfuel demand.

32. An electric power plant as set forth in claim 31 wherein said demand limit representation comprises a surge limit representation of a nonlinear surge limit characterization applicable during turbine startup.

33. An electric power plant as set forth in claim 30 wherein said fuel system controlling circuit means further comprises means for generating an auxiliary backup speed signal and means for limiting said fuel demand signal as a function of said backup speed signal.

34. An electric power plant as set forth in claim 29 which further comprises means for limiting the rate at which said fuel demand representation changes during load operating level changes.

35. An electric power plant as set forth in claim 34 wherein said fuel demand representation includes a speed demand representation and said fuel system controlling circuit means includes means for converting said speed demand representation to an analog speed reference signal, means for detecting actual turbine speed and means for generating a fuel demand signal in response to the difference between actual speed and said analog speed reference signal.

36. An electric power plant as set forth in claim 35 wherein said fuel demand representation further includes at least one fuel demand limit representation, and wherein there is further provided selection means for choosing a fuel demand signal in accordance with the lowest fuel demand signal or representation.

37. A plurality of combustion turbine electric power plants comprising a separate combustion turbine for each plant having compressor and combustion and turbine elements, a generator for each plant coupled to the associated combustion turbine for drive power, respective fuel systems for supplying fuel to the respective combustion elements, digital computer means and signal input/output means therefor, means for controlling and operating each of said turbine fuel systems, means for operating said computer means to make control action determination for implementation by the respective fuel system operating means, said fuel demand representation including a speed demand representation which is converted to an analog output speed reference signal from said computer means, and said fuel system controlling means including means for detecting actual turbine speed and means for generating a fuel demand signal in response to the difference between the actual speed and the speed reference.

38. A plurality of combustion turbine electric power plants as set forth in claim 37 wherein the fuel demand representation further includes at least one fuel demand limit representation, and means are provided for operating said fuel demand signal generating means in accordance with the lower fuel demand signal or representation.

39. A plurality of combustion turbine electric power plants as set forth in claim 38 wherein each of said power plants includes a generator breaker for coupling the generator to a power system and said computer operating means further provides control action determinations to control the opening and closure of each of said generator breakers.

40. A plurality of combustion turbine electric power plants as set forth in claim 39 wherein means are provided for detecting generator load and said computer operating means further provides for controlling said fuel system operating means in response to detected load to regulate the generator load substantially to a predetermined value.

41. A plurality of combustion turbine electric power plants as set forth in claim 40 wherein means are provided for limiting the rate at which said fuel demand representation changes during load operating level changes.

42. A plurality of combustion turbine electric power plants as set forth in claim 39 wherein each of said power plants includes a generator breaker for coupling the generator to a power system and said computer operating means further provides control action determinations to control the opening and closure of each of said generator breakers.

43. A plurality of combustion turbine electric power plants as set forth in claim 42 wherein means are provided for detecting generator load and said computer operating means further provides for controlling said fuel system operating means in response to detected load to regulate the generator load substantially to a predetermined value.

44. A plurality of combustion turbine electric power plants as set forth in claim 43 wherein means are provided for limiting the rate at which said fuel demand representation changes during load operating level changes.

45. A combustion turbine electric power plant comprising a combustion turbine having compressor, combustion and turbine elements, a generator coupled to said combustion turbine for drive power, a fuel system for supplying fuel to said combustion turbine combustion element, means for operating said fuel system to energize said turbine, programmable digital computer means and signal input/output means therefor, means for operating said computer means to determine a fuel demand representation for desired generator load conditions, means for detecting generator load, circuit means external to said computer means for controlling said fuel system operating means in response to the difference between detected load and said fuel demand representation to regulate generator load substantially to a predetermined value, means for generating as a part of said fuel demand representation a feedforward speed demand representation, said fuel system controlling circuit means including means for converting said speed demand representation to an analog speed reference signal during speed control operations, means for detecting actual turbine speed, and means for generating a fuel demand signal in response to the difference between actual speed and said analog speed reference signal.

46. A combustion turbine electric power plant as set forth in claim 45 wherein said fuel demand representation further includes at least one fuel demand limit representation, and wherein there is further provided selection means for choosing a fuel demand signal in accordance with the lowest fuel demand signal or representation.

47. A plurality of gas turbine electric power plants as set forth in claim 45 wherein means are provided for incrementally varying the predetermined value to which the load is regulated.

48. An electric power plant as set forth in claim 45 wherein said computer operating means additionally determines a load rate limit for limiting the rate at which said fuel system operating means can change the fuel flow rate during load level operating changes.

49. An electric power plant as set forth in claim 45 which further comprises means for generating a surge limit representation of a nonlinear surge limit characterization applicable during turbine startup, and said controlling means further operates said fuel system operating means as a function of said nonlinear surge limit representation.

50. An electric power plant as set forth in claim 45 wherein means are provided for generating a turbine exhaust temperature limit representation as a function of an actual exhaust temperature representation and a representation of a nonlinear temperature reference characterization, applicable during startup operations, and said controlling means further operates said fuel system operating means as a function of said nonlinear temperature limit.

51. An electric power plant as set forth in claim 50 wherein means are further provided for generating a turbine exhaust temperature limit representation as a function of an actual exhaust temperature representation and a representation of a nonlinear temperature reference characterization, applicable during load operation.

52. A combustion turbine electric power plant comprising a combustion turbine having compressor, combustion and turbine elements, a generator coupled to said combustion turbine for drive power, a fuel system for supplying fuel to said combustion turbine combustion element, means for operating said fuel system to energize said turbine, programmable digital computer means and signal input/output means therefor, means for operating said computer means to determine a fuel demand representation for desired generator load conditions, means for detecting generator load, circuit means external to said computer for controlling said fuel system operating means in response to the difference between detected load and said fuel demand representation to regulate generator load substantially to a predetermined value, and means for incrementally varying the predetermined value to which the load is regulated.

53. An electric power plant as set forth in claim 52 wherein said computer operating means additionally determines a load rate limit for limiting the rate at which said fuel system operating means can change the fuel flow rate during load level operating changes.

54. A combustion turbine power plant comprising a combustion turbine having a compressor and combustion and turbine elements, a generator coupled to said combustion turbine for drive power, a generator breaker for coupling the generator to a power system, a fuel system for supplying fuel to the combustion turbine combustion element, a control system including digital computer means and signal input/output means therefor, means for controlling and operating said fuel system to energize said turbine, means for generating a turbine speed and other predetermined feedback signals, means for operating said computer means to make control action determinations for implementation by said fuel system operating means and to control the opening and closure of said generator breaker, said computer operating means generating a feed forward speed reference representation as one of said control action determinations, said computer operating means further generating a turbine load level determining representations in response to at least one of said other predetermined turbine signals, said computer operating means combining said representations to generate a fuel demand, means external to said computer means for controlling said fuel system operating means in response to the fuel demand and said speed signal means for turbine and generator speed control, means for detecting generator load, said computer operating means controlling said fuel system operating means in response to detected load to regulate the generator load substantially to a predetermined value, and means for incrementally varying the predetermined value to which the load is regulated.

55. A combustion turbine electric power plant comprising a combustion turbine having compressor, combustion and turbine elements, a generator coupled to said gas turbine for drive power, a fuel system for supplying fuel to said combustion turbine combustion element, means for operating said fuel system to energize said turbine, programmable digital computer means and signal input/output means therefor, means for operating said computer means to determine a feedforward speed fuel demand representation and a variable load fuel demand representation for desired plant operating conditions, circuit means external to said computer for controlling said fuel system operating means in accordance with said speed fuel demand representation, means for controlling said fuel system operating means in accordance with said load fuel demand representation to control generator load, and means for limiting the rate at which said load fuel demand representation changes during load operating level changes.

56. An electric power plant as set forth in claim 55 wherein said limiting means applies one limit rate for normal loading and a higher limit rate for emergency loading.

57. A combustion turbine power plant comprising a gas turbine having a compressor and combustion and turbine elements, a generator coupled to said combustion turbine for drive power, a generator breaker for coupling the generator to a power system, a fuel system for supplying fuel to the combustion turbine combustion element, a control system including digital computer means and signal input/output means therefor, means for controlling and operating said fuel system to energize said turbine, means for generating a turbine speed and other predetermined feedback signals, means for operating said computer means to make control action determinations for implementation by said fuel system operating means and to control the opening and closure of said generator breaker, said computer operating means generating a feed forward speed reference representation as one of said control action determinations, said computer operating means further generating a turbine load level determining representations in response to at least one of said other predetermined turbine signals, said computer operating means combining said representations to generate a fuel demand, means external to said computer means for controlling said fuel system operating means in response to the fuel demand and said speed signal means for turbine and generator speed control, and said computer operating means determining a load rate limit for limiting the rate at which said fuel system operating means can change the fuel flow rate during load level operating changes.

58. An electric power plant as set forth in claim 57 wherein said computer operating means further a feedforward speed reference representation, and means for controlling said fuel system operating means in response to the speed reference representation for turbine and generator speed control.

59. An electric power plant as set forth in claim 57 wherein said computer operating means further provides for determining at least one operating limit representation of a nonlinear turbine operating limit characterization applicable over at least one mode of the turbine operation, and means for controlling said fuel system operating means as a function of the nonlinear representation.

60. A combustion turbine electric power plant comprising a combustion turbine having compressor, combustion and turbine elements, a generator coupled to said combustion turbine for drive power, a fuel system for supplying fuel to said combustion turbine combustion element, means for operating said fuel system to energize said turbine, an operator panel having predetermined generator and gas turbine switches and indicating devices, programmable digital computer means and signal input/output means therefor, means for operating said computer means in accordance with predetermined generator and turbine parameters to determine a fuel demand representation for desired turbine operation, means including said computer operating means for entering parameter changes from said panel, means for controlling said fuel system operating means in accordance with said fuel demand representation, and means including said computer operating means for selectively displaying any of predetermined generator and turbine variables on each of at least some of the panel indicating devices.

61. An electric power plant as set forth in claim 60 wherein means including said computer operating means are provided for selectively displaying any of said predetermined generator and turbine parameters on each of at least some of said panel indicating devices.

62. A combustion turbine electric power plant comprising a combustion turbine having compressor, combustion and turbine elements, a generator coupled to said combustion turbine for drive power, a fuel system for supplying fuel to the combustion turbine combustion element, means for operating said fuel system to energize said turbine, means for generating a turbine speed signal and other predetermined turbine feedback signals, means for generating a feedforward speed reference representation as a function of a predetermined acceleration reference representation, means for a turbine load level determining representations in response to at least one of said other predetermined turbine signals, means for combining said representations to generate a fuel demand, and means for controlling said fuel system operating means in response to said fuel demand representation for turbine and generator speed control.

63. An electric power plant as set forth in claim 62 wherein a first speed reference is generated from a first acceleration reference for normal startup and a second faster speed reference is generated from a second acceleration reference for emergency startup.

64. An electric power plant as set forth in claim 62 wherein said generating means comprises programmable digital computer means having the acceleration reference representation in storage, and means are provided for operating said computer means to determine said speed reference from said acceleration reference.

65. A gas turbine electric power plant comprising a combustion turbine having compressor, combustion and turbine elements, a generator coupled to said combustion turbine for drive power, a fuel system for supplying fuel to said combustion turbine combustion element, means for operating said fuel system to energize said turbine, means for generating a turbine exhaust temperature limit representation as a function of an actual exhaust temperature representation and a representation of a nonlinear temperature reference characterization, applicable during startup operation, and means for controlling said fuel system operating means as a function of said nonlinear temperature limit.

66. An electric power plant as set forth in claim 65 wherein said controlling means includes a blade path temperature limit control arrangement and an exhaust temperature limit control arrangement and said nonlinear temperature reference is employed in both control arrangements.

67. An electric power plant as set forth in claim 65 wherein said nonlinear temperature reference representation includes a first normal nonlinear startup temperature reference representation and a second higher emergency nonlinear temperature reference representation.

68. A combustion turbine electric power plant comprising a combustion turbine having compressor, combustion and turbine elements, a generator coupled to said combustion turbine for drive power, a fuel system for supplying fuel to said combustion turbine combustion element, means for operating said fuel system to energize said turbine, means for generating a turbine exhaust temperature limit representation as a function of an actual exhaust temperature representation and a representation of a nonlinear temperature reference characterization, applicable during load operation, and means for controlling said fuel system operating means as a function of said nonlinear temperature limit.

69. An electric power plant as set forth in claim 68 wherein said controlling means includes a blade path temperature limit control arrangement and an exhaust temperature limit control arrangement and said nonlinear temperature reference is employed in both control arrangements.

70. An electric power plant as set forth in claim 68 wherein said nonlinear temperature reference representation includes a first nonlinear temperature reference representation and a second higher nonlinear temperature reference representation and a third higher nonlinear temperature representation.

71. A combustion turbine electric power plant comprising a combustion turbine having compressor and combustion and turbine elements, a generator coupled to said combustion turbine for drive power, a fuel system for supplying fuel to the combustion turbine combustion element, means for operating said fuel system to energize said turbine, means for generating a turbine exhaust temperature limit representation as a function of an actual exhaust temperature representation and a representation of a nonlinear temperature reference characterization applicable during startup operation, means for controlling said fuel system operating means as a function of a nonlinear temperature limit, and means for detecting generator load, and means for controlling said fuel system operating means in response to detected load to regulate the generator load substantially to a predetermined value.

72. Industrial combustion turbine apparatus comprising a combustion turbine having compressor and combustion and turbine elements, a fuel system for supplying fuel to the combustion turbine combustion element, means for operating said fuel system to energize said turbine, digital computer means and a signal input/output means therefor, means for operating said computer means to determine a fuel demand representation for desired turbine operation, means for controlling said fuel system operating means in accordance with the fuel demand representation, said fuel demand representation including a speed demand representation which is converted to an analog output speed reference signal from said computer means, and said fuel system controlling means includes means for detecting actual turbine speed and means for generating a fuel demand signal in response to the difference between the actual speed and the speed reference.

73. Combustion turbine plant apparatus as set forth in claim 72 wherein the fuel demand representation further includes at least one fuel demand limit representation, and means are provided for operating said fuel demand signal generating means in accordance with the lower fuel demand signal or representation.

74. Combustion turbine plant apparatus as set forth in claim 73 wherein the fuel demand representation includes a plurality of fuel demand limit representations.

75. Combustion turbine plant apparatus as set forth in claim 74 wherein said computer operating means provides a low selection from the fuel demand limit representation for conversion to a single output fuel demand limit signal.

76. Combustion turbine plant apparatus as set forth in claim 72 wherein means are provided for generating an auxiliary backup speed signal, and means are provided for limiting the fuel demand signal as a function of the backup speed signal.

77. Industrial combustion turbine apparatus comprising a combustion turbine having compressor and combustion and turbine elements, a fuel system for supplying fuel to the combustion turbine combustion element, digital computer control means for generating a fuel demand signal as a function of speed demand during speed control and as a function of speed demand and load setpoint or limit demand during load control, means for generating said speed and load demands, means for operating said fuel system to energize said turbine in response to said fuel demand, and means for operating said computer means to limit the rate at which said fuel demand representation changes during changes in the load on the turbine.

78. Industrial combustion turbine apparatus comprising a combustion turbine having compressor and combustion and turbine elements, a fuel system for supplying fuel to the combustion turbine combustion element, digital computer control means for generating a fuel demand signal as a function of speed demand during speed control and as a function of speed demand and load setpoint or limit demand during load control, means for generating said speed and load demands, means for operating said fuel system to energize said turbine, means for operating said computer means to generate a turbine exhaust temperature reference representation of a nonlinear temperature reference characterization to limit said speed demand during startup operation, and means for controlling said fuel system operating means as a function of the nonlinear temperature reference.

79. Industrial combustion turbine apparatus comprising a combustion turbine having compressor and combustion and turbine elements, a fuel system for supplying fuel to the combustion turbine combustion element, digital computer control means for generating a fuel demand signal as a function of speed demand during speed control and as a function of speed demand and load setpoint or limit demand during load control, means for generating said speed and load demands, means for operating said fuel system to energize said turbine, means for operating said computer means to generate a turbine exhaust temperature reference representation of a nonlinear temperature reference characterization to limit said load demand during turbine loading operation, and means for controlling said fuel system operating means as a function of the nonlinear temperature reference.

80. Industrial combustion turbine apparatus comprising a combustion turbine having compressor and combustion and turbine elements, a fuel system for supplying fuel to the combustion turbine combustion element, digital computer control means for generating a fuel demand signal as a function of speed demand during speed control and as a function of speed demand and load setpoint or limit demand during load control, means for generating said speed and load demands, means for operating said fuel system to energize said turbine, means for operating said computer means to generate a surge limit representation of a nonlinear surge limit characterization to limit said speed demand during turbine startup, and means for controlling said fuel system operating means as a function of the nonlinear surge limit representation.

81. A computer control system for operating industrial combustion turbine apparatus including a combustion turbine having compressor and combustion and turbine elements and a fuel system for supplying fuel to the combustion element, said control system comprising digital computer means, signal input/output means for said computer means, means for controlling the operation of the fuel system, means for generating a turbine speed and other predetermined feedback signals, means for operating said computer means to generate a feedforward speed reference representation, said computer operating means further generating a turbine load level determining representation in response to at least one of said other predetermined turbine signals, said computer operating means combining said representations to generate a fuel demand, and means external to said computer means for controlling said fuel system operating means in response to the fuel demand and said speed signal means for turbine and generator speed control.

82. A control system for operating a combustion turbine-electric power plant including an electric generator and a generator breaker and a combustion turbine having compressor and combustion and turbine elements and a fuel system for supplying fuel to the combustion element, said control system comprising digital computer means, signal input/output means for said computer, means for controlling the operation of the generator breaker, means for controlling the operation of the fuel system, means for operating said computer means to generate control outputs for both of said controlling means, said computer operating means generating a fuel demand for turbine speed and load control in response to a turbine speed demand and a turbine load setpoint or limit demand, means for generating at least one of said speed and load demand signals in response to a nonlinear turbine operating limit characterization, and means for controlling said fuel system operating means in response to a computer means output signal corresponding to said fuel demand.

83. A computer control system for operating industrial combustion turbine apparatus, including a combustion turbine having compressor and combustion and turbine elements and a fuel system for supplying fuel to the combustion element, said control system comprising digital computer means, signal input/output means for said computer means, means for detecting actual turbine speed, means for operating said computer means to generate an output speed reference demand during speed and load modes of operation, means for operating said computer means to generate a load setpoint or limit demand signal during the load mode of operation, said computer operating means combining said speed and load demands to generate a speed fuel demand during startup and a load fuel demand during load operation, an analog speed control generating an output in response to the actual speed and the reference fuel demand signals during the startup and load mode, and means for controlling the operation of the fuel system as a function of the speed control output.

84. A computer control system as set forth in claim 83 wherein said computer operating means further generates at least one fuel demand limit representation, and means for limiting the operation of said fuel system controlling means in accordance with the fuel demand limit.

85. A computer control system as set forth in claim 84 wherein a plurality of fuel demand limit representations are generated by said computer operating means and the lowest fuel demand limit is as an output for the operation of said fuel operation limiting means.

86. A computer control system as set forth in claim 84 wherein a non-linear startup surge limit representation is generated.

87. A computer control system as set forth in claim 84 wherein a non-linear startup and load exhaust temperature reference is generated by said computer operating means, means are provided for determining a temperature representative of actual exhaust temperature, and an exhaust temperature limit representation is generated as a function of the actual and reference temperature representations.

88. A computer control system as set forth in claim 87 wherein a non-linear startup surge limit representation is generated and the lowest fuel demand limit is selected.

89. A computer control system for operating an industrial combustion turbine apparatus including a combustion turbine having compressor and combustion and turbine elements and a fuel system for supplying fuel to the combustion element, said control system comprising digital computer means, signal input/output means for said computer means, means for controlling the operation of the fuel system, means for operating said computer means to generate a turbine exhaust temperature limit representation as a function of a determined exhaust temperature representation and a representation of a non-linear temperature reference characterization applicable during startup and turbine loading operation, and means for controlling said fuel system operating means as a function of the non-linear temperature limit.

90. The method according to claim 4 wherein said second step of operating the computer includes the step of generating a surge limit representation of a nonlinear surge limit characterization which is effective during turbine startup.

91. The method according to claim 90 wherein said second step of operating the computer includes the step of generating a generator load demand representation.

92. The method according to claim 90 wherein said second step of operating the computer includes the step of generating a generator load demand representation.

* * * * *